United States Patent
Yokoyama et al.

(10) Patent No.: US 7,381,383 B1
(45) Date of Patent: Jun. 3, 2008

(54) TREATING APPARATUS, TREATING METHOD AND METHOD OF TREATING SOIL

(75) Inventors: Yoshiaki Yokoyama, Kounosu (JP); Toru Kodama, Toyota (JP); Yasuo Mishima, Toyota (JP); Katuo Takamiya, Toyota (JP); Tsuyoshi Abe, Toyota (JP); Hitoshi Mizuno, Toyota (JP)

(73) Assignee: Hoei Shokai Co., Ltd., Toyota-shi (JP)

( * ) Notice: Subject to any disclaimer, the term of this patent is extended or adjusted under 35 U.S.C. 154(b) by 0 days.

(21) Appl. No.: 09/711,362

(22) Filed: Nov. 10, 2000

Related U.S. Application Data

(63) Continuation of application No. PCT/JP99/02470, filed on May 13, 1999.

(30) Foreign Application Priority Data

| | | | |
|---|---|---|---|
| May 13, 1998 | (JP) | ...... | 10-148435 |
| Sep. 28, 1998 | (JP) | ...... | 10-273417 |
| Dec. 27, 1998 | (JP) | ...... | 10-377175 |

(51) Int. Cl.
*B01J 19/00* (2006.01)
*B09B 3/00* (2006.01)
*B09C 1/06* (2006.01)
*C08J 11/12* (2006.01)

(52) U.S. Cl. ...... 422/198; 422/244; 422/288; 266/144; 266/148; 266/149; 266/153; 266/271

(58) Field of Classification Search ...... 422/168–9, 422/173, 177, 255, 285, 288, 307, 308, 244; 266/161, 200, 149, 148, 152, 153; 432/152, 432/200, 208, 128

See application file for complete search history.

(56) References Cited

U.S. PATENT DOCUMENTS 2,446,403 A * 8/1948 Bassereau ...... 75/595

(Continued)

FOREIGN PATENT DOCUMENTS

JP 03130317 A * 6/1991

(Continued)

OTHER PUBLICATIONS

Derwent Machine Assisted Translation: Tejima et al., JP 9-248549, Sep. 1997.*

Primary Examiner—Jennifer A Leung
(74) Attorney, Agent, or Firm—Oblon, Spivak, McClelland, Maier & Neustadt, P.C.

(57) ABSTRACT

A treatment apparatus of the present invention includes a hermetic door 115b and a retort 115c as an interface for taking out a gaseous emission containing vaporized substances from an object to be treated which is being heated in a reduced pressure state in a second hermetic chamber 103 while maintaining conditions in the second hermetic chamber. When the retort 115c is inserted into a first opening 103b of the second hermetic chamber, the hermetic door 115b in an open state is shielded from the second hermetic chamber 103, whereby condensation of the gaseous emission at the hermetic door is prevented. Accordingly, condensates can be taken out while conditions such as temperature and pressure in the hermetic chamber are maintained without the treatment apparatus being stopped. The productivity of treatment is greatly improved by continuous operation of such a treatment apparatus.

19 Claims, 47 Drawing Sheets

U.S. PATENT DOCUMENTS

| | | | |
|---|---|---|---|
| 2,657,031 A * | 10/1953 | Tomlinson et al. | 34/66 |
| 3,130,584 A * | 4/1964 | Kennedy | 374/110 |
| 3,152,479 A * | 10/1964 | Small | 73/863.12 |
| 3,643,508 A * | 2/1972 | Schneider | 374/143 |
| 3,770,501 A * | 11/1973 | Kemper | 134/19 |
| 3,832,904 A * | 9/1974 | Dreuw et al. | 73/863.85 |
| 3,888,123 A * | 6/1975 | Kuntziger et al. | 73/863.11 |
| 3,907,261 A * | 9/1975 | Legille | 266/144 |
| 4,054,060 A * | 10/1977 | Ueno et al. | 73/863.85 |
| 4,294,124 A * | 10/1981 | Kalwaitis | 73/863.85 |
| 4,431,612 A * | 2/1984 | Bell et al. | 422/186.08 |
| 4,518,353 A * | 5/1985 | Banno et al. | 432/152 |
| 4,630,939 A * | 12/1986 | Mayes | 374/135 |
| 4,667,609 A * | 5/1987 | Hardison et al. | 110/236 |
| 5,205,857 A * | 4/1993 | Yokoyama | 75/401 |
| 5,350,438 A * | 9/1994 | Okada et al. | 266/149 |
| 5,562,383 A * | 10/1996 | Iwai et al. | 414/217.1 |
| 5,624,255 A * | 4/1997 | Hisada et al. | 432/128 |
| 5,735,933 A * | 4/1998 | Yokoyama et al. | 429/49 |
| 6,332,909 B1 * | 12/2001 | Teshima et al. | 432/128 |

FOREIGN PATENT DOCUMENTS

| | | |
|---|---|---|
| JP | 05-086478 | 4/1993 |
| JP | 8-501601 | 2/1996 |
| JP | 09-126427 | 5/1997 |
| JP | 09-248549 | 9/1997 |
| JP | 10099815 A * | 4/1998 |
| JP | 11-019625 | 1/1999 |
| JP | 2000-246085 | 9/2000 |
| JP | 2000-249477 | 9/2000 |

* cited by examiner (a)

| | 600°C THERMAL DECOMPOSITION NORMAL PRESSURE | 600°C THERMAL DECOMPOSITION REDUCED PRESSURE | 800°C THERMAL DECOMPOSITION NORMAL PRESSURE | 800°C THERMAL DECOMPOSITION REDUCED PRESSURE | 800°C THERMAL DECOMPOSITION B REDUCED PRESSURE |
|---|---|---|---|---|---|
| PCDFs | 0.05822 | n.d. | 4.75 | n.d. | n.d. |
| PCDDs | 0.62615 | 0.00021 | 19.36 | n.d. | n.d. |
| PCDFs+PCDDs | 0.68437 | 0.00021 | 24.11 | n.d. | n.d. |

UNIT : [ng/g]

US 7,381,383 B1

TREATING APPARATUS, TREATING METHOD AND METHOD OF TREATING SOIL

CROSS-REFERENCE TO RELATED APPLICATIONS

This application is a continuation under 35 U.S.C. §365 (c) of International Patent Application No. PCT/JP99/02470 filed on May 13, 1999 which designated the United States.

TECHNICAL FIELD

The present invention relates to a treatment apparatus, a treatment method, and a soil treatment method, and particularly relates to a treatment apparatus, a treatment method, and a soil treatment method for treating an object to be treated containing heavy metals such as lead and noxious organic halides such as dioxins. Furthermore, the present invention relates to a treatment apparatus and a treatment method capable of continuously treating an object to be treated containing metals and organic substances.

BACKGROUND ART

An enormous amount of wastes which modern society holds continue increasing day by day, and the establishment of effective treatment technology is an urgent necessity.

Various useful substances are contained in wastes, but they are not separated from the wastes because of difficulty in separation and the like, and most of wastes are disposed of just as they are by reclamation or combustion. The useful substances in the wastes are required to be separated and recovered, and recycled as much as possible since there exist an energy problem and a problem of exhausting resources.

Meanwhile, noxious substances are also contained in the wastes. These noxious substances is not only a cause of environmental disruption but also one of the main causes of difficulty in recycling wastes. Therefore, if the noxious substances in the wastes can be removed effectively, wastes can be recycled positively as a treasury of resources, and influence on the environment and creatures can be held to a minimum.

As described above, the technology for treating wastes effectively needs to be established by all means to solve serious problems surrounding modern society such as environmental pollution, disappearance of resources, and shortage of energy source.

The types of wastes are, however, complicated and various in recent years, and there are many complex wastes in which a plurality of different materials are integrated, and moreover there are wastes containing noxious substances. To recycle such complex wastes as resources, it is required to selectively separate and recover useful substances and noxious substances from the wastes in which a plurality of different materials are integrated, but such treatment technology has not established yet.

From a different point of view, wastes become a treasury of resources if noxious substances can be separated therefrom. The so-called wastes are called so by relative value judgment. If recycling technology can be established and the cost necessary for recycling can be reduced, they are no longer wastes but become resources.

The present invention is made to solve the aforesaid problems. Namely, an object of the present invention is to provide a treatment apparatus and a treatment method capable of effectively and economically treating an object having metals and organic substances as its components.

Another object of the present invention is to provide a treatment apparatus and a treatment method capable of suppressing the production of dioxins, and particularly a treatment apparatus and a treatment method capable of suppressing the production of organic halides containing dioxins in thermal decomposition treatment of waste automobiles and the like, and treatment of refuse and wastes from factories and general households. Still another object of the present invention is to provide a treatment method and a treatment apparatus capable of lowering the concentration of residual dioxins in a thermally decomposed residue, burned residue, residual liquid, soil, sludge, and the like which contain noxious organic halides such as dioxins. Yet another object of the present invention is to produce clean soil from soil containing organic halides such as dioxins. Another object of the present invention is to provide a treatment method and a treatment apparatus capable of cleaning soil and burned fly ashes contaminated by noxious substances such as organic halides such as dioxins, PCB, and coplanar PCB, and heavy metals.

DISCLOSURE OF THE INVENTION

To solve the aforesaid problems, a treatment apparatus of the present invention adopts the following structure. Namely, the treatment apparatus of the present invention is characterized by comprising a first hermetic chamber having a first opening, a tube capable of inserting into the first opening, and the tube having a second opening in an inserting direction, and a hermetic door capable of opening and closing the first opening, and the door being shielded from the first hermetic chamber by the tube when the tube is inserted into the first opening.

As the first hermetic chamber, a heating furnace and a reduced pressure heating furnace, for example, can be named. Such a hermetic chamber may have single chamber structure, and in addition, a plurality of such hermetic chambers may be arranged with doors between them. A purge chamber for purging a treatment atmosphere for an object to be treated, a preheating chamber for preheating the object to be treated, a cooling chamber for cooling the object to be treated, and the like may be further provided at a stage before or after these hermetic chambers. When the pressure in a first hermetic chamber is reduced, it is recommended that an exhaust system for exhausting the contents of the first hermetic chamber through a first opening be provided. As an exhaust system, various kinds of vacuum pumps (a rotary pump, an oil diffusion pump, a mechanical booster pump, a turbo-molecular pump, a getter-ion pump, a liquid sealing pump, and the like), a blower, a fan, and the like can be given. By such an exhaust system, the pressure in the first hermetic chamber can be regulated.

The first opening is provided in the first hermetic chamber. In the treatment apparatus of the present invention, a gaseous emission produced from the object to be treated by heating, pressure reduction, and the like in the first hermetic chamber is taken out through the tube inserted into the first opening and treated when the hermetic door is open. The gaseous emission is taken here to include gases, liquid drops, mist, solid fine particles, and the like produced by heating of the object to be treated, pressure reduction, and the like. As the gaseous emission, gases produced by thermal decomposition or reaction of components of the object to be treated, gases vaporized from components, and the like can be named. Such a gaseous emission taken out of the first hermetic chamber is introduced to a predetermined treatment system. There are various types of the treatment system for the gaseous emission, and for example, condensation, thermal decomposition, cracking, reforming (including hydroreforming), decomposition by a catalyst, decomposition by plasma or glow discharge, adsorption by various kinds of adsorbents, and trap by a dry filter or a wet filter (a liquid filter) can be shown. These first openings may be provided in plurality. Moreover, it is desirable to provide this first opening separately from an opening for introducing the object to be treated into the first hermetic chamber and an opening for taking the object to be treated out of the first hermetic chamber.

The hermetic door which is an openable and closeable shutter is placed at the first opening of the first hermetic chamber. It is recommended that the hermetic door be opened and closed, for example, by a drive mechanism such as a cylinder. When the operating direction of the hermetic door is substantially perpendicular to the normal direction of an open face of the first opening, a joint for converting the pushing force of the cylinder to the normal direction of the open face of the first opening may be provided at a connection portion of the cylinder and the hermetic door. Thus, the hermetic door can be pushed more strongly in the normal direction of the first open face, thereby improving hermetic sealing capability. The hermetic doors may be provided multi-fold. It is desirable to cool a portion which a seal portion of the hermetic door touches when the hermetic door is closed.

In the treatment apparatus of the present invention, the hermetic door is opened, the tube is inserted into the first opening of the first hermetic chamber from outside, and the gaseous emission is taken out of the hermetic chamber to the outside through this tube. Moreover, it is suitable to provide a second hermetic chamber connected to the first hermetic chamber via the first opening and insert the tube from this second hermetic chamber to the first opening. The tube has an external shape such as fits the first opening. As the shape of the tube, an example in which the tube has a third opening on a side opposite to the first hermetic chamber with the hermetic door therebetween when the tube is inserted into the first opening is given. The third opening may be provided so as to face the second opening or may be provided in a side face of the tube.

Moreover, it is suitable that the tube has double structure and that a refrigerant such as nitrogen gas, air, or water is circulated between the internal layer and the external layer, whereby the shielding capability of the hermetic door by the tube can be improved and the tube can be cooled effectively. Also when a metal is vaporized from the object to be treated and the vaporized metal is condensed in the tube, for example, condensation efficiency can be raised. In addition, the tube may be exchangeably provided. If so, the tube functions also as an exchangeable cartridge for recovering condensates.

When the tube is inserted into the first opening, the hermetic door is shielded from the first hermetic chamber by a zone between the second opening and the third opening in the side face of the tube. Therefore, the gaseous emission can be prevented from condensing at the hermetic door or adhering thereto. Also when packing made of resin or the like is provided at a seal portion of the hermetic door, for example, the damage of the seal portion of the hermetic door by heat of the gaseous emission can be prevented. Accordingly, the sealing capability of the hermetic door can be maintained. As described above, in the treatment apparatus of the present invention, an interface from the first hermetic chamber to the outside is realized by the hermetic door and the tube.

It is suitable to provide a cylindrical sleeve at the first opening of the first hermetic chamber and to insert the tube into this sleeve. With a change in the temperature inside the first hermetic chamber, the tube, the first opening, or the sleeve deforms due to thermal expansion or the like. In some cases, the inserted tube can not be pulled out of the first opening or the tube by this thermal expansion. Therefore, it is suitable to make the thermal expansion coefficient of the sleeve equal to or larger than the thermal expansion coefficient of the tube, for example. Furthermore, the tube may be selectively contracted by heating the sleeve or keeping the sleeve warm, and cooling the tube.

Moreover, it is desirable to make the sleeve of a material with high thermal conductivity such as carbon or metal. Thus, vaporized substances from the object to be treated condense after going far away from the second opening of the tube. Accordingly, recovering efficiency can be raised.

In order to assist the moving operation of the tube, a means, placed along the inserting direction of the tube, for guiding the inserting, attaching and detaching operation of the tube may be provided in the treatment apparatus of the present invention. It is recommended that a guide rail, a guide roller, or the like, for example, be provided as the guide means as required.

As an aspect of the treatment apparatus of the present invention, the treatment apparatus further comprises the second hermetic chamber adjoining the first hermetic chamber with the hermetic door therebetween, in which the tube is inserted into the first opening of the first hermetic chamber from the second hermetic chamber is given. Namely, the first hermetic chamber and the second hermetic chamber are connected via the first opening in which the hermetic door is provided. The tube is inserted from the second hermetic chamber into the first opening. When the tube is inserted into the first opening of the first hermetic chamber, the first hermetic chamber and the second hermetic chamber are connected by the tube. When the tube is inserted into the first opening, the second opening of the tube is positioned on the first hermetic chamber side of the hermetic door, whereas the third opening is positioned on the second hermetic chamber side of the hermetic door. Simultaneously, the hermetic door is shielded from the first hermetic chamber and the second hermetic chamber by the tube.

In the second hermetic chamber, various kinds of treatments for the gaseous emission from the object to be treated can be performed. For example, the gaseous emission may be condensed by cooling the second hermetic chamber or the tube. Moreover, the gaseous emission may be reformed or cracked in the second hermetic chamber. The tube or the second hermetic chamber may be provided between the first hermetic chamber and the exhaust system. In this case, the exhaust system is connected to the first hermetic chamber via the tube or the second hermetic chamber. The adoption of such structure enables a metal vaporized from the object to be treated under reduced pressure in the first hermetic chamber to be condensed in the tube or the second hermetic chamber in a reduced pressure state. The treatment of the gaseous emission also can be performed in a reduced pressure state. The distance between molecules becomes longer under reduced pressure, and hence opportunities of reaction between molecules get fewer than under normal pressure or under increased pressure. Even when components having organic halide producing capability such as aromatic hydrocarbon, halogen, and oxygen are contained in the gaseous emission, for example, the production of organic halides can be suppressed. Moreover, the reduced pressure state is suitable when the treatment of the gaseous emission by plasma discharge or the like is performed.

It is desirable to regulate the temperature in the second hermetic chamber (by cooling or heating). As the cooling structure of the second hermetic chamber, for example, so-called water cooling jacket structure in which the second hermetic chamber has double structure and a refrigerant such as water is circulated in its external layer can be shown. Thus, vaporized substances or the gaseous emission from the object to be treated can be condensed efficiently in the tube or the second hermetic chamber.

When the tube is provided as an exchangeable cartridge, it is suitable, for example, to provide a hermetically openable and closeable door for exchanging the tube in the second hermetic chamber, open the door, and exchange the tube. Incidentally, if the metal condensed in the tube or the second hermetic chamber is taken out as it is into the atmosphere, the metal combusts strongly in some cases. Therefore, when the metal is condensed and recovered, it is desirable to cool the condensed metal by a non-oxidizing gas before being taken out. Accordingly, it is preferable that the second hermetic chamber comprises a means for supplying a non-oxidizing gas.

In the treatment apparatus of the present invention, even when the second hermetic chamber is opened and the tube is taken out, the leakage of outside air into the first hermetic chamber can be prevented since the hermetic sealing capability of the hermetic door is maintained. Hence, the tube can be taken out while temperature conditions and pressure conditions in the first hermetic chamber are maintained. This enables continuous operation of the treatment apparatus and a rise in the productivity of treatment. In this point, the treatment apparatus of the present invention differs much from a conventional treatment apparatus which needs to be stopped when the gaseous emission or the condensates thereof are taken out of a system.

The exhaust system may be connected to the second hermetic chamber or may be connected to the third opening of the tube. In the former case, the gaseous emission is led from the tube to the exhaust system through the second hermetic chamber. In the latter case, the gaseous emission is led from the third opening of the tube to the exhaust system directly. Moreover, it is desirable to connect the third opening of the tube and the exhaust system as hermetically as possible. By connecting the third opening of the tube and the exhaust system directly, the condensation of vaporized substances from the object to be treated in the second hermetic chamber can be prevented.

In order to lead the gaseous emission from the object to be treated to the outside by the tube while shielding the hermetic door by the tube, it is desirable that the tube fits the first opening or the sleeve as perfectly as possible. In some cases, the tube can not be easily pulled out of the sleeve due to thermal expansion of the sleeve, the tube, or the condensates into the tube. If the third opening of the tube and the exhaust system are connected directly, an atmosphere in a space between the second hermetic chamber and the tube is exhausted through the first hermetic chamber and the tube even if there is a small gap between the tube and the sleeve, which can prevent the gaseous emission from flowing into the space between the second hermetic chamber and the tube. To connect the third opening of the tube and the exhaust system, a pipe or packing for connecting the third opening and the exhaust system when the tube is inserted into the first opening may be used.

Further, a means for performing regulation so that the pressure in the space between the tube and the second hermetic chamber is higher than the pressure in the first hermetic chamber when the tube is inserted into the first opening of the first hermetic chamber may be further provided. Furthermore, a means for performing regulation so that the pressure in the first hermetic chamber is lower than the pressure in the space between the tube and the second hermetic chamber and higher than the pressure in the tube when the tube is inserted into the first opening of the first hermetic chamber may be provided. Namely, when the pressure in the first hermetic chamber is P1, the pressure in the space between the tube and the second hermetic chamber is P2, and the pressure in the tube is P3, the entry of the vaporized substances into the space between the tube and the second hermetic chamber from the first hermetic chamber can be prevented by letting P2>P1 and more preferably P2>P1>P3.

The aforesaid pressure regulation may be performed by supplying a carrier gas to the space between the tube and the second hermetic chamber. The carrier gas supplied to the space between the tube and the second hermetic chamber is led into the tube through the first hermetic chamber, and exhausted through the third opening of the tube. Therefore, the space between the tube and the second hermetic chamber is sealed from the first hermetic chamber by pressure. The space between the tube and the second hermetic chamber communicates with a space in which the hermetic door is housed when being open, whereby the condensation of the vaporized substances from the object to be treated at the hermetic door, and more particularly at the seal portion thereof can be prevented. Moreover, a fitting margin of the tube and the sleeve is increased by adopting the aforesaid structure, which can prevent the tube and the sleeve from being locked by engagement.

Further, in the treatment apparatus of the present invention, a filter means placed between the second hermetic chamber (or the tube) and the exhaust means may be further provided. It is desirable to provide at least a wet filter as the filter means. When the pressure in the first hermetic chamber is reduced by the exhaust system to thereby condense the vaporized substances from the object to be treated in a space between the first hermetic chamber and the exhaust system, uncondensed vaporized substances and condensed solid particles reach a vacuum pump in any case. Thus, the vacuum pump is damaged or maintenance frequency is raised. In the treatment apparatus of the present invention, the provision of a wet filter for trapping fine particles, dust, and the like in gases by a liquid such as oil or water at a stage prior to the exhaust system can prevent the fine particles, dust, and the like from reaching the vacuum pump. An oil film filter in which a carrier in the form of cloth is soaked with oil can be used as the wet filter. The oil forms an oil film by being sucked up by capillarity or the like. Dust and fine particles lead to the exhaust system are trapped by this oil film. Acid substances such as nitrogen oxides and sulfur oxides may be trapped by forming a liquid film of an aqueous solution such as an alkaline solution or the like in place of oil. Also a liquid sealing pump such as a water sealing pump or an oil sealing pump may be used as the wet filter, in which case dust and fine particles are trapped by sealing liquid in the liquid sealing pump.

It is naturally suitable to place a dry filter such as a net or a non-woven fabric between the tube, the second hermetic chamber, or both of them and the vacuum pump. Such a dry filter may be placed inside the tube or the second hermetic chamber. As for such a filter of the type to trap solids in a dry state, it is inevitable to let a part of the trapped dust pass if the exhaust operation from the rear side by the vacuum pump is performed, and hence it is desirable to use it in combination with the wet filter.

A treatment method of the present invention is characterized by comprising the steps of heating an object to be treated in a hermetic zone to thermally decompose a component of the object to be treated, and opening a hermetic door and inserting a tube from the side of a treatment system for a component of a gaseous emission produced by the thermal decomposition adjoining the hermetic zone with the openable and closeable hermetic door therebetween so that the hermetic door is shielded from the hermetic zone to introduce the gaseous emission to the treatment system side.

Further, a treatment method of the present invention is characterized by comprising the steps of introducing an object to be treated into a hermetic zone, reducing a pressure in the hermetic zone to extract a component of the object to be treated, and opening a hermetic door and inserting a tube from the side of a treatment system for the extracted component adjoining the hermetic zone with the openable and closeable hermetic door therebetween so that the hermetic door is shielded from the hermetic zone to introduce the extracted component to the treatment system side.

Furthermore, a treatment method of the present invention is characterized by comprising the steps of heating an object to be treated containing a first metal under reduced pressure in a first hermetic zone to vaporize the first metal, inserting a tube from a second hermetic chamber adjoining the hermetic zone with an openable and closeable hermetic door therebetween so that the hermetic door is shielded from the first hermetic chamber, and cooling the tube to condense the first metal.

Moreover, a treatment apparatus of the present invention is characterized by comprising the steps of heating a soil containing a first metal under reduced pressure in a hermetic zone to vaporize the first metal, inserting a tube from a second hermetic chamber adjoining the hermetic zone with an openable and closeable hermetic door therebetween so that the hermetic door is shielded from the first hermetic chamber, and cooling the tube to condense the first metal vaporized from the object to be treated.

Additionally, a treatment apparatus of the present invention is characterized by comprising the steps of heating a soil containing a moisture, an organic substance, and a first metal in a hermetic zone to vaporize the moisture and vaporize or thermally decompose the organic substance, opening a first hermetic door and inserting a tube from the side of a treatment system for the moisture, the organic substance, or a thermal decomposition product of the organic substance connected to the hermetic zone with the openable and closeable first hermetic door therebetween so that the first hermetic door is shielded from the hermetic zone to introduce the vaporized moisture, the vaporized organic substance, or the thermal decomposition product of the organic substance to the treatment system side, vaporizing the first metal after the vaporization of the moisture and the organic substance and the thermal decomposition of the organic substance, opening a second hermetic door and inserting a tube from the side of a second hermetic chamber adjoining the hermetic zone with the openable and closeable second hermetic door therebetween so that the second hermetic door is shielded from the hermetic zone to introduce the vaporized first metal to the second hermetic chamber, and cooling the tube to condense at least the first metal. It is desirable to cool a heated residue in the treatment apparatus by a cooling gas which is substantially organic halide-free after the first metal is vaporized from the soil.

Namely, the treatment method of the present invention is a method for taking the gaseous emission out of the hermetic zone while maintaining various conditions such as the temperature, pressure, and oxygen concentration in the hermetic zone when heating of the object to be treated, pressure reduction, and the like are performed in the hermetic zone. Therefore, in the present invention, the door placed at the opening of the hermetic zone and capable of hermetically sealing the hermetic zone, and the tube to be inserted into and pulled out of the opening of the hermetic zone are adopted. As described above, in the present invention, when the door is opened and the gaseous emission is introduced from the hermetic zone to the treatment system, the tube is inserted into the opening, and the door at a waiting position in an open state is shielded from the gaseous emission by this tube. The adoption of such structure can prevent the gaseous emission from condensing at and adhering to the hermetic door, and also can prevent a seal portion of the hermetic door from being damaged by the heat of the gaseous emission, whereby the sealing capability of the hermetic door can be maintained.

Next, examples of a treatment apparatus to which the present invention can be applied will be explained. The present invention in which the gaseous emission from the object to be treated is taken out to the treatment system from the hermetic zone by the use of the tube and the hermetic door can be applied to various kinds of treatment apparatus which will be explained below.

To treat an object to be treated having resins and metals as its components, a treatment system means for treating organic substances such as resins and a treatment system for vaporizing and recovering metals are provided in the present invention.

A treatment apparatus of the present invention is a treatment apparatus for treating an object to be treated having resins and metals as its components, characterized by comprising a first hermetic zone including a temperature regulating means and a pressure regulating means for regulating a temperature and a pressure so that the resins in the object to be treated are thermally decomposed selectively, a second hermetic zone partitioned from the first hermetic zone by an openable and closeable partition and including a temperature regulating means and a pressure regulating means for regulating a temperature and a pressure so that a metal in the object to be treated is selectively vaporized, a first treatment system connected to the first hermetic zone and treating gases produced by the thermal decomposition of the resins, and a second treatment system connected to the second hermetic zone and treating the metal vaporized from the object to be treated.

In the first hermetic zone, organic substances such as resins are thermally decomposed selectively so that metals (except mercury) in the object to be treated are not vaporized. Generally, when the object to be treated is complicated, there is a possibility that the object to be treated is partially oxidized or reduced, or a phase equilibrium state changes during treatment, but it is only required that the component metals (except mercury only) of the object to be treated remain in the object to be treated or the first hermetic zone without being vaporized. Moreover, a temperature regulating means and a pressure regulating means for decomposing organic substances while performing maintenance so that the component metals of the object to be treated are not substantially oxidized may be provided.

It is recommended to use a heating means and a temperature measuring means as the temperature regulating means. It is suitable to select the heating means from various kinds of heating such as convention heating, radiation heating, and the like as required or use them in combination as the heating means. For example, resistance heating by a sheathed heater, a radiant tube, or the like may be used, or gas, heavy oil, light oil, or the like may be combusted. Besides, an induction heating means may be used. As the temperature measuring means, various kinds of temperature sensors may be used.

In the first hermetic zone, organic substances such as resins are selectively decomposed and vaporized (including vaporization after liquefaction) or carbonized on temperature and pressure conditions such that metals in the object to be treated are not oxidized nor vaporized much.

Gases produced by the decomposition of resins and vaporized are treated in the first treatment system, and for example, recovered. It is suitable to combust the recovered decomposition products of the resins and use them as a heating means. As described above, generally, when the object to be treated is complicated and abundant, there is a possibility that the object to be treated is partially oxidized or reduced, or a phase equilibrium state changes during treatment. For example, when component metals of the object to be treated are mixed in the first treatment system for recovering decomposition products of resins, it is recommended that the metals be separated and recovered in the subsequent process.

It is recommended that an exhaust means or a pressurizing means and a pressure measuring means be used as the pressure regulating means. It is suitable to use various kinds of vacuum pumps such as a rotary pump, an oil diffusion pump, and a booster pump as the exhaust means. As the pressurizing means, a gas may be introduced into the system, for example, from a gas reservoir. It is recommended that a Bourdon tube, a Pirani gauge, or the like be used as the pressure measuring means according to the degree of vacuum to be measured.

Further, a purge zone may be provided adjacent to the first hermetic zone. It is suitable that a pressure regulating means such as an exhaust system or a pressurization system and a temperature regulating means for preheating or cooling the object to be treated are provided. Furthermore, a carrier gas introduction system for purging gas in the system may be provided, and the carrier gas introduction system may serve also as a pressurization system. The object to be treated is introduced to the first hermetic zone from the outside of the apparatus through the purge zone.

By providing the purge zone, the first hermetic zone is isolated from the outside of the apparatus on the occasion of the introduction of the object to be treated to the first hermetic zone. In addition, the contents of the first hermetic zone are always exhausted and the first hermetic zone is maintained in a reduced pressure state, whereby the burden imposed on the vacuum pump is lightened.

Similarly, a purge zone may be provided adjacent to the second hermetic zone. The object to be treated is taken out of the second hermetic zone to the outside of the apparatus through the purge zone.

By providing the purge zone at the stage following the second hermetic zone, the second hermetic zone is isolated from the outside of the apparatus when the object to be treated is taken out of the second hermetic zone. Accordingly, the contents of the second hermetic zone are always exhausted and the second hermetic zone is maintained in a reduced pressure state, whereby the burden imposed on the vacuum pump is lightened. Moreover, the object to be treated can be kept being shielded from the outside air until the temperature of the heated object to be treated is cooled to a temperature such that the object to be treated is not oxidized even under atmospheric pressure.

Namely, the purge zone functions as a buffer zone between the outside of the apparatus and the first and second hermetic zones in terms of the maintenance of the apparatus and in terms of the maintenance of the object to be treated.

The first hermetic zone and the second hermetic zone of the treatment apparatus are partitioned by an openable and closeable partition. This partition maintains the hermetic sealing capability of each of the zones and the heat insulating properties of each of the zones. For example, a vacuum door for maintaining hermetic sealing capability and a heat insulating door for maintaining heat insulating properties may be used in combination. If the first and second hermetic zones are partitioned by partitions in order of a heat insulating door, a vacuum door, and a heat insulating door, the hermetic sealing capability and heat insulating properties of each of the zones are maintained. The aforesaid placement of the heat insulating doors between the vacuum door and the zones partitioned by this vacuum door can protect the vacuum door from thermal load even when large thermal load is imposed on the vacuum door. In this case, the vacuum door is protected from heat of the first and second hermetic zones.

These partitions are of course placed between the outside of the apparatus and the purge zone, between the purge zone and the first hermetic zone, and between the second hermetic zone and the purge zone, but it is recommended that the kind of partition to be placed be designed as required. For example, when the thermal load of the purge chamber is small, the vacuum door may be placed.

In the first hermetic zone to which the object to be treated is introduced, temperature and pressure conditions are regulated so that resins are decomposed while the state of metals in the object to be treated is maintained. The temperature and pressure conditions may be set previously or may be controlled by feeding back measured values of temperature and pressure to the heating means and the pressure regulating means. This applies to the second hermetic zone, too.

If the pressure inside the first hermetic chamber is reduced, the oxygen concentration is also lowered, and thus the object to be treated is never oxidized abruptly by heating. Moreover, although a large quantity of gases are produced by decomposition of resins by heating, oxygen is hardly produced even the resins are decomposed, generally. Furthermore, decomposition products of the resins are easily vaporized.

Meanwhile, if the pressure is reduced, the thermal conductivity inside the hermetic zone is lowered. If a non-oxidizing atmosphere is maintained in the first hermetic zone, the object to be treated is not substantially oxidized even under atmospheric pressure or under increased pressure. Thus, if a non-oxidizing atmosphere is maintained in the first hermetic zone, pressurization is possible and the thermal conductivity inside the system is raised.

The first treatment system treats a gaseous emission containing gases produced by decomposition of organic substances composing the object to be treated, in which case resins may be synthetic resins, natural resins, or a mixture of these resins.

A liquefying device for condensing and liquefying gases may be used as the first treatment system. When gases such as halogen and organic halides are contained in the gases produced by decomposition of resins, the gases may be decomposed, for example, by using a catalyst or the like.

As described above, heavy oil, light oil, and the like recovered by the first treatment system may be used for heating in the first or the second hermetic zone.

Moreover, the first treatment systems may be provided in plural lines or connected in multiple tiers.

Most of resin components of the object to be treated are decomposed in the first hermetic zone, and gases produced by the decomposition are recovered or made innoxious. Accordingly, metals in the object to be treated exist in the object to be treated without being vaporized. Meanwhile, most of resins in the object to be treated exist as carbides. The object to be treated is moved from the first hermetic zone to the second hermetic zone in this state.

In the treatment apparatus of the present invention, the object to be treated which is heated in the first hermetic container is introduced into the second hermetic zone without being cooled. Thus, energy to be supplied to the second hermetic zone is greatly saved, and heating time is shortened.

In the second hermetic zone into which the object to be treated is introduced, temperature and pressure conditions are regulated so that metals in the object to be treated are vaporized. If the pressure in the second hermetic zone is reduced, the metals in the object to be treated are vaporized at a lower temperature than under normal pressure. Moreover, oxygen concentration is lowered and a non-oxidizing atmosphere comes to be maintained in the second hermetic zone, and thus the metallic state of the vaporized metal is maintained.

For example, the boiling point of Zn at 760 Torr is 1203K, whereas the boiling point thereof at 1 Torr is 743K, and the boiling point thereof at $10^{-4}$ Torr is 533K.

Additionally, the boiling point of Pb at 760 Torr (1 atm) is 2017K, whereas the boiling point thereof at $10^{-1}$ Torr is 1100K, and the boiling point thereof at $10^{-3}$ Torr is 900K.

As described above, metals are selectively vaporized according to the temperature and pressure conditions in the second hermetic zone.

When being introduced in the second hermetic chamber, most of resins in the object to be treated have been turned into carbides, and hence gases to be produced by decomposition are hardly produced even if a metal is vaporized from the object to be treated. Therefore, the vaporized metal is recovered at high purity in a still metallic state, and the load imposed on the vacuum pump is lightened.

The second recovery means is to recover the metal vaporized in the second hermetic zone as above.

For example, it is suitable to connect a recovery chamber having an exhaust system to the second hermetic zone, and to cool the vaporized metal to its melting point or lower, and condense and recover it. The interior of the recovery chamber may have counter-current structure or helical structure, for example. Alternatively, a valve or an openable and closeable partition may be provided between the recovery chamber and the second hermetic zone and between the recovery chamber and the exhaust system. Even when the vaporized metal is condensed and recovered continuously, or condensed and recovered by batch processing, recovery efficiency increases if the retention time of the vaporized metal in the recovery chamber is lengthened.

N2 or a rare gas as a carrier gas may be introduced into the second hermetic zone. The vaporized metal is efficiently introduced into the recovery chamber by the carrier gas.

The second recovery means may be provided in plural lines. It is suitable to recover the same metal by means of the plurality of second recovery means, or it is suitable that a plurality of metals are selectively vaporized by regulating the temperature and pressure in the second hermetic zone stepwise and recovered by switching the plural lines of second recovery means.

Further, the second recovery means may be connected in multiple tiers.

As described above, the treatment apparatus of the present invention is to treat an object to be treated having resins and metals as its components. The treatment apparatus of the present invention enables the treatment of the object to be treated having resins and metals as its components by including the first hermetic zone for decomposing the component resins of the object to be treated at a stage prior to the second hermetic zone for vaporizing the component metals of the object to be treated. A large quantity of gases produced by decomposition of resins of the object to be treated in the hermetic zone are subjected to treatments such as cracking, catalytic reaction, neutralization, and adsorption in the treatment system connected to the first hermetic zone. Thus, sufficient heating and pressure reduction such that the metals are vaporized can be performed in the second hermetic zone.

Further, in the first hermetic zone, the resins are thermally decomposed selectively in such a condition that the metals in the object to be treated are not oxidized nor vaporized much, and thus the metals are separated and recovered from the object to be treated in a metallic state.

Furthermore, the treatment apparatus of the present invention may further comprise an oxygen concentration regulating means for regulating the oxygen concentration in the first hermetic zone. For example, it is suitable to detect the oxygen concentration in the first hermetic zone and regulate the temperature and pressure in the first hermetic zone, and the flow rate of a carrier gas according to the detected oxygen concentration.

The component resins of the object to be treated can be thermally decomposed more selectively by providing the oxygen concentration regulating means. Moreover, in the first hermetic zone, a temperature regulating means, a pressure regulating means, and an oxygen concentration regulating means for thermally decomposing resins selectively while maintaining the first hermetic zone so that metals are not substantially oxidized.

This treatment apparatus is characterized by including the oxygen concentration regulating means in the first hermetic zone. Owing to this oxygen concentration regulating means, the oxygen concentration inside the first hermetic zone can be regulated independently of the total pressure inside the first hermetic zone.

The degree of freedom of treatment in the first hermetic zone is raised by regulating the oxygen concentration in the first hermetic zone. For example, the state of component metals of the object to be treated can be maintained without the thermal conductivity inside the first hermetic zone being lowered. In addition, resins can be decomposed more positively under pressurized conditions.

As the oxygen concentration regulating means, for example, an oxygen concentration sensor which is an oxygen concentration measuring means and a carrier gas introduction system may be used.

As the oxygen concentration sensor, for example, a so-called zirconia sensor using zirconia (zirconium oxide) may be used, or the absorption of CO and $CO_2$, for example, may be measured by infrared spectroscopy. Besides, GC-MS may be used. It is suitable that the oxygen concentration sensor is selected from them as required or they are used in combination.

A rare gas such as $N_2$ or Ar may be used as a carrier gas. Owing to this carrier gas, not only the oxygen concentration in the hermetic zone is regulated, but also gases produced by decomposition of resins are efficiently led to the first recovery means. Moreover, the oxygen concentration regulating means may serve also as a pressure regulating means, and besides may detect the concentration of halogen such as chlorine, for example, without limiting to that of oxygen and regulate the temperature and pressure in the first hermetic zone, and the flow rate of a carrier gas according to the detected chlorine concentration. Thus, the production or the recomposition of dioxins can be suppressed.

A plurality of second hermetic zones may be provided. Namely, a treatment apparatus for treating an object to be treated having resins, a first metal, and a second metal as its components may comprise a first hermetic zone including a temperature regulating means, a pressure regulating means, and an oxygen regulating means for thermally decomposing the resins selectively, a second hermetic zone partitioned from the first hermetic zone by an openable and closeable partition and including a temperature regulating means and a pressure regulating means for vaporizing the first metal in the object to be treated selectively, a third hermetic zone partitioned from the second hermetic zone by an openable and closeable partition and including a temperature regulating means and a pressure regulating means for vaporizing the second metal in the object to be treated selectively, a first recovery means, connected to the first hermetic zone, for recovering gases produced by decomposition of the resins, a second recovery means, connected to the second hermetic zone, for recovering the first metal vaporized from the object to be treated, and a third recovery means, connected to the third hermetic zone, for recovering the second metal vaporized from the object to be treated.

The configuration of this treatment apparatus is characterized by including a plurality of second hermetic zones. By providing the plurality of second hermetic zones, a plurality of metals contained in the object to be treated are selectively vaporized and recovered.

Furthermore, a treatment apparatus of the present invention is a treatment apparatus for treating an object to be treated having resins and metals as its components, characterized by comprising a hermetic container holding the object to be treated therein and including a temperature regulating means, a pressure regulating means, and an oxygen regulating means, a first recovery means, connected to the hermetic container, for recovering gases produced by thermal decomposition of the resins when the temperature and oxygen concentration in the hermetic container are regulated so that the resins in the object to be treated are thermally decomposed, and a second recovery means, connected to the hermetic container, for recovering a metal vaporized from the object to be treated when the temperature and pressure in the hermetic container are regulated so that a first metal in the object to be treated is selectively vaporized. It may further comprise a third recovery means, connected to the hermetic container, for recovering a second metal vaporized from the object to be treated when the temperature and pressure in the hermetic container are regulated so that the second metal in the object to be treated is selectively vaporized.

The first recovery means may recover gases produced by decomposition of the resins when the temperature and oxygen concentration in the hermetic container are regulated so that the first and second metals in the object to be treated are not substantially oxidized and the resins are thermally decomposed selectively.

This treatment apparatus includes a means for changing conditions in one hermetic container and a plurality of recovery means corresponding to conditions in the system, whereas the aforesaid treatment apparatus of the present invention includes a plurality of hermetic zones different in conditions such as temperature, pressure, and oxygen concentration conditions in the hermetic container.

Similarly to the aforesaid treatment apparatus of the present invention, it is recommended that a heating means, a temperature sensor, and the like be used as the temperature regulating means in the hermetic container, that is, the temperature regulating means for the object to be treated. Also as for heating, it is suitable to select one from various kinds of heating means such as convention, radiation, and the like as required or use them in combination.

Also concerning the pressure regulating means, similarly to the aforesaid treatment apparatus of the present invention, it is recommended that an exhaust means, a pressurizing means and a pressure measuring means be used. It is suitable to use various kinds of vacuum pumps such as a rotary pump, an oil diffusion pump, and a booster pump as the exhaust means. As the pressurizing means, a gas may be introduced into the system, for example, from a gas reservoir. It is recommended that a Bourdon tube, a Pirani gauge, or the like be used as the pressure measuring means according to the degree of vacuum to be measured.

Also concerning the oxygen concentration regulating means, it is recommended that an oxygen concentration sensor and a carrier gas introduction system be used similarly.

Moreover, it is recommended that the recovery means also be provided in the same manner as in the aforesaid treatment apparatus of the present invention.

Namely, a liquefying device for condensing and recovering gases produced by decomposition of resins, for example, may be provided as the first recovery system. Oil obtained by this liquefying device may be used as a heating means.

Further, as for the second and third recovery means, for example, a recovery chamber having an exhaust system is connected to the hermetic zone, and the metal vaporized in this chamber may be cooled to its melting point or lower, condensed, and recovered. The interior of the recovery chamber may have counter-current structure or helical structure, for example. Alternatively, a valve or an openable and closeable partition may be provided between the recovery chamber and the second hermetic zone and between the recovery chamber and the exhaust system. Namely, it is suitable that after the metal vaporized from the object to be treated is introduced into the recovery chamber, the chamber is closed and cooled and thereby the metal is condensed and recovered.

A treatment system of the present invention is a treatment system for treating an object to be treated having lead as its component, characterized by comprising a hermetic container for holding the object to be treated therein, a temperature regulating means for regulating the temperature in the hermetic container, a pressure regulating means for regulating the pressure in the hermetic container, a control means for controlling the temperature regulating means and the pressure regulating means so that lead in the object to be treated is selectively vaporized, and a recovery means, connected to the hermetic container, for recovering the lead vaporized from the object to be treated. The structure in which the aforesaid tube and hermetic door are combined can be adopted as the recovery means.

Also, it may comprise a hermetic container for holding an object to be treated having lead and resins as its components therein, a temperature regulating means for regulating the temperature in the hermetic container, a pressure regulating means for regulating the pressure in the hermetic container, a first control means for controlling temperature regulating means and the pressure regulating means so that the temperature and pressure in the hermetic container are regulated such that the resins are selectively vaporized while the lead in the object to be treated is maintained so as not to be substantially vaporized, a second control means for controlling the temperature regulating means and the pressure regulating means so that the temperature and pressure in the hermetic container are regulated such that the lead in the object to be treated is selectively vaporized, a first recovery means, connected to the hermetic container, for recovering gases produced by decomposition of the resins, and a second recovery means, connected to the hermetic container, for recovering the lead vaporized from the object to be treated.

A treatment system of the present invention is a treatment system for treating the object to be treated having lead and resins as its components, characterized by comprising a hermetic container for holding the object to be treated therein, a temperature regulating means for regulating the temperature in the hermetic container, a pressure regulating means for regulating the pressure in the hermetic container, an oxygen concentration regulating means for regulating the oxygen concentration in the hermetic container, a first control means for controlling the temperature regulating means and the oxygen concentration regulating means so that the resins are thermally decomposed selectively, a second control means for controlling the temperature regulating means and the pressure regulating means so that the temperature and pressure are regulated such that the lead in the object to be treated is selectively vaporized, a first recovery means, connected to the hermetic container, for recovering gases produced by thermal decomposition of the resins, and a second recovery means, connected to the hermetic container, for recovering the lead vaporized from the object to be treated.

The first control means may control the temperature regulating means and the oxygen concentration regulating means so that the temperature and oxygen concentration in the hermetic container are regulated such that the resins are thermally decomposed selectively while the lead in the object to be treated is maintained so as not to be substantially oxidized.

A treatment method of the present invention is characterized by comprising a step of introducing an object to be treated having lead as its component into a hermetic container and hermetically sealing the hermetic container, a step of regulating the temperature and pressure in the hermetic container so that the lead in the object to be treated is selectively vaporized, and a step of recovering the lead vaporized from the object to be treated.

Moreover, it may comprise a step of introducing an object to be treated having lead and resins as its components into a hermetic container and hermetically sealing the hermetic container, a first control step of regulating the temperature and pressure in the hermetic container so that the resins in the object to be treated are thermally decomposed selectively, a second control step of regulating the temperature and pressure in the hermetic container so that the lead in the object to be treated is selectively vaporized, a first recovery step of recovering gases produced by the thermal decomposition of the resins, and a second recovery step of recovering the lead vaporized from the object to be treated.

Furthermore, a treatment method of the present invention is characterized by comprising a step of introducing an object to be treated having lead and resins as its components into a hermetic container and hermetically sealing the hermetic container, a first control step of regulating the temperature and oxygen concentration in the hermetic container so that the resins are thermally decomposed selectively, a second control step of regulating the temperature and pressure in the hermetic container so that the lead in the object to be treated is selectively vaporized, a first recovery step of recovering gases produced by the thermal decomposition of the resins, and a second recovery step of recovering the lead vaporized from the object to be treated.

Additionally, in the first control step, the temperature and oxygen concentration in the hermetic container may be regulated so that the lead in the object to be treated is not substantially oxidized and so that the resins are thermally decomposed selectively.

These treatment systems and treatment methods of the present invention make it possible to separate and recover lead from an object to be treated containing lead.

In the first control step, the oxygen concentration in the hermetic container, for example, may be regulated at about 10 vol % or lower. The oxidation of lead can be prevented by regulating the oxygen concentration.

Further, in the first control step, the temperature in the hermetic container, for example, may be regulated in the range of 323K to 1073K.

Furthermore, in the first control step, the pressure in the hermetic container, for example, may be regulated at about 760 Torr to about 10 Torr. Lead is vaporized at a lower temperature by regulating the pressure.

In the second control step, for example, the pressure in the hermetic container may be regulated at about $7.6 \times 10^2$ Torr to about $7.6 \times 10^3$ Torr. The thermal decomposition of resins is promoted by thermally decomposing the resins selectively by pressurization.

Further, in the second control step, for example, the temperature in the hermetic container may be regulated in the range of 713K to 2273K.

These treatment system and method are characterized basically by introducing an object to be treated into a hermetic container, regulating the temperature, pressure, and oxygen concentration in the hermetic container to vaporize lead in the object to be treated selectively, and separate and recover it from the object to be treated. Moreover, also concerning each of metals other than lead, it is suitable that the interior of the hermetic container is controlled on predetermined temperature and pressure conditions such that the metal is selectively vaporized, and that the metal is separated and recovered from the object to be treated.

When the object to be treated contains lead and resins, resinous portions are first thermally decomposed (gasified, liquefied, or carbonized) selectively by heating the object to be treated on such a condition that lead is not vaporized nor oxidized, then the lead is selectively vaporized, and the vaporized lead is recovered in a metallic state. In this case, the resins may be synthetic resins, natural resins, or a mixture of these resins. Generally, the greater part of a thermoplastic resin can be vaporized or liquefied by heating and recovered, whereas the greater part of a thermoset resin is carbonized or vaporized. In either case, the lead can be recovered positively by thermally decomposing the component resins of the object to be treated selectively.

The aforesaid treatment apparatus of the present invention, for example, may be used for an apparatus portion of the treatment system. Namely, for example, selective thermal decomposition of resins and vaporization of lead may be performed by regulating stepwise conditions such as temperature, pressure, and oxygen concentration in one hermetic container. Moreover, selective thermal decomposition of resins and vaporization of lead may be performed by providing a plurality of hermetic zones different in conditions such as temperature, pressure, and oxygen concentration and opening and closing partitions which partition respective hermetic zones to transfer the object to be treated sequentially.

It is recommended that a heating means and a temperature measuring means be used as the temperature regulating means. As the heating means, for example, resistance heating by a sheathed heater, or the like may be used, or oil such as heavy oil or light oil may be combusted. Besides, an induction heating means may be used. It is recommended that various kinds of thermometers may be used as the temperature measuring means.

By controlling the temperature, pressure, oxygen concentration in the hermetic container, the resins are thermally decomposed selectively and vaporized (including vaporization after liquefaction) or carbonized on temperature and pressure conditions such as lead in the object to be treated is not oxidized not vaporized. Gases produced by thermal decomposition of the resins and vaporized are recovered in the first recovery means, and it is suitable to combust the recovered decomposition products of the resins and use them as a heating means.

It is recommended that an exhaust means or a pressurizing means and a pressure measuring means be used as the pressure regulating means. It is suitable to use various kinds of vacuum pumps such as a rotary pump, an oil diffusion pump, and a booster pump as the exhaust means as required depending on the degree of vacuum, exhaust capacity, and the like. As the pressurizing means, a gas may be introduced into the system, for example, from the gas reservoir.

Moreover, a carrier gas may be introduced into the hermetic container. This carrier gas may be used as the pressurizing means, for example, by regulating a valve of exhaust system and introduction flow rate.

It is recommended that a Bourdon tube, a Pirani gauge, or the like be used as the pressure measuring means according to the degree of vacuum to be measured.

Also in the treatment system of the present invention, in addition to the temperature regulating means and the pressure regulating means, the oxygen concentration regulating means for regulating the oxygen concentration in the hermetic container may be provided.

By providing this oxygen concentration regulating means, the oxygen concentration in the hermetic container is regulated independently of total pressure. The degree of freedom of treatment in the hermetic container is raised by regulating the oxygen concentration in the hermetic container. For example, the resins can be thermally decomposed selectively without the thermal conductivity inside the first hermetic zone being lowered. In addition, the oxidation and vaporization of the component metals of the object to be treated can be suppressed. Specially when the object to be treated contains resins as its component, the resins can be thermally decomposed selectively more effectively while the state of lead is substantially maintained by regulating the oxygen concentration in the hermetic container. The resins can be thermally decomposed selectively more positively, for example, by pressurizing the interior of the hermetic container in a non-oxidizing atmosphere to about one atmosphere to about ten atmospheres.

As the oxygen concentration regulating means, for example, an oxygen concentration sensor which is an oxygen concentration measuring means and a carrier gas introduction system may be used.

As the oxygen concentration sensor, for example, a so-called zirconia sensor using zirconia (zirconium oxide) may be used, or the absorption of CO and $CO_2$, for example, may be measured by infrared spectroscopy. Besides, GC-MS may be used. It is suitable that the oxygen concentration sensor is selected from them as required or they are used in combination.

The treatment system of the present invention includes a control means for controlling the aforesaid temperature regulating means and pressure regulating means or oxygen concentration regulating means. This control means controls the temperature and pressure or oxygen concentration in the hermetic container so that resins are thermally decomposed selectively and so that lead in the object to be treated is vaporized selectively. It is suitable that this control means measures the state inside the hermetic container by the aforesaid temperature sensor, pressure sensor, oxygen concentration sensor, and the like and feeds back the measured values to the heating means, the exhaust system, the pressurization system, the carrier gas introduction system, and the like to optimize the state inside the hermetic container.

Such control may be performed by an operator's operating the heating means, the exhaust system, the pressurization system, and the carrier gas introduction system according to a parameter of the state inside the hermetic container.

Moreover, a control device, in which the measured parameter of the state inside the hermetic container is an input and a signal for operating the heating means, the exhaust system, the pressurization system, and the carrier gas introduction system so that conditions in the hermetic container are optimized is an output, may be provided. This control circuit may be stored as a program in a memory means of the control device.

A first step in a treatment method of the present invention is a step of heating an object to be treated to thermally decompose resins selectively.

Resins such as plastic and the like start melting at about 323K (50° C.), and they are thermally decomposed at about 453K to 873K (180° C. to 600° C.) and mainly emits hydrocarbon gases of C1 to C16. These gases produced by selective thermal decomposition of resins can be recovered as valuable oil, for example, by being condensed by the exhaust gas treatment system or the like.

It is desirable to perform the selective thermal decomposition of resins in the container where the oxygen concentration is regulated. The oxygen concentration may be regulated by the total pressure in the hermetic container, or may be regulated by the introduction of a carrier gas such as $N_2$ or Ar.

The oxidation of lead can be prevented by regulating the oxygen concentration in the hermetic container. Moreover, the oxidation of lead can be prevented without the thermal conductivity inside the hermetic container being lowered by regulating the oxygen concentration separately from the total pressure, thereby improving the decomposition efficiency of resins and the recovery efficiency of gases produced by decomposition. Depending on the situation, it is suitable to increase the pressure in the hermetic container by introducing a carrier gas such as $N_2$ or Ar to thereby thermally decompose resins selectively.

Resins in the object to be treated do not need to be thermally decomposed completely but only need to be decomposed to such a degree that a bad influence is not exerted on the separation and recovery of lead.

Lead (metal) shows a vapor pressure of 760 mmHg at 2017K, whereas lead oxide shows a vapor pressure of 760 mmHg at 1745K which is lower. Accordingly, the regulation of the oxygen concentration in the hermetic container can inhibit metallic lead from being oxidized into lead oxide, leading to prevention of scattering of lead, and thus lead can be recovered more positively in the subsequent process.

After the resins in the object to be treated are thermally decomposed selectively as described above, the temperature and pressure in the hermetic container are controlled so that lead is vaporized selectively, and the lead is separated and recovered from the object to be treated.

When metals other than lead are contained in the object to be treated, lead is vaporized selectively by a difference in vapor pressure. The temperature at which lead is vaporized changes depending on the pressure in the hermetic container. Under atmospheric pressure, the vapor pressure of lead when being heated to 1673K is 84 mmHg, whereas the vapor pressure of iron, copper, or tin does not reach even 1 mmHg.

Therefore, almost only lead vapor can be generated selectively from the object to be treated by heating the object to be treated to about 1673K.

Further, under atmospheric pressure, the vapor pressure of lead when being heated to 2013K is 760 mmHg, whereas the vapor pressure of tin does not reach even 15 mmHg and the vapor pressure of copper does not reach even 3 mmHg. Therefore, almost only lead vapor can be generated selectively from the object to be treated by heating the object to be treated to about 1673K.

Furthermore, lead in the object to be treated can be vaporized at a lower temperature by reducing the pressure in the hermetic container.

If the pressure in the hermetic container is regulated at $10^{-1}$ Torr, almost only lead vapor can be generated selectively from the object to be treated by heating the object to be treated to about 1100K.

Further, if the pressure in the hermetic container is regulated at $10^{-3}$ Torr, almost only lead vapor can be generated selectively from the object to be treated by heating the object to be treated to about 900K.

Furthermore, if the pressure in the hermetic container is regulated at $10^{-4}$ Torr, almost only lead vapor can be generated selectively from the object to be treated by heating the object to be treated to about 700K.

The lead vapor generated selectively as described above is recovered as metallic lead by a recovery device or the like which is cooled to the melting point of lead or lower.

When the vaporized lead is recovered after being condensed and crystallized, the recovery percentage of lead is raised by setting the retention time of vaporized lead in the device for a long time. For example, the recovery device may have counter-current structure or helical structure.

Moreover, the lead vapor can be recovered more selectively by letting a rare gas such as $N_2$ or Ar as a carrier gas flow into the recovery device from within the hermetic container.

By continuously performing the step of thermally decomposing resins selectively and the step of vaporizing lead selectively, energy to be supplied in the subsequent step can be greatly held down.

Namely, the thermal conductivity of a gas lowers with a drop in pressure, and hence the supply of larger energy is required as the pressure in the hermetic container is reduced in the step of vaporizing lead. In the treatment system and treatment method of the present invention, however, the step of thermally decomposing resins is also a preheating stage of the step of vaporizing lead, and thus energy to be supplied in the step of vaporizing lead can be greatly saved.

Moreover, moisture and oil in the object to be treated are removed from the object to be treated in the thermal decomposition step of resins, and thus a bad influence is never exerted on the step of vaporizing lead.

A treatment system of the present invention is a treatment system for treating an object to be treated having a first object and a second object which are bonded by a metal, characterized by comprising a hermetic container for holding the object to be treated therein, a temperature regulating means for regulating the temperature in the hermetic container, a pressure regulating means for regulating the pressure in the hermetic container, and a control means for controlling the temperature regulating means and the pressure regulating means so that the metal bonding the first object and the second object is vaporized.

Further, it may comprise a hermetic container for holding a first object and a second object which are bonded by an alloy having a first metal and a second metal therein, a temperature regulating means for regulating the temperature in the hermetic container, a pressure regulating means for regulating the pressure in the hermetic container, and a control means for controlling the temperature regulating means and the pressure regulating means so that the temperature and pressure in the hermetic container are regulated such that the alloy is vaporized.

Furthermore, it may comprise a hermetic container for holding a first object and a second object which are bonded by an alloy composed of a first metal and a second metal and have resins as their components therein, a temperature regulating means for regulating the temperature in the hermetic container, a pressure regulating means for regulating the pressure in the hermetic container, a first control means for controlling the temperature regulating means so that the resins are thermally decomposed selectively, a second control means for controlling the temperature regulating means and the pressure regulating means so that the temperature and pressure in the hermetic container are regulated such that the first metal of the alloy is vaporized selectively, a third control means for controlling the temperature regulating means and the pressure regulating means so that the temperature and pressure in the hermetic container are regulated such that the second metal of the alloy is vaporized, a first recovery means for recovering gases produced by the selective thermal decomposition of the resins, and a second recovery means for recovering the first metal vaporized from the alloy. Moreover, the resins may be thermally decomposed selectively while the oxidation states of the first and second metals are substantially maintained.

Additionally, it may comprise a hermetic container for holding a first object and a second object which are bonded by an alloy composed of a first metal and a second metal and have resins as their components therein, a temperature regulating means for regulating the temperature in the hermetic container, a pressure regulating means for regulating the pressure in the hermetic container, a first control means for controlling the temperature regulating means so that the temperature and pressure in the hermetic container are regulated such that the resins are thermally decomposed selectively, a second control means for controlling the temperature regulating means and the pressure regulating means so that the temperature and pressure in the hermetic container are regulated such that the first metal of the alloy is vaporized selectively, a third control means for controlling the temperature regulating means and the pressure regulating means so that the temperature and pressure in the hermetic container are regulated such that the second metal of the alloy is vaporized, a first recovery means for recovering gases produced by the selective thermal decomposition of the resins, and a second recovery means for recovering the first metal vaporized from the alloy. Moreover, the resins may be thermally decomposed selectively while the oxidation states of the first and second metals are substantially maintained.

A treatment system of the present invention is a treatment system for treating an object to be treated having a first object and a second object which are bonded by an alloy having a first metal and a second metal and have resins as their components, characterized by comprising a hermetic container for holding the object to be treated therein, a temperature regulating means for regulating the temperature in the hermetic container, a pressure regulating means for regulating the pressure in the hermetic container, an oxygen concentration regulating means for regulating the oxygen concentration in the hermetic container, a first control means for controlling the temperature regulating means and the oxygen concentration regulating means so that the resins are thermally decomposed selectively, a second control means for controlling the temperature regulating means and the pressure regulating means so that the first metal of the alloy is vaporized selectively, a third control means for controlling the temperature regulating means and the pressure regulating means so that the second metal of the alloy is vaporized, a first recovery means for recovering gases produced by the selective thermal decomposition of the resins, and a second recovery means for recovering the first metal vaporized from the alloy.

Moreover, the first control means may control the temperature regulating means and the oxygen concentration regulating means so that the temperature and oxygen concentration in the hermetic container are regulated such that the resins are thermally decomposed selectively while the first metal of the alloy is maintained so as not to be substantially oxidized.

At least one element out of Zn, Cd, Hg, Ga, In, Tl, Sn, Pb, Sb, Bi, Ag, or In as the first metal may be separated or recovered from the object to be treated.

Further, by regulating the temperature, pressure, oxygen concentration in the hermetic container, metals other than these can be separated and recovered in a metallic state (See FIG. 30). This point applies to all portions of the present invention even when not specially described.

Moreover, a treatment method of the present invention is a treatment method for treating an object to be treated having a first metal and a second metal which are bonded by a metal, characterized by comprising a step of introducing the object to be treated into a hermetic container and hermetically sealing this hermetic container and a step of regulating the temperature and pressure in the hermetic container so that the metal is vaporized.

Further, it may comprise a step of introducing a first object and a second object which are bonded by an alloy having a first metal and a second metal into a hermetic container and hermetically sealing this hermetic container and a step of regulating the temperature and pressure in the hermetic container so that the alloy is vaporized.

Furthermore, it may comprise a step of introducing an object to be treated having a first object and a second object which are bonded by an alloy having a first metal and a second metal and have resins as their components into a hermetic container and hermetically sealing this hermetic container, a first step of regulating the temperature and pressure in the hermetic container so that the resins are thermally decomposed selectively, a second step of regulating the temperature and pressure in the hermetic container so that the first metal in the alloy is vaporized selectively, a third step of regulating the temperature and pressure in the hermetic container so that the second metal in the alloy is vaporized, a first recovery step of recovering gases produced by the decomposition of the resins, and a second recovery step of recovering the first metal vaporized from the alloy.

In the first step, the temperature and pressure in the hermetic container may be regulated so that the resins are thermally decomposed selectively while the state of the first metal in the alloy is substantially maintained.

Moreover, a treatment method of the present invention is a treatment method for treating an object to be treated having a first object and a second object which are bonded by an alloy having a first metal and a second metal and have resins as their components, characterized by comprising a step of introducing the object to be treated into a hermetic container and hermetically sealing this hermetic container, a first control step of regulating the temperature and oxygen concentration in the hermetic container so that the resins are thermally decomposed selectively, a second control step of regulating the temperature and pressure in the hermetic container so that the first metal in the alloy is vaporized selectively, a third control step of regulating the temperature and pressure in the hermetic container so that the second metal in the alloy is vaporized, a first recovery step of recovering gases produced by the thermal decomposition of the resins, and a second recovery step of recovering the first metal vaporized from the alloy.

In the first control step, the temperature and oxygen concentration in the hermetic container may be regulated so that the resins are thermally decomposed selectively while the first and the second metals in the alloy are maintained so as not to substantially oxidized.

Furthermore, it is characterized by comprising a step of introducing a mounting substrate composed of a circuit board having resins as its component and electronic parts bonded to this circuit board by an alloy having a first metal and a second metal into a hermetic container and hermetically sealing this hermetic container, a first control step of regulating the temperature and oxygen concentration in the hermetic container so that the resins are thermally decomposed selectively, a second control step of regulating the temperature and pressure in the hermetic container so that the first metal in the alloy is vaporized selectively, a third control step of regulating the temperature and pressure in the hermetic container so that the second metal in the alloy is vaporized, a first recovery step of recovering gases produced by the selective thermal decomposition of the resins, and a second recovery step of recovering the first metal vaporized from the alloy. In the first control step, the temperature and oxygen concentration in the hermetic container may be regulated so that the resins are thermally decomposed selectively while the states of the first and second metals in the alloy are substantially maintained.

The aforesaid treatment system of the present invention can release bonding of the object to be treated in which the bonding is performed by a metal or an alloy. Moreover, the treatment method of the present invention can release bonding of the object to be treated in which the bonding is performed by a metal or an alloy.

A basic idea of the aforesaid treatment system and treatment method of the present invention is to introduce an object to be treated into a hermetic container, regulate the temperature, pressure, oxygen concentration, and the like in the hermetic container to vaporize a bonding metal or alloy, and thereby to release bonding. The vaporized metal can be recovered, for example, by being condensed.

When the object to be treated has resins as its component, resinous portions are first thermally decomposed selectively, and gasified, liquefied, or carbonized. This selective thermal decomposition of the resins may be performed while the temperature, pressure, or oxygen concentration in the hermetic container is regulated on such a condition that metal is not oxidized nor vaporized much. Namely, the resins may be thermally decomposed while an oxidation state and a phase equilibrium state of the component metals of the object to be treated are maintained as constant as possible.

Subsequently, the temperature and pressure in the hermetic container are regulated to vaporize the bonding metal in the object to be treated selectively. When a plurality of metals (elements) are contained in the object to be treated, it is recommended that the temperature and pressure in the hermetic container be regulated according to respective metals to thereby vaporize each of the metals selectively.

The aforesaid treatment apparatus of the present invention may be used for a treatment apparatus portion of the treatment system. Namely, for example, selective thermal decomposition of resins and vaporization of lead may be performed by regulating conditions such as temperature, pressure, and oxygen concentration in one hermetic container stepwise. Moreover, selective thermal decomposition of resins and vaporization of lead may be performed by providing a plurality of hermetic zones different in conditions such as temperature, pressure, and oxygen concentration and opening and closing partitions which partition respective hermetic zones to transfer the object to be treated sequentially.

Moreover, the temperature regulating means, the pressure regulating means, the oxygen concentration regulating means, the control means, the resin recovering means, metal recovery means, and the like are the same as described above.

As for the object to be treated of the treatment system and treatment method of the present invention, a mounting substrate in which a print-circuit board and various kinds of electronic parts are bonded by a solder alloy such as Pb—Sn and electronic equipment having such a mounting substrate can be given as examples.

In addition to the mounting substrate, for any object to be treated in which bonding is performed by a metal or alloy, the bonding can be released.

It is suitable, for example, to introduce a mounting substrate to the treatment apparatus of the present invention, heat the mounting substrate to a temperature (for example, about 473K) such that resins are not oxidized much while regulating the oxygen concentration, reduce the pressure in the hermetic container, regulate the oxygen concentration, further heat the mounting substrate to a temperature (for example, about 523K to about 773K at $10^{-3}$ Torr) such that lead is not oxidized nor vaporized to thermally decompose component resins of the mounting substrate, then heat the mounting substrate to the boiling point of lead (for example, about 900K at $10^{-3}$ Torr) or higher to vaporize lead and similarly vaporize tin to thereby separate the mounting substrate into electronic parts and a circuit board (A board on which the electronic parts are mounted is called here a circuit board.), and recover them.

For the vaporization of metals such as lead on the occasion of selective thermal decomposition of resins, the provision of a metal separating means in the recovery system is recommended. This respect is common to all of the present invention.

Further, it is suitable, for example, to introduce a mounting substrate to the treatment apparatus of the present invention, heat the mounting substrate to a temperature (for example, about 473K) such that resins are not oxidized so much while regulating the oxygen concentration, reduce the pressure in the hermetic container, regulate the oxygen concentration, further heat the mounting substrate to a temperature (for example, about 523K to about 773K at $10^{-3}$ Torr) such that lead is not substantially oxidized nor vaporized to thermally decompose component resins of the mounting substrate, then heat the mounting substrate, for example, to about 973K to vaporize Zn, Sb, and the like, and recover them.

Furthermore, it is suitable to heat the mounting substrate, for example, to about 1773K to thereby vaporize Au, Pt, Pd, Ta, Ni, Cr, Cu, Al, Co, W, Mo, and the like and recover them.

A solder alloy is not limited to PB—Sn, and so-called Pb-free solder such as Ag—Sn, Zn—Sn, In—Sn, Bi—Sn, Sn—Ag—Bi, or Sn—Ag—Bi—Cu is also suitable. Bonding by alloys other than these or a simple metal is also suitable.

The object to be treated may contain resins as its component. The resins may be thermoplastic resins, thermoset resins, or a mixture of these resins.

When the object to be treated contains resins as its component, as has been described so far, it is recommended that resinous portions be thermally decomposed (vaporized, liquefied, carbonized, or the like) selectively. Gases produced by the selective thermal decomposition may be condensed by the exhaust gas treatment system, for example, and recovered. Recovered decomposition products of resins such as light oil and heavy oil may be used for heating the object to be treated. It is unnecessary to completely perform the selective thermal decomposition of resin components, and it is desirable to thermally decompose them to the extent that the separation and recovery of the bonding metal are not disturbed. Also, as described above, for the vaporization of a part of the bonding metal, the provision of a separating means for the vaporized metal in the recovery system is recommended.

Resins such as plastic and the like start melting at about 323K, and they are thermally decomposed at about 453K to 873K and mainly emits hydrocarbon gases of C1 to C8 and C8 to C16. These gases produced by selective thermal decomposition of resins can be recovered as valuable oil, for example, by being condensed by the exhaust gas treatment system or the like. Generally, most of resins composing the circuit board are thermoset resins, and most of their components are carbonized or vaporized.

It is desirable to perform the selective thermal decomposition of resins in the container where the oxygen concentration is regulated. The oxygen concentration may be regulated by the total pressure in the hermetic container, or may be regulated by the introduction of a carrier gas such as $N_2$ or Ar.

The oxidation of a bonding metal such as lead or tin can be prevented by regulating the oxygen concentration in the hermetic container. Moreover, the oxidation of the metal can be prevented without the thermal conductivity inside the hermetic container being lowered by regulating the oxygen concentration separately from the total pressure, thereby improving the decomposition efficiency of resins and the recovery efficiency of gases produced by decomposition. Depending on the situation, it is suitable to increase the pressure in the hermetic container by introducing a carrier gas such as $N_2$ or Ar to thereby thermally decompose resins selectively. The resins in the object to be treated do not need to be thermally decomposed completely but only need to be decomposed to such a degree that a bad influence is not exerted on the separation and recovery of the metal.

For example, metallic lead shows a vapor pressure of 760 mmHg at 2017K, whereas lead oxide shows a vapor pressure of 760 mmHg at 1745K. Accordingly, the regulation of the oxygen concentration in the hermetic container can inhibit the metal from being oxidized into lead oxide, and thus the metal can be recovered more positively in the subsequent process. In addition, utility value is raised by recovering it as metal. After the resins are thermally decomposed while the state of lead in the object to be treated is substantially maintained as described above, the temperature and pressure in the hermetic container are controlled so that lead is vaporized selectively, and the lead is separated and recovered from the object to be treated.

Even when metals other than lead are contained in the object to be treated, lead is vaporized selectively by a difference in vapor pressure.

For example, the temperature at which lead is vaporized changes depending on the pressure in the hermetic container. Under atmospheric pressure, the vapor pressure of lead when being heated to, for example, 1673K is 84 mmHg, whereas the vapor pressure of iron, copper, or tin does not reach even 1 mmHg. Therefore, almost only lead vapor can be generated selectively from the object to be treated by heating the object to be treated to about 1673K.

Further, under atmospheric pressure, the vapor pressure of lead when being heated to, for example, 2013K is 760 mmHg, whereas the vapor pressure of tin does not reach even 15 mmHg and the vapor pressure of copper does not reach even 3 mmHg. Therefore, almost only lead vapor can be generated selectively from the object to be treated by heating the object to be treated to about 1673K.

Furthermore, lead in the object to be treated can be vaporized at a lower temperature by reducing the pressure in the hermetic container.

If the pressure in the hermetic container is regulated at $10^{-1}$ Torr, almost only lead vapor can be generated selectively from the object to be treated by heating the object to be treated to about 1100K.

Further, if the pressure in the hermetic container is regulated at $10^{-3}$ Torr, almost only lead vapor can be generated selectively from the object to be treated by heating the object to be treated to about 900K.

Furthermore, if the pressure in the hermetic container is regulated at $10^{-4}$ Torr, almost only lead vapor can be generated selectively from the object to be treated by heating the object to be treated to about 700K.

The lead vapor generated selectively as above is recovered as metallic lead by a recovery device which is cooled to the melting point of lead or lower or the like.

When the vaporized lead is recovered after being condensed and crystallized as above, the recovery percentage of lead is raised by setting the retention time of vaporized lead in the device for a long time. For example, the recovery device may have counter-current structure or helical structure.

Moreover, the lead vapor can be recovered more selectively by letting a rare gas such as $N_2$ or Ar as a carrier gas flow into the recovery device from within the hermetic container.

By continuously performing the step of thermally decomposing resins and the step of vaporizing lead selectively, energy to be supplied in the subsequent step can be greatly held down.

Namely, the thermal conductivity of a gas lowers with a drop in pressure, and hence the supply of larger energy is required as the pressure in the hermetic container is reduced in the step of vaporizing lead. In the treatment system and treatment method of the present invention, however, the step of thermally decomposing resins is also a preheating stage of the step of vaporizing lead, and thus energy to be supplied in the step of vaporizing lead can be saved greatly.

Moreover, moisture and oil in the object to be treated are removed from the object to be treated in the thermal decomposition step of resins, and thus a bad influence is never exerted on the step of vaporizing lead.

A treatment system of the present invention is a treatment system for treating an object to be treated in which resins and metals are integrated, characterized by comprising a hermetic container for holding the object to be treated therein, a temperature regulating means for regulating the temperature in the hermetic container, a pressure regulating means for regulating the pressure in the hermetic container, and a control means for controlling the temperature regulating means and the pressure regulating means in the hermetic container so that the resins are thermally decomposed selectively.

The control means for controlling the temperature regulating means and the pressure regulating means may control the temperature regulating means and the pressure regulating means in the hermetic container so that the resins are thermally decomposed selectively while the state of metals is substantially maintained.

Further, a treatment system of the present invention may comprise a hermetic container for holding an object to be treated in which resins and metals are integrated therein, a temperature regulating means for regulating the temperature in the hermetic container, an oxygen concentration regulating means for regulating the oxygen concentration in the hermetic container, and a control means for controlling the temperature regulating means and the oxygen concentration regulating means so that the resins are thermally decomposed selectively while the state of metals is substantially maintained. On the occasion of the selective thermal decomposition of resins, the temperature, pressure or oxygen concentration may be regulated so that the state of component metals are maintained as constant as possible.

A treatment system of the present invention is a treatment system for treating an object to be treated in which resins and metals are integrated, characterized by comprising a hermetic container for holding the object to be treated therein, a temperature regulating means for regulating the temperature in the hermetic container, a pressure regulating means for regulating the pressure in the hermetic container, an oxygen concentration regulating means for regulating the oxygen concentration in the hermetic container, and a control means for controlling the temperature regulating means, the pressure regulating means, and the oxygen concentration regulating means in the hermetic container so that the resins are thermally decomposed selectively.

Moreover, the control means may control the temperature regulating means, the pressure regulating means and the oxygen concentration regulating means in the hermetic container so that the resins are thermally decomposed selectively while the state of metals is substantially maintained.

Further, a treatment system of the present invention may comprise a hermetic container for holding an object to be treated in which resins, a first metal, and a second metal are integrated therein, a temperature regulating means for regulating the temperature in the hermetic container, a pressure regulating means for regulating the pressure in the hermetic container, an oxygen concentration regulating means for regulating the oxygen concentration in the hermetic container, and a control means for controlling the temperature regulating means and the oxygen concentration regulating means so that the resins are thermally decomposed selectively, a second control means for controlling the temperature regulating means and the pressure regulating means so that the first metal is vaporized selectively, and a recovery means for recovering the first metal vaporized from the object to be treated. The control means may control the temperature regulating means and the oxygen concentration means in the hermetic container so that the resins are thermally decomposed selectively while the state of the first and second metals is substantially maintained.

A treatment method of the present invention is characterized by comprising a step of introducing an object to be treated in which resins and metals are integrated to a hermetic container, and a step of regulating the temperature and oxygen concentration in the hermetic container so that the resins are thermally decomposed selectively.

The temperature and oxygen concentration in the hermetic container may be regulated so that the resins are thermally decomposed selectively while the state of metals is substantially maintained. Further, a treatment system of the present invention may comprise a step of introducing an object to be treated in which resins and metals are integrated to a hermetic container, and a step of regulating the temperature and pressure in the hermetic container so that the resins are thermally decomposed selectively.

Furthermore, a treatment method of the present invention is characterized by comprising a step of introducing an object to be treated in which resins and metals are laminated to a hermetic container, a step of regulating the temperature and oxygen concentration in the hermetic container so that the resins are thermally decomposed selectively, and a step of regulating the temperature and pressure in the hermetic container so that the surface area of the object to be treated decreases as the metals melt.

The temperature and oxygen concentration in the hermetic container may be regulated so that the resins are thermally decomposed while the metals are maintained not so as to be substantially oxidized.

A treatment method of the present invention may comprise a step of introducing an object to be treated in which resins and copper are laminated to a hermetic container, a step of regulating the temperature and oxygen concentration in the hermetic container so that the resins are thermally decomposed selectively while the state of the copper is substantially maintained, and a step of regulating the temperature and pressure in the hermetic container so that the surface area of the object to be treated decreases as the copper melts.

Moreover, a treatment method of the present invention may comprise a step of introducing an object to be treated in which resins and metals are integrated to a hermetic container and a step of regulating the temperature, pressure, and oxygen concentration in the hermetic container so that the resins are thermally decomposed selectively while the state of the metals is substantially maintained.

Further, a treatment method of the present invention is characterized by comprising a step of introducing an object to be treated in which resins, a first metal and a second metal are integrated to a hermetic container, and a first control step of regulating the temperature and oxygen concentration in the hermetic container so that the resins are thermally decomposed selectively, a second control step for regulating the temperature and pressure in the hermetic container so that the first metal is vaporized selectively, and a step of recovering the first metal vaporized from the object to be treated.

Furthermore, in the first control step, the temperature and oxygen concentration in the hermetic container may be regulated so that the resins are thermally decomposed selectively while the first and second metals are maintained so as not to be substantially oxidized.

Such a treatment system of the present invention is a system capable of treating an object to be treated having resins and metals as its components.

Further, such a treatment method of the present invention is a method capable of treating an object to be treated having resins and metals as its components.

Namely, a basic idea of such treatment system and treatment method of the present invention is to introduce an object to be treated having resins and metals as its components to a hermetic container, first thermally decompose resinous portions selectively, and thereby vaporize, liquefy, or carbonize them. This selective thermal decomposition of resins may be performed by regulating the temperature, pressure or oxygen concentration in the hermetic container on such a condition that the metals are not oxidized nor vaporized.

When it is still difficult to separate the metals from the object to be treated by this operation only, the temperature and pressure in the hermetic container are then regulated to thereby vaporize the metals in the object to be treated selectively. When a plurality of metals (elements) are contained in the object to be treated, the temperature and pressure in the hermetic container are regulated depending on respective metals to thereby vaporize each of the metals selectively. As for the apparatus, for example, the treatment apparatus of the present invention such as described above may be used.

The object to be treated of such a treatment system or treatment method of the present invention is not only an object to be treated having resins and metals but also an object to be treated in which resins and metals are integrated.

As an example of the object to be treated having resins and metals, aluminum foil laminated by a plastic film in packing receptacles for retort pouch food, a syringe, a print-circuit board in which resins and metals such as copper and nickel are integrated, a flexible board or a film carrier of TAB, an IC, an LSI, or a resistor can be given. In addition, wastes from which lead is removed by means of the treatment system or the treatment method of the present invention may be an object to be treated.

Moreover, the object to be treated in which bonding by a metal or an alloy is released by means of the treatment system or the treatment method of the present invention may be an object to be treated. For example, a mounting substrate is separated into a substrate and electronic parts by means of the treatment system and the treatment method of the present invention, and the substrate and the parts may be objects to be treated respectively. Further, respective aspects of the treatment apparatus, the treatment system, or the treatment method of the present invention may be combined, for example.

In order to thermally decompose organic substances in the object to be treated, or in order to thermally decompose organic substances while maintaining component metals so as to be oxidized or vaporized as little as possible, for example, the object to be treated may be heated while the pressure in the hermetic container is controlled, or the object to be treated may be heated while the oxygen concentration in the hermetic container is controlled.

To control the oxygen concentration, oxygen partial pressure may be regulated by regulating the total pressure in the hermetic container, or the oxygen concentration in the system may be regulated by introducing a gas such as nitrogen gas or a rare gas into the hermetic container. If the oxidation of resinous portions progresses rapidly by heating the object to be treated, that is, the resinous portions are combusted, metallic portions which are integrated with the resinous portions are also oxidized into oxides, which lowers their utility value, and thus attention is required.

In heating the object to be treated, thermal conductivity is lowered and temperature regulating efficiency is lowered if the pressure in the hermetic container is reduced. Thus, it is suitable to reduce the pressure after heating the resins to a predetermined temperature, and then heat further the object to be treated.

Moreover, it is suitable to raise thermal conductivity by heating the interior of the hermetic container under pressure to a temperature such that the oxidation state of metals is maintained in a non-oxidizing atmosphere to thereby raise temperature increase efficiency, reduce the pressure after heating the object to be treated to the temperature such that the oxidation state is maintained, and then heat it further. The recovery percentage of decomposed components of resins with relatively small molecular weight is elevated by heating under pressure.

When metallic portions are composed of a plurality of metals, it is suitable to heat further the object to be treated to thereby vaporize respective metals selectively and recover each of the metals.

Gases produced by decomposition of resins of the object to be treated may be recovered by being condensed, and may be recovered, for example, by the exhaust gas system. Moreover, they may be condensed after being reformed and thermally decomposed, for example, at a temperature of 1000° C. or higher. The production of dioxins can be suppressed by cooling from a high temperature of 1000° C. of higher to normal temperature.

It is recommended to recover hydrogen gas by being adsorbed, and when halogenated hydrocarbon or the like is produced, it may be decomposed by a catalyst or the like.

When resins are polyvinyl chloride resin and the like which contain halogen, first, wastes may be heated to normal temperature in a range in which the oxidation state of component metals of the wastes are maintained to produce halogen gas. The produced halogen gas may be brought into contact with iron heated to a high temperature and recovered as iron halide, or may be reacted with ammonium and recovered as ammonium halide.

These gases produced by the heating of wastes may be treated by means of a multi-gas treatment system.

As an example of treatment, for example, concerning the treatment of aluminum foil laminated by a plastic film (hereinafter referred to as resin-coated aluminum foil) used for various kinds of packing receptacles, the thermal decomposition such as carbonization or liquefaction of resinous portions is insufficient in the case of temperatures below 673K. Moreover, since aluminum melts if it is heated to 923K or higher, and thus the resinous portions are thermally decomposed (vaporized, liquefied, or carbonized) selectively by heating it in the range of 673K to 923K, and aluminum foil is recovered in a metallic state.

It is more preferable that the pressure in the hermetic container is reduced to about $10^{-2}$ Torr or lower or the oxygen concentration is regulated by introducing gas such as $N_2$ or Ar and that heating is then performed. It is more preferable to set the heating temperature at 823 K to 873K.

A wastes treatment system of the present invention is characterized by comprising a hermetic container for holding wastes in which resins and copper are integrated therein, a temperature regulating means for regulating the temperature in the hermetic container, and a control means for controlling the temperature in the hermetic container so that the resins are thermally decomposed selectively while the copper is not substantially oxidized.

Further a wastes treatment system of the present invention is characterized by comprising a hermetic container for holding wastes in which resins and copper are integrated therein, a temperature regulating means for regulating the temperature in the hermetic container, an oxygen concentration regulating means for regulating the oxygen concentration in the hermetic container, and a control means for controlling the temperature and oxygen concentration in the hermetic container so that the resins are thermally decomposed selectively while the copper is maintained so as not to be substantially oxidized.

In the case of temperatures below 673K, the thermal decomposition such as carbonization or liquefaction of resinous portions is insufficient. It is possible to vaporize, liquefy, or carbonize the resins and to recover the copper in a metallic state as it is by heating the wastes in the range of 673K to 923K.

It is more preferable that the pressure in the hermetic container is reduced to about $10^{-2}$ Torr or lower or the oxygen concentration is regulated by introducing gas such as $N_2$ or Ar and that heating is then performed. It is more preferable to set the heating temperature at 823 K to 873K.

Further, an object of the present invention is to provide a treatment apparatus and a treatment method for treating an object such as shredder dust containing metals and resins while suppressing the production of dioxins.

Furthermore, an object of the present invention is to provide a treatment apparatus and a treatment method for separating an object such as a circuit board on which electronic parts and the like are mounted into the electronic parts and the circuit board while suppressing the production of dioxins, separating and recovering noxious metals such as lead and the like and metals such as copper and the like.

To solve such problems, a treatment apparatus of the present invention is characterized by comprising a first thermal decomposition means for thermally decomposing an object containing resins and metals at a first temperature, a reforming means, connected to the thermal decomposition means, for reforming a gaseous emission produced from the object at a second temperature such that dioxins are decomposed, a cooling means, connected to the reforming means, for cooling the gaseous emission to a third temperature so that a rise in the concentration of dioxins in the gaseous emission reformed at the second temperature is suppressed, a reduced pressure heating means for heating a residue produced by the thermal decomposition of the object under reduced pressure so that a metal contained in this residue is vaporized, and a condensing means for condensing the metal vaporized from the residue.

A treatment apparatus of the present invention is characterized by comprising a first thermal decomposition means for thermally decomposing an object containing resins and metals at a first temperature, a second thermal decomposition means, connected to the thermal decomposition means, for thermally decomposing a gaseous emission produced from the object at a second temperature higher than the first temperature, a cooling means, connected to the thermal decomposition means, for cooling the gaseous emission to a third temperature so that a rise in the concentration of dioxins in the gaseous emission which is thermally decomposed at the second temperature is suppressed, a reduced pressure heating means for heating a residue produced by the thermal decomposition of the object under reduced pressure so that a metal contained in this residue is vaporized, and a condensing means for condensing the metal vaporized from the residue.

Moreover, a treatment apparatus of the present invention may comprise a first thermal decomposition means for thermally decomposing an object containing resins, a first metal, and a second metal at a first temperature, a reforming means, connected to the first thermal decomposition means, for reforming a gaseous emission produced from the object at a second temperature such that dioxins are decomposed, a cooling means, connected to the reforming means, for cooling the gaseous emission to a third temperature so that a rise in the concentration of dioxins in the gaseous emission reformed at the second temperature is suppressed, a first reduced pressure heating means for heating a residue produced by the thermal decomposition of the object under reduced pressure so that the first metal contained in this residue is vaporized and the second metal is maintained, a condensing means, connected to the first reduced pressure heating means, for condensing the first metal vaporized from the residue, and a second reduced pressure heating means for heating the residue under reduced pressure so that the second metal contained in the residue from which the first metal is vaporized melts.

The second reduced pressure heating means of the treatment apparatus of the present invention may heat the residue under reduced pressure so that the second metal contained in the residue from which the first metal is vaporized melts and it coheres by its surface tension.

Further, a treatment apparatus of the present invention may comprise a thermal decomposition means for thermally decomposing an object having resins and metals as a part of its components and having a first portion and a second portion which are bonded by a bonding metal while maintaining the bonding metal, a reforming means, connected to the thermal decomposition means, for reforming a gaseous emission produced from the object at a second temperature such that dioxins are decomposed, a cooling means, connected to the reforming means, for cooling the gaseous emission to a third temperature so that a rise in the concentration of dioxins in the reformed gaseous emission is suppressed, and a reduced pressure heating means for heating a residue produced by the thermal decomposition of the object under reduced pressure so that the bonding metal is vaporized.

It is recommended that such a thermal decomposition means of the treatment apparatus of the present invention perform thermal decomposition in a non-oxidation atmosphere or a reducing atmosphere by controlling oxygen concentration or the like. Moreover, it is recommended that the cooling means perform cooling to the third temperature in the shortest possible time, and more preferably within about ten seconds.

Moreover, the treatment apparatus of the present invention may further comprise a neutralizing means, connected to the cooling means, for neutralizing the cooled gaseous emission.

A treatment method of the present invention is characterized by comprising a first thermal decomposition step of thermally decomposing an object containing resins and metals at a first temperature, a reforming step of reforming a gaseous emission produced from the object at a second temperature such that dioxins are decomposed, a cooling step of cooling the gaseous emission to a third temperature so that a rise in the concentration of dioxins in the reformed gaseous emission is suppressed, a reduced pressure heating step of heating a residue produced by the thermal decomposition of the object under reduced pressure so that a metal contained in this residue is vaporized, and a condensing step of condensing the metal vaporized from the residue.

A treatment method of the present invention is characterized by comprising a first thermal decomposition step of thermally decomposing an object containing resins and metals at a first temperature, a second thermal decomposition step of thermally decomposing a gaseous emission produced from the object at a second temperature higher than the first temperature, a cooling step of cooling the gaseous emission to a third temperature so that a rise in the concentration of dioxins in the gaseous emission which is thermally decomposed at the second temperature is suppressed, a reduced pressure heating means for heating a residue produced by the thermal decomposition of the object under reduced pressure so that a metal contained in this residue is vaporized, and a condensing means for condensing the metal vaporized from the residue.

A treatment method of the present invention is characterized by comprising a first thermal decomposition step of thermally decomposing an object containing resins, a first metal, and a second metal at a first temperature, a reforming step of reforming a gaseous emission produced from the object at a second temperature such that dioxins are decomposed, a cooling means for cooling the gaseous emission to a third temperature so that a rise in the concentration of dioxins in the gaseous emission reformed at the second temperature is suppressed, a first reduced pressure heating step of heating a residue produced by the thermal decomposition of the object under reduced pressure so that the first metal contained in this residue is vaporized and the second metal is maintained, a condensing step of condensing the first metal vaporized from the residue, and a second reduced pressure heating step of heating the residue under reduced pressure so that the second metal contained in the residue from which the first metal is vaporized melts.

The treatment method of the present invention is characterized in that in the second reduced pressure heating step, the residue is heated under reduced pressure so that the second metal contained in the residue from which the first metal is vaporized melts and coheres by its surface tension.

A treatment method of the present invention is characterized by comprising a thermal decomposition step of thermally decomposing an object having resins and metals as a part of its components and having a first portion and a second portion which are bonded by a bonding metal while maintaining the bonding metal, a reforming step of reforming a gaseous emission produced from the object at a second temperature such that dioxins are decomposed, a cooling step of cooling the gaseous emission to a third temperature so that a rise in the concentration of dioxins in the reformed gaseous emission is suppressed, and a reduced pressure heating step of heating a residue produced by the thermal decomposition of the object under reduced pressure so that the bonding metal is vaporized.

Moreover, the treatment method of the present invention may further comprise a neutralizing step of neutralizing the gaseous emission cooled by the cooling means.

It is recommended that the aforesaid thermal decomposition step be performed in a non-oxidation atmosphere or a reducing atmosphere by controlling oxygen concentration or the like. Moreover, in the cooling step, it is desirable to perform cooling to the third temperature in the shortest possible time, and more preferably within about ten seconds. It is suitable to set the first temperature at about 250° C. to about 500° C. It is suitable to set the second temperature at a temperature higher than about 800° C., and more preferably at a temperature higher than 1000° C., and still more preferably at a temperature higher than 1200° C. It is suitable to set the third temperature at a temperature lower than 150° C., and more preferably at a temperature lower than 100° C., and still more preferably at a temperature lower than 35° C.

The concentration of dioxins in the gaseous emission can be lowered drastically by reforming and thermally decomposing the gaseous emission emitted from the object to be treated at such a temperature that dioxins are decomposed, shortening the retention time of the gaseous emission in the temperature range in which dioxins are produced and recomposed from this state as much as possible, and cooling the gaseous emission to the third temperature at which dioxins are not produced nor recomposed. The concentration of a production source of dioxins is sharply lowered by treating the first thermal decomposition, the second thermal decomposition, or the reforming at two stages of the first temperature and the second temperature and simultaneously performing them in a reducing atmosphere.

In this case, the second temperature is such a temperature that dioxins are decomposed, and that not only dioxins but also other chemical compounds contained in the gaseous emission are also decomposed. Accordingly, in the present invention, not only dioxins but also halogenated hydrocarbon, PCB, coplanar PCB, and the like can be also decomposed and made innoxious.

Namely, in the present invention, to treat an object having resins and metals as its components, a means for decomposing resins, a means for thermally decomposing further a gaseous emission produced from the object to be treated, a cooling means for cooling the gases so that dioxins are not produced, and a recovery means for recovering a metal from a thermally decomposed residue by vaporizing or liquefying it under reduced pressure are provided, in which case the resins may be synthetic resins, natural resins, or a mixture of these resins. Moreover, if not specially explained, the metal here is the general term for metals contained in the object to be treated, and not limited to a specific metallic element.

The first thermal decomposition means is to thermally decompose the object to be treated at the first temperature such that the object to be treated is thermally decomposed under controlled oxygen concentration, and extracts a gaseous emission, for example, from shredder dust, waste circuit boards, and the like. Here, the gaseous emission is basically composed of emitted gases, but the case where the gaseous emission contains solid fine particles, liquid fine particles mixed in the emitted gases is not excluded.

It is recommended that a heating means and a temperature measuring means be used as a temperature regulating means for regulating the first temperature in the first thermal decomposition means. As for a heating means, it is suitable to select the heating means from various kinds of heating such as convection heating, radiation heating, and the like as required or use them in combination as the heating means. For example, resistance heating by a sheathed heater or the like may be used, or gas, heavy oil, light oil, or the like may be combusted outside the chamber. Moreover, gases emitted from the resins of the object to be treated are turned into fuel gas after being reformed, made innoxious, or neutralized, and may be reused as a heat source of the treatment apparatus, including the first thermal decomposition means, of the present invention. Furthermore, it is suitable to feed clean fuel gas, for example, obtained as described above into a gas turbine generator, convert it to electric power, and to use this electric power for the operation of the treatment apparatus, including the first thermal decomposition means, of the present invention.

The use of various kinds of temperature sensors as the temperature measuring means is recommended. It is recommended that the first temperature be set so that the resins of the object to be treated are thermally decomposed and that the metals of the object to be treated are oxidized as little as possible, but it is preferable to maintain the first thermal decomposition means on a reducing condition to eradicate production sources of dioxins at many stages as will be described later. For example, by thermally decomposing aromatic series hydrocarbon compounds containing chlorine under a reducing condition, chlorine contained in the aromatic series hydrocarbon compounds is decomposed into HCl and the like. Accordingly the production of dioxins is suppressed.

Incidentally, in the present invention, unless explained specially, polychlorinated dibenzo-p-dioxins (PCDDs), polychlorinated dibenzofurans (PCDFs), and homologues different from these in number of chlorine and substitution position are generically called dioxins. In addition, compounds in which another halogen is substituted for chlorine are included.

Therefore, it is suitable that the first thermal decomposition means includes a temperature regulating means and an oxygen concentration regulating means since it is preferable that the metals contained in the object to be treated are maintained so as not to be substantially oxidized, and more preferably in a reducing atmosphere.

Generally, when the object to be treated is complicated, there is a possibility that the object to be treated is partially oxidized, but it is only required to maintain a reducing atmosphere inside the first thermal decomposition means as a whole. As the oxygen concentration regulating means, for example, an oxygen concentration sensor which is an oxygen concentration measuring means and a carrier gas introduction system may be used.

As the oxygen concentration sensor, for example, a so-called zirconia sensor using zirconia (zirconium oxide) may be used, or the absorption of CO and $CO_2$, for example, may be measured by infrared spectroscopy. Besides, GC-MS may be used. It is suitable that the oxygen concentration sensor is selected from them as required or they are used in combination as the oxygen concentration sensor.

A rare gas such as Ar or the like may be used as a carrier gas. This carrier gas can not only regulate the oxygen concentration in the first thermal decomposition means but also efficiently lead gases to the reforming means or the second thermal decomposition means. Moreover, the oxygen concentration regulating means may serve also as a pressure regulating means.

Moreover, a shredder may be provided at a stage prior to the first thermal decomposition means. The object to be treated brought in from the outside of the apparatus may be introduced into the first thermal decomposition means after being shredded by the shredder and segregated, or may be introduced into the first thermal decomposition means without being shredded. When the object to be treated is a waste circuit board, it is suitable to introduce it into the first thermal decomposition means without shredding it.

It is recommended that temperature and oxygen concentration conditions in the first thermal decomposition means into which the object to be treated has been introduced be regulated so that the metals in the object to be treated are oxidized as little as possible and so that chlorine which has combined with organic compounds on the occasion of thermal decomposition of the resins is made inorganic as much as possible. The temperature and oxygen concentration conditions may be set previously, or may be controlled by feeding back measured values of temperature and oxygen concentration to the heating means, the oxygen concentration regulating means, and the like. When the oxygen concentration needs to be measured, the used of a zirconia sensor or the like is recommended.

The pressure in a chamber of the first thermal decomposition means may be controlled. If the pressure in the first thermal decomposition means is reduced, for example, the oxygen concentration is also lowered, whereby the object to be treated is not abruptly oxidized by heating. A large quantity of gases produced by decomposition are generated from the resins by heating, but generally resins hardly produce oxygen even if they are decomposed. Moreover, decomposition products of the resins are easily vaporized.

Meanwhile, if the pressure is reduced, the thermal conductivity in the hermetic zone is lowered. But, if a non-oxidizing atmosphere is maintained in the first thermal decomposition means, the object to be treated is not oxidized even under atmospheric pressure or under increased pressure. Therefore, if the non-oxidizing atmosphere is maintained in the first thermal decomposition means, pressurization is possible, resulting in a rise in the thermal conductivity in the system.

A gaseous emission treatment system for treating a gaseous emission from the object to be treated will be explained now.

The gaseous emission treatment system is to treat the gaseous emission emitted from the object to be treated by the first thermal decomposition means, and the principal portion thereof is composed of the reforming means or the second thermal decomposition means and the cooling means. The gaseous emission treated by the cooling means is utilized as clean fuel gas by being subjected to post-treatment such as neutralization, filtration, or cleaning as required.

The reforming means is placed to connect with the first heating means and reforms the gaseous emission emitted from the object to be treated in the first thermal decomposition means at the second temperature higher than the first temperature, where reforming means that hydrocarbon compounds contained in the gaseous emission emitted from the object to be treated are changed into lower-molecular hydrogen, methane, carbon monoxide, and the like. Moreover, hydroreforming or the like may be performed. It is suitable in terms of the eradication of production sources of dioxins as described above to perform reforming while maintaining the inside of the system on a reducing condition. If a reducing atmosphere is maintained in the reforming means, a small quantity of air may be introduced into the reforming means. As the reforming means, not only the thermal reforming means but also a catalytic reforming means by the use of a catalyst, for example, may be provided in addition to this. As a catalyst, a metal such as Pt, Re, Ni, or V may be used being supported by various kinds of ceramics, solid acids such as alumina silica and zeolite (aluminosilicate).

Moreover, in place of the reforming means, the second thermal decomposition means, connected to the first thermal decomposition means, for thermally decomposing the gaseous emission in a reducing atmosphere may be provided.

The gaseous emission from the object to be treated can be treated at the second temperature higher than the first temperature by separating the reforming means or the second thermal decomposition means from the first thermal decomposition means, whereby the gaseous emission can be reformed effectively and chlorine is made inorganic effectively.

It is desirable to maintain the reforming means or the second thermal decomposition means on such a condition that dioxins which directly or indirectly originate in the object to be treated are decomposed as much as possible. Considerable dioxins can be decomposed, for example, by setting the second temperature at about 800° C. Moreover, dioxins can be decomposed more effectively by setting the second temperature at 1000° C. or higher, and more preferably at 1200° C. or higher. This reforming means performs treatment at the second temperature such that dioxins are decomposed, and thus thermal decomposition of the gaseous emission occurs simultaneously at the second temperature.

Hydrocarbon compounds contained in the gaseous emission emitted from the object to be treated are made lower-molecular and changed into hydrogen, methane, carbon monoxide, and the like by being reformed by the reforming means or by thermally decomposed by the second thermal decomposition means. Further, when dioxins are contained in the gaseous emission, most of the dioxins are decomposed. Moreover, organic chlorine is made inorganic, and the recomposition of dioxins is suppressed.

Concerning the reforming means or the second thermal decomposition means, such a temperature condition that a reducing atmosphere and dioxins are decomposed by introducing the gaseous emission from the first thermal decomposition means and a small quantity of air into a chamber filled with cokes may be formed.

Further, as described above, it is also suitable to heat the chamber to such a temperature that dioxins are decomposed by combusting fuel gas and air, and introduce the gaseous emission from the first thermal decomposition means into this chamber as described above.

Furthermore, a catalytic cracking means such as a catalyst as described above may be provided in the chamber.

Additionally, a temperature regulating means and an oxygen concentration measuring means for regulating the temperature and oxygen concentration in the system may be provided in the reforming means or the second thermal decomposition means as required. As the oxygen concentration regulating means, such oxygen concentration sensor and carrier gas introduction system as described above may be used. Moreover, a hydrogen gas reservoir may be connected, or a reservoir for an inert gas such as Ar may be connected.

As described above, the gaseous emission contained in the gaseous emission from the object to be treated is made lower-molecular by the reforming means or the second thermal decomposition means and changed into hydrogen, methane, carbon monoxide, and the like. As for the first thermal decomposition means, the reforming means or the second thermal decomposition means, and the cooling means, the corrosion of containers, tubes, and the like caused by chlorine gas is severe in the case where chlorine and the like are contained in the gaseous emission, and thus hastelloy, titanium alloy, or the like in place of stainless steel may be used for the apparatus as required.

The treatment apparatus of the present invention includes the cooling means, placed to connect with the reforming means or the second thermal decomposition means, for cooling the gaseous emission reformed or thermally decomposed at the second temperature to the third temperature so that a rise in the concentration of dioxins in the gaseous emission is suppressed.

Namely, the concentration of dioxins in the gaseous emission reformed or thermally decomposed at the second temperature in the reforming means or the second thermal decomposition means is extremely low, since the second temperature is a temperature such that the dioxins are decomposed and halogen in hydrocarbon compounds decomposed or reformed at this temperature is made inorganic by a reducing atmosphere. Accordingly, in order to prevent the production and recomposition of dioxins from this state, the gaseous emission is cooled to the third temperature so that a rise in the concentration of dioxins in the gaseous emission is suppressed as much as possible. The third temperature may be set at such a temperature that no production reaction of dioxins occurs.

The production and recomposition of dioxins can be suppressed, for example, by cooling the gaseous emission in which dioxins are already decomposed to 150° C. or lower, more preferably 100° C. or lower, and still more preferably 50° C. or lower (since the temperature is required to be a temperature such that dioxins are decomposed even if it is not the same as the temperature in the in the reforming means or the second thermal decomposition means). On this occasion, it is desirable to cool the gaseous emission to the third temperature in the possible shortest time. This is because dioxins are easily produced and recomposed in the range of about 200° C. to about 400° C., and thus the concentration of dioxins in the gaseous emission can be held down more effectively by cooling the gaseous emission to the third temperature to shorten the retention time of the gaseous emission in the temperature range in which dioxins are easily produced and recomposed as much as possible.

Therefore, it is desirable to perform cooling of the gaseous emission in the cooling means rapidly, preferably within about ten seconds.

As an example of such a cooling means, it is suitable to perform contact cooling by directly jetting a refrigerant such as water or cooling oil to the gaseous emission. On this occasion, if alkaline powder such as lime powder or the like is jetted to the gaseous emission, the gaseous emission is neutralized. Moreover, HCl in the gaseous emission, for example, is spread over the surfaces of solids by touching the lime powder, which can also suppress the production and reproduction of dioxins.

As described above, by means of the first thermal decomposition means, the reforming means or the second thermal decomposition means, and the cooling means, the gaseous emission from the object to be treated is changed into hydrogen, methane, carbon monoxide, and the like, and the concentration of dioxins in the gaseous emission is sharply lowered.

In the present invention, the production of dioxins is suppressed by treating the decomposition of the object to be treated and the decomposition of the gaseous emission from the object to be treated at multiple stages by the first thermal decomposition means and the reforming means or the second thermal decomposition means, and by maintaining such decomposition means on a reducing condition.

When halides, SOx, NOx, and the like are contained in the gaseous emission cooled by the cooling means, the gaseous emission may be cleaned and desulfurized by a cleaning means and a desulfurizing means, and the like. In addition, a filter means using activated carbon may be provided.

Furthermore, the gaseous emission cooled in the cooling means may be introduced to a neutralization reaction filter means such as a bag filter. Between the cooling means and the neutralization reaction filter means, slacked lime, filter aid (for example, particles with high voids such as zeolite or activated carbon) and the like may be blown into a current of the gaseous emission by a dry venturi or the like.

The gaseous emission emitted from the object to be treated which has been treated as above may be used as a heat source of heating by the first thermal decomposition means or may be supplied to a gas turbine generator to obtain electric power. Moreover, this electric power may be used for a heat source of the treatment apparatus of the present invention and the like.

Next, the treatment of the thermally decomposed residue of the object to be treated which is thermally decomposed by the first thermal decomposition means will be explained.

In order to treat an object having resins and metals as a part of its components, the treatment apparatus of the present invention includes a means for decomposing and recovering the resins and a means for separating and recovering the metals, and the reduced pressure heating means is a means for separating and recovering the metals from the residue of the object to be treated which is thermally decomposed by the first thermal decomposition means. It is recommended that such treatment be performed by the treatment apparatus of the present invention including the tube and the hermetic door.

Most of the resin components of the object to be treated are decomposed, and the gaseous emission is treated as described above by the first thermal decomposition means. The oxygen concentration in the first thermal decomposition means is controlled, and thus the metals in the object to be treated are maintained in the object to be treated without being substantially oxidized and with only tiny vaporization taking place. Meanwhile, most of the resins in the object to be treated remain as carbides as a result of thermal decomposition. In the present invention, the object to be treated which is treated by the first thermal decomposition means is transferred from the first thermal decomposition means to the reduced pressure heating means.

The reduced pressure heating means provided in the treatment apparatus of the present invention comprises a first hermetic zone partitioned from the first thermal decomposition means by an openable and closeable partition and including a temperature regulating means and a pressure regulating means for selectively vaporizing a metal in the object, and a first recovery means, connected to the first hermetic zone, for recovering the metal vaporized from the object. As such a recovery means, it is recommended that structure in which a hermetic door and a tube are combined as described above be adopted.

BRIEF DESCRIPTION OF DRAWING

FIG. 48 is a chart showing measurement results of the concentration of residual dioxins in a heated residue;

BEST MODE FOR CARRYING OUT THE INVENTION

Example 1

Figure 1:
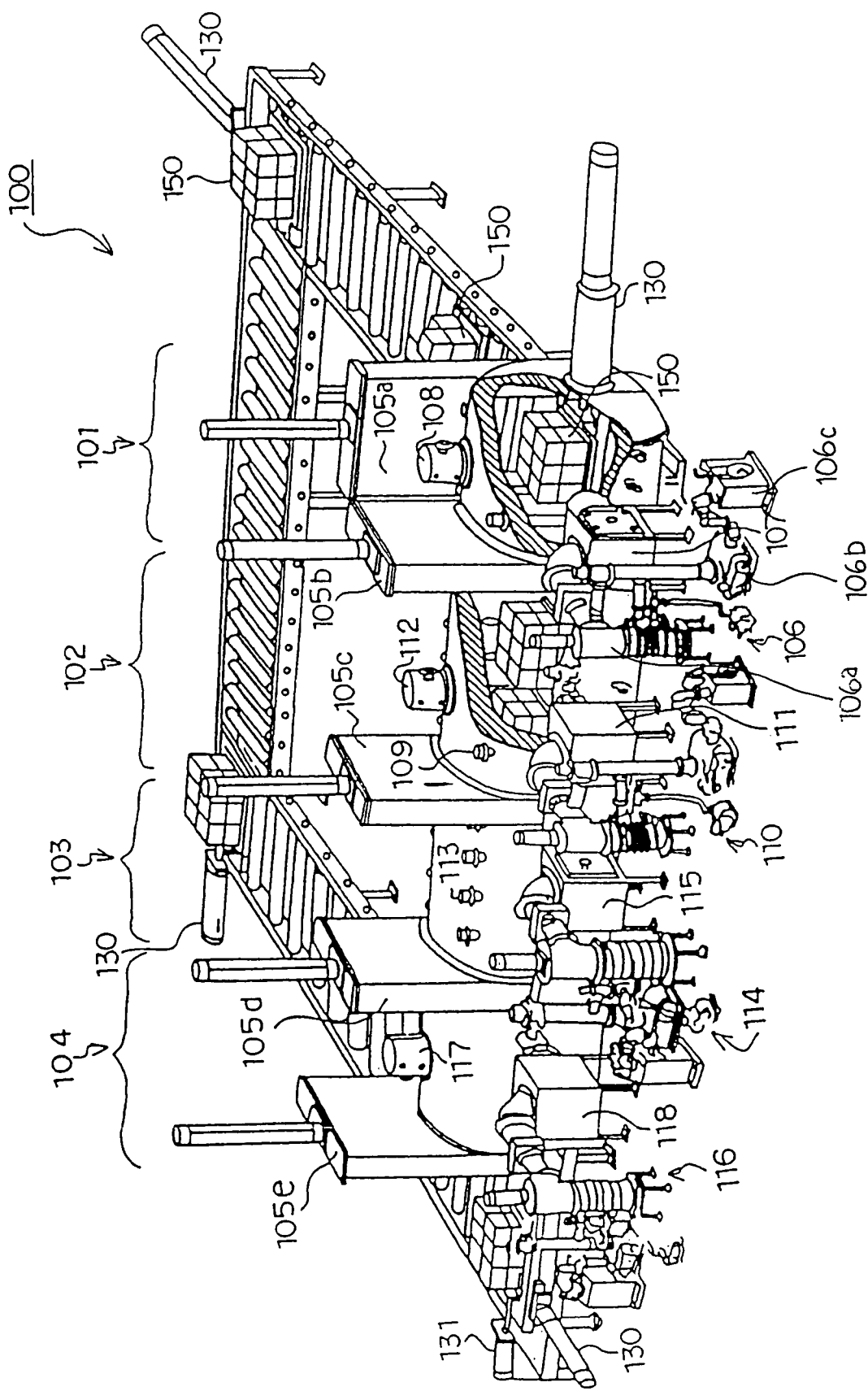
FIG. 1 is a perspective view roughly showing an example of a treatment apparatus of the present invention.

FIG. 1 is a perspective view roughly showing an example of a treatment apparatus of the present invention, and showing the interior thereof by sectioning a portion thereof.

This treatment apparatus 100 can treat an object to be treated 150 having resins and metals as its components, and it is composed of a purge chamber 101, a first hermetic chamber 102, a second hermetic chamber 103, and a cooling chamber 104.

These chambers are partitioned off by doors 105 which are openable and closeable partitions. Namely, the outside of the apparatus and the purge chamber 101 are partitioned off by a door 105a, the purge chamber 101 and the first hermetic chamber 102 are partitioned off by a door 105b, the first hermetic chamber 102 and the second hermetic chamber 103 are partitioned off by a door 105c, the second hermetic chamber 103 and the cooling chamber 104 are partitioned off by a door 105d, and the cooling chamber 104 and the outside of the apparatus are partitioned off by a door 105e.

The doors 105 partitioning off these chambers include hermetic sealing maintainability and heat insulating properties, and partition off the respective chambers in terms of heat and pressure. A thermal load imposed on the door 105a or 105b is small, so that only the maintenance of hermetic sealing capability is required.

An exhaust system 106 is connected to the purge chamber 101. The exhaust system 106 includes an oil diffusion pump 106a, a booster pump 106b, and a rotary pump 106c. Valves not illustrate are placed between the purge chamber 101 and the exhaust system 106, and between respective vacuum pumps. This point also applies to cases where it is not specially described below.

A trap 107 for trapping moisture, hydrogen gas, and the like emitted from the object to be treated 150 by pressure reduction in the purge chamber 101 and the like is placed between the purge chamber 101 and the exhaust system 106. Therefore, the emission of moisture, hydrogen gas, and the like from the object to be treated 150 in the purge chamber does not exert a harmful influence on the exhaust system 106. It is recommended that this trap 107 be provided as required. Moreover, it is recommended that an exhaust gas treatment system capable of decomposing or trapping dioxins which will be described later be provided in place of the trap when the object to be treated such as soil or burned fly ashes containing organic halides such as dioxins is treated. A wet filter such as an oil film filter, a liquid seal pump, or the like may be used as the trap.

The pressure in the purge chamber 101 is regulated by this exhaust system 106 and a vacuum gauge not illustrated which is a pressure sensor. It is suitable to use a Bourdon tube, a Pirani gauge, or the like as the vacuum gauge as required.

A carrier gas introduction system for purging the interior of the purge chamber 101 by gas is connected to the purge chamber 101, and the numeral 108 denotes a carrier gas introduction valve. The carrier gas introduction system is connected to a carrier gas reservoir not illustrated. $N_2$ is used here as a carrier gas, but a rare gas such as Ar or the like may be used.

It is also suitable to provide a heating means in the purge chamber 101 to preheat the object to be treated 150.

The pressures in the purge chamber 101 and the first hermetic chamber 102 are almost equalized, the door 105b is then opened, and the object to be treated 150 is moved to the first hermetic chamber 102 by a pusher 130. Even when not specially described hereafter, it is recommended that the doors 105 be opened and closed after the pressures on both sides are balanced. When a plurality of hermetic chambers are placed, the chambers may be placed in an L-shape for the transfer of the object to be treated.

The first hermetic chamber 102 is a treatment chamber for thermally decomposing component resins selectively while maintaining the oxidation state of component metals of the object to be treated 150.

The first hermetic chamber 102 includes an electric heater 109 which is a heating means. Although a radiant tube is used here as the heating means, the heating means is not limited to the aforesaid electric heater 109, but may be selected or provided in combination as required. For example, gas, oil, or the like may be combusted or dielectric heating may be performed. Further, gases and oil which are thermal decomposition products of the component resins of the object to be treated 150 may be combusted.

The temperature in the first hermetic chamber 102 is regulated by this electric heater 109, a temperature sensor not illustrated, and a control means not illustrated for controlling the electric heater by a measured value from the temperature sensor. As for the control means, a program in which the measured value from the temperature sensor or a measured voltage is an input and a signal or a voltage such as changes electric power to be supplied to the electric heater is an output, for example, is incorporated in an electronic computer and used as the control means.

Such a control may be performed by an analog circuit, or an operator may operate the heating means according to measured temperatures.

In the treatment apparatus illustrated in FIG. 1, the temperature in the first hermetic chamber 102 is controlled by the control means not illustrated collectively with the pressure and the oxygen concentration in the first hermetic chamber 102, conditions in the purge chamber 101, the second hermetic chamber 103, and the cooling chamber 104, the opening and closing of the partitions 105, and the transfer of the object to be treated 150, which will be described later. The control means, for example, may include a control program in the electronic computer.

An exhaust system 110 is connected to the first hermetic chamber 102. The structure of this exhaust system is similar to that of the exhaust system 106 of the purge chamber 101.

The pressure in the first hermetic chamber 102 is regulated by this exhaust system 110 and a vacuum gauge not illustrated which is a pressure sensor. As described above, it is also suitable to use a Bourdon tube, a Pirani gauge, or the like as the vacuum gauge as required. A carrier gas introduction system for regulating the oxygen concentration in this chamber is connected to the first hermetic chamber 102, and the numeral 112 denotes a carrier gas introduction valve. The carrier gas introduction system is connected to a carrier gas reservoir not illustrated.

$N_2$ is used here as a carrier gas, but a rare gas such as Ar or air may be used.

The pressure inside the first hermetic chamber can be reduced or raised by properly operating the exhaust system 110 and the carrier gas introduction valve 112. A pressure regulating means of this apparatus can regulate the pressure in the system in the range of about $10^{-3}$ Torr to about $4 \times 10^3$ Torr. The pressure may be reduced by changing the capability and capacity of the exhaust system. Moreover, pressurization may be performed further by previously pressurizing the carrier gas.

The oxygen concentration in the first hermetic chamber 102 is regulated by the carrier gas introduction valve 112 and an oxygen concentration sensor not illustrated. A zirconia sensor, for example, may be used as the oxygen concentration sensor. When the temperature in the first hermetic chamber 102 is too low for the zirconia sensor, gas extracted from within the first hermetic chamber 102 may be regulated at about 773K and the oxygen concentration may be measured.

In addition to the zirconia sensor, for example, the oxygen concentration may be measured by infrared-spectroscopically analyzing gas in the system.

The oxygen concentration in the first hermetic chamber 102 may be regulated, for example, not by the introduction of the carrier gas such as $N_2$ but by the total pressure in the system.

When thermal decomposition of component resins of the object to be treated 150 starts, a gas atmosphere produced by decomposition of the resins is distinguished in the first hermetic chamber 102. Therefore, if the oxygen concentration is fully lowered by reducing the pressure in the first hermetic chamber 102 before the start of thermal decomposition of resins, the combustion of the object to be treated 150 and the oxidation of component metals of the object to be treated can be prevented.

It is recommended that the pressure and oxygen concentration in the first hermetic chamber 102 be controlled in the same manner as the temperature as described above. A program in which measured values from the pressure sensor and the oxygen concentration sensor or a measured voltage is an input and a signal or a voltage for controlling a valve in the exhaust system 110 and the carrier gas introduction valve 112 is an output, for example, may be incorporated in the electronic computer and used as a control means.

Figure 2:
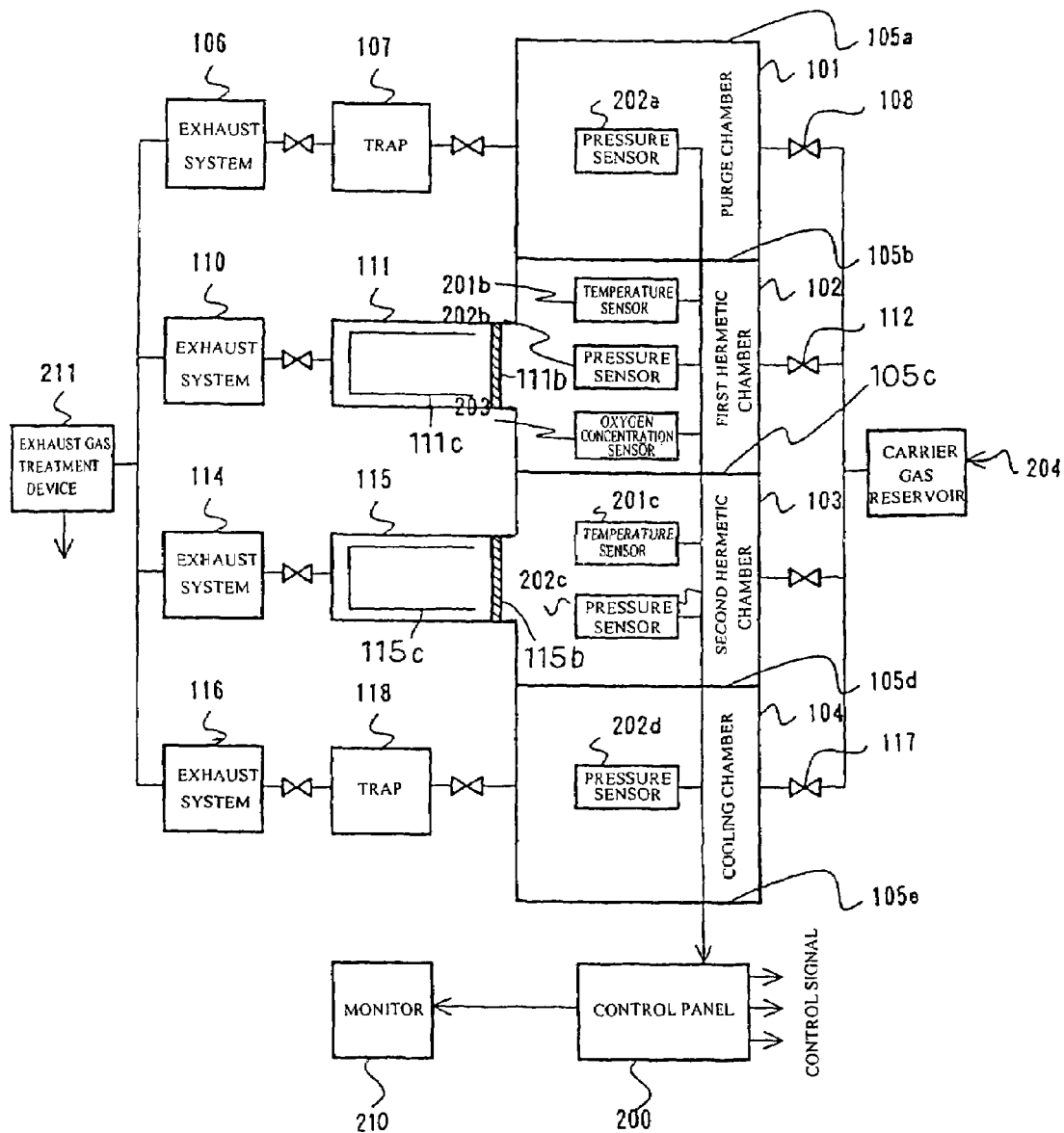
FIG. 2 is a diagram schematically showing the treatment apparatus of the present invention illustrated in FIG. 1.

An exhaust gas treatment system 111 for treating a gaseous emission containing gas produced by decomposition of the component resins of the object to be treated 150 is placed between the first hermetic chamber 102 and the exhaust system 110. The first hermetic chamber 102 and the exhaust gas treatment system 111 are partitioned off by an openable and closeable hermetic door 111b as depicted in FIG. 2. When this hermetic door 111b is opened, a retort 111c is inserted from the exhaust gas treatment system 111 side. On this occasion, the hermetic door 111b is shielded from the first hermetic chamber 102, and the first hermetic chamber 102 and the exhaust treatment system 111 hermetically communicate with each other by the retort 111c. The adoption of this structure makes it possible to prevent the gaseous emission from adhering to the hermetic door 111b in the treatment apparatus of the present invention. Moreover, a seat portion of the hermetic door 111b is shielded from heat from the first hermetic chamber 102, whereby the seal portion of the hermetic door is protected, leading to improvement in hermetic sealing capability.

In the exhaust treatment system, exhaust gas is made innoxious and values are recovered by condensing exhaust gas, decomposing the exhaust gas by a catalyst or plasma glow discharge, or adsorbing the exhaust gas by an adsorbent. For example, it is suitable to condense gases produced by the selective thermal decomposition of the object to be treated 150 by the exhaust gas treatment system and recover them as oil such as light oil and heavy oil, and tar. The recovered oil may be used as a heating means as described above.

When gases such as halogen and organic halides are contained in the gases produced by the decomposition of the component resins of the object to be treated 150, the gases may be decomposed, for example, by the use of a catalyst, plasma, and the like.

A multi-exhaust gas chamber not illustrated may be provided at stages subsequent to the exhaust systems 106, 110, 114, and 116 connecting to the respective chambers in order not to leak noxious gases emitted from the object to be treated 150 to the outside of the apparatus.

The temperature, pressure, and oxygen concentration in the first hermetic chamber 102 are controlled as described above. Accordingly, the component metals of the object to be treated 150 are hardly oxidized nor vaporized, whereby the component resins can be thermally decomposed selectively. The gaseous emission produced by the thermal decomposition of the component resins is treated by the exhaust gas treatment system 111. It is unnecessary to completely carbonize the component resins of the object to be treated in the first hermetic chamber 102, and it is suitable to thermally decompose the component resins to the extent that they are not obstacles when a metal is separated and recovered in the second hermetic chamber 103 at the next stage.

At the time of the completion of treatment in the first hermetic chamber 102, most of the component resins remaining in the object to be treated 150 exist as carbides.

In the treatment apparatus 100 of the present invention, the object to be treated 150 heated in the first hermetic chamber 102 is moved to the second hermetic chamber 103 without being cooled, resulting in very high thermal efficiency.

The second hermetic chamber 103 is a treatment chamber for selectively vaporizing and recovering the component metals of the object to be treated 150 from the object to be treated 150.

This second hermetic chamber 103 includes the same electric heater 113 as the first hermetic chamber as a heating means. The heating member is not limited to the electric heater 109, and can be selected or provided in combination as required.

As described above, the temperature in the second hermetic chamber 103 is controlled by the electric heater 113 and a temperature sensor not illustrated similarly to that in the first hermetic chamber 102. Namely, the temperature in the second hermetic chamber 103 is controlled by the control means not illustrated collectively with the pressure and the oxygen concentration in the second hermetic chamber 103, and with conditions in the purge chamber 101, the first hermetic chamber 102, and the cooling chamber 104, and the opening and closing of the partitions 105.

An exhaust system 114 is connected to the second hermetic chamber 103. The structure of this exhaust system is similar to that of the exhaust system 106 of the purge chamber 101.

The pressure in the second hermetic chamber 103 is regulated by this exhaust system 114 and a vacuum gauge not illustrated which is a pressure sensor. As described above, it is also suitable to use a Bourdon tube, a Pirani gauge, or the like as the vacuum gauge as required. A carrier gas introduction system for regulating the oxygen concentration in this chamber is connected to the second hermetic chamber 103, and the numeral 112 denotes a carrier gas introduction valve. The carrier gas introduction system is connected to the carrier gas reservoir not illustrated. $N_2$ is used here as a carrier gas, but a rare gas such as Ar may be used.

The pressure in the first hermetic chamber can be reduced or raised by properly operating the exhaust system 114 and the carrier gas introduction valve 112. In this apparatus, the pressure in the system can be regulated in the range of about $10^{-3}$ Torr to about $4 \times 10^3$ Torr. The pressure may be reduced by changing the capability and capacity of the exhaust system. Moreover, pressurization may be performed further by previously pressurizing the carrier gas.

The vapor pressures (boiling points) of the component metals of the object to be treated 150 drop with pressure reduction in the second hermetic chamber 103, whereby the metals can be vaporized at lower temperatures.

Therefore, it is recommended that the capabilities of the heating means and an exhaust means provided in the second hermetic chamber 103 be changed according to the kind of metal separated and recovered from the object to be treated 150.

A dielectric heating means may be provided, for example, to heat the interior of the second hermetic chamber 103 to a higher temperature. Moreover, a vacuum pump with higher capability and a larger exhaust quantity may be provided, for example, to reduce the pressure in the second hermetic chamber 103 to form a higher vacuum. Depending on the capacity of the interior of the second hermetic chamber 103, a still higher vacuum may be formed by using a getter-ion pump, a turbo-molecular pump, or the like.

The oxygen concentration in the second hermetic chamber 103 is sufficiently low even if not specially regulated since the pressure in the system is fully reduced. Hence, positive regulation is unnecessary, but when an oxygen concentration regulating means is provided, the same manner as in the first hermetic chamber 102 can be recommended.

Although the structure in which one second hermetic chamber 103 is provided is illustrated in the treatment apparatus 100 shown in FIG. 1, a plurality of second hermetic chambers 103 may be provided. The provision of the plurality of second hermetic chambers 103 different in temperature and pressure conditions therein enables a plurality of metals with different vapor pressures to be vaporized and recovered from the object to be treated 150.

When it is unnecessary to separate and recover individual elements of metals from the object to be treated 150, a plurality of metals can be vaporized and recovered from the object to be treated 150. When a Pb—Sn alloy is removed from the object to be treated, for example, it is suitable to heat the object to be treated at such a temperature that Pb and Sn are vaporized at the pressure in the second hermetic chamber 103 and recover Pb and Sn. It is naturally suitable to selectively vaporize Pb and Sn and recover them as separate fractions.

A recovery chamber 115 for recovering a metal in the state of a gas vaporized from the object to be treated 150 is placed between the second hermetic chamber 103 and the exhaust system 114. This recovery chamber condenses the metal vaporized in this chamber by cooling them to a temperature not more than a melting point and recovers it. The second hermetic chamber 103 and the recovery chamber 115 are partitioned off by an openable and closeable hermetic door 115b as depicted in FIG. 2. When the hermetic door 115b is opened 115b, a retort (or a tube) 115c is inserted from the recovery chamber 115 side. On this occasion, the hermetic door 115b is shielded from the second hermetic chamber 103 and the recovery chamber 115, and the second hermetic chamber 103 and the recovery chamber 115 hermetically communicate with each other by the retort 115c. The adoption of the aforesaid structure makes it possible to prevent vaporized substances from the object to be treated from condensing and adhering to the hermetic door 115b in the treatment apparatus of the present invention. Moreover, a seal portion of the hermetic door 115b is shielded from heat from the second hermetic chamber 103, whereby the seal portion of the hermetic door 115b is protected, leading to improvement in hermetic sealing capability.

The recovery chamber 115 can be separated from the second hermetic chamber 103 if the hermetic door 115b is closed by retreating the retort 115c to the recovery chamber 115 side. In this state, the retort 115c can be exchanged by opening the recovery chamber 115 from the outside. Accordingly, in the treatment apparatus of the present invention, condensates vaporized once from the object to be treated can be taken out while the conditions such as the temperature, pressure, and the like in the second hermetic chamber 103 are maintained. Thus, continuous operation of the treatment apparatus becomes possible, thereby drastically raising the productivity of treatment. The structure of this recovery chamber will be described in detail on another occasion.

The interior of the retort 115c placed in the recovery chamber 115 may have counter-current structure or helical structure. Even when the vaporized metal is continuously condensed and recovered, or condensed and recovered by batch processing, recovery efficiency increases if the retention time of the vaporized metal in the recovery chamber 115 is lengthened. A valve, an openable and closeable partition, and a filter for trapping vaporized substances and condensates which have not been recovered by the retort 15c may be provided between the recovery chamber 115 and the exhaust system 114.

N2 or a rare gas as a carrier gas may be introduced into the second hermetic chamber 103. The vaporized metal is efficiently introduced into the recovery chamber by the carrier gas.

The recovery chambers 115 may be provided in plural lines in the second hermetic chamber 103. It is suitable to recover the same metal by means of the plurality of recovery chambers 115. Alternatively, it is suitable that a plurality of metals are selectively vaporized by regulating the temperature and pressure in the second hermetic chamber 103 stepwise and recovered by switching the plurality of lines of recovery chambers 115.

The temperature, pressure, and oxygen concentration in the second hermetic chamber 103 are controlled as above. Therefore, the component metal of the object to be treated 150 can be vaporized according to the vapor pressure thereof, and recovered in a metallic state by the recovery chamber 115.

Incidentally, the component resins sometimes emit gases produced by decomposition and the like depending on the extent of thermal decomposition of the component resins of the object to be treated 150 in the first hermetic chamber. It is recommended that such gases produced by decomposition be treated by connecting a stage subsequent to the recovery chamber 115 to the exhaust gas treatment system 111, the multi-exhaust gas chamber not illustrated, or the like.

As described above, a predetermined metal can be vaporized and recovered from the object to be treated in the second hermetic chamber 103.

If the object to be treated 150 is taken out from the second hermetic chamber 103 to the outside of the apparatus 100 directly, there is a possibility that the object to be treated 150 is oxidized rapidly. Moreover, the pressure in the second hermetic chamber 103 needs to be returned to an atmospheric pressure and thus it is inconvenient also in terms of the maintenance of hermetic sealing capability in the second hermetic chamber 103. Therefore, in the treatment apparatus 100 illustrate in FIG. 1 includes the cooling chamber 104 at a stage subsequent to the second hermetic chamber 103.

This cooling chamber includes the same pressure regulating means and oxygen concentration regulating means as the purge chamber 101, the first hermetic chamber 102, and the second hermetic chamber 103, that is, includes the same exhaust system 116 and carrier gas introduction valve 117 as described above.

The object to be treated 150 from which the predetermined metal is separated in the second hermetic chamber 103 is transferred to the cooling chamber 104, and cooled in a pressure- and oxygen concentration-regulated state. The carrier gas not only regulates the oxygen concentration but also functions as a cooling gas for the object to be treated 150.

A trap 118 for trapping gases emitted from the object to be treated by pre-heating may be placed between the cooling chamber 104 and the exhaust system 116.

After being fully cooled in the cooling chamber 104, the object to be treated 150 is taken out of the apparatus.

Such a treatment apparatus of the present invention functions efficiently even when the object to be treated capable of producing organic halides such as dioxins or the object to be treated containing organic halides (for example, soil, burned fly ashes) is treated. This is because the partial pressure of organic halides or components capable of producing organic halides in an atmospheric gas coexisting with the object to be treated is suppressed to the lowest since the object to be treated is heat-treated under reduced pressure. The concentration of dioxins contained in a residue let out finally can be lowered by cooling a heated residue of the object to be treated in the aforesaid gas which is substantially organic halide-free and not capable of producing organic halides. Incidentally, it is recommended that the object to be treated 150 be brought into the treatment apparatus 100, taken out therefrom, and moved between the respective chambers by the pusher 130 and a drawer 131.

The operation of the pusher 130 and the drawer 131 together with the opening and closing of the partitions 105 may be performed by the aforesaid control means not illustrated.

FIG. 2 is a diagram schematically showing the treatment apparatus of the present invention illustrated in FIG. 1. Signals from a pressure sensor 202a in the purge chamber 101, a temperature sensor 201b, a pressure sensor 202b, and an oxygen concentration sensor 203 in the first hermetic chamber 102, a temperature sensor 201c and a pressure sensor 202c in the second hermetic chamber 103, and a pressure sensor 202d in the cooling chamber 104, all of which are not illustrated in FIG. 1, are transmitted to a control panel 200 composing a control means. The control means may be structured by incorporating a program into an electronic computer. It is suitable that the control means controls the heating means, the pressure regulating means, and the oxygen concentration regulating means according to the state of each of the chambers in the apparatus. Moreover, the opening and closing of the partitions 105 and the transfer of the object to be treated 150 by the pusher 130 and the drawer 131 may be performed by this control means. The numeral 210 denotes a monitor for showing the state of the temperature, pressure, oxygen concentration, and the like in each chamber, the opening and closing state of the partitions 105, and the like to the operator. The numeral 211 denotes a multi-exhaust gas treatment device.

Example 2

Figure 3:
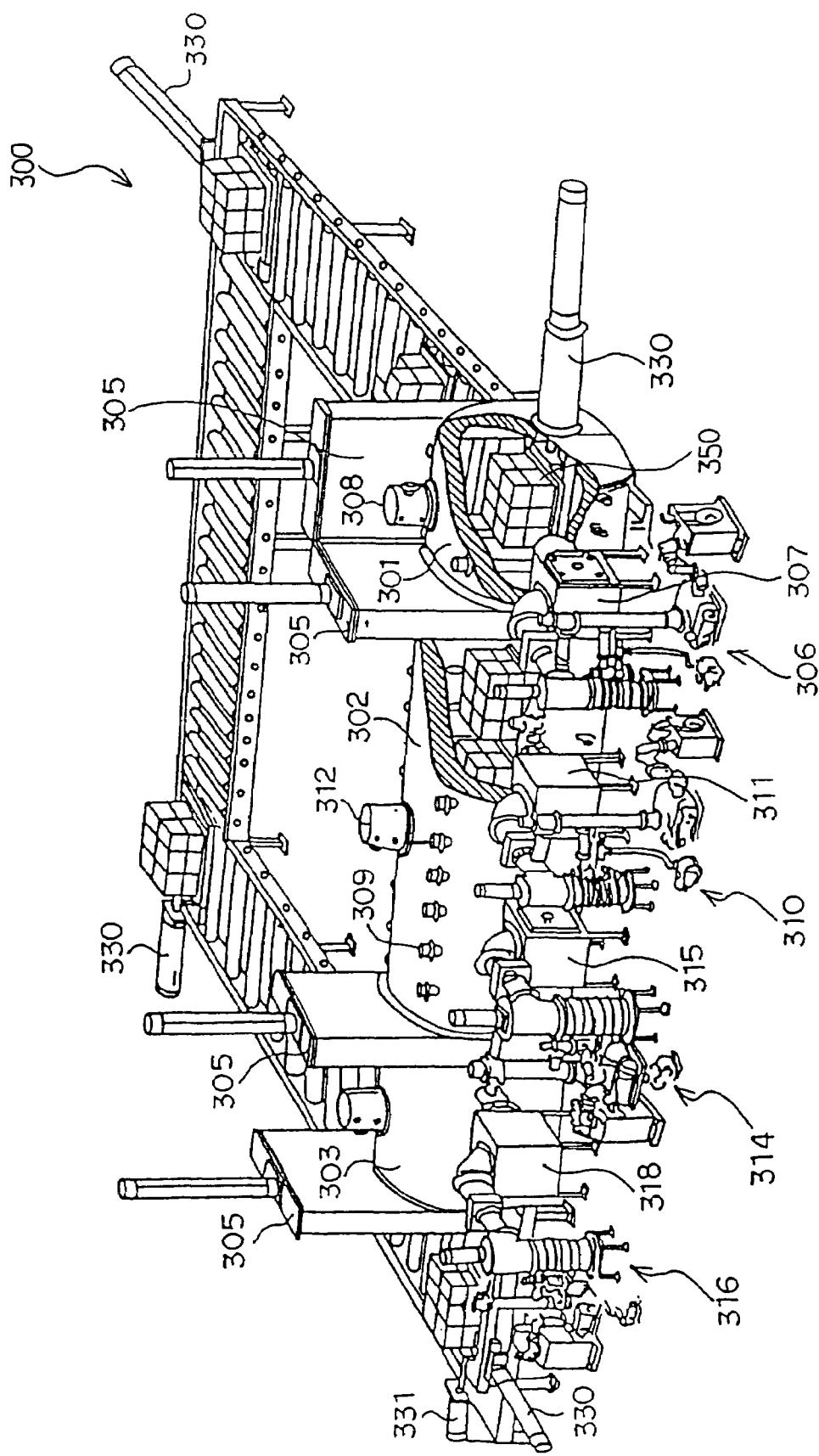
FIG. 3 is a diagram roughly showing another example of the treatment apparatus of the present invention.

FIG. 3 is a diagram roughly showing another example of the treatment apparatus of the present invention, and showing the interior thereof by sectioning a portion thereof. This treatment apparatus 300 also can treat an object to be treated 350 having resins and metals as its components.

This treatment apparatus 300 is composed of a purge chamber 301, a hermetic chamber 302, and a cooling chamber 303. The hermetic chamber 302 has both the functions of the first hermetic chamber 102 and the second hermetic chamber 103 in the treatment apparatus 100 illustrated in FIG. 1. Specifically, component resins of the object to be treated 350 are thermally decomposed selectively in the hermetic chamber 302, and then a metal is separated and recovered in the same hermetic chamber 302. Specially when a predetermined metal is isolated by the selective thermal decomposition of resins, it is unnecessary to vaporize component metals of the object to be treated 350.

The hermetic chamber 302 includes a temperature regulating means, a pressure regulating means, and an oxygen concentration regulating means, but the oxygen concentration may be also regulated by the total pressure in the hermetic chamber 302 as described above.

It is recommended that the temperature in the hermetic chamber 302 be regulated by an electric heater 309 and a temperature sensor not illustrated.

It is recommended that the pressure in the hermetic chamber 302 be regulated by exhaust systems 310 and 314, a carrier gas introduction system, and a pressure sensor not illustrated. The numeral 312 denotes a carrier gas introduction valve.

An exhaust gas treatment system 311 for treating a gaseous emission containing gases produced by decomposition of the component resins of the object to be treated 350 is placed between the hermetic chamber 302 and the exhaust system 310.

A recovery chamber 315 for condensing gas from the component metal vaporized from the object to be treated 350 is placed between the hermetic chamber 302 and the exhaust system 314. The structure of the recovery chamber 315 is similar to that described above. When the component metals of the object to be treated do not need to be vaporized, a plurality of exhaust gas treatment systems 311 may be provided.

The purge chamber 301, the cooling chamber 303, partitions 305, exhaust system 306, trap 307, carrier gas introduction valve 308, exhaust system 316, trap 318, the carrier gas introduction system, a pusher 330, and a drawer 331 are similar to those in the treatment apparatus 100 illustrated in FIG. 1. A control means also can be provided in the same manner.

As described above, the treatment apparatus of the present invention is most basically composed of a portion for thermally decomposing the component resins of the object to be treated selectively so that the component metals are oxidized as little as possible. The category of an object capable of being treated is greatly widened by combining the structure in which the component metal is vaporized and separated from the object to be treated, and recovered, with this portion.

As for the treatment of resin-coated aluminum foil, aluminum can be recovered in a metallic state by thermally decomposing resinous portions selectively under a controlled atmosphere.

As for the treatment of a mounting substrate in which electronic parts are mounted on a board or the like, it is suitable to vaporize and recover a solder alloy and thereby separate the board and the electronic parts.

Example 3

Figure 4:
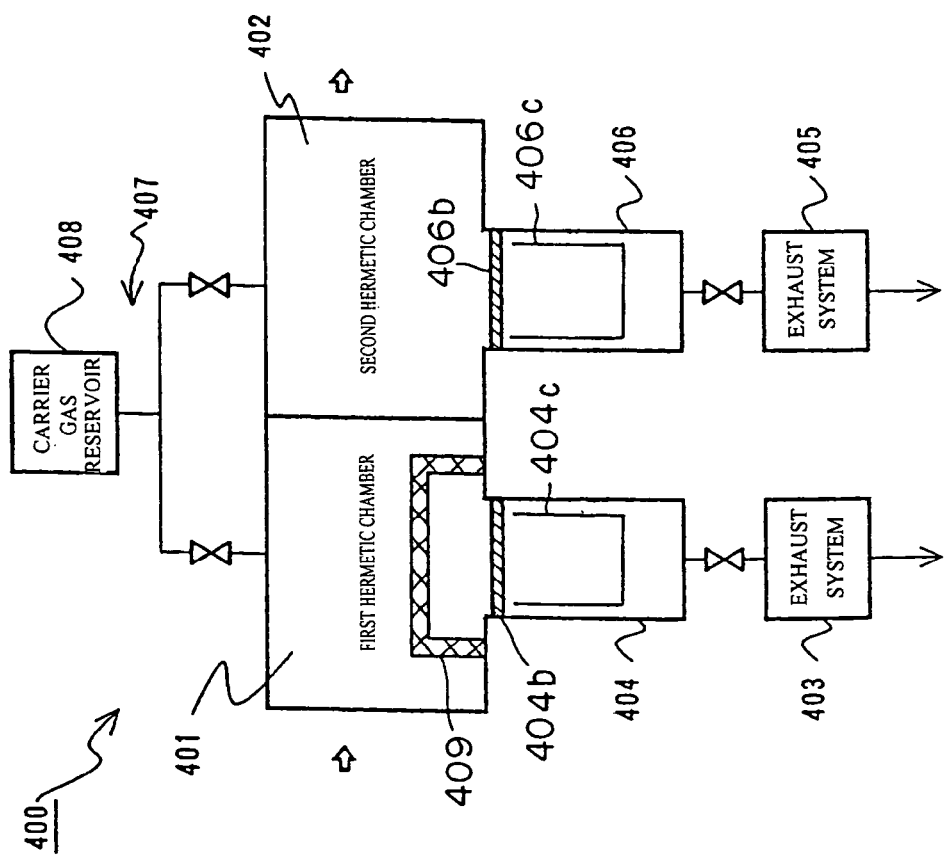
FIG. 4 is a diagram schematically showing another example of the treatment apparatus of the present invention.

FIG. 4 is a diagram schematically showing another example of the treatment apparatus of the present invention.

This treatment apparatus 400 includes a first hermetic chamber 401 and a second hermetic chamber 402. The first hermetic chamber 401 includes a temperature regulating means not illustrated and is connected to an exhaust system 403 and an exhaust gas treatment system 404. The second hermetic chamber includes a temperature regulating means not illustrated and is connected to an exhaust system 405 and a recovery chamber 406. A carrier gas introduction system 407 is connected to the first hermetic chamber 401 and the second hermetic chamber 402, and thus the regulation of the oxygen concentration and pressurization in each of the hermetic chambers can be performed. The numeral 408 denotes a carrier gas reservoir. The first hermetic chamber 401 and the exhaust gas treatment system 404 are partitioned off by a hermetic door 404b. When the hermetic door 404b is open, a retort 404c is inserted into an opening of the first hermetic chamber 401, whereby the retort 404c shields the hermetic door 404b from the first hermetic chamber 401 and the exhaust gas treatment system 404 and substantially allows the first hermetic chamber 401 and the exhaust gas treatment system 404 to hermetically communicate with each other. Similarly, the second hermetic chamber 402 and the recovery chamber 406 are partitioned off by a hermetic door 406b. When the hermetic door 406b is open, a retort 406c is inserted into an opening of the second hermetic chamber 402, whereby the retort 406c shields the hermetic door 406b from the second hermetic chamber 402 and the recovery chamber 406 and allows the first hermetic chamber 401 and the exhaust gas treatment system 404 to hermetically communicate with each other.

In this example, component resins of the object to be treated having resins and metals are thermally decomposed selectively in the first hermetic chamber 401, and gases produced by the decomposition are subjected to treatment for making the gases innoxious in the exhaust gas treatment system 404. On this occasion, it is recommended that the resins be thermally decomposed selectively while the state of component metals of the object to be treated is maintained by regulating the temperature, pressure, and oxygen concentration in the first hermetic chamber 401. Also, it is possible to equalize the structure of the exhaust treatment system 404 with that of the recovery chamber 406 and to condense vaporized substances from the object to be treated.

A reforming unit 409 for reforming a gaseous emission is placed on the exhaust gas treatment system 404 side in the first hermetic chamber 401. In this example, the reforming unit 409 includes a heating means such as a radiant tube and heats the gaseous emission to about 700° C. to about 1200° C. to perform cracking under reduced pressure. For example, gases produced by the thermal decomposition of organic substances such as resins composing the object to be treated are reformed when passing through the reforming unit 409. As a result, the treatment of gases at the subsequent stage is facilitated. Moreover, the performance of reforming under reduced pressure can suppress the reproduction of organic halides such as dioxins from the gaseous emission. Incidentally, in the reforming unit 409, not only cracking of the gaseous emission by heating but also reforming by glow discharge or plasma discharge or reforming by a catalyst may be performed.

When the gaseous emission is reformed by such a reforming unit 409, it is desirable to first exhaust the contents of the system by the exhaust system to make the reforming unit 409 reach a reforming temperature (in the case of reforming by heating), thereafter to regulate the temperature in the first hermetic chamber 401, and then to heat the object to be treated. Even when the reforming unit 409 performs reforming by glow discharge or plasma discharge or reforming by a catalyst, it is suitable to heat the object to be treated after the reforming unit reaches a state capable of performing reforming. By this structure, even the gaseous emission in the process of a rise in the temperature of the object to be treated can be reformed certainly. For example, when soil and burned fly ashes contaminated by organic halides such as dioxins are treated, dioxins (a solid, a liquid, a gas) are extracted or composed in the process of temperature rise from normal temperature to about 500° C. According to the treatment apparatus of the present invention, such a gaseous emission produced in the process of temperature rise also can be reformed certainly.

In the second hermetic chamber 402, the temperature and pressure therein are regulated, and a component metal of the object to be treated is vaporized and then condensed in the recovery chamber 406. It is recommended that the temperature and pressure in the second hermetic chamber 402 be regulated by the same control means as that of the first hermetic chamber 401. A purge chamber may be placed at a stage prior to the first hermetic chamber 401 or a stage subsequent to the second hermetic chamber 402 as described above. Furthermore, the same reforming unit as that of the first hermetic chamber may be provided in the second hermetic chamber.

Example 4

Figure 5:
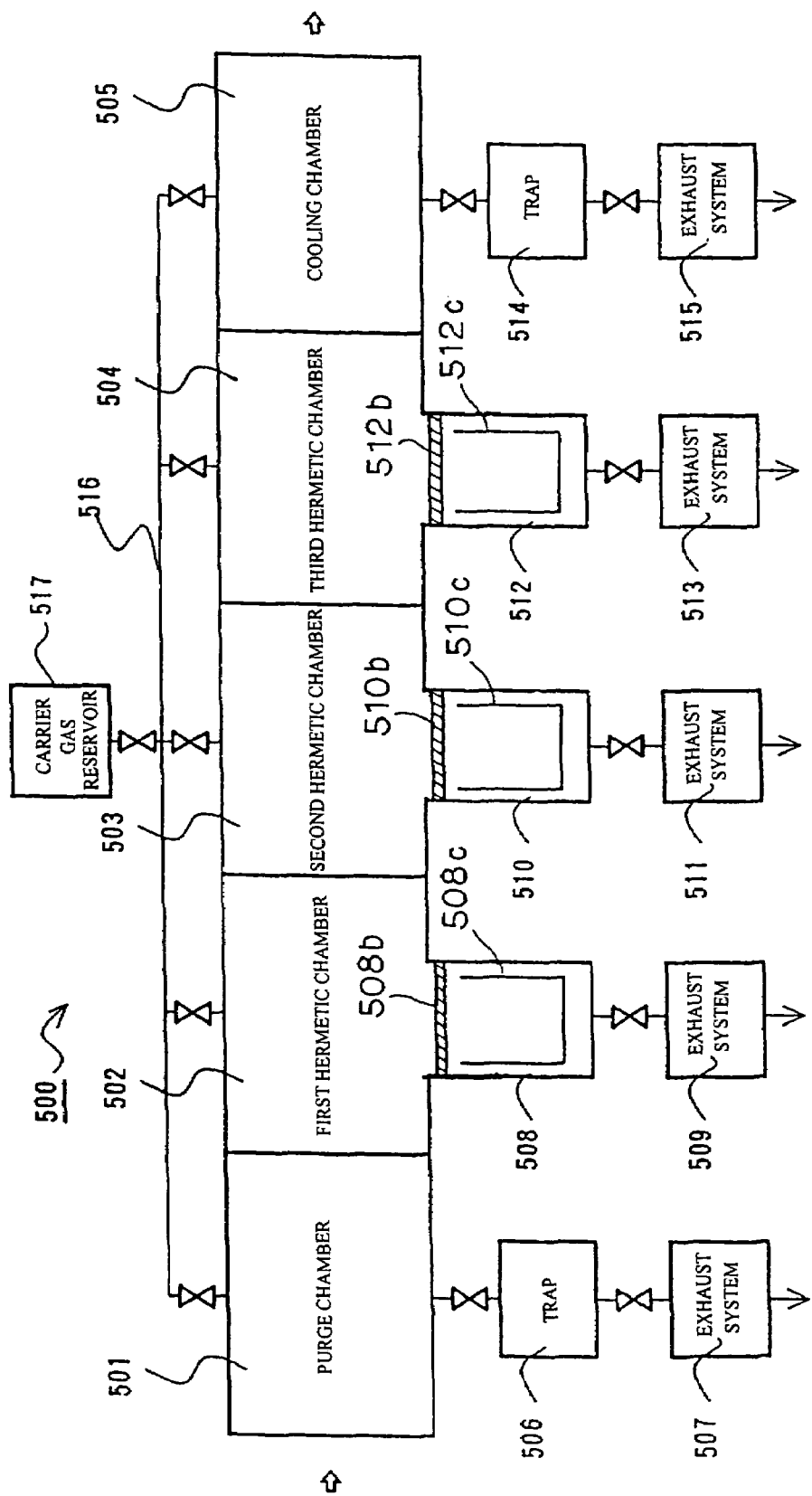
FIG. 5 is a diagram schematically showing another example of the treatment apparatus of the present invention.

FIG. 5 is a diagram schematically showing another example of the treatment apparatus of the present invention.

This treatment apparatus 500 is an apparatus capable of treating an object to be treated having resins and metals as its components, and includes a purge chamber 501, a first hermetic chamber 502, a second hermetic chamber 503, a third hermetic chamber 504, and a cooling chamber 505.

The purge chamber 501 is connected to a trap 506 and an exhaust system 507. The first hermetic chamber 502 is connected to an exhaust gas treatment system 508 and an exhaust system 509 via a hermetic door 508b. The second hermetic chamber 503 is connected to a recovery chamber 510 and an exhaust system 511 via a hermetic door 510b. The third hermetic chamber 504 is connected to a recovery chamber 512 and an exhaust system 513 via a hermetic door 512b. The cooling chamber 505 is connected to a trap 514 and an exhaust system 515. The first hermetic chamber 502, the second hermetic chamber 503, and the third hermetic chamber 504 include temperature regulating means not illustrated respectively. The numeral 516 denotes a carrier gas introduction system, and the numeral 517 denotes a carrier gas reservoir. The exhaust gas treatment system 508 includes a retort 508c, the recover chamber 510 includes a retort 510c, and the recover chamber 512 includes a retort 512c.

The first hermetic chamber 502 includes an oxygen concentration sensor not illustrated, and can regulate the oxygen concentration in the system independent of total pressure.

Namely, the treatment apparatus 500 includes a plurality of treatment chambers each for vaporizing a component metal of the object to be treated. Even when the object to be treated has a plurality of component metals, the plurality of metals can be vaporized selectively in the second hermetic chamber 503 and the third hermetic chamber 504, and recovered.

Example 5

Figure 6:
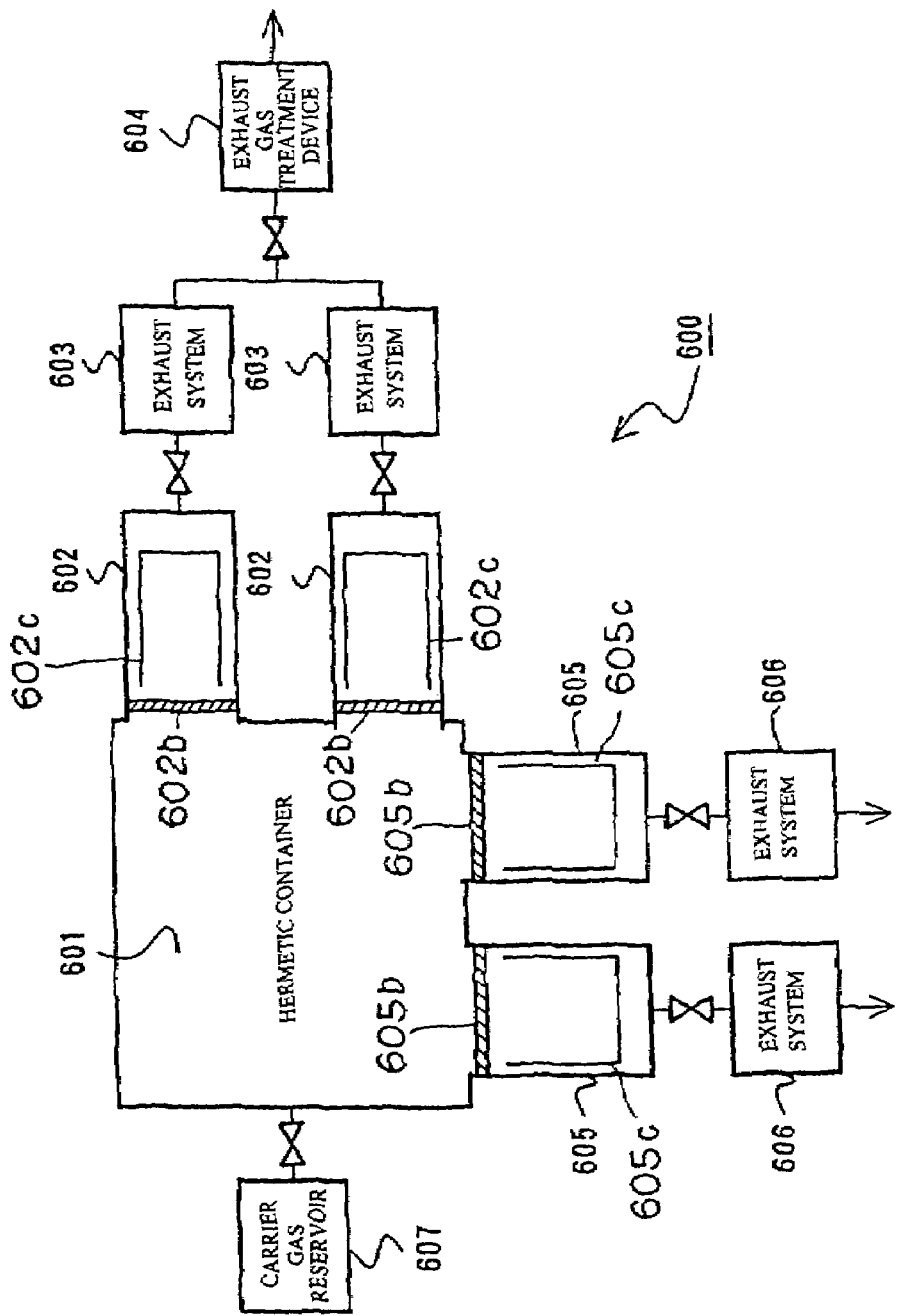
FIG. 6 is a diagram schematically showing another example of the treatment apparatus of the present invention.

FIG. 6 is a diagram schematically showing another example of the treatment apparatus of the present invention.

This treatment apparatus 600 is an apparatus capable of treating an object to be treated having resins and metals as its components. In this treatment apparatus 600, a plurality of recovery systems are connected to one hermetic container 601, and treatment is performed by switching the recovery systems according to the temperature, pressure, and oxygen concentration in the hermetic container 601. Also in this example, the hermetic container 601 and exhaust gas treatment systems 602 are partitioned off by hermetic doors 602b in the same manner as above. Moreover, the hermetic container 601 and the recovery chamber 605 are partitioned by hermetic doors 605b. The exhaust gas treatment systems 602 each include a retort 602c, and the recovery chambers 605 each include a retort 605c.

Example 6

Figure 7:
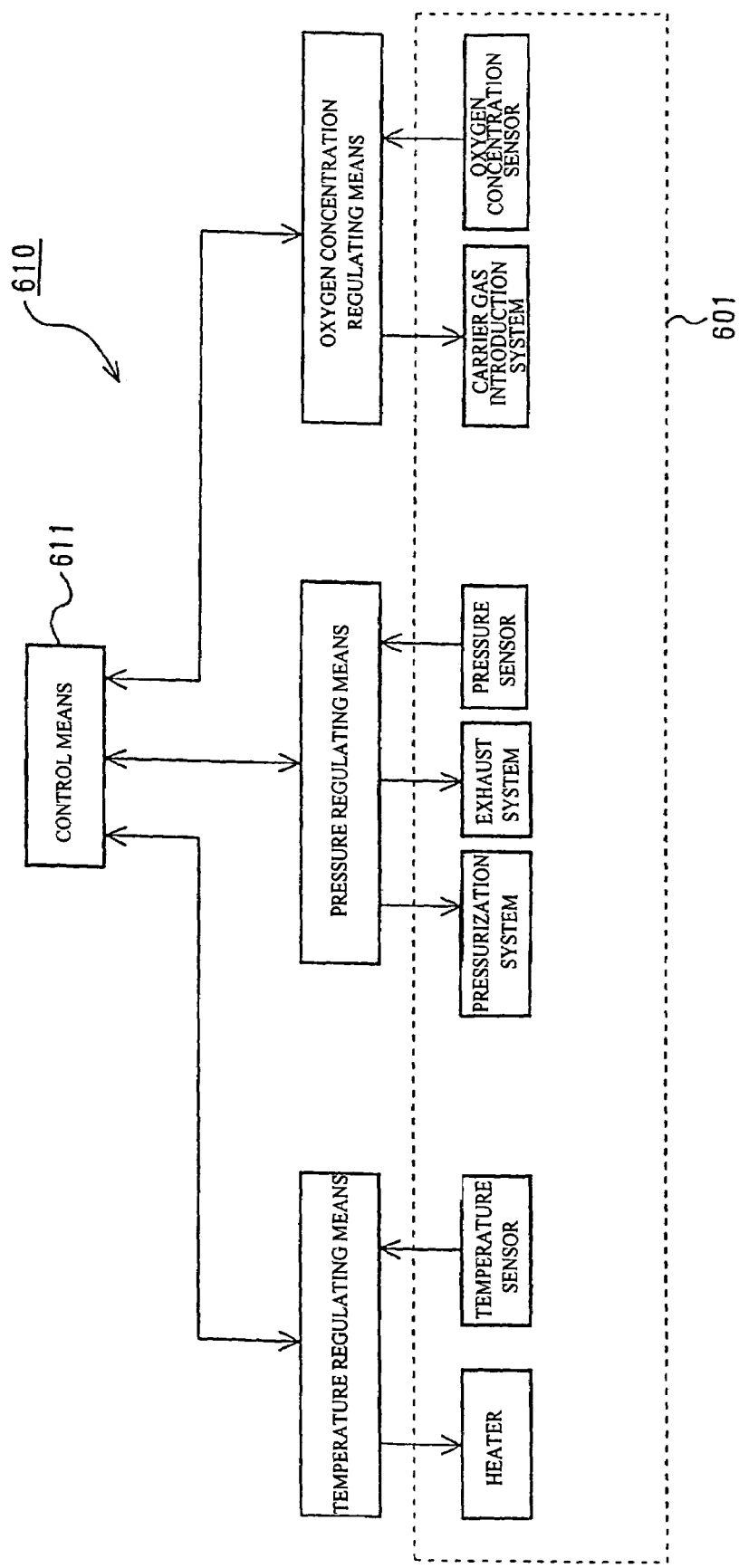
FIG. 7 is a diagram schematically showing the structure of a control system for regulating the temperature, pressure, oxygen concentration of the treatment apparatus of the present invention.

FIG. 7 is a diagram schematically showing the structure of a control system 610 for regulating the temperature, pressure, oxygen concentration in the hermetic container 601. It is suitable to control the apparatus by incorporating all or a part of a control means 611 into an electronic computer, for example, as a control program as described above.

A plurality of lines of exhaust gas treatment systems 602 for recovering gases produced by the decomposition of the component resins of the object to be treated are connected to the hermetic container 601, and each of the exhaust gas treatment systems 602 is connected to an exhaust system 603. Since gases produced by the decomposition of a resin are generally emitted in large quantities, the aforesaid provision of the plurality of exhaust gas treatment systems facilitates the control of the state of the interior of the hermetic container and lightens the burden imposed on the exhaust systems.

At a stage subsequent to the exhaust systems 603, an exhaust gas treatment device 604 for making noxious substances and the like contained in exhaust gas innoxious, odorless, and smokeless. For example, dioxins, SOx, NOx, and the like which have passed through the exhaust systems 603 are treated to have values not more than the emission standard values by this exhaust gas treatment device 604, and let out. This exhaust gas treatment device 604 may include a wet filter such as an oil film filter or a bag filter, an activated carbon filter, or the like.

A plurality of lines of recovery chambers 605 for recovering component metals of the object to be treated vaporized in the hermetic container 601 are connected to the hermetic container 601, and the respective recovery chambers are connected to exhaust systems 606.

The plurality of lines of recovery chambers 605 connected to the hermetic container 601 may recover the same metal, or may recover a plurality of metals with different vapor pressures (boiling points) by performing switching according to temperature and pressure conditions in the hermetic container 601.

A carrier gas introduction system is connected to the hermetic container 601. The numeral 607 denotes a carrier gas reservoir. The oxygen concentration in the hermetic container 601 can be regulated independent of total pressure by the introduction of a carrier gas such as $N_2$ or Ar. Furthermore, pressurization inside the hermetic container 601 may be performed by the introduction of a previously pressurized carrier gas. The decomposition efficiency of the component resins increases by pressurizing the object to be treated in a non-oxidizing atmosphere.

Moreover, the oxygen concentration in the hermetic container 601 may be regulated by total pressure.

Example 7

Figure 8:
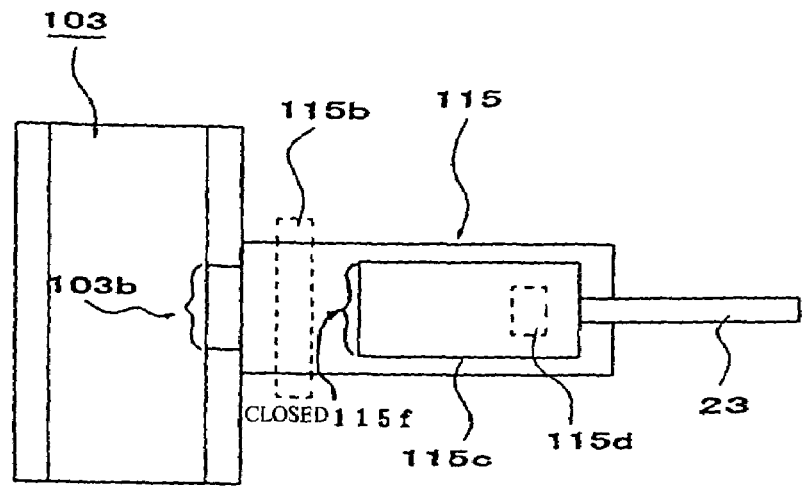
FIG. 8 and FIG. 9 are diagrams schematically showing a recovery system including a recovery chamber connected to the treatment apparatus of the present invention.
Figure 9:
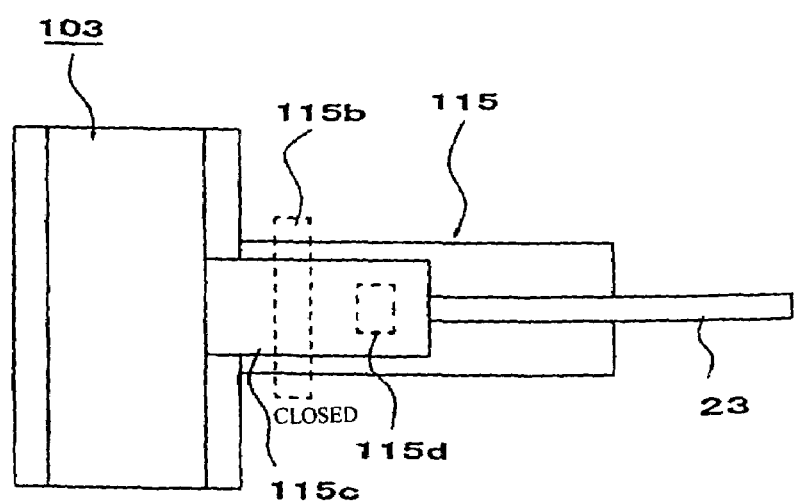

FIG. 8 and FIG. 9 are diagrams schematically showing an example of the structure of the recovery chamber of the treatment apparatus of the present invention illustrated in FIG. 1 and FIG. 2. FIG. 8 shows a state in which the retort 115c retreats into the recovery chamber 115 and the hermetic door 115b is closed. FIG. 9 shows a state in which the retort 115c moves forward and is inserted into an opening 103b of the second hermetic chamber 103 and the hermetic door 115b is open. The explanation centers here upon the recovery chamber, and the illustration of portions other than this chamber is omitted.

The recovery chamber 115 is placed adjacent to the second hermetic chamber 103 but partitioned therefrom by the openable and closeable hermetic door 115b. The recovery chamber 115 includes a temperature regulating means not illustrated. A carrier gas introduction system and a cooling gas introduction system may be connected to the recovery chamber 115. The recovery chamber 115 is provided between the second hermetic chamber 103 and the exhaust system 114. The hermetic door 115b is placed between the second hermetic chamber 103 and the recovery chamber 115 so as to partition off the second hermetic chamber 103 and the recovery chamber 115. The retort 115c is housed in the recovery chamber 115. The retort 115c is an exchangeable tubular cassette for recovering vaporized substances from the object to be treated, and in this example, it has a hollow cylindrical shape having a second opening 115f in a face fronting the second hermetic chamber 103 and a third opening 115d in a side face on the exhaust system 114 side. Gas flowing from the second hermetic chamber 103 to the exhaust system 114 gets into the retort 115c from the second opening 115f of the retort, and is led to the exhaust system 114 side through the opening 115d in the side face of the retort. A metallic net or the like may be provided inside the retort 115c so that the vaporized substances from the object to be treated can be easily condensed. In any case, it is recommended that the shape of the retort 115c be designed to fit the opening 103b of the second recovery chamber 103 as required. It is also recommended that the inner structure of the recovery retort be designed as required. The recovery chamber 115c has water cooling jacket structure and can maintain the interior of the chamber at a temperature lower than the temperature enabling the condensation of the vaporized substances.

This retort 115c can be taken out by opening the recovery chamber 115 while being separated from the second hermetic chamber 103 and the exhaust system 114, and set again in the recovery chamber 115.

The recovery chamber 115 includes a mechanism for moving the retort 115c forward and backward. In this example, the retort 115c is moved forward and backward in the recovery chamber 115 by the extension and contraction movement of a cylinder 115d. The recovery retort 115c is inserted into the opening 103b of the second hermetic chamber 103 at a forward movement position. A plurality of cylinders may be provided for forward movement operation and backward movement operation. In this example, the cylinder 23 is covered with a bellows-shaped cover in order to prevent the adhesion of vaporized substances to the cylinder 23. A mechanism for guiding the forward and backward movement of the retort 115c is provided in the recovery chamber 115. As such a guide mechanism, a guide rail, a guide roller, or the like may be used as required. This guide mechanism helps thermal conduction between the recovery chamber 115 and the retort 15c. Thus, the guide mechanism may be composed of metal with good thermal conductivity.

The operation of the treatment apparatus of the present invention having the aforesaid recovery system will be explained now. First, the hermetic door 115b is opened, and then the retort 115c is moved forward and inserted into the opening 103b of the second hermetic chamber 103 (See FIG. 9). The hermetic door 115b is partitioned off from the second hermetic chamber 103 and the recovery chamber 115 by the recovery retort 115c. The adoption of the aforesaid structure makes it possible to prevent the adhesion of vaporized substances from the object to be treated to the hermetic door 115b. Furthermore, the hermetic door 115b is shielded from radiation heat of the second hermetic chamber 103. Thus, a seal portion of the hermetic door 115b is protected, leading to improvement in the hermetic sealing capability of the system.

After the retort 115c is inserted into the opening 103b of the second hermetic chamber 103, the temperature and pressure in the second hermetic chamber 103 are regulated to exceed a boiling point of a desired metal in the object to be treated to thereby vaporize the metal. Vaporized substances from the object to be treated are cooled while going toward the exhaust system 114 through the retort 115c, and condensed in the retort 115c. A filter for trapping the vaporized substances which have not been condensed in the retort 115c may be placed between the recovery chamber 115 and the exhaust system 114, which can prevent the vaporized substances from the object to be treated from reaching a vacuum pump. On this occasion, the hermetic door 115b is shielded from a hot gas stream containing the vaporized substances from the object to be treated by the retort 115c. As a result, the condensation of the vaporized metal from the object to be treated at the seal portion of the hermetic door 115b can be prevented. Also when resin is used for the seal portion of the hermetic door 115b, the seal portion can be protected.

When vaporization treatment of a desired component from the object to be treated is completed, the retort 115c is moved backward into the recovery chamber 115, and the hermetic door 115b is closed (See FIG. 8).

The recovery chamber 115 is separated also from the exhaust system 114 by closing a valve between the recovery chamber 115 and the exhaust system 114. In this state, a hermetic door (the illustration of which is omitted) provided in the recovery chamber 115 is opened, and the retort 115c is taken out. Condensates in the retort 115c are in a metallic state or in an unstable state with a large specific surface area, and hence it is desirable to cool the condensates by introducing gas such as nitrogen, carbon dioxide, or an inert gas before opening the recovery chamber 115. Thereafter, another retort is set in the recovery chamber 115, and the same operation is repeated. The provision of such a recovery chamber 115 enables conditions such as temperature, pressure, oxygen concentration, and the like in the second hermetic chamber 103 and the recovery chamber 115 to be controlled independent of each other. Consequently, the operational efficiency of the apparatus is raised. Such a recovery chamber can naturally be applied to the respective recovery chambers of the treatment apparatus of the present invention shown in FIG. 3, FIG. 4, FIG. 5, and FIG. 6. The same structure can be adopted for a connection portion of the exhaust gas treatment system and the hermetic chamber. By adopting the aforesaid structure, in the treatment apparatus of the present invention, the vaporized substances from the object to be treated and thermal decomposition products such as a gaseous emission can be recovered while a heating furnace is continuously operated without being stopped when the pressure in the heating furnace is decreased or increased. Thereby, the productivity of treatment is raised, resulting in a reduction in treatment costs.

Example 8

Figure 10:
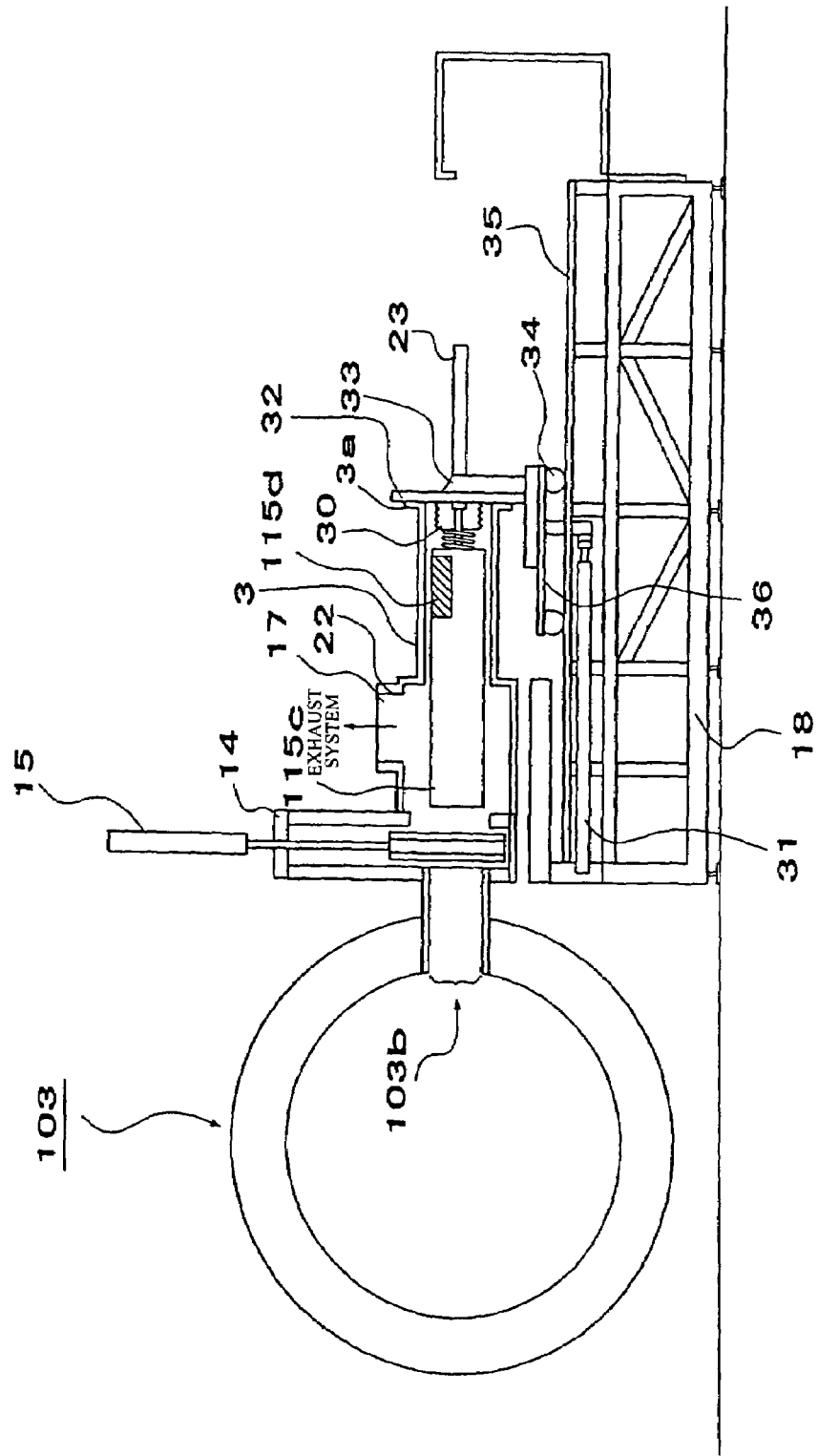
FIG. 10, FIG. 11, and FIG. 12 are diagrams roughly showing an example of the structure of the recovery chamber.
Figure 11:
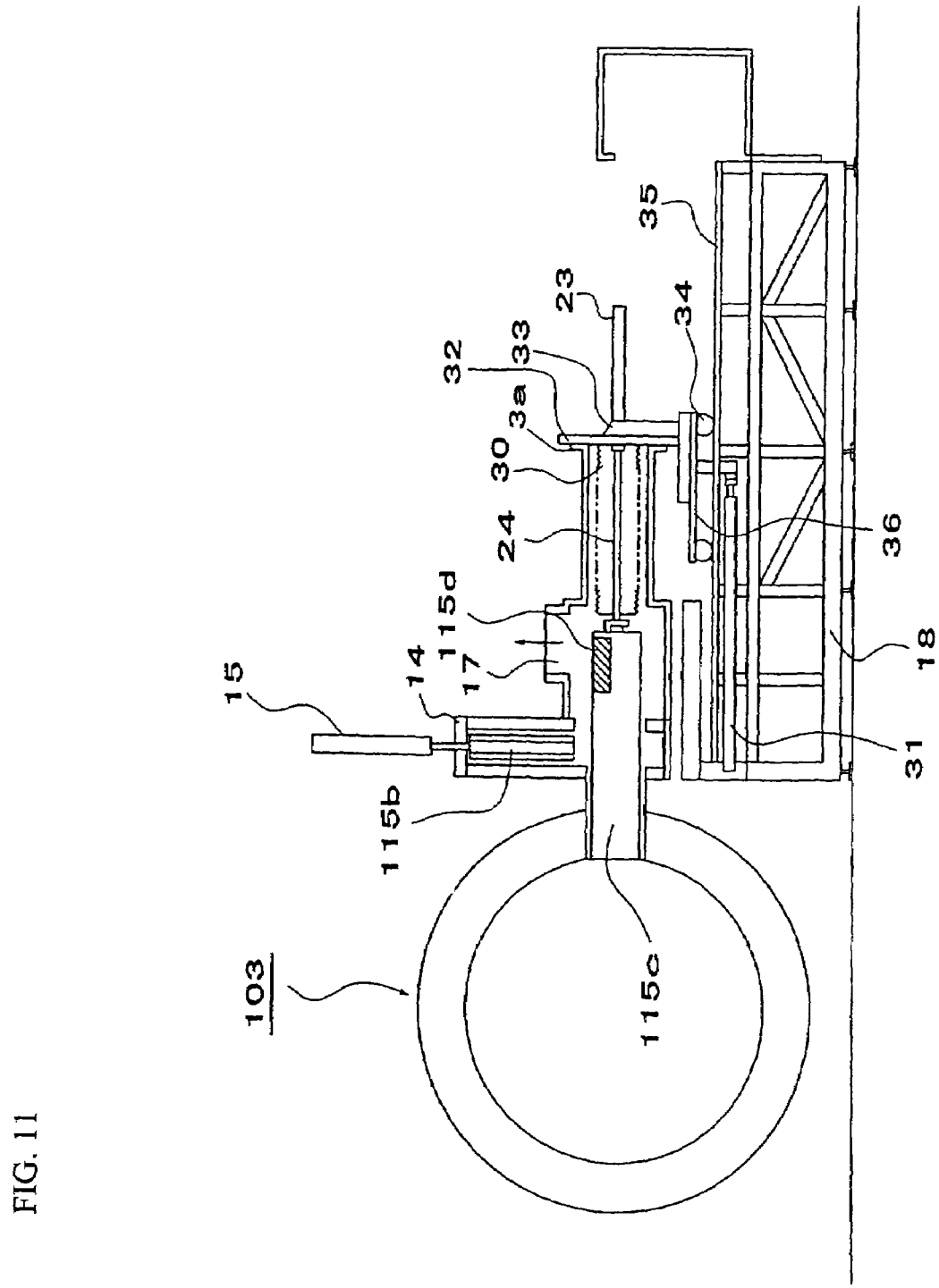
Figure 12:
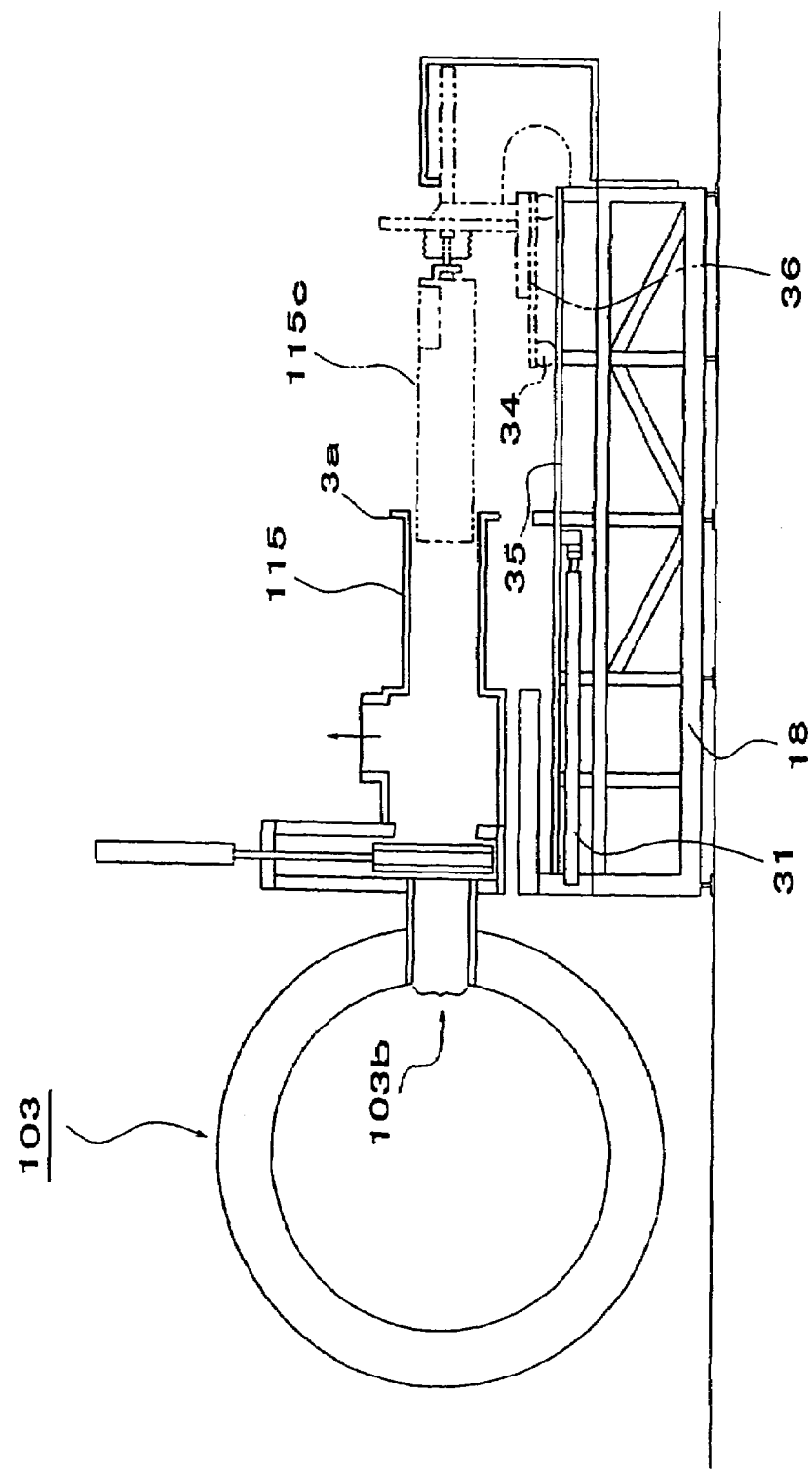

FIG. 10, FIG. 11, and FIG. 12 are diagrams roughly showing an example of the structure of the treatment apparatus of the present invention. FIG. 10 shows a state in which the retort is set in the recovery chamber, FIG. 11 shows a state in which the retort is inserted into the hermetic chamber, and FIG. 12 shows a state in which the recovery chamber is opened for exchange of retorts. Incidentally, explanation will be given here with the treatment apparatus of the present invention shown in FIG. 1 and FIG. 2 as the example thereof, but the structure of this recovery system can be applied to other treatment apparatus of the present invention similarly.

As described above, the second hermetic chamber 103 is partitioned off from the recovery chamber 115 by the openable and closeable hermetic door 115b. The recovery chamber 115 is connected to the exhaust system 114 through an opening 17. The numeral 14 denotes a housing chamber in which the hermetic door 115b is housed when being opened, and the numeral 15 is a cylinder for opening and closing the hermetic door 115b. The retort 115c is housed in the recovery chamber 115. The retort 115c is an exchangeable tubular cassette for recovering the vaporized substances from the object to be treated, and in this example, it has a hollow cylindrical shape having the opening in a face fronting the second hermetic chamber 103 and the opening (115d) in a side face on the exhaust system 114 side. The recovery chamber 115 includes a mechanism for moving the retort 115c forward and backward. In this example, the retort 115c moves forward and backward in the recovery chamber 115 by the extension and contraction motion of cylinders 23 and 31. The recovery retort 115c is inserted closely into the opening 103b of the second hermetic chamber 103 at a forward movement position. A plurality of cylinders may be provided for forward movement operation and backward movement operation. In this example, the cylinder 23 is covered with a bellows-shaped cover 30 in order to prevent the adhesion of vaporized substances to the cylinder 23. A mechanism for guiding the forward and backward movement of the retort 115c is provided in the recovery chamber 115. As such a guide mechanism, a guide rail, a guide roller, or the like may be used as required.

FIG. 11 shows a state in which the hermetic door 115b is opened, and then the retort 115c is moved forward and inserted into the opening 103b of the second hermetic chamber 103. The hermetic door 115b is blocked off from the second hermetic chamber 103 and the recovery chamber 115 by the recovery retort 115c. The adoption of the aforesaid structure makes it possible to prevent the adhesion of the vaporized substances from the object to be treated to the hermetic door 115b. Furthermore, the hermetic door 115b is shielded from radiation heat of the second hermetic chamber 103. Thus, the seal portion of the hermetic door 115b is protected, leading to improvement in the hermetic sealing capability of the system. In this state, the temperature and pressure in the second hermetic chamber 103 are regulated to exceed a boiling point of a desired metal in the object to be treated to thereby vaporize the metal. Vaporized substances from the object to be treated are cooled while going toward the exhaust system 114 through the retort 115c and condensed in the retort 115c. On this occasion, the hermetic door 115b is shielded from a hot gas stream containing the vaporized substances from the object to be treated by the retort 115c. As a result, the condensation of the vaporized metal from the object to be treated at the seal portion of the hermetic door 115b can be prevented. Also when resin is used for the seal portion of the hermetic door 115b, the seal portion can be protected.

When vaporization treatment of a desired component from the object to be treated is completed, the retort 115c is moved backward into the recovery chamber 115, and the hermetic door 115b is closed (See FIG. 10).

The recovery chamber 115 is separated also from the exhaust system 114 by closing the valve between the recovery chamber 15 and the exhaust system 114. In this state, a hermetic door 33 provided in the recovery chamber 115 is opened, and the retort 115c is taken out (FIG. 12). Since the hermetic door 115b is shielded from the second hermetic chamber 103 during the recovery of the vaporized substances from the object to be treated, the adhesion of condensates to the hermetic door 115b is prevented. Moreover, damage caused to the seal portion of the hermetic door 115b by heat is also prevented. Consequently, even if the recovery chamber 115 is opened, the leakage of outside air into the second hermetic chamber 103 can be prevented. Thereafter, another retort is set in the recovery chamber 115, and the same operation is repeated. By adopting the aforesaid structure, in the present invention, the vaporized substances from the object to be treated and thermal decomposition products such as a gaseous emission can be recovered while a heating furnace is continuously operated without being stopped even when the pressure in the heating furnace is decreased or increased. Thereby, the productivity of treatment is raised, resulting in a reduction in treatment costs.

As described above, with respect to the object to be treated having resins and metals as components, the treatment apparatus of the present invention can separate them from the object to be treated and recover them by thermally decomposing (vaporizing, liquefying, or carbonizing) the component resins selectively and by vaporizing the component metals.

Example 9

Next, a treatment system for removing lead from an object having lead as its component will be explained.

This treatment system is intended for the treatment of an object in which lead and resins are used for at least a part of components. For example, it can remove lead from electronic equipment, automotive electronic parts, and the like in which an alloy containing lead such as a PB—Sn series solder alloy is used.

This treatment system first thermally decomposes resinous portions selectively by vaporization, liquefaction, carbonization, or the like, and then separates lead from the object to be treated by vaporizing the lead. It is recommended that the vaporized lead be recovered. The treatment apparatus of the present invention described above may be used as its apparatus.

First, the component resins are thermally decomposed selectively so that lead contained in the object to be treated is not substantially oxidized.

The resins melt from about 323K, and emits mainly hydrocarbon gases of C1 to C8 by thermal decomposition if being maintained at about 453K to about 873K. It is recommended that the aforesaid gases produced by the decomposition of resins be recovered by the exhaust gas treatment system or the like.

It is desirable to perform this selective thermal decomposition process of resins in a state in which the oxygen concentration is regulated. The regulation of oxygen concentration improves the recovery efficiency of gases produced by the decomposition of resins, and can prevent the oxidation of lead. Since lead oxide vaporizes at a temperature lower than lead, lead can be prevented from flying about, and lead can be recovered more positively at the following process.

The temperature and pressure are regulated, and then lead is vaporized from the object to be treated. When the object to be treated contains metals such as iron, copper, aluminum, and tin other than lead, it is recommended that the metals be vaporized selectively from a difference in vapor pressure.

The temperature at which lead vaporizes changes depending on the pressure in the hermetic container. When being is heated, for example, to 1673K under atmospheric pressure, the vapor pressure of lead is 84 mmHg, whereas the vapor pressures of iron, copper, and tin do not reach even 1 mmHg. Therefore, almost only lead vapor can be selectively generated from the object by heating the object to about 1673K.

When being heated, for example, to 2013K under atmospheric pressure, the vapor pressure of lead is 760 mmHg, whereas the vapor pressure of tin is 15 mmHg, and the vapor pressure of copper does not reach even 3 mmHg. Therefore, almost only lead vapor can be selectively generated from the object by heating the object to about 1673K.

Further, lead in the object to be treated can be vaporized at a lower temperature by heating the object to be treated under reduced pressure.

If the pressure is regulated at $10^{-1}$ Torr, almost only lead vapor can be selectively generated from the object to be treated by heating the object to about 1100K.

If the pressure is regulated at $10^{-3}$ Torr, almost only lead vapor can be selectively generated from the object to be treated by heating the object to about 900K.

Furthermore, if the pressure is regulated at $10^{-4}$ Torr, almost only lead vapor can be selectively generated from the object to be treated by heating the object to about 700K.

It is recommended that the lead vapor generated selectively as described above be recovered as metallic lead by the recovery device cooled to the melting point of lead or lower.

Figure 13:
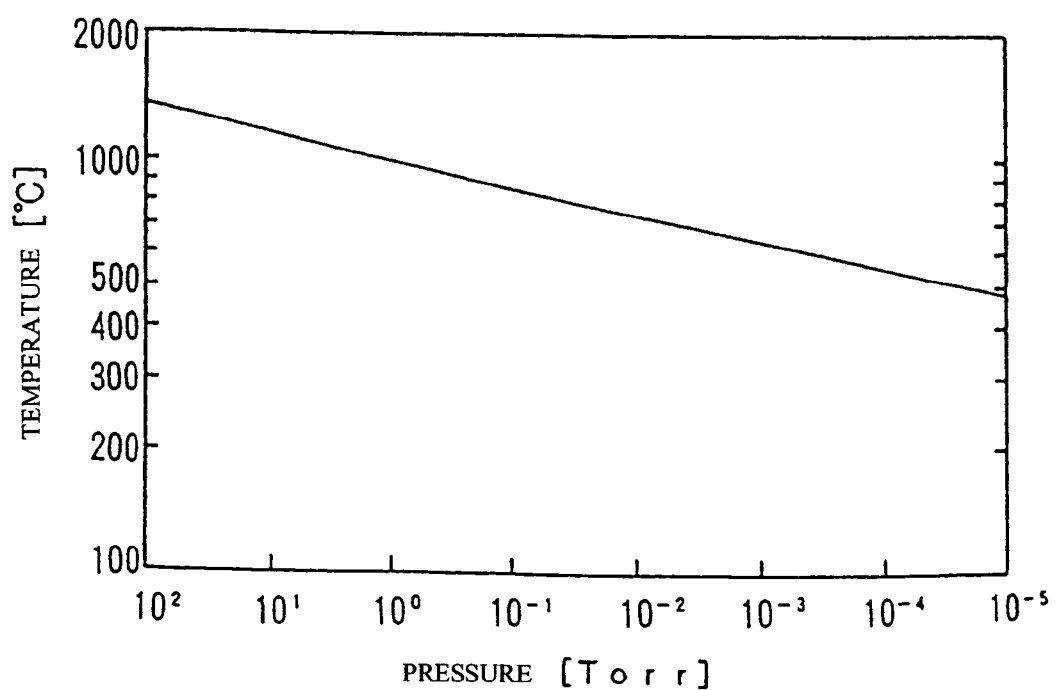
FIG. 13 is a graph showing temperature dependency of the boiling point (vapor pressure) of lead.

FIG. 13 is a graph showing the relationship between the vapor pressure of lead and the temperature thereof. It can be seen that the boiling point of lead lowers if the pressure in the hermetic container is reduced.

It is suitable to regulate heating temperature, for example, according to the pressure in the hermetic container based on this graph. It is also suitable to incorporate this relationship as a program in an electronic computer and use it as the aforesaid control means of the treatment apparatus of the present invention.

Example 10

An example in which a mounting substrate in which various kinds of electronic parts are mounted on a circuit board with a solder alloy containing Pb as an object to be treated is treated will now be explained as an example of an object having lead and resins as its components.

Figure 14:
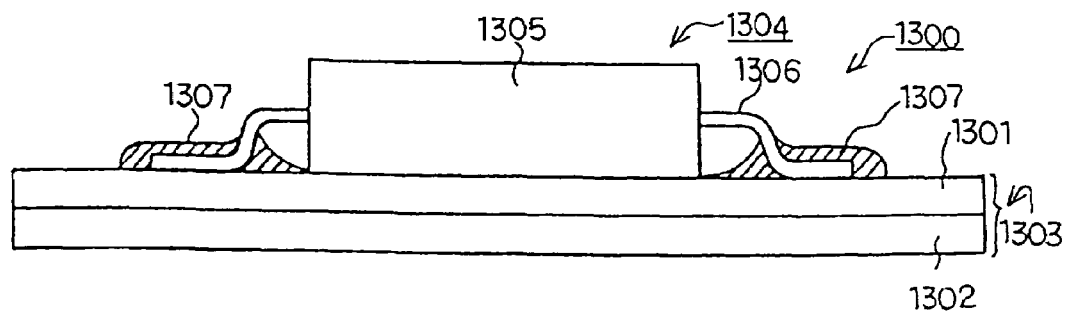
FIG. 14 is a diagram schematically showing the state of an untreated mounting substrate as an object to be treated.

FIG. 14 is a diagram schematically showing such a mounting substrate 1300.

Electronic parts 1304 is mounted on a circuit board 1303 in which copper foil 1301 and resins 1302 are laminated. The electronic parts 1304 are packaged by resins 1305. A connecting terminal 1306 of the electronic parts, made of a Cu alloy, and the copper foil are bonded with a Pb—Sn series solder alloy 1307. The surface of the connecting terminal 1306 of the electronic parts is sometimes plated with a solder alloy, in which case treatment can be performed in the same manner.

First, the mounting substrate 1300 is heated in the hermetic container where the oxygen concentration is regulated, and the resins 1302 and 1303 are thermally decomposed selectively. Component resins of a print-circuit board are generally thermosetting resins and mostly carbonized, but a large quantity of gases produced by decomposition are emitted. This applies to the packaging resins 1303 for the electronic parts.

Figure 15:
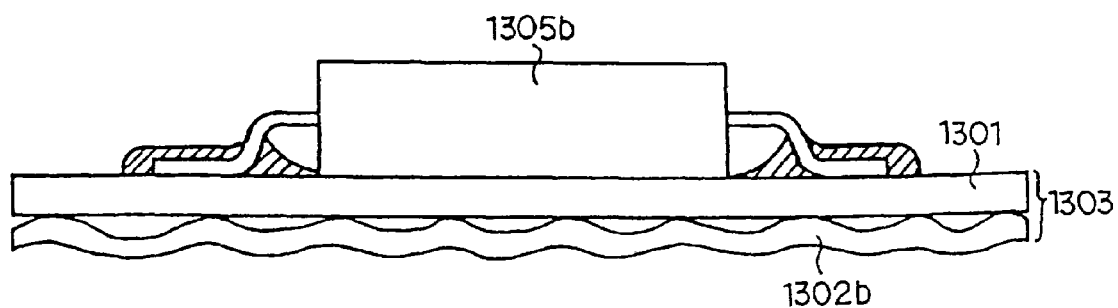
FIG. 15 is a diagram schematically showing the state of the mounting substrate in which its component resins are thermally decomposed.

FIG. 15 is a diagram schematically showing the mounting substrate 1300 in which the component resins are thermally decomposed selectively.

In this state, most of the component resins of the mounting substrate are carbonized. Lead never flies about by regulating the oxygen concentration.

Subsequently, lead contained in the object to be treated is selectively vaporized in the hermetic container where the temperature and pressure are regulated. It is recommended that the temperature and pressure be decided based on FIG. 13. It is desirable to reduce the pressure in the hermetic container. This is because energy to be supplied becomes smaller since lead is vaporized at a lower temperature, and component metals of the object to be treated such as lead and the like are not substantially oxidized since the oxygen concentration becomes lower. When there is a possibility that the component metals of the object to be treated are oxidized, it is recommended that a carrier gas such as $N_2$ or Ar be introduced to regulate the oxygen concentration in the hermetic container.

Figure 16:
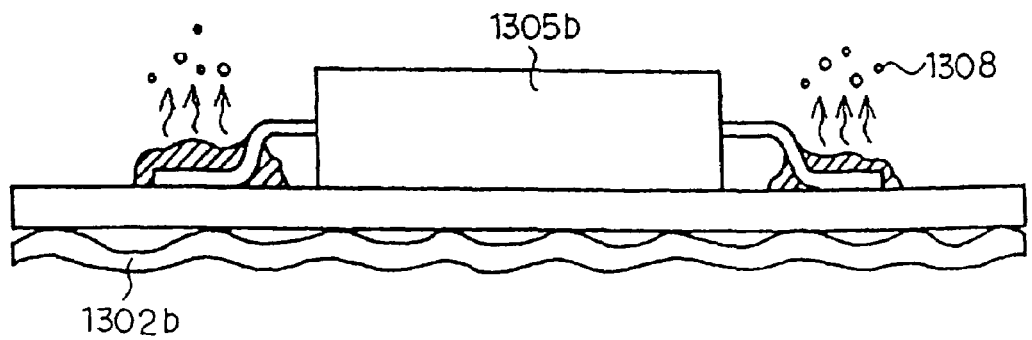
FIG. 16 is a diagram schematically showing a state in which lead is vaporized.

As the pressure in the hermetic container is reduced more, lead is vaporized at a lower temperature. FIG. 16 is a diagram schematically showing a state in which lead 1308 is vaporized in a metallic state. Only lead can be vaporized selectively by regulating the temperature and pressure in the hermetic container. When metals with boiling points lower than lead are contained in the object to be treated, it is better to vaporize such metals earlier.

As described above, lead can be removed from the mounting substrate 1300 which is the object to be treated. Further, a large amount of waste electronic equipment in society can be disposed of as non-industrial wastes by treating mounting substrates of the waste electronic equipment, and the contamination of the environment by the elution of lead is eliminated. The separation of component metals other than lead is facilitated, and those metals can be utilized as resources. The component resins can be recovered as valuable oil or carbides. The carbides may be utilized as fertilizer and activated carbon.

Although processes until lead is removed from the mounting substrate 1300 are explained above, component metals other than lead of the object to be treated may be vaporized by further regulating the temperature and pressure in the hermetic container.

For example, the circuit board 1303 and the electronic parts 1304 can be separated by vaporizing tin composing the solder alloy.

Figure 17:
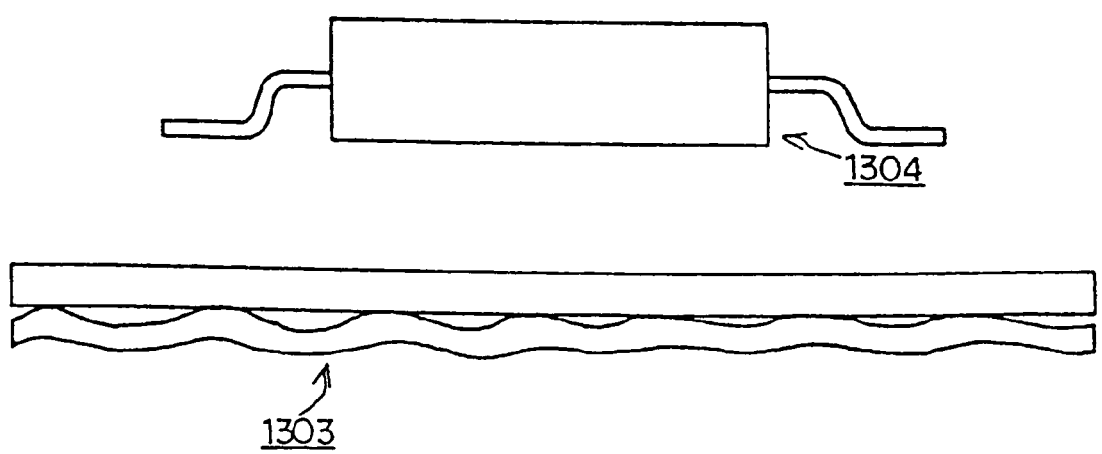
FIG. 17 is a diagram schematically showing a state in which a circuit board and electronic parts are separated.

FIG. 17 is a diagram schematically showing a state in which tin is vaporized and thereby the circuit board 1303 and the electronic parts 1304 are separated.

The aforesaid removal of lead and separation of the circuit board 1303 and the electronic parts 1304 reduce complexity owned by the object to be treated, leading to facilitation of the following treatment. In other words, the entropy of the object to be treated reduces, which can raise the value of the object.

Metals such as Au, Ag, Pt, Bi, In, Ta, Ni, Cr, Cu, Al, W, Mo, Co, and Pd contained in the circuit board 1303 and the electronic parts 1304 may be vaporized and recovered by regulating the temperature and pressure in the hermetic container. Such recovery becomes more efficient if the recovery is performed after the circuit board 1303 and the electronic parts 1304 are separated.

Figure 18:
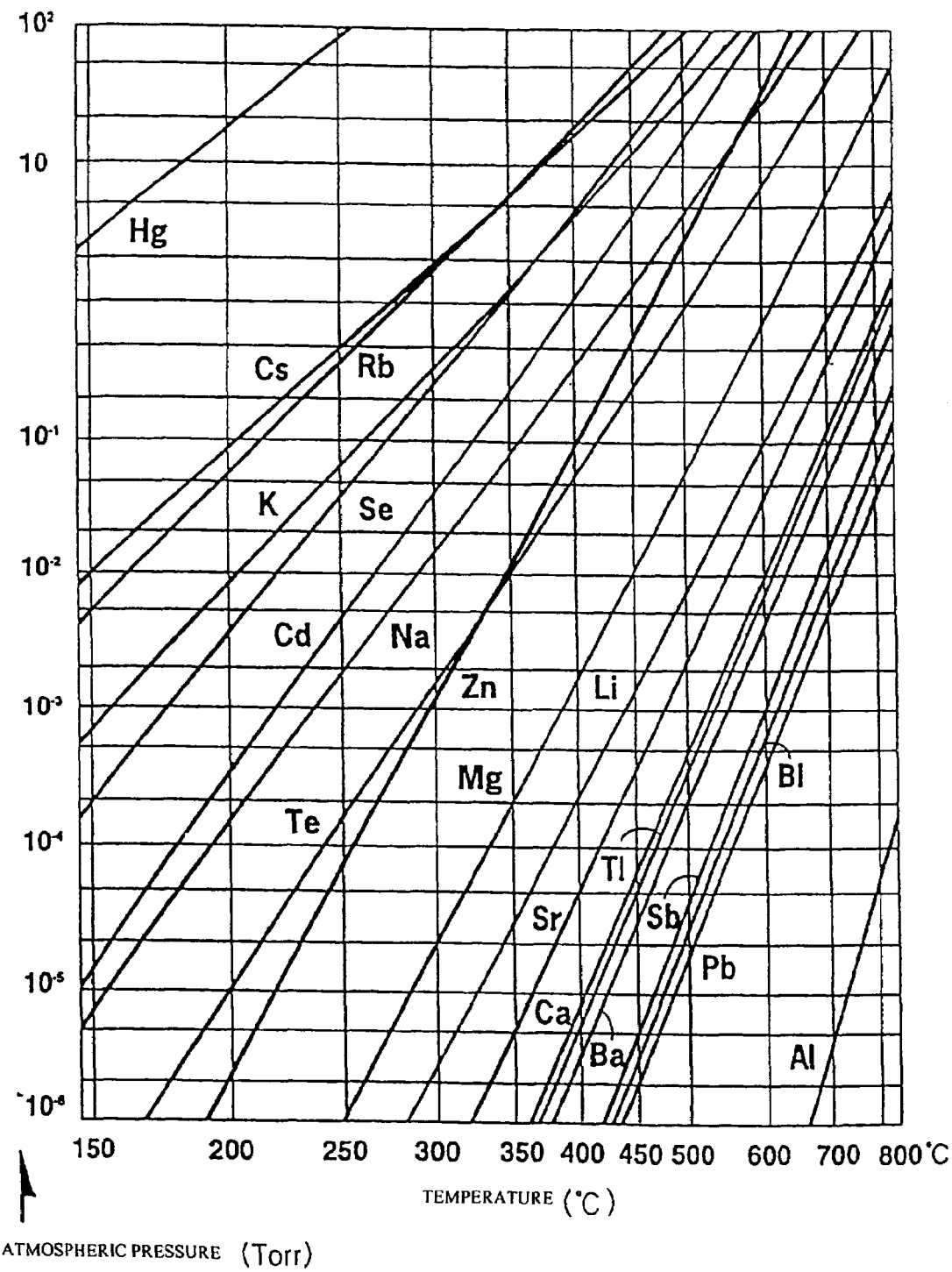
FIG. 18 is a graph showing pressure dependency of the boiling points (vapor pressure) of various kinds of metals.
Figure 29:
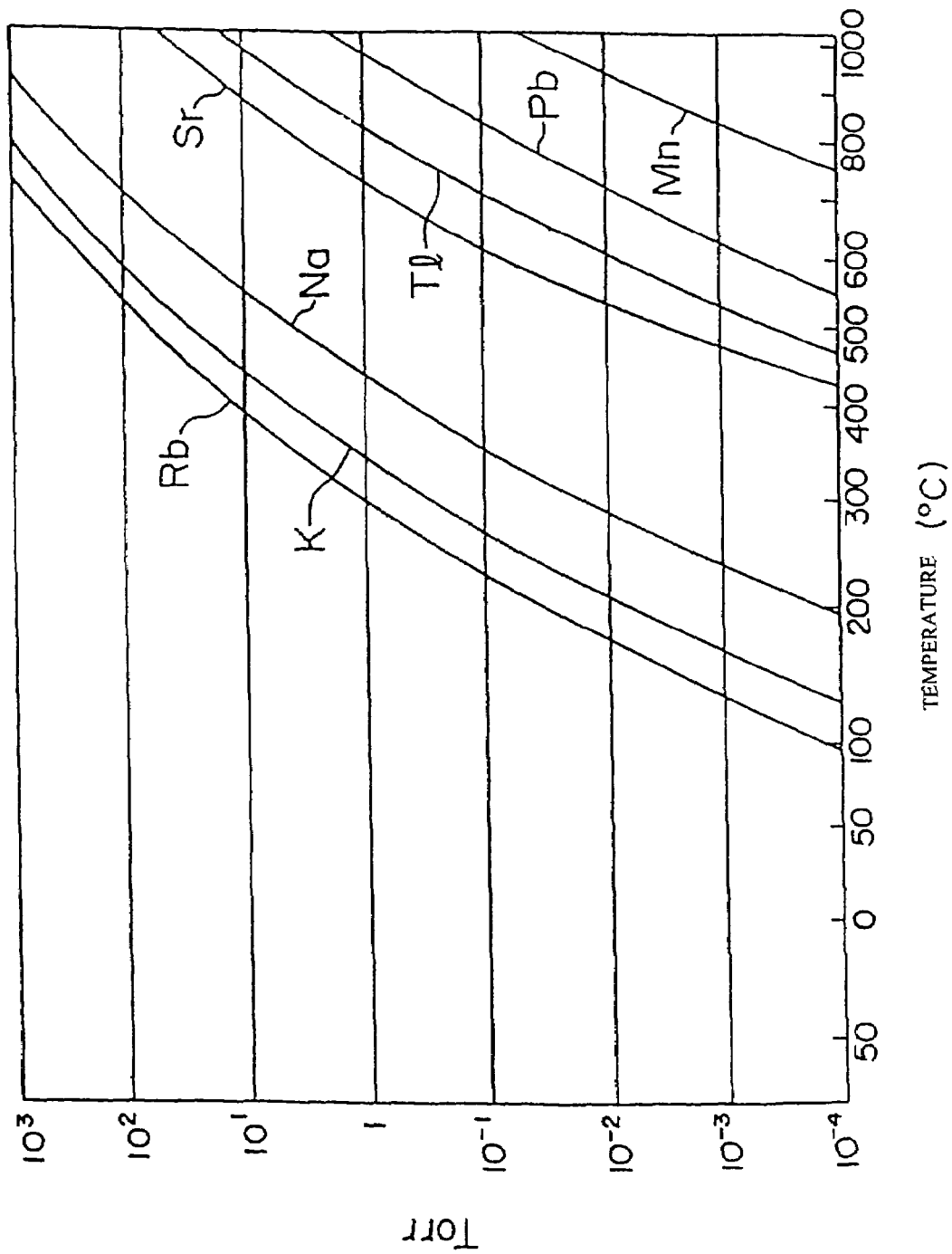
FIG. 29 and FIG. 30 are graphs showing the relations between vapor pressure and temperature of various kinds of metals.
Figure 30:
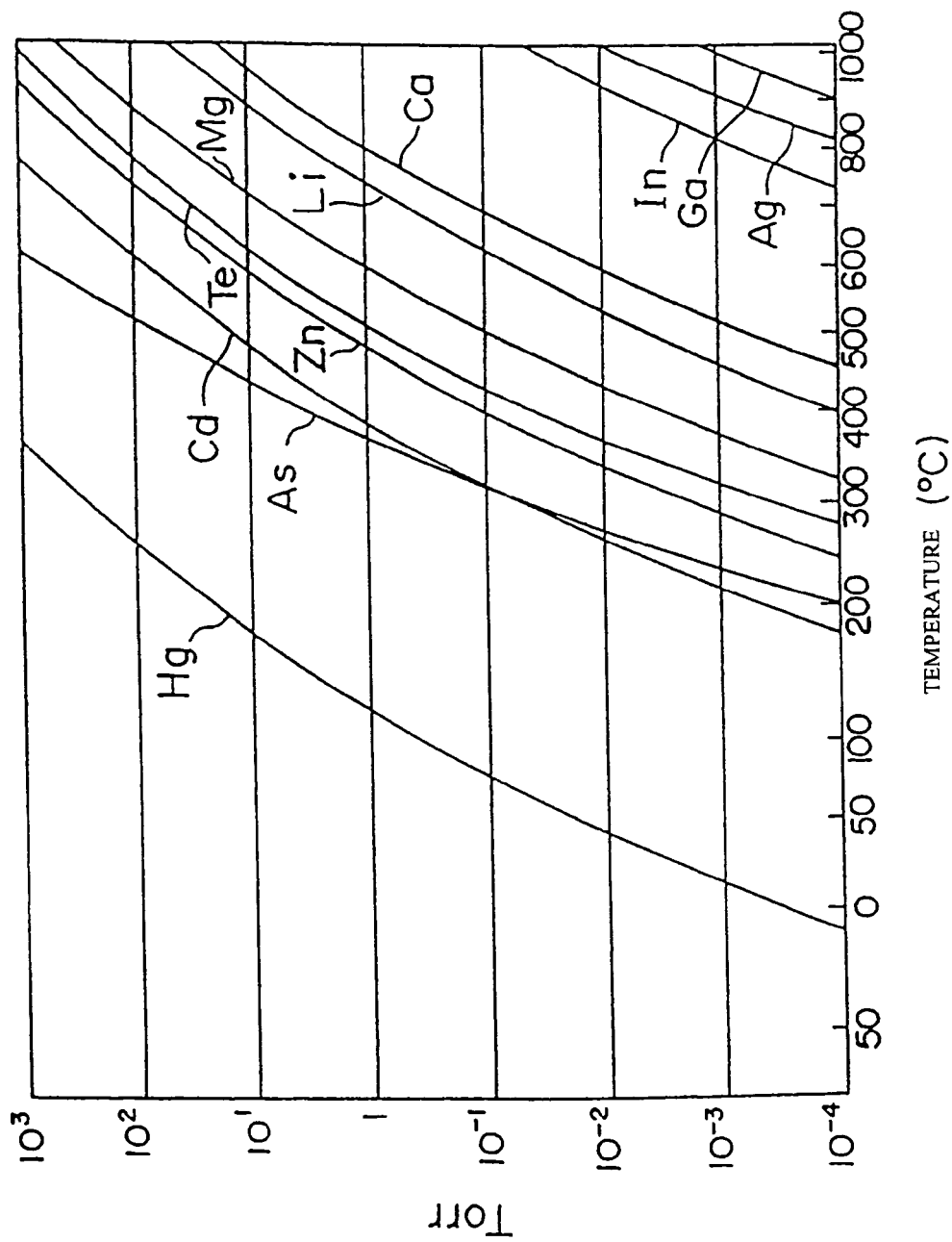

FIG. 18, FIG. 29, and FIG. 30 are diagrams showing pressure dependency of the boiling points (vapor pressures) of various kinds of metals. These diagrams illustrate recoverable metals, but metals not illustrated also can be recovered.

Figure 19:
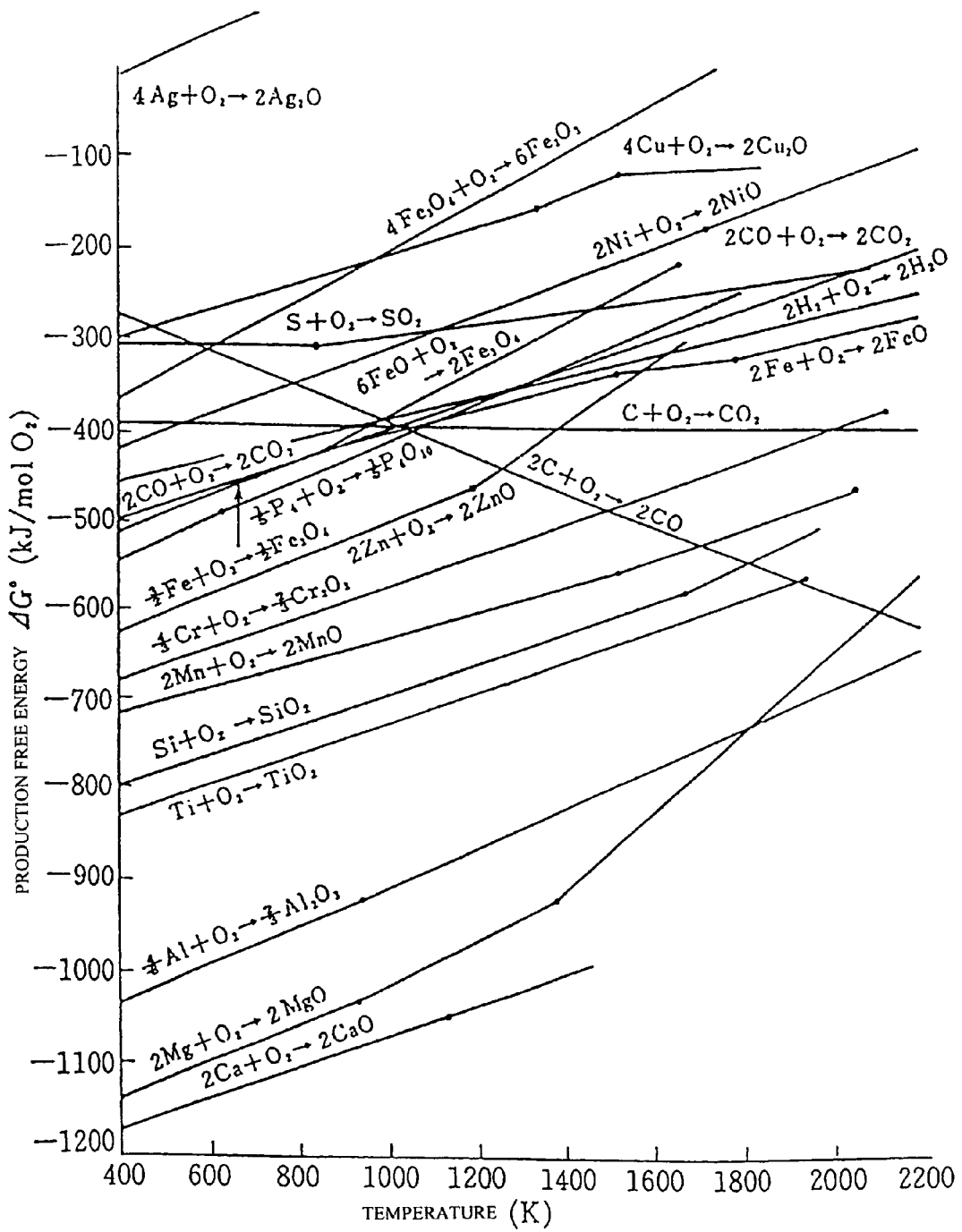
FIG. 19 is a diagram showing production free energy of various kinds of oxides and their temperature dependency.

FIG. 19 is a diagram showing temperature dependency of production free energy of oxides. Elements illustrated in FIG. 19 are shown as one example, but data concerning elements other than these elements also can be obtained easily by computation or a data base. It is recommended that the temperature, pressure, oxygen concentration in the hermetic container, for example, be controlled by using the relations shown in FIG. 18, FIG. 19, FIG. 29, and FIG. 30 together with the relation between the boiling point (vapor pressure) of lead and pressure.

It is also suitable to incorporate these relations as a program in an electronic computer and use it as the aforesaid control means of the treatment apparatus of the present invention.

Example 11

Figure 20:
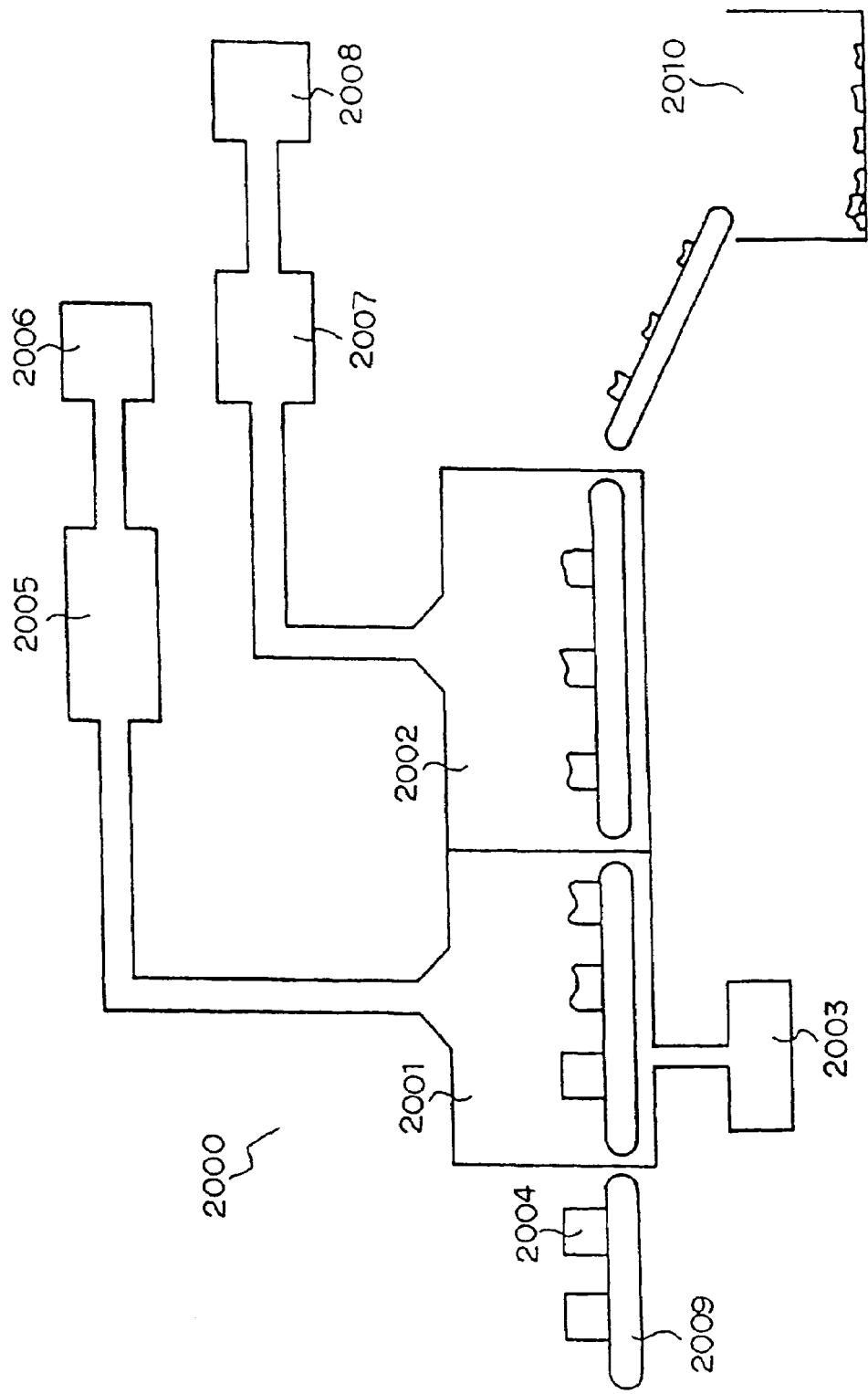
FIG. 20 is a diagram schematically showing an example of the treatment apparatus of the present invention.

FIG. 20 is a diagram schematically showing an example of an apparatus used for removing lead contained in the object to be treated having lead and resins as its components of the present invention. The apparatus is not limited to the apparatus illustrated in FIG. 20, and the treatment apparatus of the present invention described until now can be used.

This treatment apparatus 2000 includes a first hermetic chamber 2001 and a second hermetic chamber 2002. The first hermetic chamber 2001 includes an oxygen concentration control device 2003 and a heating device not illustrated such as a burner, and it is maintained at a predetermined temperature for a predetermined period of time by a control section the illustration of which is omitted.

Hydrocarbon gas emitted from component resins by heating an object to be treated 2004 is cooled and recovered as oil in a liquefaction and recovery device 2005. The numeral 2006 denotes an exhaust gas cleaning device, and in this example, an alkaline water shower cleaning device or the like is connected, and halogen gas contained in exhaust gas is reduced to a value not more than the environmental standard.

The second hermetic chamber 2002 is a vacuum heating furnace, and has a lead recovery chamber 2007 and an exhaust device 2008.

Objects to be treated are sent to the first hermetic chamber 2001 and the second hermetic chamber in sequence by a moving means 2009 such as a conveyor.

The retention time, heating temperature, pressure, and oxygen concentration in the first hermetic chamber 2001 and the second hermetic chamber 2002 of these objects to be treated are respectively controlled by a control section not illustrated.

The objects to be treated are sent to a residue catching section 2010 after passing through the second hermetic chamber 2002.

In the first hermetic chamber 2001, the temperature of the object to be treated 2004 is increased to and maintained at about 473K to about 873K. The component resins which are a part of components of the object to be treated 2004 are thermally decomposed and emitted as hydrocarbon gases, for example, C1 to C8 and C8 to C16.

The gases produced by the decomposition of resins and emitted are condensed and recovered by the exhaust gas treatment system 2005. Unrecovered gases are removed by the exhaust gas cleaning device 2006, and made innoxious, smokeless, and odorless.

Thereafter, the object to be treated 2004 is sent to the second hermetic chamber 2002, and the pressure is reduced, for example, to about $10^{-5}$ Torr, the temperature is regulated at about 700K, and this condition is maintained. Lead in the object to be treated is emitted as vaporized lead from the object to be treated. A gas exhaust section is provided at the upper portion of the second hermetic chamber 2002, and the vaporized lead emitted form the object to be treated is condensed as metallic lead by a reduction in vapor pressure. Crystallized metallic lead is deposited and recovered in the lead recovery chamber 2005. An inert gas such as $N_2$ or Ar is introduced from a carrier gas introduction section provided in the second hermetic chamber 2002 in order to efficiently feed vaporized lead from the second hermetic chamber 2002 to the lead recovery chamber 2005, and the vaporized lead together with the carrier gas is fed to the lead recovery chamber 2005.

A gas exhaust section is provided at the upper portion of the first hermetic chamber, and the gases produced by the decomposition of resins and emitted are sent to the exhaust gas treatment system 2005.

The exhaust gas treatment system 2005 mainly recovers heavy oil when the cooling temperature is 523K to 423K, a mixture of heavy oil and light oil when it is 423K to 323K, and light oil when it is 323K to room temperature. The recovered oil is led to a recovery tank the illustration of which is omitted, and can be reused as fuel or a raw material.

Gas exhausted from the exhaust gas treatment system 2005 is led to the exhaust gas cleaning device 2006 via a gas delivery section 15. In this example, the alkaline water shower cleaning device is connected, and halogen gas contained in the exhaust gas is reduced to a value not more than the environmental standard.

Example 12

Next, an example in which electronic equipment containing solder is treated as an object to be treated by using the treatment apparatus 2000 structured as above will be explained.

The electronic equipment which is the object to be treated 2004 may be crushed in pretreatment. Electronic parts are coarsely crushed here into about 10 centimeters square by a double spindle-type crusher. The coarsely crushed electronic equipment is thrown into the first hermetic chamber.

The first hermetic chamber 2001 is maintained at a furnace temperature of about 773K and an oxygen concentration of about 5%, and the electronic equipment is held therein for about 30 minutes. Component resins accounting for about 40% of components of the electronic equipment are thermally decomposed selectively in the first hermetic chamber 2001, and emitted as hydrocarbon gas or carbonized.

Chemical change is not caused to metals such as iron, copper, and aluminum accounting for about 50% of components and a mounting substrate accounting for about 10% of components in the first hermetic chamber 2001. Namely, an oxidation state and a phase equilibrium state are substantially maintained.

The electronic equipment in which the components resin are thermally decomposed selectively is transferred to the second hermetic chamber 2002 without being cooled. The second hermetic chamber 2002 is maintained at a pressure of about $10^{-3}$ Torr and a temperature of about 900K, and the electronic equipment is held therein for about 30 minutes.

A solder alloy weighing about 5% to 10% of the substrate weight is used in the mounting substrate accounting for about 10% of components of the electronic equipment. About 40 wt % of this solder alloy is lead.

Namely, 0.2% to 0.4% lead is used as a part of components in the electronic equipment. The lead is vaporized as vaporized lead in the second hermetic chamber 2002, fed together with a carrier gas to the lead recovery chamber 2005, and recovered as metallic lead.

To raise the recovery percentage of lead, it is desirable to lengthen the retention time of lead vapor in the lead recovery chamber 2005 as long as possible. In this example, the recovery percentage of lead is 98%. The recovered lead has few impurities, and can be reused as valuable metal.

The hydrocarbon gas thermally decomposed and emitted in the first hermetic chamber 2001 is fed to the exhaust gas treatment system 2005 and cooled in a condensing section cooled by circulating water at about 300K. In this example, 40% of the electronic equipment is composed of resins. The liquefaction percentage differs depending on components of the component resins, but about 90% of weight percentage is recovered as oil, and about 10% thereof remains as a residue mainly composed of carbides.

The recovered oil can be recycled as fuel or a raw material. Gas components which have passed through the exhaust gas treatment system 2005 are released into the atmosphere as exhaust gas with a value not more than the environmental standard by being cleaned in the exhaust gas cleaning device 2006. Metals such as iron, copper, and aluminum accounting for about 50% of components of the electronic equipment are hardly oxidized in the first hermetic chamber 2001 and the second hermetic chamber 2002, and if anything, they are reduced and can be recovered as metals, resulting in high recycling value.

In this example, residues let out into the residue catching section 30 are mainly iron, copper, aluminum, and a carbide residue of resins.

Figure 21:
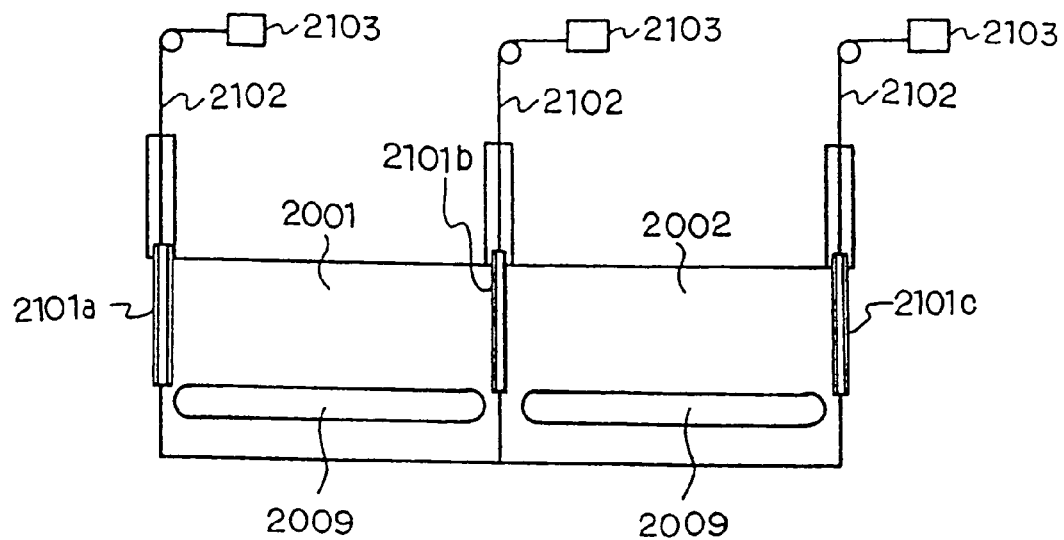
FIG. 21 is a diagram schematically showing partitions of the treatment apparatus of the present invention.

FIG. 21 is a diagram schematically showing an example of openable and closeable partitions 2101 for maintaining hermetic sealing capabilities and heat insulating properties of the first hermetic chamber 2001 and the second hermetic chamber 2002 in the treatment apparatus 2000 illustrated in FIG. 20. The partitions 2101 are operated by wires 2102 and winding machines 2103.

A vacuum door and a heat insulating door may be provided separately at the position of each of the partitions 2101. For example, it is suitable that vacuum door is used as the partition 2101b, and that on the first hermetic chamber 2001 side and on the second hermetic chamber 2002 side of this door, openable and closeable heat insulating doors are placed.

Next, wastes containing resins and metals which are used in large quantities in various kinds of electronic equipment, automobiles, precision equipment, stationary, packages for medical supplies and groceries, and so on will be taken up as the object to be treated and the treatment system thereof will be explained. As for an apparatus, it is recommended that the treatment apparatus of the present invention described above be used.

Example 13

Such wastes containing resins and metals are difficult to separate and recover, and hence they are generally treated by combustion and reclamation. In the treatment system of the present invention, in the same apparatus, the component resins of the wastes are thermally decomposed (vaporized, liquefied, or carbonized) selectively, and the component metals are vaporized and recovered in a metallic state. Specially, wastes containing resins are slow in temperature increase under reduced pressure, which is practically the problem, but in the present invention, this problem is solved by regulating oxygen concentration.

In the treatment system of the present invention, wastes containing resins and metals are first thrown into the hermetic container. The oxygen concentration is regulated to recover resinous portions, and pressurization to several atmospheres and heating are performed. Then, pressure reduction and heating is performed to vaporize and recover the metals.

Figure 22:
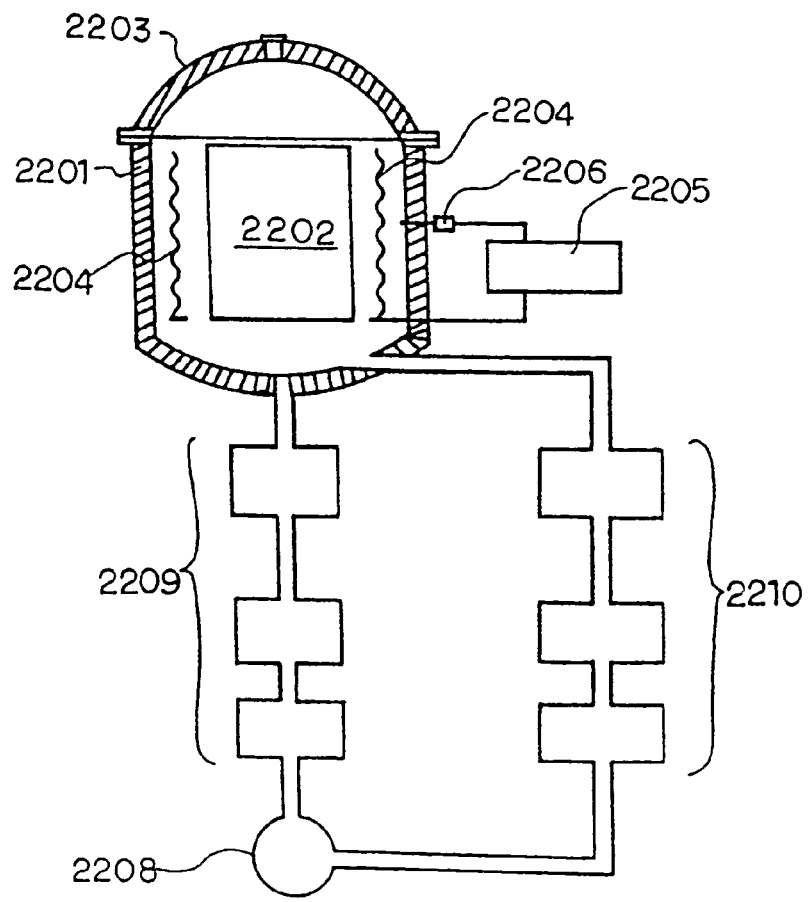
FIG. 22 is a diagram schematically showing an example of the treatment apparatus of the present invention.

FIG. 22 is a diagram schematically showing an example of the treatment apparatus which can be used in this treatment system.

Wastes containing metals and resins are housed in a hermetic container 2201, a throw shelf 2202 made of metal with high temperature increase efficiency and high heat resistance is provided in the hermetic container. The numeral 2203 is a door for opening and closing the hermetic container 2201. A heating device 2204 such as a sheathed heater or the like is provided in the hermetic container, and operated together with the pressure and oxygen concentration in the hermetic container by a control panel 2205. The numeral 2206 denotes a sensor, and it transmits the temperature, pressure, and oxygen concentration in the hermetic container 2201 as signals to the control panel 2205.

The hermetic container 2201 is connected to an exhaust device 2208. A resin recovery system 2209 which is a recovery device for gases produced by decomposition of the component resins of the wastes and a metal recovery system 2210 which is a recovery device for the component metals of the wastes are placed between the hermetic container 2201 and the exhaust device 2208. The resin recovery system 2209 may include, for example, an exhaust gas treatment system or the like. The metal recovery device may include, for example, a cyclone separator.

The wastes are thrown into the throw shelf 2202 provided in the hermetic container 2201, the door 2203 is closed to hermetically seal the container, and heating (400° C.) and pressurization (3 atm) are first started in a state in which the recovery system is closed.

In this case, temperature increase efficiency is higher than heating under reduced pressure, which contributes to temperature increase efficiency in heating under reduced pressure at the time of the following recovery of metals.

Gases produced by thermal decomposition of the component resins of the wastes are recovered by a plurality of recovery devices according to the types of gases. When the wastes contain polyvinyl chloride resins, it is suitable to first heat them under normal pressure to generate chlorine gas. It is recommended that this chlorine gas be recovered as iron chloride by being brought into contact with iron heated to a high temperature, or be recovered as ammonium chloride by adding ammonia. In this case, the corrosion of the container, tubes, and the like by chlorine gas is severe, and thus hastelloy, titanium alloy, or the like in place of stainless steel may be used for the apparatus as required. Incidentally, exhaust gas such as unrecovered gas may be made innoxious by high-temperature combustion.

A part of resins are carbonized and can be reused for fertilizer, fuel, and the like. Carbides subjected to vacuum heat treatment have excellent capability for fertilizer, fuel, deodorant, and the like. Then, the resin recovery system 2209 is closed, and a circuit for another pipe for the metal recovery system 2210 is opened. The pressure in the hermetic container 2201 is reduced to about $10^{-3}$ Torr by the exhaust device, the hermetic container is heated to a temperature not less than a boiling point of the alloy according to the kind of metal to vaporize the metal, and the metal is recovered by a condensing means placed midway in the metal recovery system 2210. In this case, the vaporization temperature of metal is lower than under normal pressure, which enables relatively lower heating temperature and uneasy oxidation, resulting in good recovery efficiency.

As described above, according to the treatment system of the present invention, thermal efficiency is favorable and treatment costs are low. Furthermore, the performance of heating and pressurization enables favorable recovery efficiency of oil with relatively small molecular weight, and heating under vacuum enables high recovery percentage of metal with high purity.

Example 14

Next, waste mounting substrates, in each of which various kinds of electronic parts are mounted on a circuit board, used in large quantities in various kinds of electronic equipment, automobiles, precision equipment, and so on will be taken up as the object to be treated, and the treatment system thereof will be explained. As for an apparatus, it is recommended that the treatment apparatus of the present invention described above be used.

This treatment system efficiently separates and recovers electronic parts from a mounting substrate on which various kinds of electronic parts such as an IC, an LSI, a resistor, a capacitor, and the like are mounted, and also separates and recovers component resins and component metals of the mounting substrate composed of a circuit board, electronic parts, and the like and makes them resources.

Such waste mounting substrates have difficulty in separating the electronic parts from the circuit board, and the mounting substrate is an object in which different materials are intricately integrated, whereby the treatment thereof is difficult. Therefore, reclamation treatment, combustion treatment, and the like are common.

In this treatment system, waste mounting substrates are thrown into the hermetic container. To raise temperature increase efficiency, heating to such a temperature that the resins are not oxidized so much under normal pressure or increased pressure, and then pressure reduction are performed. This is because thermal conductivity in the hermetic chamber becomes lower under reduced pressure.

The resins are thermally decomposed (vaporized, liquefied, or carbonized) selectively as described above, and gases produced by the decomposition are recovered.

When the component resins of the mounting substrate are treated, to raise temperature increase efficiency in the hermetic container, the mounting substrate which is the object to be treated is heated while pressure and oxygen concentration are regulated by the exhaust system, after being heated to a temperature (200° C.) at which the resins are not oxidized so much. In this case, the component resins are thermally decomposed selectively at a temperature corresponding to the degree of vacuum. As the degree of vacuum becomes higher, the resins are thermally decomposed at a lower temperature, and thus the hermetic reduced pressure container is never damaged.

The package resins of the electronic parts are also thermally decomposed and become very fragile, whereby the separation from elements in the package becomes easy.

Gases produced by the thermal decomposition of resins are recovered by a plurality of recovery devices according to the kinds of the produced gases. For example, hydrogen gas may be recovered by a substance which adsorbs this gas, and chlorine gas may be recovered as iron chloride by being brought into contact with iron heated to a high temperature.

Incidentally, exhaust gas and the like may be made innoxious by high-temperature combustion. Moreover, the temperature, pressure, and oxygen concentration in the hermetic container are regulated according to metals to be recovered (See FIG. 13, FIG. 18, FIG. 19, FIG. 29, and FIG. 30), and an alloy (for example, a Pb-Sn alloy) bonding the circuit board and the electronic parts is vaporized. It is desirable to selectively vaporize an alloy depending on its vapor pressure and separate it in terms of recycling.

If the alloy bonding the circuit board and the electronic parts is vaporized, the electronic parts are separated from the circuit board.

Not only the bonding alloy bonding the circuit board and the electronic parts but also various kinds of metals such as Zn, Sb, Au, Pt, Ni, Cr, Cu, Al, Mo, W, and Ta contained in the mounting substrate may be vaporized, and thereby separated and recovered. The metals can be recovered in a metallic state without turning into oxides, and thus the utility value thereof is high.

At the time of the vaporization of the solder alloy, in order to raise temperature increase efficiency, after being heated to a temperature (for example, about 200° C.) at which the solder alloy is not oxidized so much, the solder alloy may be heated further (for example, to about 400° C.) while the pressure in the hermetic container is reduced by the exhaust means, and condensed by the condensing means provided midway in a recovery route.

According to this system, the solder alloy of the mounting substrate is removed completely as shown in FIG. 17, and solder at lead terminal portions in the IC, the LSI, the resistor, the capacitor, and the like is also removed completely. Therefore, the electronic parts can be removed from the board, and in addition the recycling of the circuit board and electronic parts can be facilitated, and their values can be raised.

The component resins of the mounting substrate are vaporized, carbonized, or become an intermediate product, and thus can be effectively used.

The component metals of the solder alloy are vaporized according to the degree of vacuum in the hermetic container, and as the degree of vacuum becomes higher, the metals are vaporized at a lower temperature, whereby a furnace wall and the like of the treatment apparatus are not damaged.

If the mounting substrate is subjected to reclamation treatment, noxious metals such as Pb and Sb in the solder alloy melt due to acid rain and the like to thereby contaminate soil and rivers. Most of resins are not decomposed naturally and remains semipermanently, which causes shortage of treatment plants and problems in terms of environmental protection. The treatment system of the present invention can solve these problems.

Moreover, various kinds of metals contained in the circuit board and the electronic parts can be separated, recovered, and recycled. These metals include metals having a possibility of being exhausted and scarce metals the elements of which exist very little in the earth crust. Consequently, the recovery of these metals contributes to the solution of resources and energy problems which mass consumption society confronts at present.

Example 15

Next, a circuit board in which copper foil and resins are laminated will be taken up as the object to be treated, and the treatment system thereof will be explained.

The circuit board may be a so-called copper laminated sheet, a flexible board, or a TAB (Tape Automated Bonding) film carrier. Cut portions of the copper laminated sheet produced in the fabrication process of circuit boards may be treated. Moreover, as explained above, the circuit board after the electronic parts and the bonding alloy are separated from the mounting substrate may be treated.

Although the circuit board is explained here as an example, any object having copper and resins as its components can be treated in the same manner.

The separation of the solder alloy and the electronic parts from the mounting substrate is similar to that described above. The thermal decomposition of the component resins of the mounting substrate is also the same as above. A part of the resins may contain paper. This applies to other portions of the present invention.

In order to separate the copper foil and the resins, this treatment system heats the circuit board under a reduced pressure condition or a non-oxidation condition to thermally decompose the component resins of the circuit board into gas, oil, carbides, and the like. The copper foil is recovered as almost pure metal. Impurities such as carbides adhering to copper may be treated by a method such as cleaning, vibration, rotation with fine sand, or the like as required. It is recommended that the treatment apparatus of the present invention be used as this apparatus.

Figure 23:
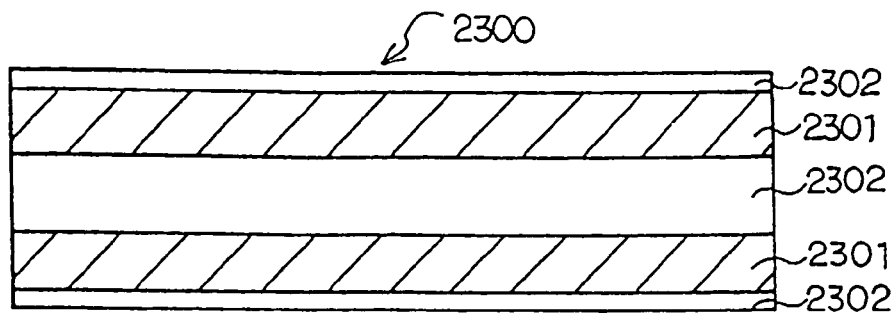
FIG. 23 is a diagram schematically showing the state of an untreated circuit board which is an example of the object to be treated.

FIG. 23 is a diagram schematically showing a circuit board 2300 which is the object to be treated. The circuit board 2300 is a two-layered sheet, copper foil 2301 and resins 2302 are laminated integrally.

The circuit board 2300 is introduced into the hermetic chamber, and the resins 2302 are thermally decomposed (vaporized, liquefied, or carbonized) selectively in the hermetic container where the temperature, pressure, and oxygen concentration are regulated so that the copper 2301 is not substantially oxidized. It is suitable to recover gases produced by the decomposition of the resins 2302 by the exhaust gas treatment system or the like.

On this occasion, it is also suitable to heat the object to be treated to a temperature (for example, 200° C.) at which the resins 2302 are not oxidized so much, then reduce pressure or reduce oxygen concentration partial pressure, and then increase temperature (for example, to 400° C. to 650° C.), which resulting in a rise in temperature increase efficiency.

Figure 24:
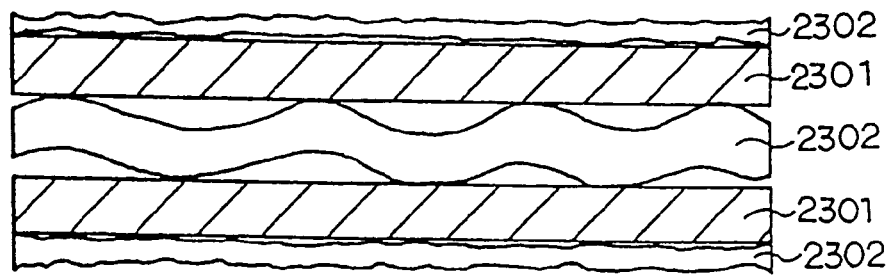
FIG. 24 is a diagram schematically showing the state of the circuit board of which the component resins are thermally decomposed.

FIG. 24 is a diagram schematically showing the circuit board 2300 after the component resins are thermally decomposed. Most of resins remain as carbides.

In this state, the carbonized resins 2302 may be separated mechanically.

Figure 25:
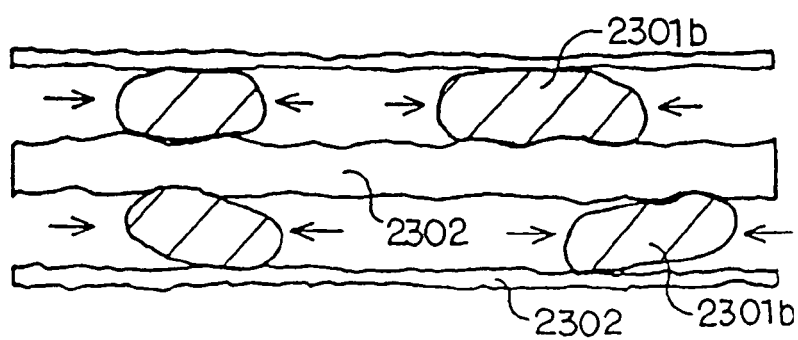
FIG. 25 is a diagram schematically showing a state in which copper gathers in granular form by surface tension.

If the temperature is increased to a temperature fifty or sixty degrees higher than the melting point of copper while the pressure or the oxygen concentration in the hermetic container is regulated, the copper 2301 in a liquid state turns into granular copper 2301b by surface free energy (surface tension) (FIG. 25). If cooling is performed in this state, the separation and recovery of copper becomes easier. For example, the melting point of copper at 760 Torr is 1080° C., and copper can be collected in a granular form by increasing the temperature in the hermetic container to about 1150° C. (in the case of 760 Torr).

The copper foil can be recovered with only tiny oxidation taking place by heating the circuit board under reduced pressure or in a non-oxidizing atmosphere as described above. Incidentally, impurities such as carbides and the like adhering to the surface can be removed by cleaning or the like as required.

As explained above, according to the treatment system of the present invention, copper can be separated and recovered in a metallic state from an object in which resins and copper are integrated. Moreover, the resins can be recovered as oil and carbides.

Example 16

Next, resin-coated aluminum foil in which aluminum foil and resins are laminated will be taken up as the object to be treated, and the treatment system thereof will be explained.

Such resin-coated aluminum foil is widely used, for example, for bags for potato chips, packing receptacles for retort pouch food such as curry, packing receptacles for food and medical supplies, heat insulating materials, and the like.

The treatment of such resin-coated aluminum foil is difficult because resins and aluminum foil are integrated, and thus the resin-coated aluminum foil is treated by reclamation or combustion. In the case of combustion treatment, aluminum turns into oxides, and its value as resources sharply drops.

Enormous energy is consumed in refining aluminum, and hence it is a waste of energy not to recycle aluminum.

In the present invention, the component resins are thermally decomposed (vaporized, liquefied, or carbonized) selectively while the oxidation state of aluminum is substantially maintained by heating the resin-coated aluminum foil in the hermetic chamber where the oxygen concentration is regulated. Namely, to separate the aluminum foil and the resins efficiently, the resin-coated aluminum foil is heated under a reduced pressure condition or a non-oxidation condition, and the resins are decomposed into gas, oil, carbides, and the like, and recovered. The aluminum foil is recovered as almost pure metal. Impurities such as carbides adhering to aluminum may be treated by a method such as cleaning, vibration, rotation with fine sand, or the like as required.

To raise temperature increase efficiency, this treatment system heats the resin-coated aluminum foil to a temperature at which the resin is not oxidized so much, then reduces pressure or reduces oxygen partial pressure, then increases temperature, and consequently decomposes resinous portions into gas, oil, carbides, and the like and recovers them. The aluminum foil is separated as almost pure metal from the resins.

Figure 26:
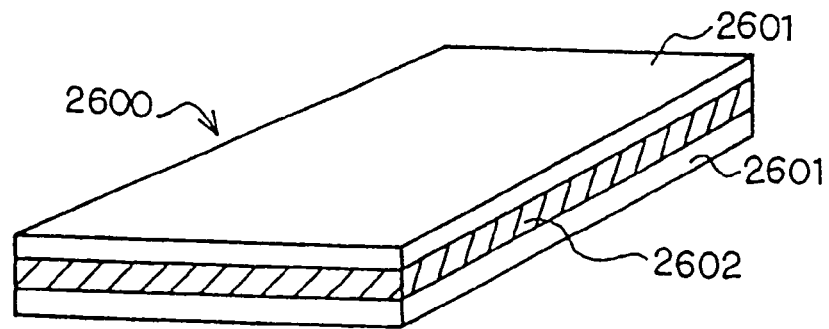
FIG. 26 is a diagram schematically showing untreated resin-coated aluminum foil which is the object to be treated.

FIG. 26 is a diagram schematically showing a resin-coated aluminum foil 2600. Resins 2601 and aluminum foil 2602 are integrated.

First, the resin-coated aluminum foil 2600 which is the object to be treated is put into the treatment apparatus of the present invention.

Then, to raise the temperature increase efficiency of the hermetic container, after being heated to a temperature (for example, 200° C.) at which the resins 2601 are not oxidized much, the resin-coated aluminum foil 2600 is heated to 400° C. to 650° C. while temperature and pressure conditions are controlled (See FIG. 18, FIG. 19, FIG. 29, and FIG. 30).

The thermal decomposition of component resins is insufficient at temperatures lower than 400° C., whereas the aluminum foil melts at temperature higher than 650° C., and thus the above temperature range is set.

It is more preferable to thermally decompose the resins selectively at a heating temperature of 550° C. to 650° C. under a pressure not more than $10^{-2}$ Torr (or in a non-oxidizing atmosphere).

Figure 27:
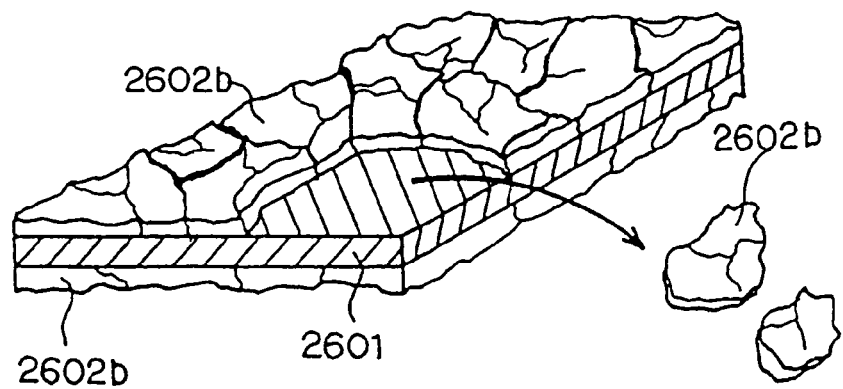
FIG. 27 is a diagram schematically showing the state of the resin-coated aluminum foil of which the component resins are thermally decomposed.
Figure 28:
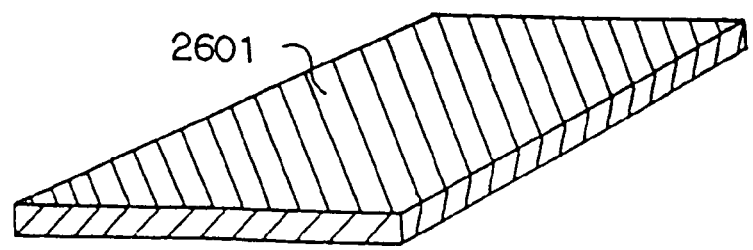
FIG. 28 is a diagram schematically showing aluminum foil separated from the resin-coated aluminum foil.

FIG. 27 is a diagram schematically showing the state of the resin-coated aluminum foil after the component resins 2601 are thermally decomposed selectively, in which carbides 2602b which are thermal decomposition products of the resins adhere to the aluminum foil 2601 in a metallic state. In this state, the carbides 2602 easily peel off the aluminum foil by only soft touch. Therefore, the aluminum foil can be recovered easily in a metallic state (See FIG. 28).

Gases produced by the thermal decomposition of resins and emitted are recovered by a plurality of recovery devices according to the kinds of gases. A catalyst may be used. For example, it is recommended that hydrogen gas be recovered by being adsorbed by a hydrogen gas adsorbing substance. Chlorine gas may be trapped by an alkaline solution such as NaOH to be neutralized, or may be recovered as iron chlorine by being brought into contact with iron heated to a high temperature.

Incidentally, exhaust gas such as unrecovered gases may be made innoxious by high-temperature combustion. A part of the resins are recovered as carbides or oil. Generally, component resins of resin-coated aluminum foil are thermoplastic resins, and the majority thereof can be vaporized or liquefied, and then recovered. Carbides of the component resins can be easily separated from the aluminum foil. Aluminum maintains its metal properties.

Aluminum can be recovered with only tiny oxidation taking place by heating the resin-coated aluminum foil under reduced pressure or in a non-oxidizing atmosphere as described above. Incidentally, impurities such as carbides and the like adhering to the surface can be removed by cleaning or the like as required.

Example 17

Figure 31:
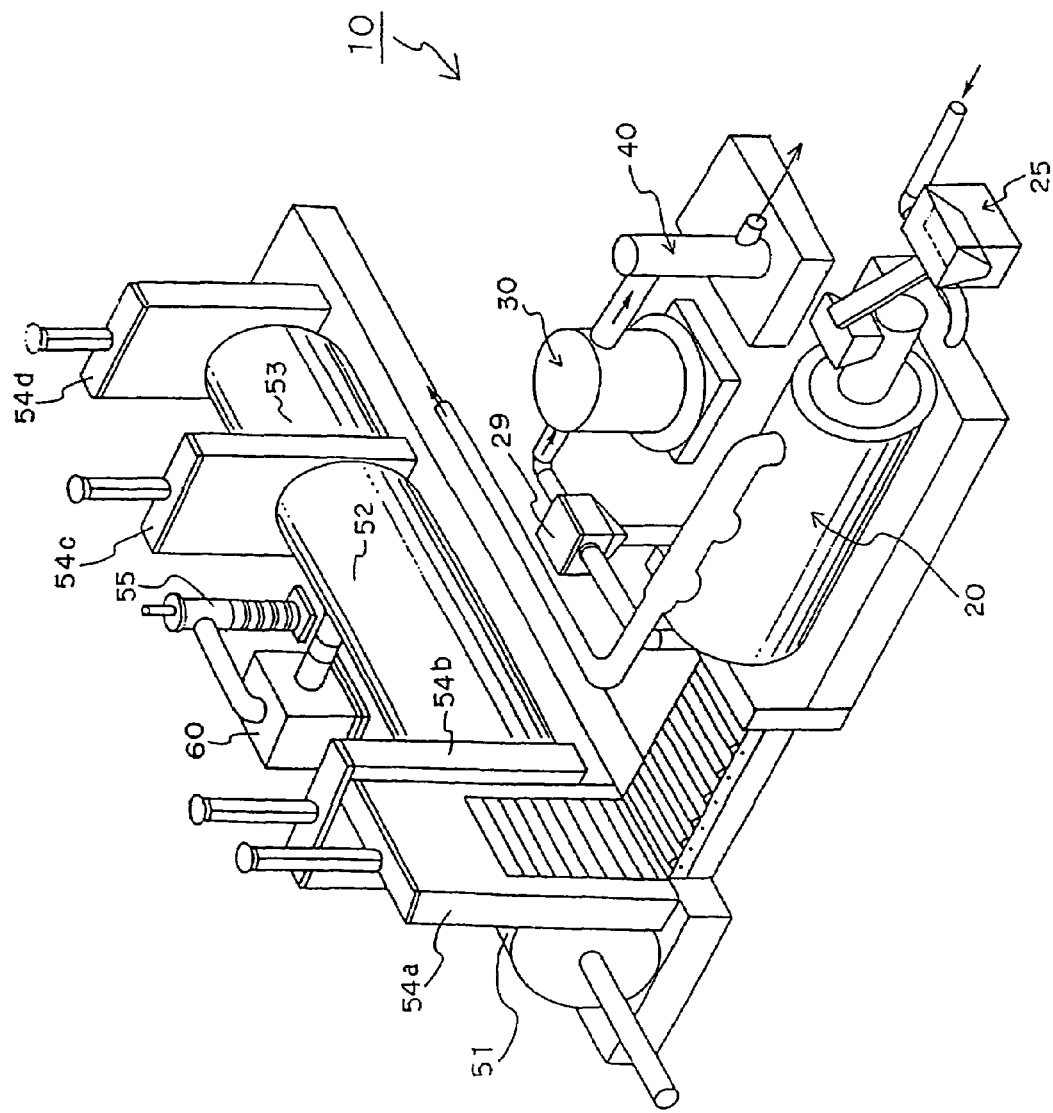
FIG. 31 is a diagram roughly showing an example of the treatment apparatus of the present invention.

FIG. 31 is a diagram roughly showing an example of the treatment apparatus of the present invention.

Figure 32:
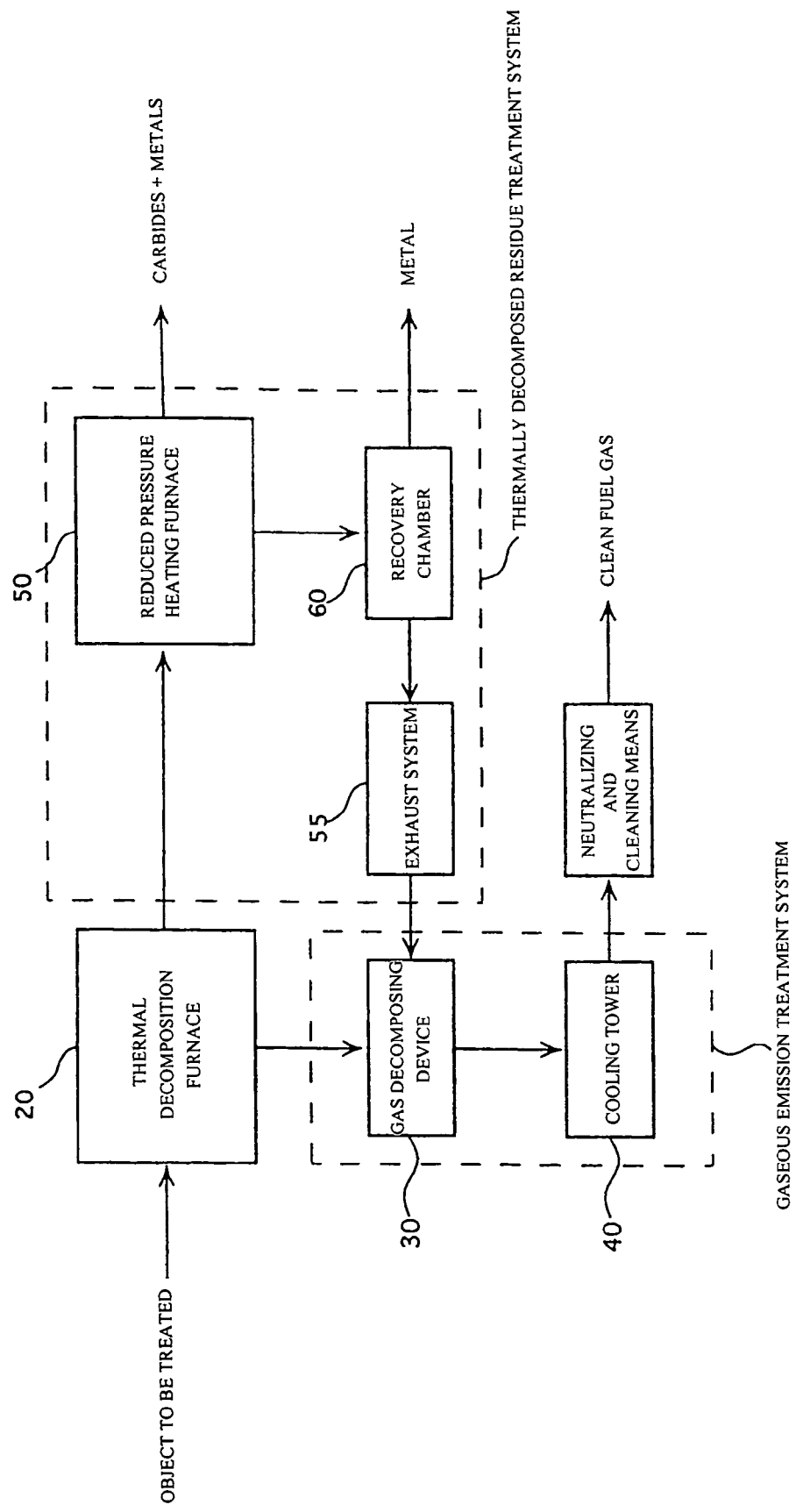
FIG. 32 is a diagram schematically showing the structure of the treatment apparatus of the present invention illustrated in FIG. 31.

FIG. 32 is a diagram schematically showing the structure of the treatment apparatus of the present invention illustrated in FIG. 31.

This treatment apparatus 10 includes a thermal decomposition furnace 20 which is a first thermal decomposition means for thermally decomposing an object to be treated containing resins and metals at a first temperature, a gas decomposing device 30, connected to the thermal decomposition furnace 2, for reforming or thermally decomposing a gaseous emission produced from the object to be treated at a second temperature such that dioxins are decomposed, a cooling tower 40 which is connected to the gas decomposing device 30 and is a cooling means for cooling the gaseous emission to a third temperature so that a rise in the concentration of dioxins contained in the gaseous emission reformed at the second temperature, a reduced pressure heating furnace 50 for heating a residue resulting from the thermal decomposition of the object to be treated, solids separated from the gaseous emission, and the like under reduced pressure so that a metal contained in the residue are vaporized, and a recovery chamber 60 for condensing the metal vaporized from the residue.

Namely, the treatment apparatus of the present invention introduces the object to be treated containing resins and metals into the thermal decomposition furnace, thermally decompose it, treats a gaseous emission from the object to be treated by a gaseous emission treatment system mainly composed of the gas decomposing device and a cooling tower to make it innoxious and to turn it into clean fuel gas, and introduces a thermally decomposed residue of the object to be treated which has emitted the gaseous emission into the reduced pressure heating furnace to separate and recover a metal.

The thermal decomposition furnace 20 is to thermally decompose the object to be treated at the first temperature such that the object to be treated is thermally decomposed under controlled oxygen concentration, and extracts a gaseous emission, for example, from shredder dust, waste circuit boards, and the like. The gaseous emission is basically composed of emission gas, but the case where the gaseous emission contains solid fine particles, liquid fine particles mixed in the emission gas is not excluded.

Figure 33:
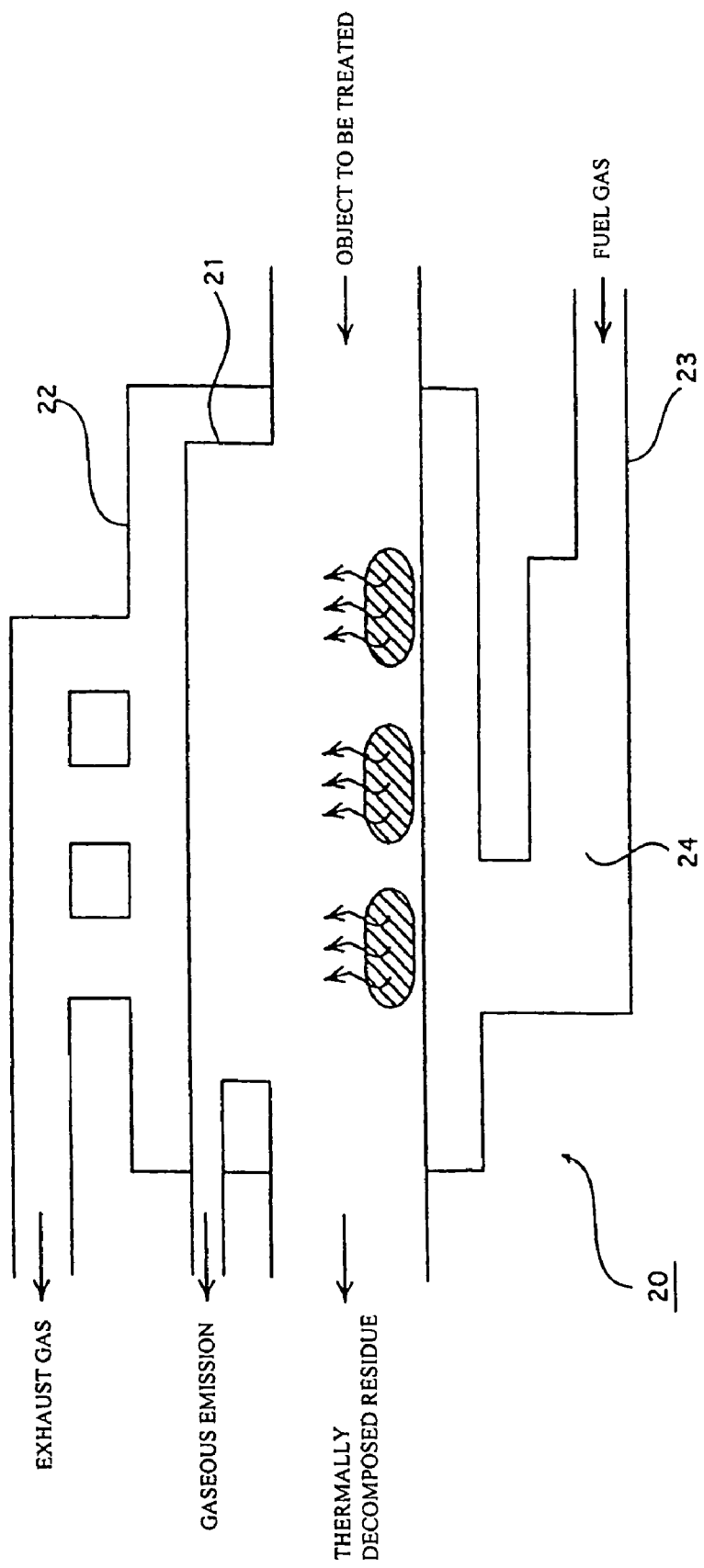
FIG. 33 is a diagram schematically showing an example of the structure of a thermal decomposition furnace.

FIG. 33 is a diagram schematically showing an example of the structure of the thermal decomposition furnace 20. The thermal decomposition furnace 20 is composed of a thermal decomposition chamber 21 for thermally decomposing the object to be treated and a combustion chamber 22 for heating the thermal decomposition chamber 21, and combusts fuel gas introduced from a fuel gas pipe 23 in a combustion chamber 24 to heat the interior of the thermal decomposition chamber 21 by this combustion heat.

A temperature regulating means and an oxygen concentration regulating means which are not illustrated are provided in the thermal decomposition furnace 20 to maintain the interior of the thermal decomposition chamber 21 at the first temperature, and to regulate oxygen concentration so that thermal decomposition is performed in a reducing atmosphere.

It is recommended to use a heating means and a temperature measuring means as the temperature regulating means for regulating the thermal decomposition furnace 20 at the first temperature. It is suitable to select the heating means from various kinds of heating such as convection heating, radiation heating, and the like as required or use them in combination as the heating means. For example, resistance heating by a sheathed heater, or the like may be used, or gas, heavy oil, light oil, or the like may be combusted outside the chamber. Moreover, gases emitted from the resins of the object to be treated are turned into fuel gas after being reformed, made innoxious, or neutralized, and may be reused as a heat source of the treatment apparatus of the present invention. Furthermore, it is suitable to feed the clean fuel gas, for example, obtained as described above into a gas turbine generator, convert it to electric power, and to use this electric power for the operation of the treatment apparatus, including the thermal decomposition furnace 20, of the present invention.

The use of various kinds of temperature sensors as the temperature measuring means is recommended. It is recommended that the first temperature be set so that the resins of the object to be treated are thermally decomposed and that the metals of the object to be treated are oxidized as little as possible, but it is more preferable to maintain the thermal decomposition furnace 20 on a reducing condition to eradicate production sources of dioxins at many stages as will be described later. For example, by thermally decomposing aromatic series hydrocarbon compounds containing chlorine under a reducing condition, chlorine contained in the aromatic series hydrocarbon compounds is decomposed into HCl and the like. Accordingly, the production of dioxins is suppressed.

This thermal decomposition furnace 20 thermally decomposes the object to be treated in the temperature range of about 250° C. to about 600° C., and more preferably in the range of about 400° C. to about 550° C. The first temperature may be regulated as required according to the property, structure, and the like of the object to be treated. The setting of the first temperature of the thermal decomposition furnace 20 at a relatively low temperature can prevent the vaporization of heavy metals and the like of the object to be treated, leading to more efficient separation and recovery in the reduced pressure heating furnace 50 at the subsequent stage. A load on the thermal decomposition furnace 20 is reduced, and thus its life can be lengthened, resulting in a reduction in treatment costs. Incidentally, the gaseous emission treatment system may also treat the gaseous emission from the reduced pressure heating furnace. The reduced pressure heating furnace may be used as the thermal decomposition furnace.

As the oxygen concentration regulating means, an oxygen concentration sensor which is an oxygen concentration measuring means and a carrier gas introduction system may be used. Although the thermal decomposition furnace 20 is structured separately from the reduced pressure heating furnace in the example shown in FIG. 31, the first hermetic chamber 102 of the treatment apparatus of the present invention shown in FIG. 1 and FIG. 2, for example, may be used as the thermal decomposition furnace.

As the oxygen concentration sensor, for example, a so-called zirconia sensor using zirconia (zirconium oxide) may be used, or the absorption of CO and $CO_2$, for example, may be measured by infrared spectroscopy. Besides, GC-MS may be used. It is suitable that the oxygen concentration sensor is selected from them as required or they are used in combination as the oxygen concentration sensor.

A rare gas such as Ar or the like may be used as a carrier gas. This carrier gas can not only regulate the oxygen concentration in the thermal decomposition furnace 20 but also lead gases efficiently to the gas decomposing device 30. Moreover, the oxygen concentration regulating means may serve also as a pressure regulating means.

The thermal decomposition furnace 20 is required only to thermally decompose the object to be treated under controlled oxygen concentration, and thus a rotary kiln, for example, may be used.

Figure 40:
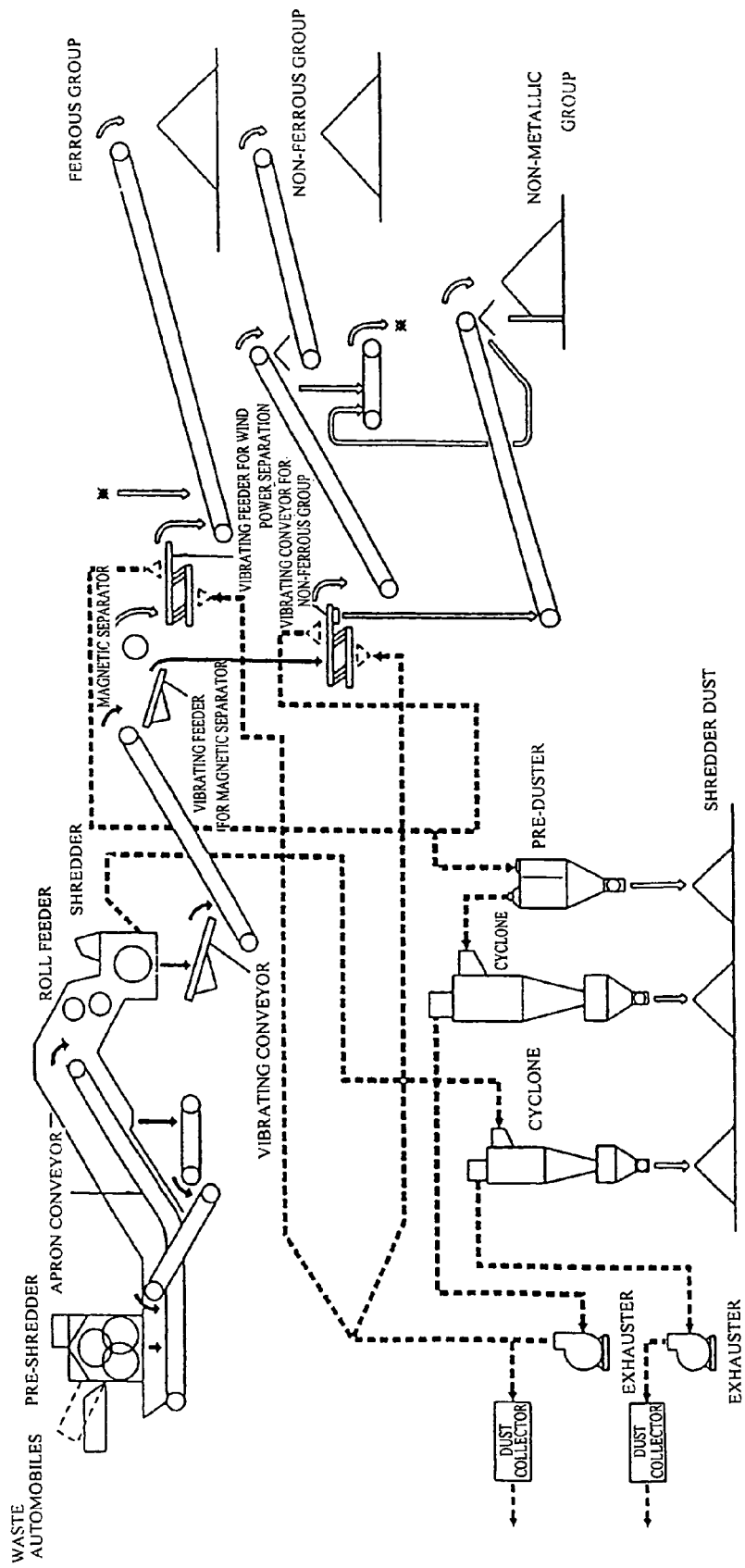
FIG. 40 is a diagram roughly and schematically showing an example of the structure of shredding equipment.

A shredder 25 may be provided at a stage prior to the thermal decomposition furnace 20 (See FIG. 40). The object to be treated brought in from the outside of the apparatus may be introduced into the thermal decomposition furnace 20 after being shredded by the shredder and segregated, or may be introduced into the thermal decomposition furnace without being shredded. When the object to be treated is a waste circuit board, it is suitable to introduce it into the thermal decomposition furnace 20 without shredding it.

It is recommended that temperature and oxygen concentration conditions in the thermal decomposition furnace 20 into which the object to be treated is introduced be regulated so that the metals in the object to be treated are oxidized as little as possible and so that chlorine which has combined with organic compounds on the occasion of thermal decomposition of the resins is made inorganic as much as possible. The temperature and oxygen concentration conditions may be set previously, or may be controlled by feeding back measured values of temperature and oxygen concentration to the heating means, the oxygen concentration regulating means, and the like. When the oxygen concentration needs to be measured, the use of a zirconia sensor or the like is recommended.

The pressure in the thermal decomposition chamber 21 of the thermal decomposition furnace 20 may be controlled. If the pressure in the thermal decomposition chamber 21 is reduced, for example, the oxygen concentration lowers, whereby the object to be treated is not abruptly oxidized by heating. A large quantity of gases produced by decomposition are generated from the resins by heating, but generally resins hardly generate oxygen even if they are decomposed. Moreover, decomposition products of the resins are easily vaporized.

Meanwhile, if the pressure is reduced, the thermal conductivity in the thermal decomposition chamber 21 lowers. But, if a non-oxidizing atmosphere is maintained in the thermal decomposition furnace 20, the object to be treated is not oxidized even under atmospheric pressure or under increased pressure. Therefore, if the non-oxidizing atmosphere is maintained in the thermal decomposition chamber 21, pressurization is possible, resulting in a rise in the thermal conductivity in the system.

The gaseous emission from the object to be treated is introduced into the gas decomposing device 30 through a pipe. In the treatment apparatus 10 illustrated in FIG. 31, a cyclone separator 29 for separating a solid emission such as dust in the gaseous emission is placed between the thermal decomposition furnace 20 and the gas decomposing device 30. This cyclone separator 29 may be provided as required.

The gas decomposing device 30 thermally decomposes or reforms the gaseous emission from the object to be treated at a second temperature higher than the first temperature, where thermal decomposition or reforming means that hydrocarbon compounds contained in the gaseous emission from the object to be treated are changed into lower-molecular hydrogen, methane, carbon monoxide, and the like. Moreover, hydroreforming or the like may be performed. It is suitable in terms of the eradication of production sources of dioxins to maintain the inside of the system on a reducing condition as described above. If a reducing atmosphere is maintained in the gas decomposing device 30, a small quantity of air may be introduced into the gas decomposing device 30. In addition to thermal decomposition, catalytic cracking by the use of a catalyst may be performed in the gas decomposing device 30. As a catalyst, a metal such as Pt or Re may be used being supported by a solid acid such as alumina silica or zeolite (aluminosilicate).

By providing the gas decomposing device 30 separately from the thermal decomposition furnace 20, the gaseous emission from the object to be treated can be treated at the second temperature higher then the first temperature, which makes it possible to effectively reform the gaseous emission and make chlorine inorganic.

It is desirable that the gas decomposing device 30 keep conditions such that dioxins which directly or indirectly originate in the object to be treated are decomposed as much as possible. A considerable amount of dioxins can be decomposed, for example, by setting the second temperature at about 800° C. Furthermore, dioxins can be decomposed more effectively by setting the second temperature at 1000° C. or higher, and more preferably at 1200° C. or higher. This gas decomposing device 30 is set at the second temperature such that dioxins are decomposed, and hence the thermal decomposition of hydrocarbon in the gaseous emission occurs simultaneously at the second temperature.

Hydrocarbon compounds contained in the gaseous emission from the object to be treated are made lower-molecular and changed into hydrogen, methane, carbon monoxide, and the like by being reformed and thermally decomposed in the gas decomposing device 30.

When dioxins are contained in the gaseous emission, most of the dioxins are decomposed. Moreover, organic chlorine is made inorganic, and the recomposition of dioxins is suppressed.

Figure 34:
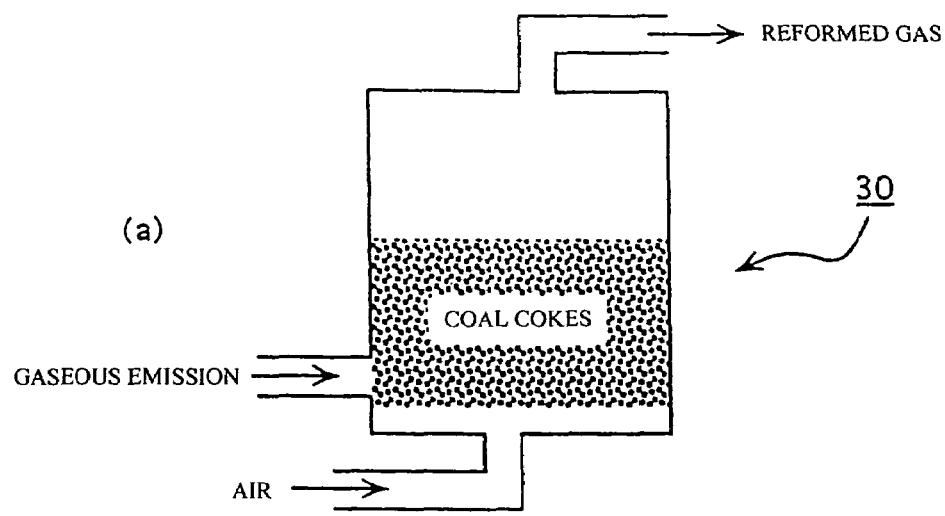
FIG. 34 is a diagram schematically showing examples of the structure of a gas decomposing device.
Figure 34:
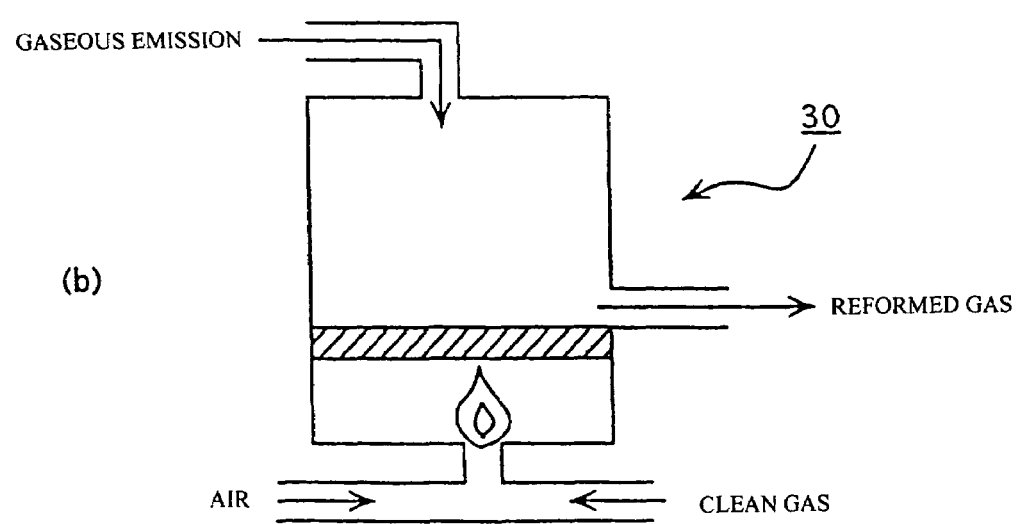

FIG. 34 schematically shows examples of the structure of the gas decomposing device 30.

The gas decomposing device illustrated in FIG. 34(a) forms such a temperature condition that the gaseous emission is thermally decomposed and reformed and that a reducing atmosphere and dioxins are decomposed by introducing the gaseous emission from the thermal decomposition furnace 20 and a small quantity of air into a chamber filled with cokes.

The gas decomposing device illustrated in FIG. 34(b) is structured to heat the chamber to such a temperature that dioxins are decomposed by combusting fuel gas and air, and introduce the gaseous emission from the thermal decomposition furnace 20 into this chamber, and thermally decompose and reform the gaseous emission.

A catalytic cracking means such as a catalyst as described above may be provided in the chamber in the gas decomposing device 30.

A temperature regulating means and an oxygen concentration measuring means for regulating the temperature and oxygen concentration in the chamber may be provided in the gas decomposing device 30 as required. As the oxygen concentration regulating means, such oxygen concentration sensor and carrier gas introduction system as described above may be used. Moreover, a hydrogen gas reservoir may be connected, or a reservoir for an inert gas such as Ar may be connected.

As described above, the gaseous emission contained in the gaseous emission from the object to be treated is made lower-molecular by the gas decomposing device 30 or a second thermal decomposition means and changed into hydrogen, methane, carbon monoxide, and the like.

The gaseous emission thermally decomposed and reformed in the gas decomposing means 30 is introduced into the cooling tower 40.

The cooling tower 40 is placed to connect with the gas decomposing device 30, and cools the gaseous emission reformed or thermally decomposed at the second temperature to a third temperature so that a rise in the concentration of dioxins in the gaseous emission is suppressed.

Namely, the concentration of dioxins in the gaseous emission reformed or thermally decomposed at the second temperature in the gas decomposing device 30 or the second thermal decomposition means is extremely low, since the second temperature is a temperature such that the dioxins are decomposed and chlorine in hydrocarbon compounds decomposed or reformed at this temperature is made inorganic by a reducing atmosphere. Accordingly, in order to prevent the production and recomposition of dioxins from this state, the gaseous emission is cooled to the third temperature so that a rise in the concentration of dioxins in the gaseous emission is suppressed as much as possible. The third temperature may be set at a temperature such that no production reaction of dioxins occurs.

The production and recomposition of dioxins can be suppressed, for example, by cooling the gaseous emission in which dioxins are already decomposed (the temperature of which is required to be higher than a temperature such that dioxins are decomposed even if it is not the same as the second temperature in the gas decomposing device 30) to 150° C. or lower, more preferably 100° C. or lower, still more preferably 50° C. or lower, and most preferably 35° C. or lower.

On this occasion, it is desirable to cool the gaseous emission to the third temperature in the possible shortest time. This is because dioxins are easily produced and recomposed in the range of about 200° C. to about 400° C., and thus the concentration of dioxins in the gaseous emission can be held down more effectively by cooling the gaseous emission to the third temperature to shorten the retention time of the gaseous emission in the temperature range in which dioxins are easily produced and recomposed as much as possible.

Therefore, it is desirable to perform cooling of the gaseous emission in the cooling tower 40 rapidly, preferably within about ten seconds.

As an example of such a cooling tower 40, it is suitable to perform contact cooling by directly jetting a refrigerant such as water or cooling oil to the gaseous emission. On this occasion, if alkaline powder such as lime powder or the like is jetted to the gaseous emission, the gaseous emission is neutralized. Moreover, HCl in the gaseous emission, for example, is spread over the surfaces of solids by touching the lime powder, which can also suppress the production and recomposition of dioxins.

Figure 35:
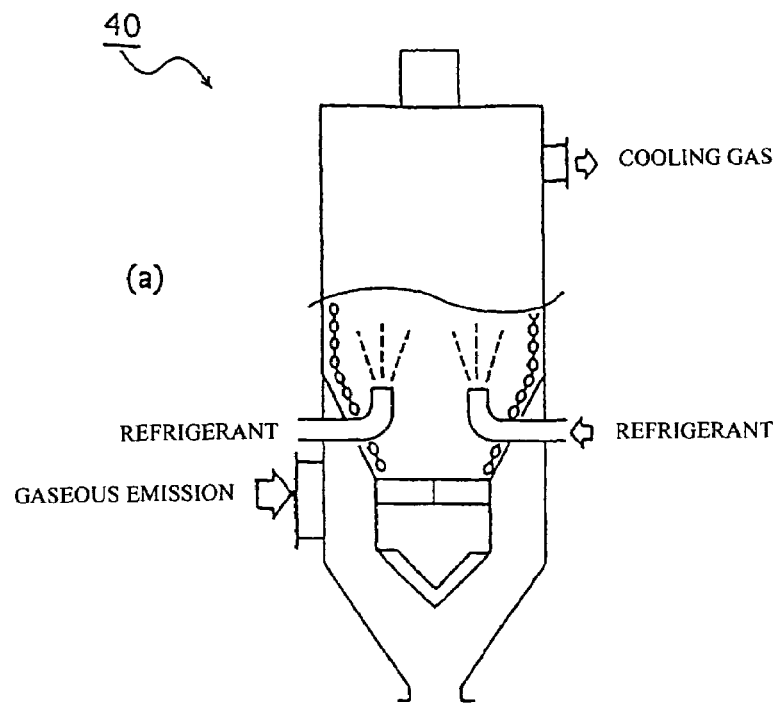
FIG. 35 is a diagram schematically showing examples of the structure of a cooling tower.
Figure 35:
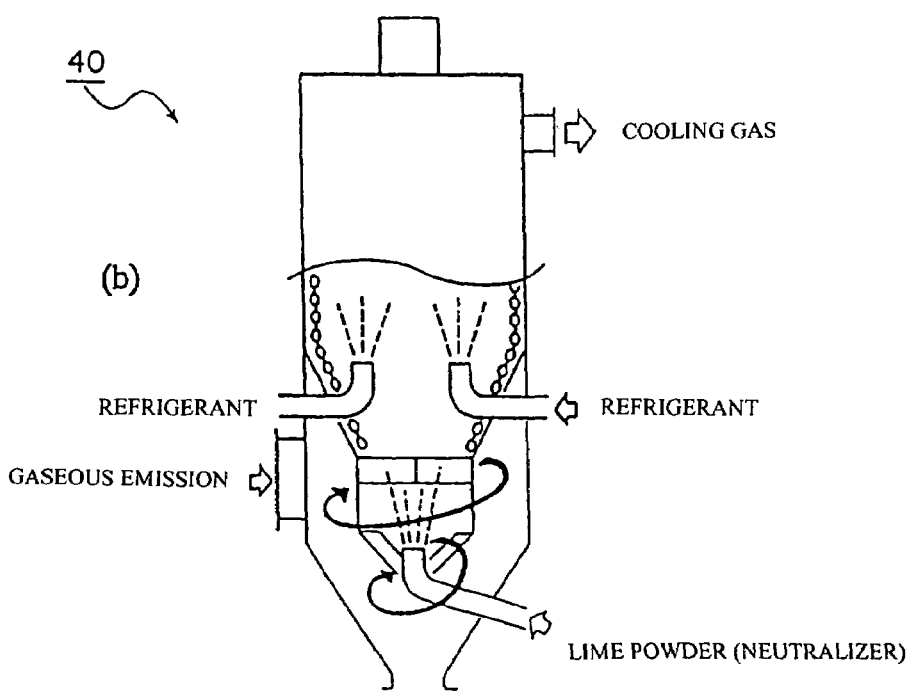

FIG. 35 schematically shows examples of the structure of the cooling tower 40.

FIG. 35(a) shows structure in which the gaseous emission introduced from the decomposing device 30 is rectified and cooled to the third temperature by directly jetting a refrigerant such as cooling water or cooling oil thereto. FIG. 35(b) shows structure in which production resources of dioxins are removed from the gaseous emission by neutralizing the gaseous emission by jetting a neutralizer such as lime powder together with a refrigerant thereto and by fixing chlorine in the gaseous emission.

In the cooling tower 40, temperature sensors not illustrated are provided in a gaseous emission introduction section and a cooling gas exhaust section, and an introduced gaseous emission cooling rate control means, for example, a refrigerant flow rate and temperature regulating means is provided, whereby the cooling rate of the gaseous emission is controlled so that the production and recomposition of dioxins are suppressed.

As described above, the gaseous emission emitted from the object to be treated in the thermal decomposition furnace 20 is changed into hydrogen, methane, carbon monoxide, and the like by being thermally decomposed or reformed at a temperature such that dioxins are decomposed in the gas decomposing device 30 and being cooled so that the production and recomposition of dioxins do not occur in the cooling tower 40, and besides the concentration of dioxins in the gaseous emission is sharply lowered.

As described above, in the treatment apparatus of the present invention, the generation of dioxins can be suppressed by treating the decomposition of the object to be treated and the decomposition of the gaseous emission from the object to be treated at plural stages in the thermal decomposition furnace 20 and the gas decomposing device 30 and by maintaining a reducing atmosphere in such decomposition means.

The concentration of dioxins in the gaseous emission could be lowered to 0.1 TEQng/Nm$^3$ to 0.5 TEQng/Nm$^3$ by setting the second temperature at 800° C. and the third temperature at 150° C.

Moreover, the concentration of dioxins in the gaseous emission could be lowered to 0.1 TEQng/Nm$^3$ or lower by setting the second temperature at 1150° C. and the third temperature at 50° C.

The gaseous emission cooled in the cooing tower 40 may be cleaned and desulfurized as required.

Furthermore, the gaseous emission cooled in the cooling tower 40 may be introduced into a neutralization reaction filter means such as a bag filter. Between the cooling tower 40 and the neutralization reaction filter means, slacked lime, filter aid (for example, particles with high voids such as zeolite or activated carbon, Teshisorb, Shirasu balloons) or the like may be blown into a current of the gaseous emission by a dry venturi or the like.

Figure 36:
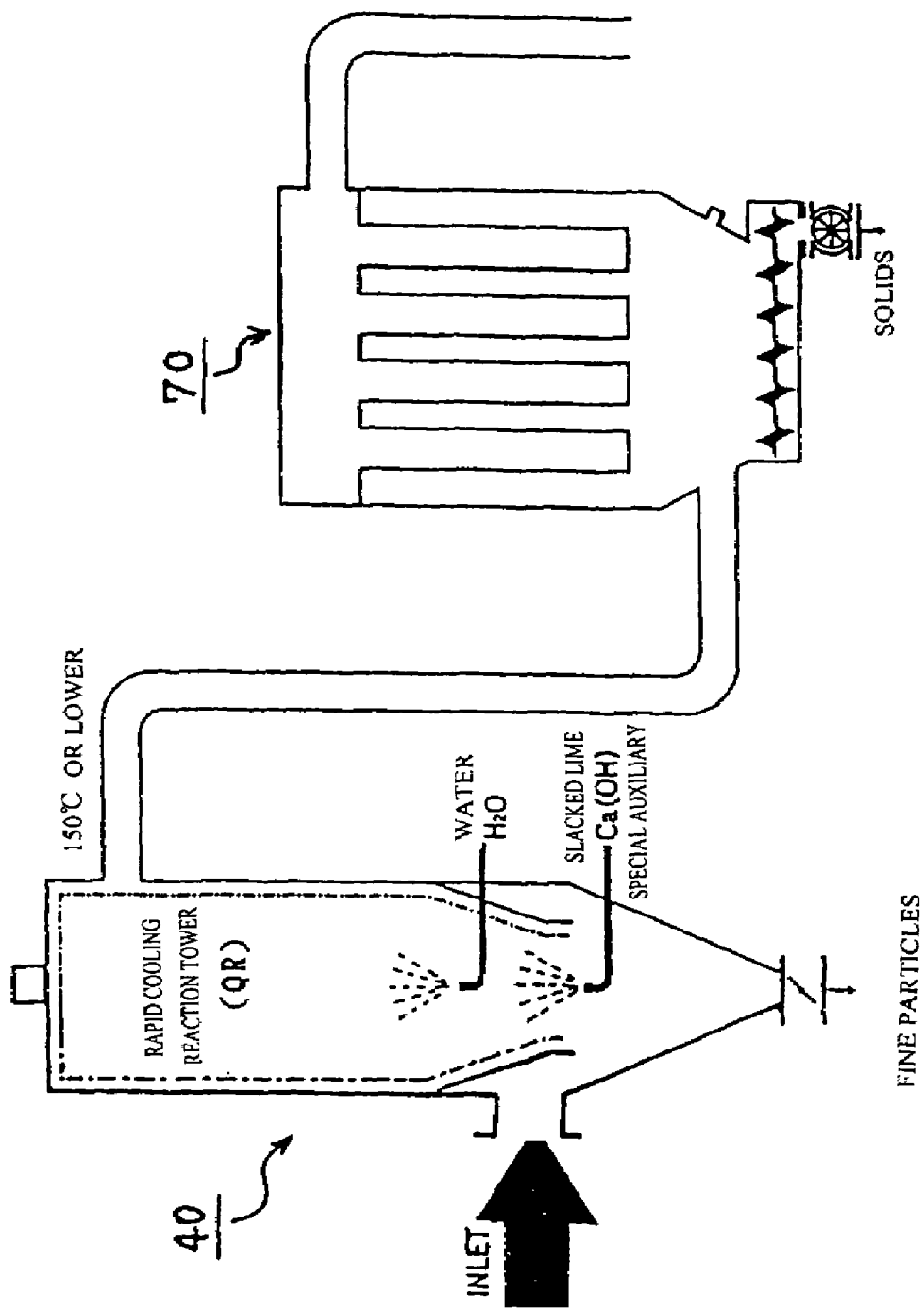
FIG. 36 is a diagram showing a part of the structure of a gaseous emission treatment system in which a bag filter is connected at a stage subsequent to the cooling tower.

FIG. 36 is a diagram showing a part of the structure of a gaseous emission treatment system in which a bag filter 70 is connected to a stage subsequent to the cooling tower 40.

A solid emission such as heavy metal fine particles condensed in the cooling tower 40 and solids let out from the bag filter 70 can be separated and recovered by being introduced into the reduced pressure heating furnace 50 and treated even when metals such as lead, tin, arsenic, and cadmium are contained in the gaseous emission.

The gaseous emission emitted from the object to be treated which has been treated as above may be used as a heat source of heating in the thermal decomposition furnace 20 or may be supplied to a gas turbine generator to obtain electric power. Moreover, this electric power may be used for a heat source of the treatment apparatus of the present invention and the like.

Meanwhile, a thermally decomposed residue of the object to be treated which has emitted the gaseous emission in the thermal decomposition furnace 20 is introduced into the pressure reduced heating furnace 50. Since most of organic components of the object to be treated are decomposed in the thermal decomposition furnace 20 which is the first thermal decomposition means, the thermally decomposed residue is mainly composed of metals and carbides or glass.

The reduced pressure heating furnace 50 for separating and recovering metals from this thermally decomposed residue which is the object to be treated is composed of a purge chamber 51, a first hermetic chamber 52, and a cooling chamber 53, and the respective chambers are partitioned by openable and closeable partitions 54. The thermal decomposition furnace 20 and the first hermetic chamber of the reduced pressure heating furnace 50 may be connected via the purge chamber 51.

In the reduced pressure heating furnace 50 of the treatment apparatus illustrated in FIG. 31, the object to be treated is introduced to the purge chamber 51 after a partition 54a is opened. The partition 54a is closed and the purge chamber 51 is roughly evacuated by an exhaust system not illustrated, and thereafter a partition 54b is opened, and the object to be treated is moved to the first hermetic chamber 52.

The partition 54b is closed, and the pressure and temperature in the first hermetic chamber 52 are controlled so that a metal in the object to be treated is vaporized under reduced pressure. The metal vaporized from the object to be treated is condensed and recovered in the recovery chamber 60. The structure of this recovery chamber may be similar to that illustrated in FIG. 8, FIG. 9, FIG. 10, FIG. 11, and FIG. 12, for example. The numeral 55 denotes an exhaust system. Exhaust gas from an exhaust gas treatment system of the thermal decomposition furnace 50 may be introduced to the decomposing device 30.

After a desired metal is vaporized, a partition 54c between the hermetic chamber and the cooling chamber 53 in which the pressure is reduced by an exhaust system not illustrated is opened, and the object to be treated is moved to the cooling chamber 53.

The partition 54c is closed, and the object to be treated is cooled. When the object to be treated gets into a stable state even in the atmosphere, the cooling chamber 53 is made to leak, a partition 54d is opened, and the object to be treated is taken out.

The contents of the object to be treated are composed of carbides and metals not vaporized, and these metals can be easily separated from the carbides.

As described above, according to the present invention, the object to be treated having resins and metals can be recycled to a high level, and moreover, the generation of dioxins can be prevented.

Example 18

Figure 37:
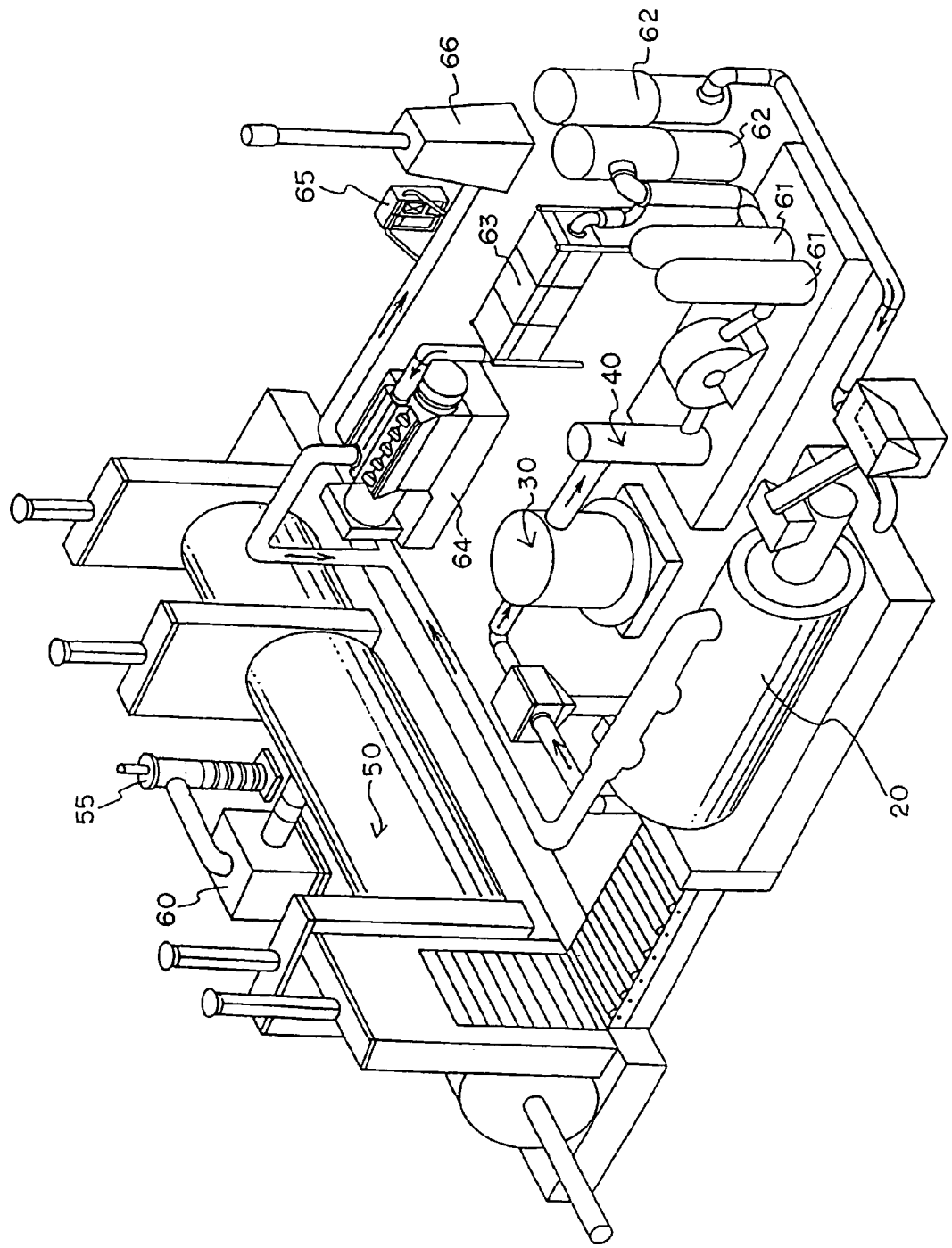
FIG. 37 is a diagram roughly showing another example of the treatment apparatus of the present invention.

FIG. 37 is a diagram roughly showing another example of the treatment apparatus of the present invention.

Figure 38:
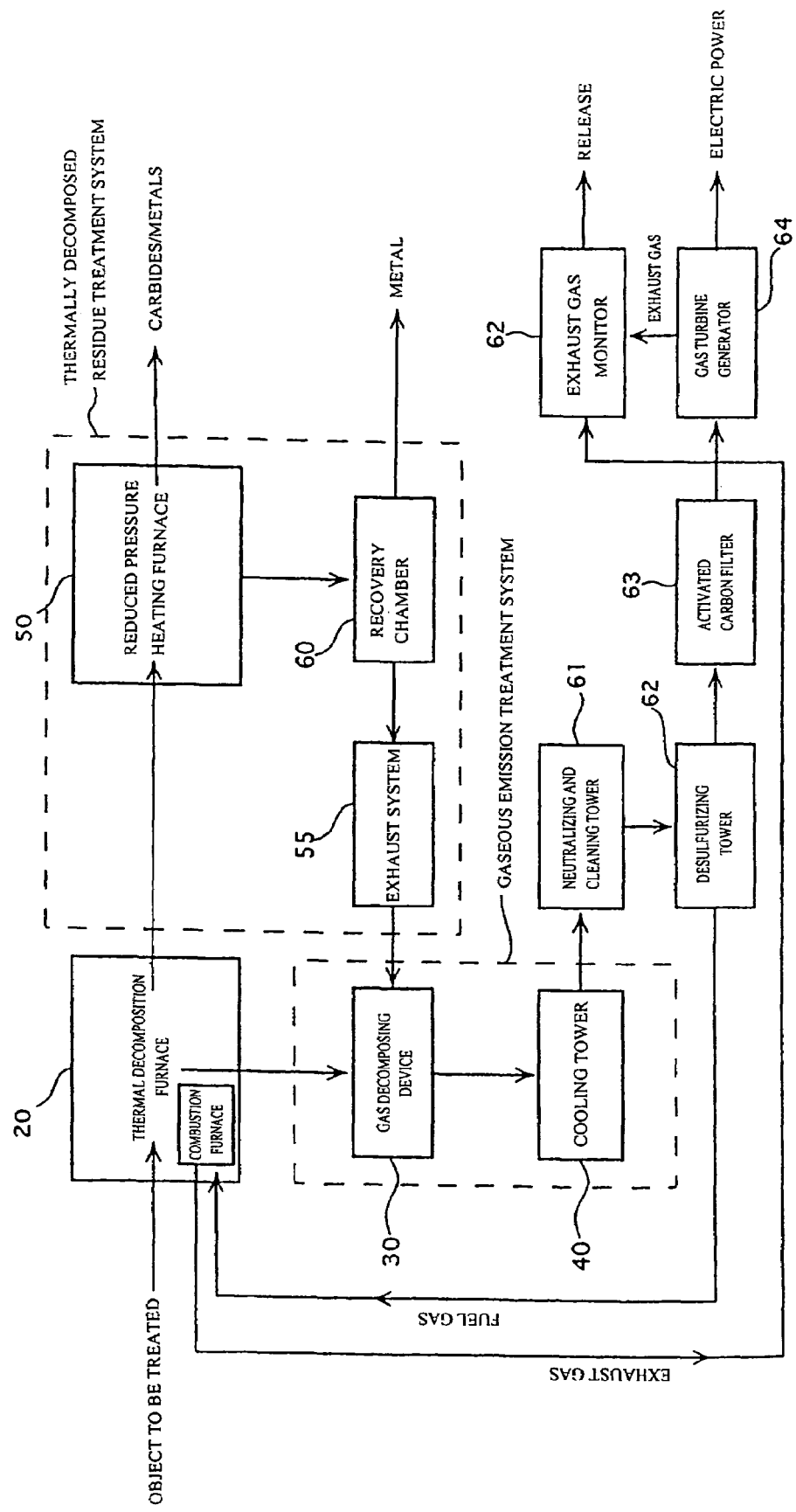
FIG. 38 is a diagram schematically showing the structure of the treatment apparatus of the present invention illustrated in FIG. 37.

FIG. 38 is a diagram schematically showing the structure of the treatment apparatus of the present invention illustrated in FIG. 37. In this treatment apparatus, acidic constituents in the gaseous emission cooled in the cooling tower 40 are neutralized in the neutralizing and cleaning tower 61 and desulfurized in a desulfurizing tower 62 so as to be utilized as clean fuel gas. This fuel gas is sent to a combustion chamber 23 of the thermal decomposition furnace 20 and used as heating fuel for the thermal decomposition furnace, or filtered by an activated carbon filter 63 and then sent to a gas turbine generator 64 to be converted into electric power. Exhaust gas resulting from the heating of the thermal decomposition furnace 20 and exhaust gas from the gas turbine generator 64 are released into the atmosphere from a chimney 66 after components and concentration are monitored by a GC-MS or the like and safety is confirmed.

The adoption of such structure enables the treatment apparatus of the present invention to treat the object to be treated more efficiently.

The running cost of the apparatus can be kept down to a low level, for example, by neutralizing and cleaning the gaseous emission which is made innoxious and utilizing it as clean fuel gas for the heating of the thermal decomposition furnace, and in addition by operating the reduced pressure heating furnace by electric power obtained by the gas generator or selling the electric power.

The first temperature in the first thermal decomposition means is as low as 600° C. or lower, and thus the life of the thermal decomposition furnace is long, leading to easy maintenance.

Figure 39:
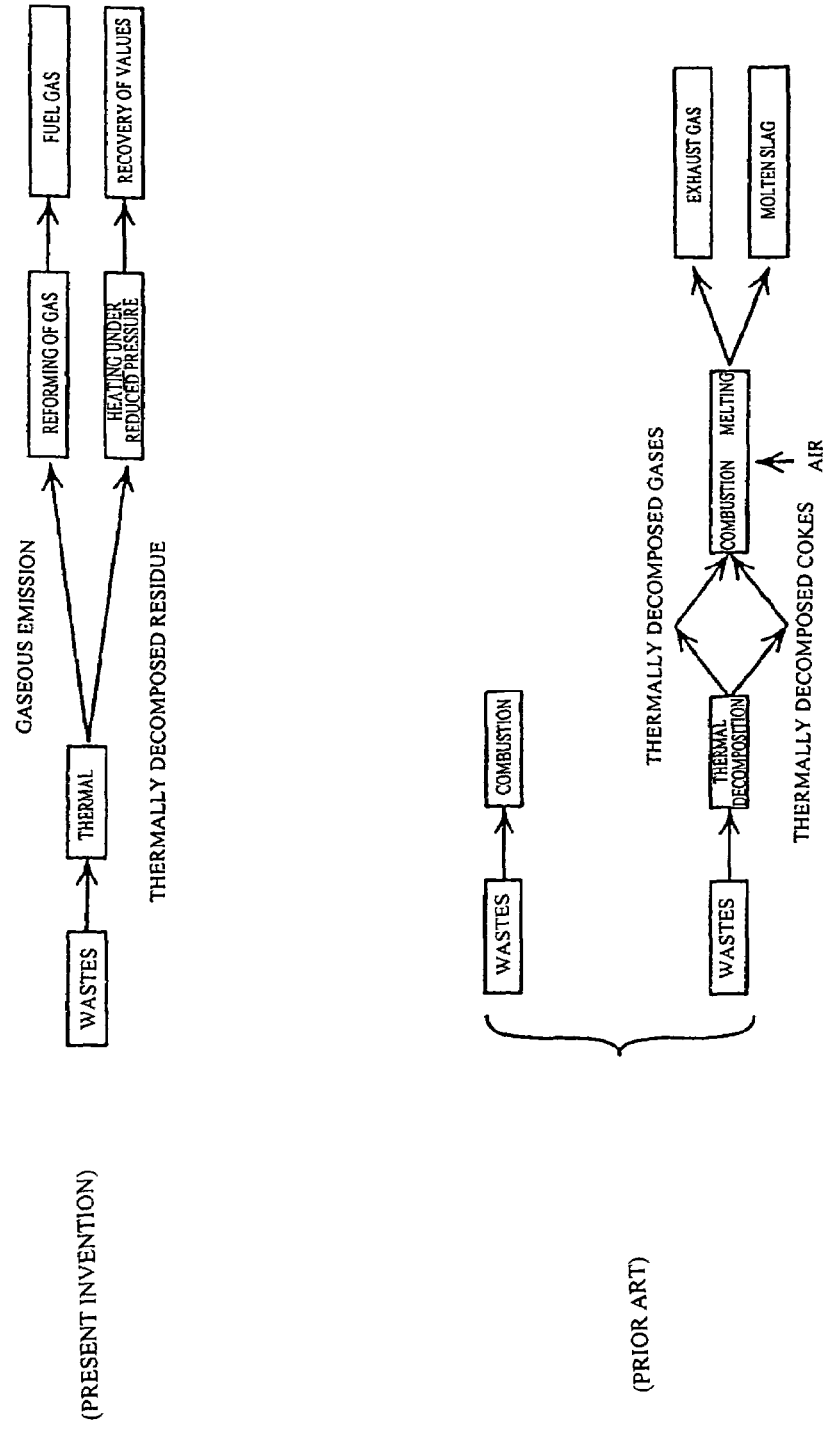
FIG. 39 is a diagram schematically showing an example in which a treatment method of the present invention is applied to wastes treatment.

FIG. 39 is a diagram showing an example in which a treatment method of the present invention is applied to wastes treatment. Namely, wastes are thermally decomposed, a gaseous emission from the wastes is turned into clean fuel gas by the gaseous emission treatment system, and a thermally decomposed residue is introduced to the reduced pressure heating furnace and can be recovered as heavy metals, useful metals, activated carbon, and the like.

FIG. 40 is a diagram schematically showing an example of the structure of shredding equipment which can be provided at a stage prior to the treatment apparatus of the present invention. Shredding equipment for treating waste automobiles is illustrated here.

Waste automobiles are shredded by a shredder and classified into a ferrous group, a non-ferrous group, a non-metallic group, and the like by magnetism, wind force, or the like. Such classified residues are shredder dust. The shredder dust includes various kinds of metals including resins (including fiber and paper), glass, and heavy metals. By adopting the aforesaid structure, such shredder dust for which the treatment technology has not been hitherto established can be also treated safely and efficiently in the present invention.

Shredder dust is thrown into the thermal decomposition furnace 20 and thermally decomposed at 400° C. to 500° C., and a gaseous emission emitted from resin components, organic components, or the like of the shredder dust is led to the gas decomposing device 30 and thermally decomposed at the second temperature of 1100° C. or higher (more preferably, 1150° C. or higher) so as to decompose noxious substances such as dioxins and make them innoxious. Immediately after this, it is rapidly cooled within ten seconds in the cooling tower 40 in which the third temperature is set at 100° C. or lower (more preferably, 50° C. or lower), whereby the production of dioxins can be suppressed to 0.1 TEQng/Nm$^3$ or lower. Clean fuel gas can be obtained by removing cyanides, sulfides, nitrides, and the like from the gaseous emission from the object to be treated which is treated as above by the gas cleaning (neutralizing) device and the desulfurizing device.

This fuel gas is utilized as a heating source for the thermal decomposition furnace 20, and converted into electric power by electric power generation by the gas turbine generator to thereby operate the reduced pressure heating furnace 50.

A thermally decomposed residue of the object to be treated is introduced to the reduced pressure heating furnace 50 and heated under a reduced pressure of $10^{-1}$ Torr to $10^{-3}$ Torr, whereby metals such as Pb, Sb, As, Cd, Sn, and Zn can be separated and recovered at a yield of 99% or more. Pb, Sb, As, Cd, Sn, and Zn in the object to be treated which has been treated in the reduced pressure heating furnace 50 can be reduced to the level of 0.1 ppm.

A ferrous group remaining in the object to be treated which has been treated in the reduced pressure heating furnace 50 is separated and recovered by gravity concentration, an electric magnet, and the like, and finally innoxious and high-purity carbides can be obtained. These carbides may be used in the activated carbon filter 63, or may be utilized for an effective soil conditioner and the like.

As described above, according to the present invention, household electrical products, automobiles, precision equipment, and the like, or shredder dust of these wastes are thermally decomposed while oxygen concentration is controlled, and treated in the gaseous emission treatment system and the thermally decomposed resin treatment system, whereby the gaseous emission can be turned into clean fuel gas by noxious substances such as dioxins therein being decomposed and made innoxious. This fuel gas can be led to the combustion chamber of the thermal decomposition furnace or the like and used as a heating source. Besides, it is possible to generate electricity by using this fuel gas. Compared with a hydroelectric power generation method which has difficulty in supplying electric power constantly since water is in short supply in the dry season, shredder dust is abundant and inexpensive resources, and it is possible to generate electricity very efficiently by the use of the treatment apparatus of the present invention. Moreover, the treatment apparatus of the present invention has module structure, and hence can cope with an extensive scale from a small scale to a large scale and various uses.

Meanwhile, from the thermally decomposed residue, various kinds of metals can be separated and recovered in a high-purity metallic state by heating under vacuum. Carbides also can be utilized effectively since heavy metals are removed therefrom. Compared with a melting furnace, the reduced pressure heating furnace is smaller in size, whereby installation costs and installation space can be decreased, which makes it possible to efficiently cope with wastes treatment on a municipal scale.

As described above, reusable substances can be recovered in a high-purity state from a large quantity of wastes, which contain noxious substances or source materials thereof and produce noxious substances including dioxins if combusted, without releasing noxious substances, heavy metals, and the like into the environment.

Furthermore, according to the treatment apparatus and the treatment method of the present invention, circuit boards and various kinds of electronic parts such as ICs, resistors, capacitors, and the like can be easily separated from waste mounting substrates and the like, and simultaneously solder alloys and the like can be separated and recovered.

First, a mounting substrate is introduced to the thermal decomposition furnace 20 without being shredded, and then thermally decomposed after the first temperature is set at 250° C. to 500° C. On this occasion, the pressure in the thermal decomposition furnace may be reduced. In order to suppress the generation of noxious substances such as dioxins, a gaseous emission produced by the thermal decomposition of the mounting substrate is led to the gas decomposing device 30 and decomposed by heating at 800° C. or higher, and thereafter cooled to 100° C. or lower in the cooling tower 40. A thermally decomposed residue is introduced to the reduced pressure heating furnace 50, and component metals of a solder alloy are vaporized by reducing the pressure to about $10^{-3}$ and increasing the temperature to 350° C. to 700° C. successively. Accordingly, a circuit board and various kinds of electronic parts such as an IC, a resistor, and a capacitor are separated, and concurrently metals such as vaporized lead and the like can be recovered by a cohering means provided midway in a recovery route.

The electronic parts and the circuit board can be separated almost completely by such a method. Moreover, low-melting metals such as noxious Pb can be removed almost completely (the level of 0.1 ppm). The concentration of noxious substances in a gaseous emission generated from resinous portions is extremely low, and the concentration of dioxins, for example, can be lowered to the range of 0.1 TEQng/Nm$^3$ to 0.5 TEQng/Nm$^3$. The circuit board, from which the electronic parts are dismounted and bonding metals are removed, is carbonized and gets into a state in which copper for wiring is contained. Noxious metals such as Pb and Sb are removed from the various electronic parts such as an IC, a resistor, and a capacitor, and the resinous portions such as a mold resin are carbonized and get into a state in which a part of them contain metals such as Si, Au, Ni, W, and Mo.

Subsequently, the circuit board carbonized and containing copper is further heated (1050° C. to 1200° C.) in the reduced pressure heating furnace 50, and copper foil is half melted to cohere into a spherical shape of five or six millimeters.

The performance of such treatment facilitates the separation and recovery of copper from carbides. This circuit board composed of carbides and metallic copper is cleaned by a calcium carbonate aqueous solution or the like, and thereby high-purity copper can be recovered.

As described above, according to the present invention, from a waste mounting substrate, the circuit board and various kinds of electronic parts can be easily separated without emitting noxious substances and with noxious substances being removed, and without manpower. At the same time, various kinds of metals including component metals of the solder alloy can be separated and recovered by vaporizing them. Moreover, metals not vaporized such as copper can be recovered at high purity. According to the present invention, reusable substances can be recovered in a high-purity state from wastes such as mounting substrates, for which the effective treatment technology has not been hitherto established, without releasing noxious substances, heavy metals, and the like into the environment.

Example 19

Figure 41:
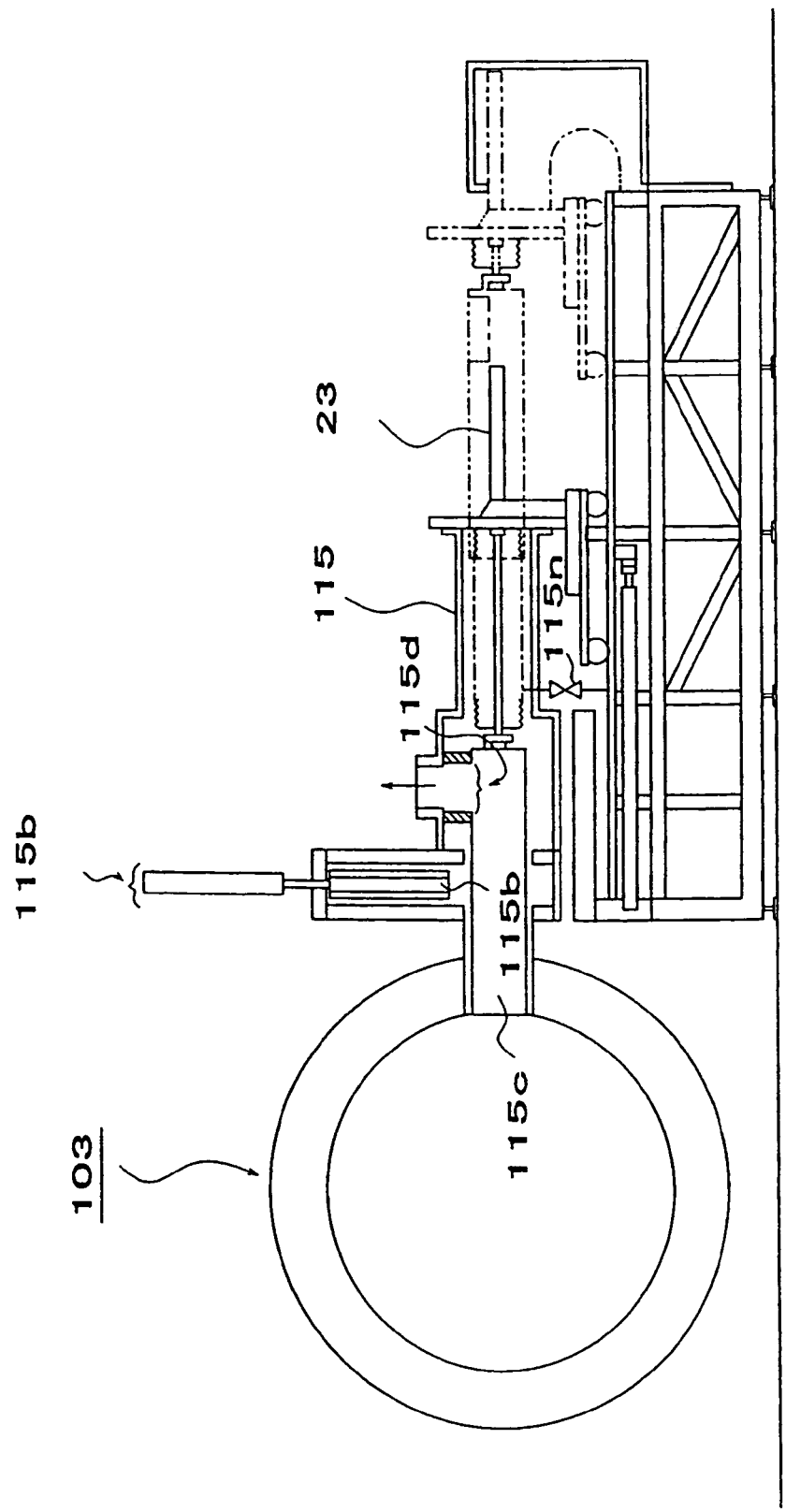
FIG. 41, FIG. 42, FIG. 43, FIG. 44, and FIG. 45 are diagrams roughly showing the structure of the treatment apparatus of the present invention.

FIG. 41 is a diagram showing another example of the treatment apparatus of the present invention. In this example, the retort 115c is connected directly to the exhaust system through the third opening 115d. A space between the third opening 115d and the exhaust system is hermetically sealed by packing 115p. The packing may be made of asbestos, for example. A pipe for connecting the third opening 115d and the exhaust system when the retort is inserted into the first opening may be provided in place of the packing. The adoption of such structure can prevent a gaseous emission from the object to be treated from entering a space between the retort 115c and the recovery chamber 115. This is because the pressure in the second hermetic chamber 103 is lower than the pressure inside the space between the retort 115c and the recovery chamber 115.

Further, it is suitable to provide a carrier gas introduction system 115n and supply an inert carrier gas such as nitrogen gas to the space between the retort 115c and the recovery chamber 115. This carrier gas is introduced to the retort 115c through the second hermetic chamber 103, and led to the exhaust system through the third opening 115d of the retort. Thus, the space between the retort 115c and the recovery chamber 115 is sealed off from the second hermetic chamber 103 by pressure. Since the space between the retort 115c and the recovery chamber 115 communicates with a space in which the hermetic door 115b is housed when being open, vaporized substances from the object to be treated can be prevented from condensing at the hermetic door, and particularly at seal portions 115q thereof. Moreover, a fitting margin of the retort 115c and a sleeve 103s increases by adopting the aforesaid structure, which can prevent the retort 115c and the sleeve 103s from being locked by engagement, and also can downsize a driving means of the retort 115c such as the cylinder 23 or make it unnecessary.

Figure 42:
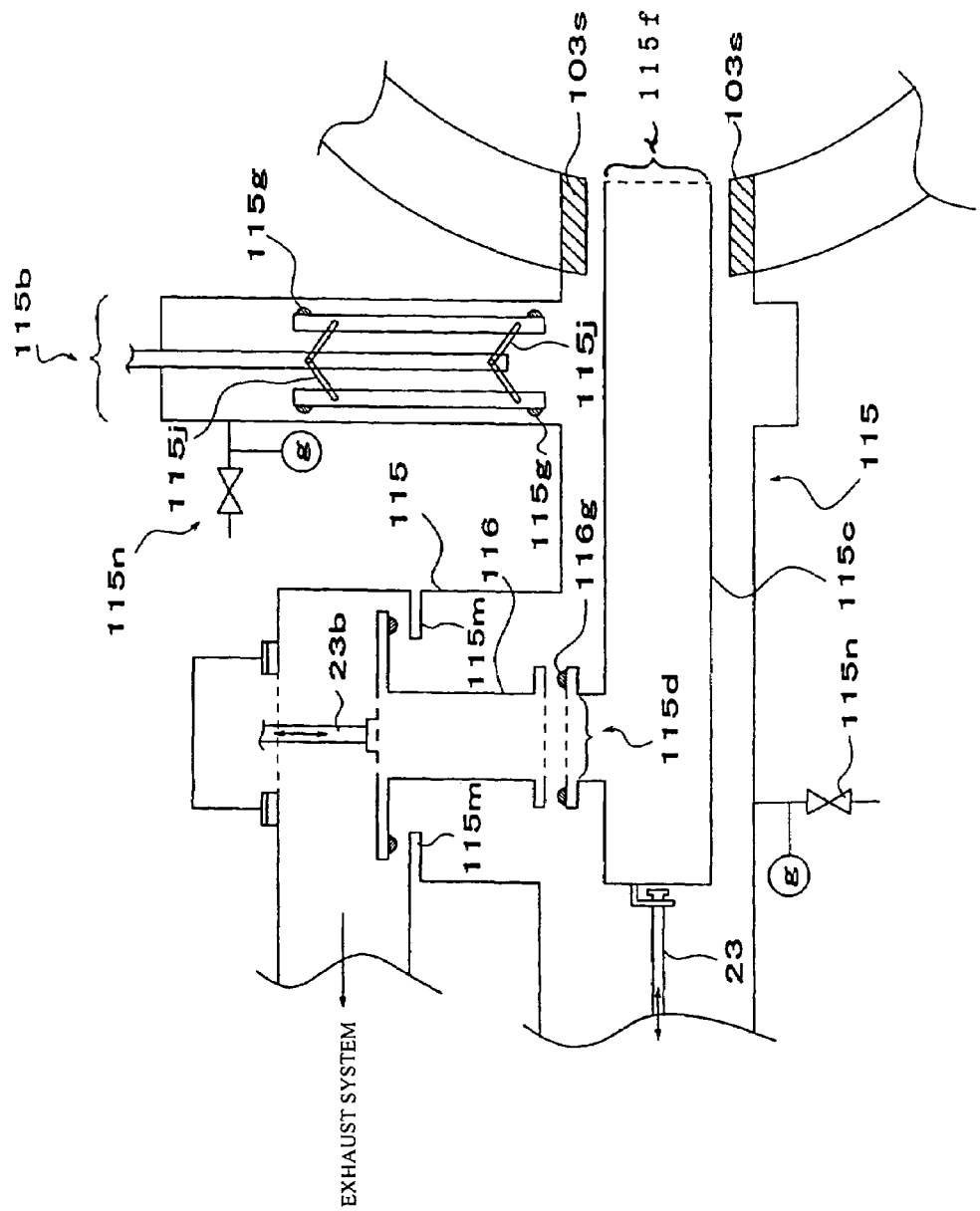

FIG. 42 is a diagram showing another example of the structure of the treatment apparatus of the present invention. In this example, the third opening 115d of the retort 115c is connected to the exhaust system through a pipe 116. This pipe 116 opens and closes the connection of the exhaust system and the retort by moving up and down. Moreover, the pipe 116 and seal faces 115m of the recovery chamber, and the pipe 116 and the third opening 115d of the retort 115c are both hermetically connected by the elastic deformation of packing 116q. When the retort 115c is inserted into the first opening 103b, the third opening 115d of the retort and the exhaust system are hermetically connected by the pipe 116. When the retort is pulled out and the hermetic door 115b is closed, the pipe 116 is moved to a waiting position by a cylinder 23b.

Incidentally, in this example, the carrier gas introduction system 115n includes a pressure gauge g for detecting the pressure in the space between the retort 115c and the recovery chamber 115, and controls the flow rate of a carrier gas by opening and closing a valve according to the detected pressure. For example, it is recommended that the pressure in the second hermetic chamber 103 be detected, and that such regulation that the pressure in the space between the retort 115c and the recovery chamber 115 is slightly higher than the above pressure be performed. By doing this, the gaseous emission from the object to be treated can be led into the retort even if there is a clearance between the retort 115c and the sleeve 103s.

Furthermore, in this example, the hermetic door 115b adopts double structure. This hermetic door 115b is opened and closed by a cylinder. Joints 115 change the force of the cylinder when the door is closed almost perpendicularly to the pushing direction of the cylinder. By adopting such structure, packing 115q are pushed against the recovery chamber more firmly. It is desirable to cool an area on which the packing 115q of the hermetic door of the recovery chamber 115 by water cooling or the like.

Figure 43:
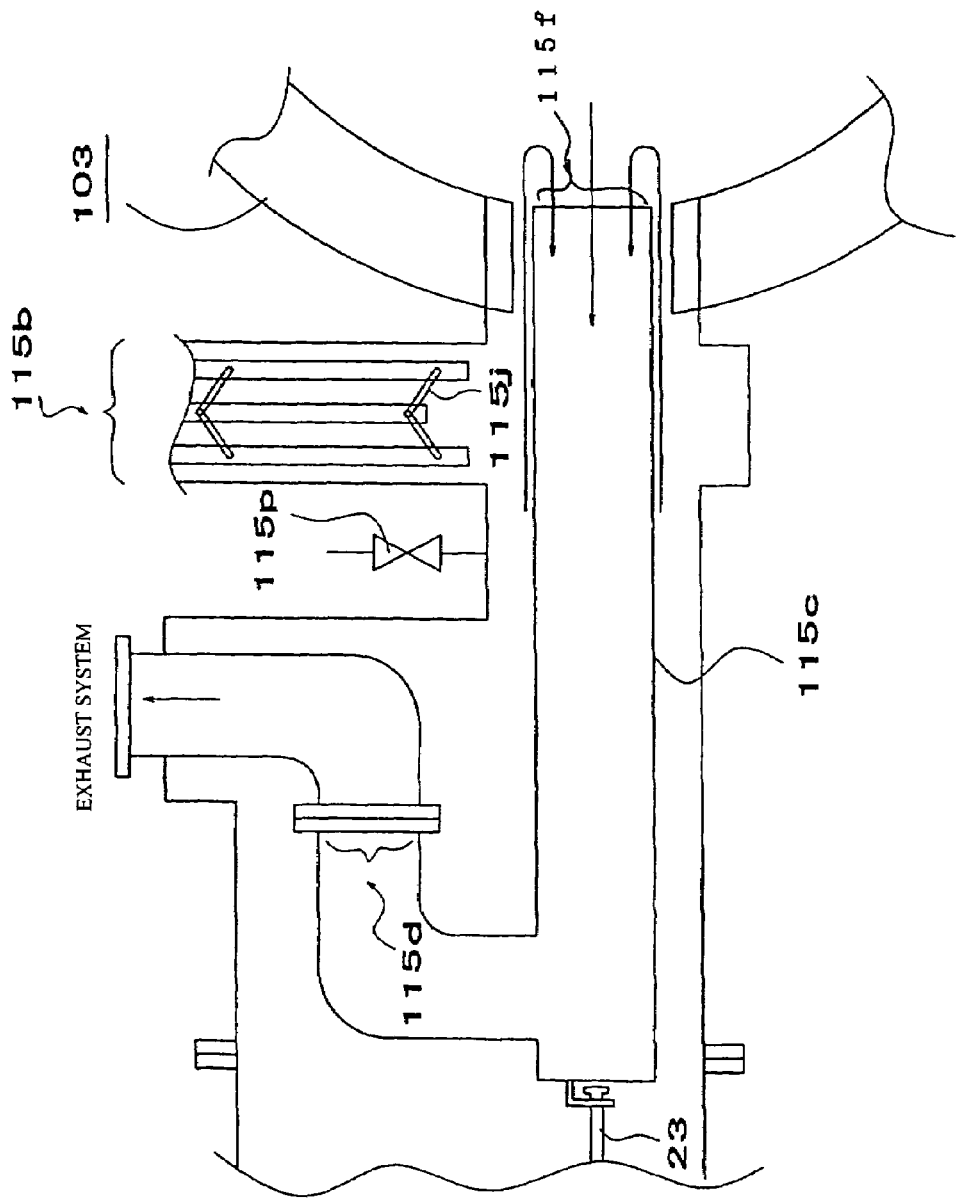
Figure 44:
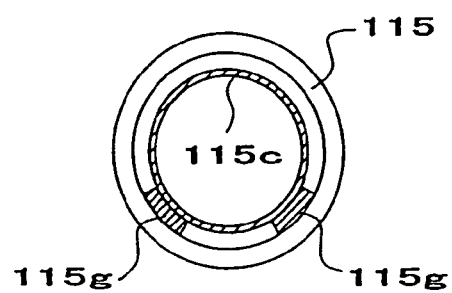
Figure 45:
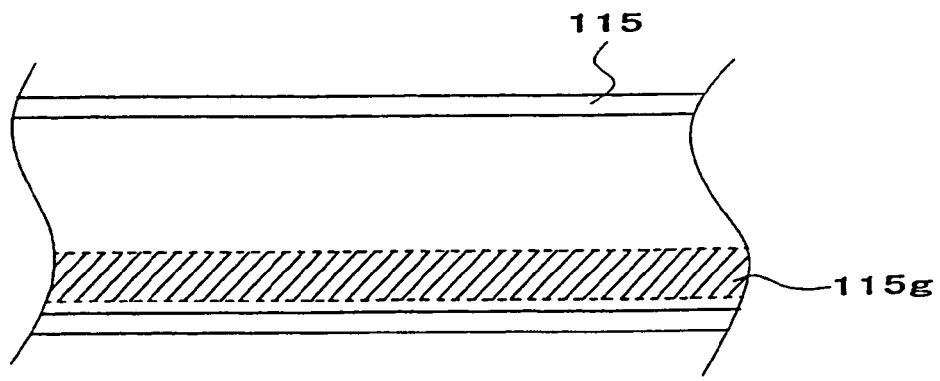

FIG. 43 is a diagram showing another example of the treatment apparatus of the present invention. In this example, an open face of the third opening 115d of the retort 115b and the second open face 115f are arranged suitably, whereby the inserting operation of the retort 115c and the connecting operation of the retort 115c and the exhaust system can be performed simultaneously. Wire gauze, a dry filter, or the like may be placed in the aforesaid retort 115c so as to facilitate the condensation of vaporized substances from the object to be treated. Such a dry filter may be made of the same material as that of a condensate. For example, when zinc is vaporized from a zinc steel plate, post-treatment after recovery is facilitated if the dry filter and the retort itself are made of zinc. FIG. 44 and FIG. 45 are diagrams for explaining an example of a guide mechanism for guiding the forward and backward movement of the retort 115. FIG. 44 shows a sectional view of the retort 115c in a direction parallel to the second opening 115f, and FIG. 45 shows a sectional view thereof in a direction parallel to the direction of the forward and backward movement of the retort. In this example, guide rolls 115g are provided along the direction of the forward and backward movement of the retort on the inner surface of the recovery chamber 115. Such a guide mechanism can make the forward and backward movement of the retort more certain. Moreover, this guide roll is made of metal, and takes charge of a part of heat conduction of the retort 115c and the recovery chamber 115. Thereby, the temperature of the retort can be regulated more effectively.

Figure 46:
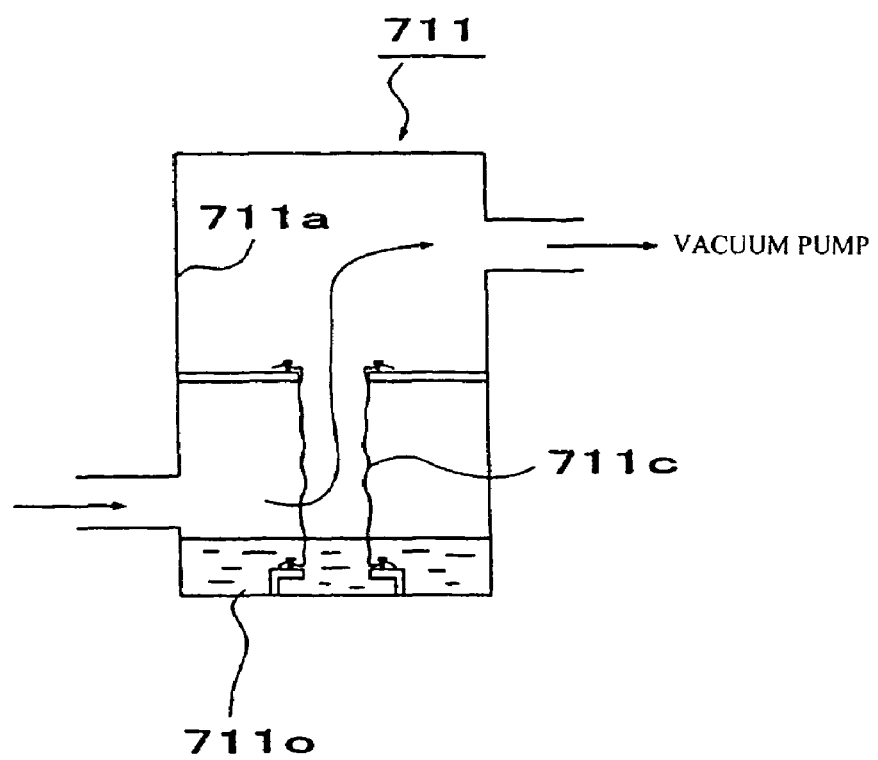
FIG. 46 is a diagram roughly showing an example of the structure of a wet filter.

FIG. 46 is a diagram showing the sectional structure of a wet filter provided in the treatment apparatus of the present invention.

In an oil film filter 711, oil 711o for a vacuum pump with small vapor pressure collects inside a casing 711a, and a lower portion of a cloth 711c the upper and lower openings of which are hermetically fixed to the casing 711a is immersed in this oil 711o. The oil forms a film along the surface of the cloth 711c by capillarity. Dust which has not been trapped by the recovery chamber 115 and other filter means is trapped by the oil film of this cloth 711c.

In the treatment apparatus of the present invention, it is desirable to provide such an oil film filter 711 between the aforesaid recovery chamber 115 and exhaust system. This is because vaporized substances which have not been condensed in the retort 115 and the like and fine particles once condensed are prevented from reaching the exhaust system. Thus, the exhaust capability of the vacuum pump can be maintained. In addition, the life of the vacuum pump and a period of time to the next maintenance can be lengthened.

Example 20

Applying the present invention, treatment of shredder dust is performed. Automobile shredder dust is prepared as a sample. This sample is composed of the following six types of fractions. Incidentally, as for the automobile, MINICA (manufactured by Mitsubishi Motors Corporation) is used.

(1) vinyl chloride (10 wt %)
(2) polypropylene (10 wt %)
(3) polyurethane (10 wt %)
(4) rubber (10 wt %)
(5) polyurethane (10 wt %)
(6) others (50 wt %)

The fraction (6) is press-treated.

Such shredder dust is treated by thermal decomposition under normal pressure (600° C. and 800° C.) and thermal decomposition under reduced pressure (600° C. and 800° C.), and the concentration of dioxins contained in the thermally decomposed residue thereof is measured.

Figure 47:
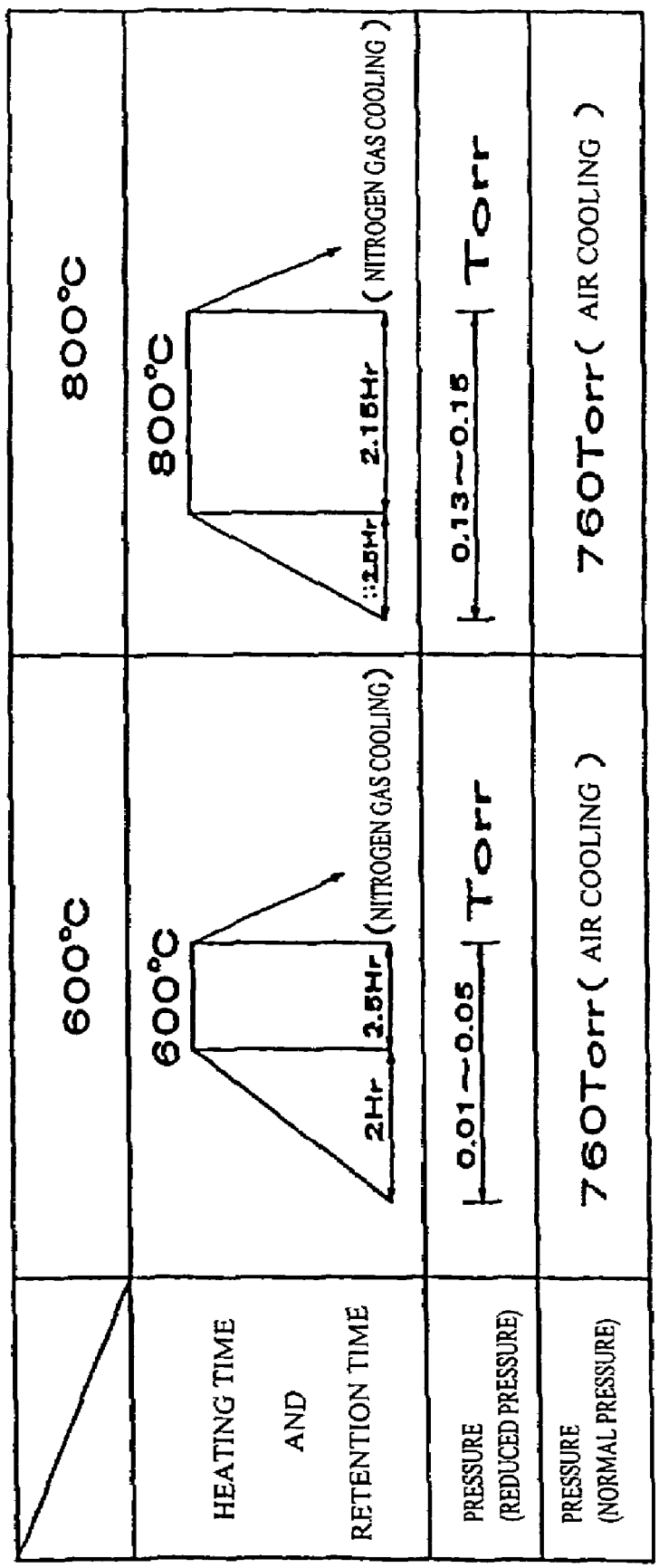
FIG. 47 is a chart for explaining treatment conditions for the object to be treated.

FIG. 47 is a chart for explaining treatment conditions for thermal decomposition. In the case of 600° C., the shredder dust rises in temperature from normal temperature to 600° C. in two hours, and is cooled after being maintained at 600° C. for two hours and a half. In the case of 800° C., the shredder dust rises in temperature from normal temperature to 800° C. in two hours and a half, and is cooled after being maintained at that temperature for two hours and a quarter.

In the case of cooling in the thermal decomposition under reduced pressure, purge under reduced pressure of the present invention is applied, while in the case of cooling in the thermal decomposition under normal pressure, air cooling is performed without the present invention being applied. A thermally decomposed residue resulting from the thermal decomposition under normal pressure at 800° C. in which dioxins remain, is thermally decomposed further at 800° C. under reduced pressure, and the concentration of dioxins contained in the thermally decomposed residue is measured (the fraction of 800° C. thermal decomposition B in FIG. 48).

FIG. 48 shows the measurement results thereof. PCDDs and PCDFs are measured separately, and the sum of them is dioxin concentration (ng/g). Moreover, n.d. (not detected) in FIG. 48 shows that no dioxin is detected.

As shown above, dioxins in the heated residue can be extremely reduced according to the present invention. Especially, in the thermal decomposition under normal pressure, dioxins still remain even after treatment at 800° C., but dioxins can be removed if this residue is retreated under reduced pressure. Although the treatment example in which the shredder dust is used as the object to be treated is explained above, the same result can be obtained also in the case of soil, burned ashes, sludge, and the like. The present invention, as wastes treatment equipment, may be a manual system suitable for treatment in small quantities for general factories or a continuous treatment furnace suitable for treatment in bulk quantities for a self-governing body and the like, and combination is possible depending on treatment costs.

Incidentally, in the present invention, heavy metals such as lead, cadmium, mercury, zinc contained in soil can be separated from the soil by vaporizing them under reduced pressure. The separation and recovery of these heavy metals from the object to be treated can be performed by the aforesaid treatment apparatus of the present invention. The concentrations of phosphorus and cyanogen in the soil also can be lowered to values not more than the environmental standard values.

Example 21

Figure 49:
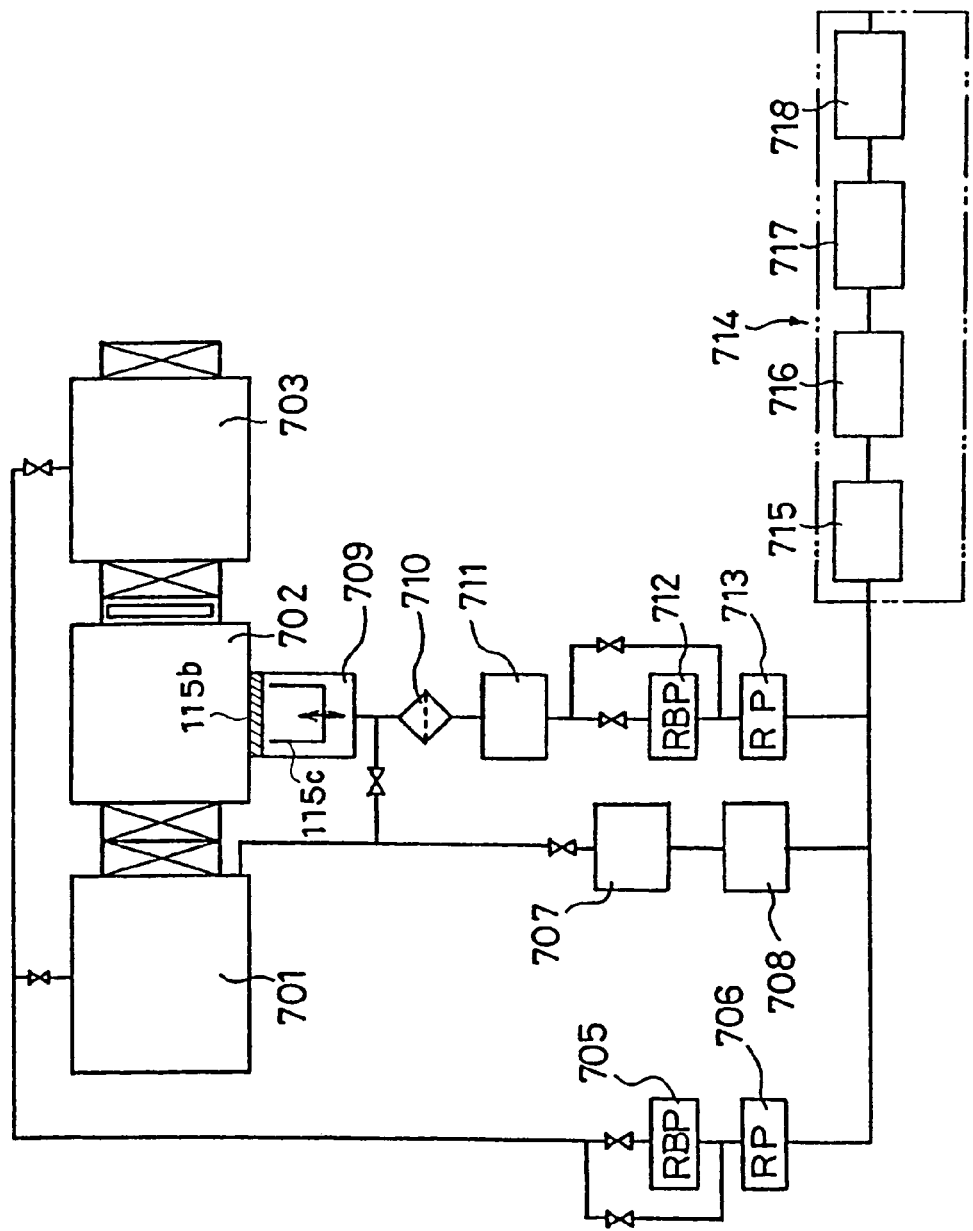
FIGS. 49, 50, and 51 are diagrams roughly showing examples of the structure of the treatment apparatus of the present invention.
Figure 50:
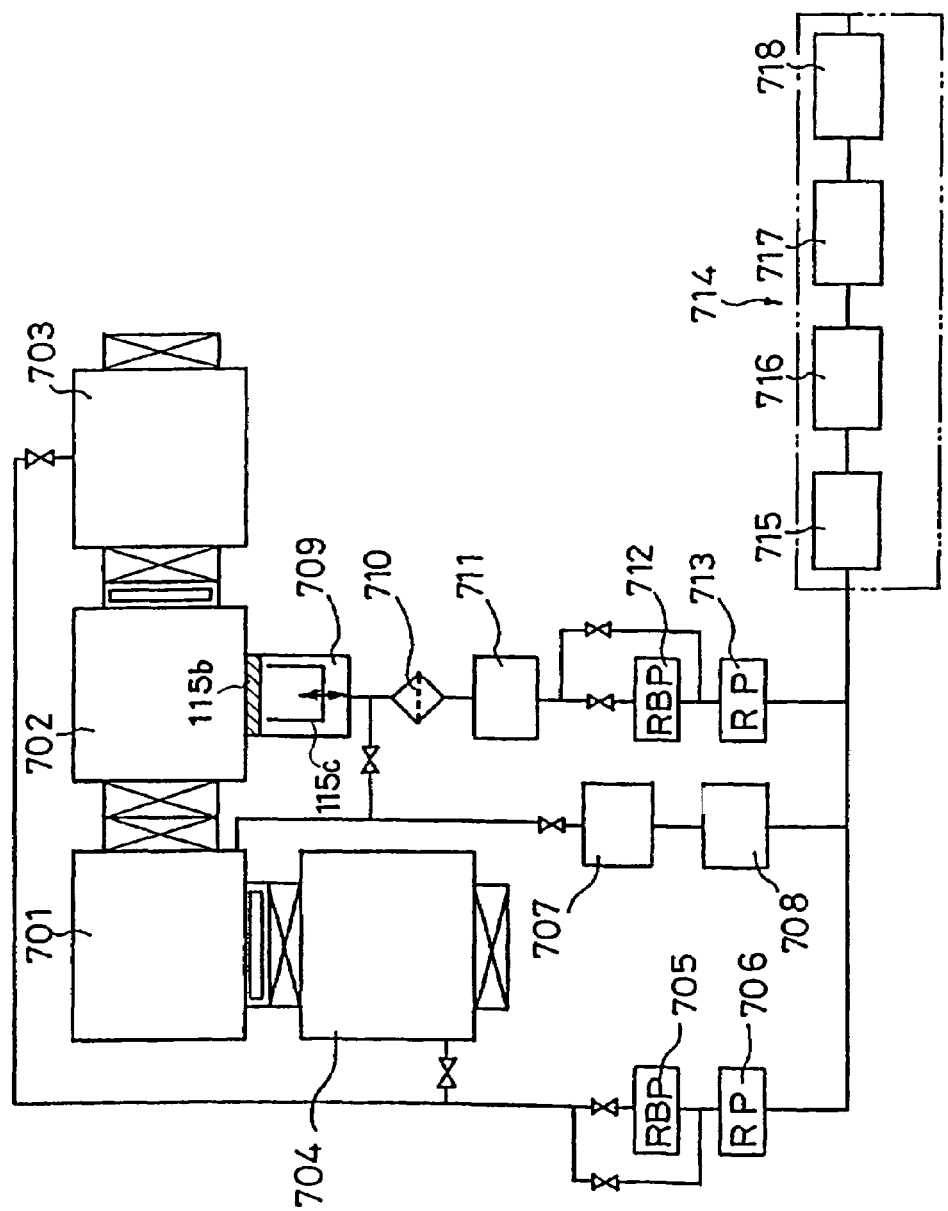
Figure 51:
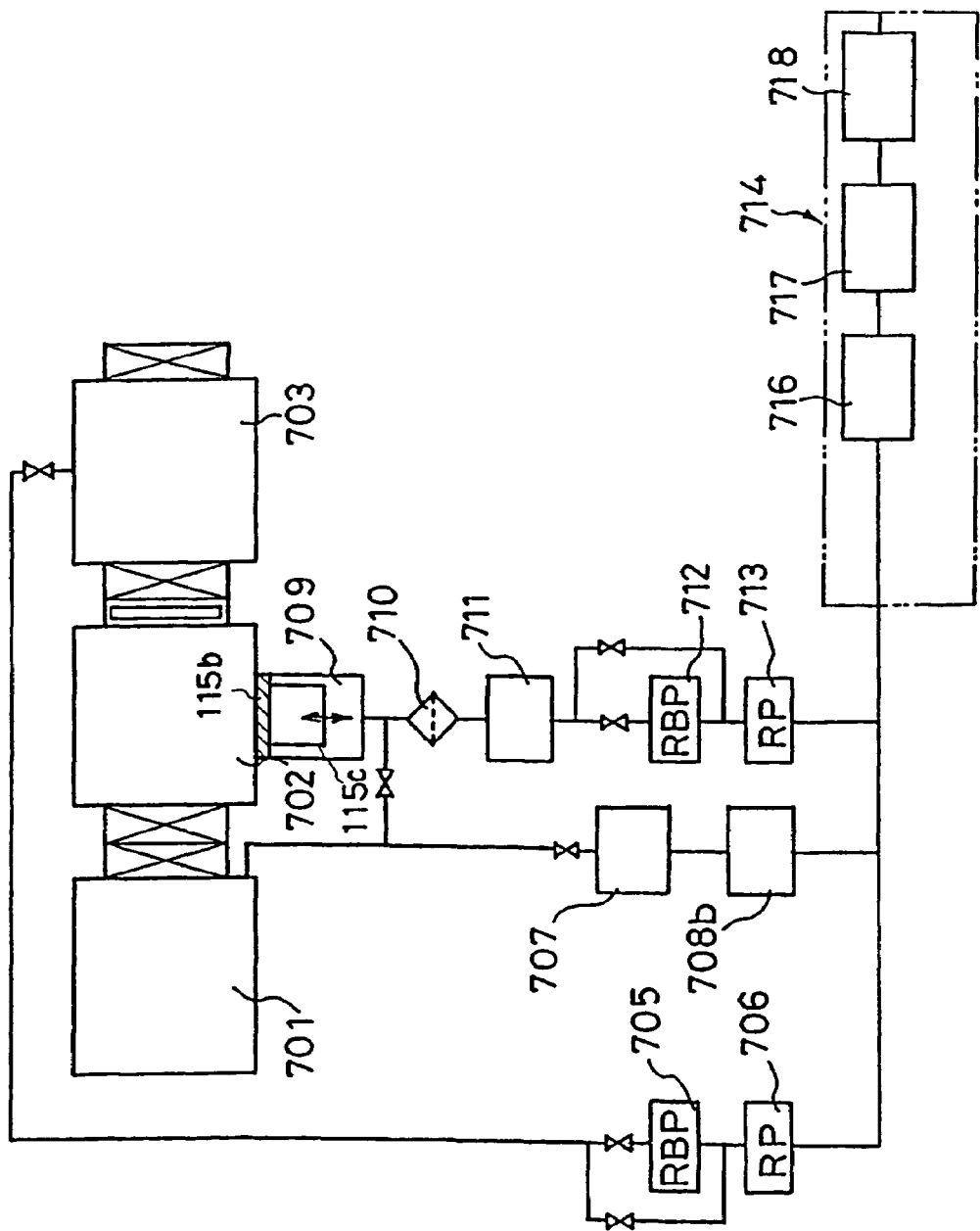

FIG. 49, FIG. 50, and FIG. 51 are diagrams roughly showing other examples of the structure of the treatment apparatus of the present invention.

In FIG. 49, FIG. 50, and FIG. 51, a dry distillation chamber 701 for thermal decomposition under normal pressure and a vacuum vaporization chamber 702 for thermal decomposition under reduced pressure are provided as heat treatment chambers. A cooling chamber 703 for cooling the heated residue is positioned at a stage subsequent to the above chambers. These treatment chambers are partitioned by a vacuum door so as to be openable and closeable.

In the structure illustrated in FIG. 49, FIG. 50, and FIG. 51, the object to be treated such as soil is introduced into the dry distillation heating chamber 701 and thermally decomposed, and then introduced into the vacuum vaporization chamber 702, where heavy metals such as arsenic, cadmium, lead, and the like are removed by vaporization. The heated residue of the object to be treated is introduced into the cooling chamber 703 and cooled in an atmosphere similar to that described above which is organic halide-free and not capable of producing organic halides. The contents of the system is exhausted by booster pumps 705 and 712 and rotary pumps 706 and 713. The structure in which a gaseous emission from the object to be treated is treated by a gas treatment device in the same manner as above is given. The gaseous emission from the dry distillation heating chamber 701 is introduced into a gas treatment device 714 through a gas cracking device 707 and a condenser 708 for condensing and recovering vaporized substances in the gaseous emission. The gaseous emission from the vacuum heating chamber 702 is introduced into the gas treatment device 714 through a recovery chamber 709 including the retort 115c and the oil film filter 711. The gas treatment device 714 includes a gas cracking device 715, a jet scrubber 716, an activated carbon filter, and an exhaust blower 718. In the example shown in FIG. 51, the gas cracking device 715 is omitted in the gas treatment device 714. Moreover, a gas combustion device for combusting the gaseous emission in place of the jet scrubber 716, and an alkali shower for alkali-cleaning the gaseous emission in place of the activated carbon filter 717 may be provided.

In FIG. 49 and FIG. 51, a loading chamber 704 for introducing the object to be treated to the dry distillation heating chamber 701 and the dry distillation heating chamber are common, but they may be provided separately. Furthermore, although FIG. 51 shows the structure in which an oil jet scrubber 708b is provided as a gas treatment device and oil in the gaseous emission is recovered there, the condenser 708 may be provided, instead.

Example 22

The present invention relates to a vacuum vaporization and recovery device, and in increasing detail to a high-efficiency vacuum vaporization and recovery device in which it is unnecessary to reduce the temperature of a vacuum furnace in recovering a metal from vaporized substances generated by vacuum heat treatment in the vacuum furnace.

In a conventional vacuum vaporization and recovery device, in recovering a metal from vaporized substances generated by vacuum heat treatment in a vacuum furnace, it is required to go through the processes of reducing the temperature in the vacuum furnace, taking out metallic recovered substances, and then increasing the temperature in the furnace again to perform vacuum heat treatment. This is because complete vacuum sealing can not be obtained since a vaporized metal adheres to a seal portion of a vacuum door located between the vacuum furnace and a metal recovery device, as a result air flows into the vacuum heating furnace at the time of the recovery of the metal, and thereby recovery operation can not be performed.

As described above, in the conventional vacuum vaporization and recovery device, it is required to cool the vacuum furnace in recovering vaporized substances, and to increase the temperature in the furnace again after the recovery, but there is a disadvantage that the operation of the vacuum furnace needs to be stopped for a long period of time (for example, four days) for the aforesaid cooling and heating.

Accordingly, a problem to be solved of the present invention is to provide a vacuum vaporization and recovery device having no disadvantage such as described above, that is, enabling continuous operation since it is unnecessary to change the temperature in the furnace when vaporized substances are recovered, a sharp rise in operation efficiency, and advantage in terms of costs.

Another problem of the present invention is to provide a vacuum vaporization and recovery device in which there is no possibility that vaporized fine particles reach a vacuum valve and a vacuum pump to lower the vacuum hermetic sealing capability of the vacuum valve or to cause a failure of the vacuum pump.

The present invention solves the aforesaid problems by a vacuum vaporization and recovery device in which a cooling and vacuum purge chamber having a cooling function is connected to a vacuum furnace via a vacuum door, a vaporized substance recovery retort is provided in the cooling and vacuum purge chamber so as to move forward and backward therein, pass through the vacuum door and fronting the interior of the vacuum furnace on the occasion of forward movement, and get out of the vacuum purge chamber on the occasion of backward movement, the recovery retort being attachable to and detachable from a shaft of a cylinder for moving the retort forward and backward.

Furthermore, the present invention solves the aforesaid problems by a vacuum vaporization and recovery device characterized in that a cooling and vacuum purge chamber is connected to a vacuum furnace via a vacuum door, and in that a vacuum valve and a vacuum pump are connected to the cooling and vacuum purge chamber via a filter. It is preferable that both a solid filter (dry filter) and a liquid filter (wet filter) are used for the filter in this case.

Figure 52:
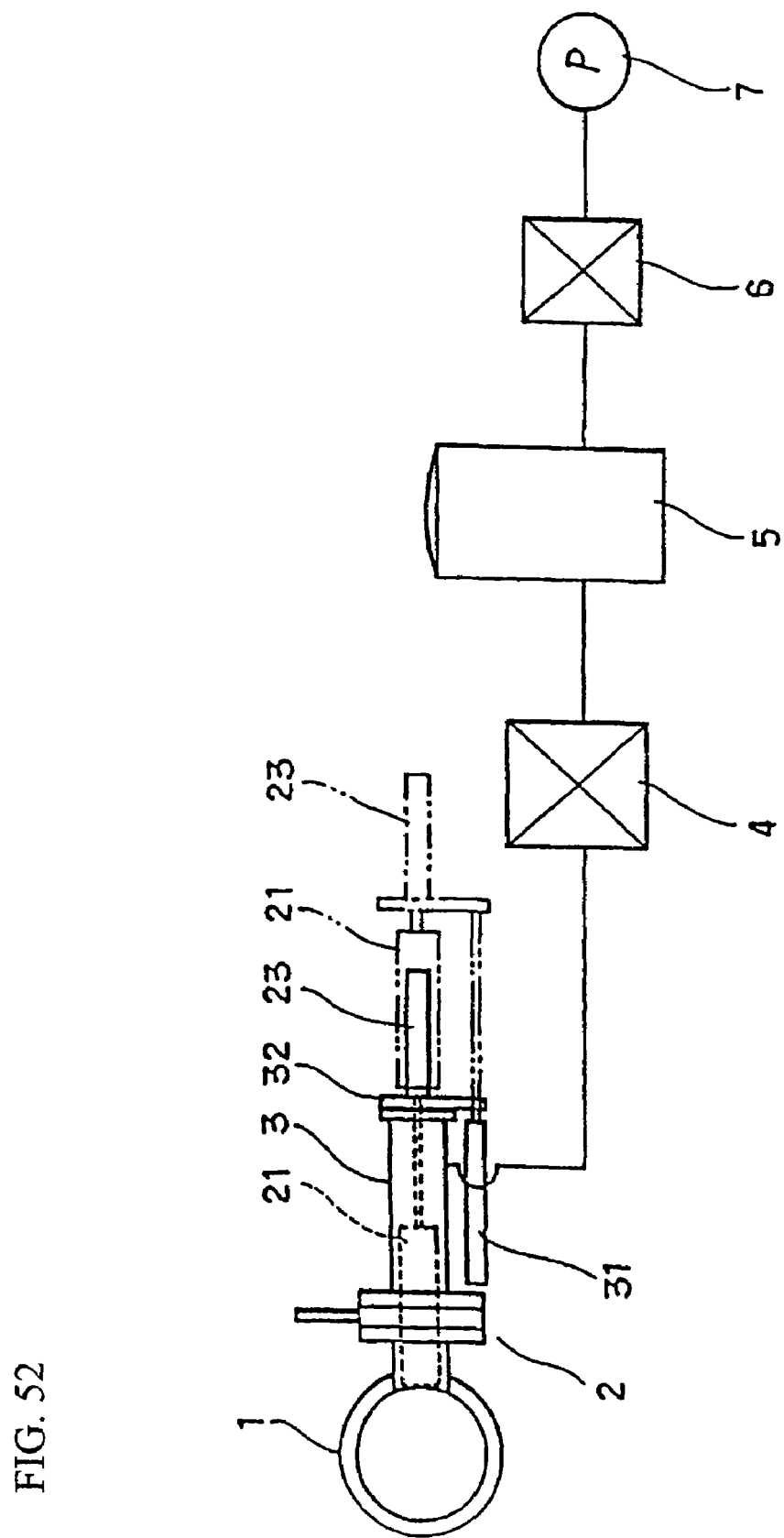
FIG. 52 is a schematic block diagram of a vacuum vaporization recovery device according to the present invention.

An embodiment of the present invention will be explained based on the attached drawings. FIG. 52 is an entire block diagram of an apparatus according to the present invention, and this apparatus is composed of a vacuum furnace 1, a vacuum double door 2 placed at an outlet for vaporized substances, a cooling and vacuum purge chamber 3 connected to the vacuum furnace 1 via the vacuum double door 2, a solid-type fine particle recovery filter 4 and a liquid-type fine particle recovery filter 5, and a vacuum valve 6 and a vacuum pump 7 which are connected to a gas passage from the cooling and vacuum purge chamber 3.

A recovery retort 21 which is moved forward and backward by the operation of the insertion cylinder 23 is inserted into the cooling and vacuum purge chamber 3. A vacuum door 32 for vacuum-sealing an opening of an end portion of the cooling and vacuum purge chamber 3 is placed in the cylinder 23, and a cylinder shaft of a moving cylinder 31 is connected to the cylinder 23. The recovery retort 21 is pulled out of the cooling and vacuum purge chamber 3 with the extension motion of the moving cylinder 31.

Figure 53:
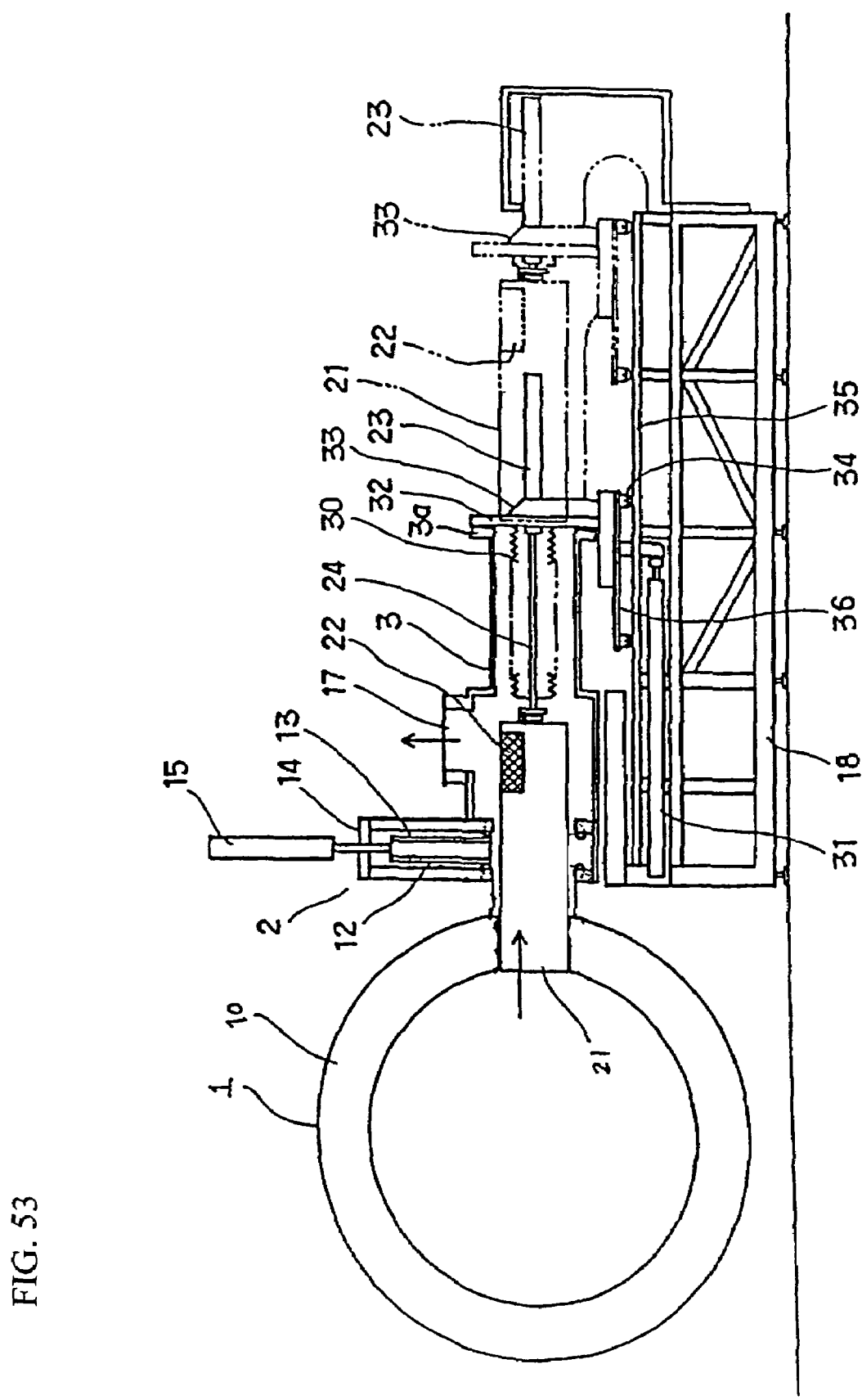
FIG. 53 is a detailed sectional view of a cooling and vacuum purge chamber portion of the vacuum vaporization recovery device according to the present invention.

FIG. 53 shows the details of the vacuum double door 2 and the cooling and vacuum purge chamber 3, and the vacuum double door 2 is placed between the vacuum furnace 1 encircled by a heat insulating material 10 and the cooling and vacuum purge chamber 3 provided adjacent thereto. The vacuum double door 2 is a double door in which a heat insulating vacuum door 12 placed on the vacuum furnace 1 side and a vacuum door 13 placed on the opposite side thereto are combined, and it is raised and lowered by the operation of an opening and closing cylinder 15 placed on a door case 14 and hermetically blocks a passage to the cooling and vacuum purge chamber 3 when being lowered. An unrecovered vaporized substance outlet 17 is provided in the cooling and vacuum purge chamber 3, and the solid-type fine particle recovery filter 4 is provided in the gas passage extending from the unrecovered vaporized substance outlet 17.

The cylindrical recovery retort 21 for recovering metallic vaporized substances is inserted so as to reach the vacuum furnace 1 through the vacuum double door 2 in an open state from the cooling and vacuum purge chamber 3. The recovery retort 21 has an open front end portion fronting a heating portion of the vacuum furnace 1, and vaporized gases produced in the vacuum furnace 1 can get into the recovery retort 21 from that portion. An opening is provided in a side face of a rear end portion of the recovery retort 21, and a metallic net 22 is put up there to enable ventilation between the inside and the outside of the retort. Incidentally, it is preferable to provide a heat exchange function by doubling surrounding walls of the cooling and vacuum purge chamber 3 to allow cooling water to flow between them.

A cylinder shaft 24 of the insertion cylinder 23 for moving the recovery retort 21 forward from the cooling and vacuum purge chamber 3 into the vacuum furnace 1 is removably engaged with a rear end face of the recovery retort 21. As an engaging means, structure in which an attaching plate 27 having a long hole 26 with a width enough for the movement of the cylinder shaft 24 is attached to the rear end face of the recovery retort 21 with a gap 28 between them, whereas an engaging portion 29 with a width larger than that of the long hole 26 is provided at an front end portion of the cylinder shaft 24 is thought.

In this case, if the engaging portion 29 is inserted into the gap 28 and the cylinder shaft 24 is slid into the long hole 26 while the operation is performed in a state in which the recovery retort 21 is lifted by a hoist or the like, the engaging portion 29 is caught by the edge of the long hole 26, and thus the cylinder shaft 24 is engaged with the rear end face of the recovery retort 21 via the attaching plate 27. Consequently, the recovery retort 21 can move in a horizontal direction accompanying the movement of the cylinder shaft 24. Incidentally, the cylinder shaft 24 is covered with a bellows cover 30.

The insertion cylinder 23 is fixed to a cylinder supporting block 33 which reciprocates on a frame 18 by the operation of the moving cylinder 31 via the vacuum door 32 attached to the insertion cylinder 23, and thereby moves on the frame 18 with the movement of the cylinder supporting block 33. Namely, the cylinder supporting block 33 is placed on a movable carriage 36 having rollers 34 and structured to be movable on a table 35 of the frame 18, and the moving cylinder 31 is placed under the table 35 in the frame 18 and its cylinder shaft is fixed to the movable carriage 36.

Figure 54:
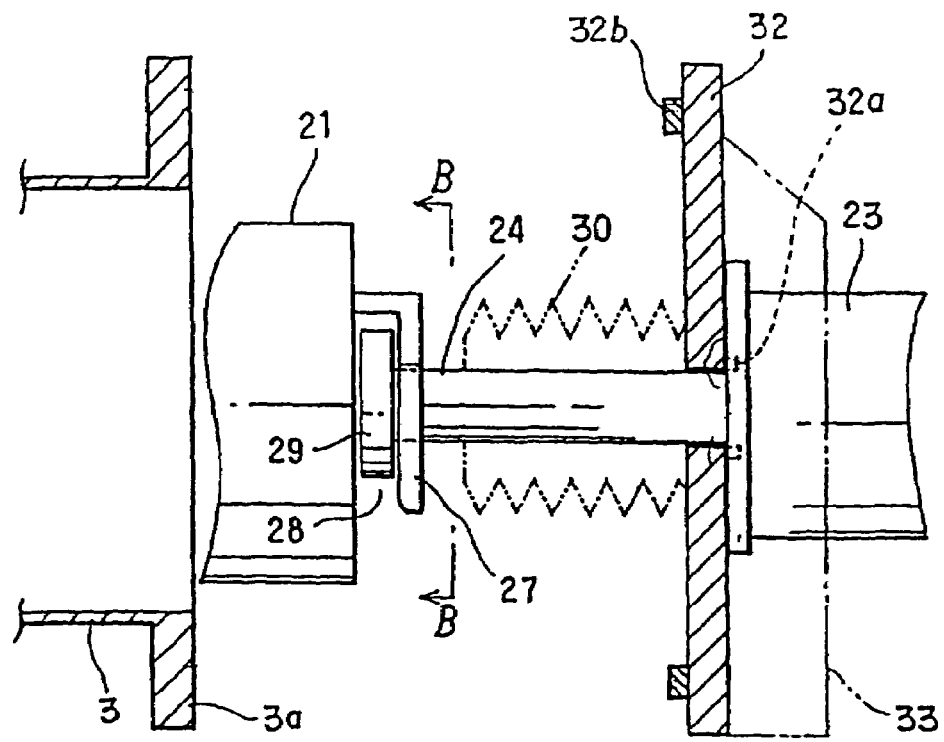
FIG. 54 and FIG. 55 are diagrams showing a connecting method of a recovery retort and a cylinder for moving it forward and backward in the vacuum vaporization recovery device according to the present invention.
Figure 55:
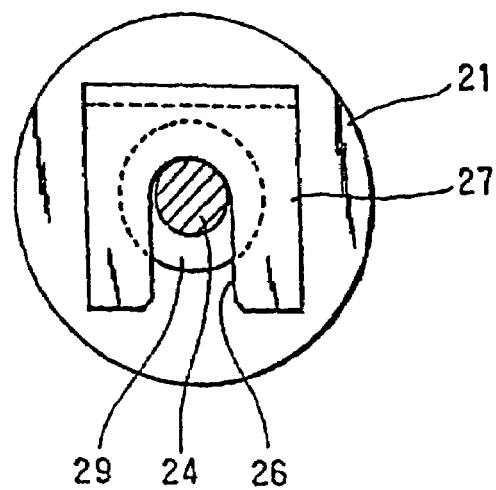

As shown in FIG. 54, the vacuum door 32 is fixed to a flange portion of the insertion cylinder 23, and has a vacuum seal 32a at a portion through which the cylinder shaft 24 is inserted and packing 32a which is closely attached to an end portion flange 3a of the cooling and vacuum purge chamber 3, and thus vacuum-seals the cooling and vacuum purge chamber 3.

After the closing operation of the vacuum double door 2, the insertion cylinder 23 reaches a rear end portion (the right end in FIG. 53) of the frame 18 at the end of the extension movement of the moving cylinder 31, and the exchange operation of the recovery retorts 21 is performed at the end of backward movement (hereinafter, this position is referred to as "a first stop point"). The new recovery retort 21 is attached to the cylinder shaft 24 of the insertion cylinder 23, for example, by an engaging means such as described above. When the attaching operation of the new recovery retort 21 is completed, the movable carriage 36 is moved forward (moved leftward in FIG. 53) by the contraction movement of the moving cylinder 31.

Following this, the recovery retort 21 gets into the cooling and vacuum purge chamber 3, and stops and waits at the end of the contraction movement of the moving cylinder 31.

At this waiting position, the front face of the recovery retort 21 is positioned just in front of the vacuum double door 2 which blocks up the cooing and vacuum purge chamber 3 at this time (hereinafter, this position is referred to as "a second stop point"), and the vacuum door 32 is closely attached to the end portion flange 3a of the cooling and vacuum purge chamber 3 and vacuum-seals it.

Next, the operation of the apparatus structured as above will be described in increasing detail. As described above, when the movable carriage 36 reaches an end portion of the frame 18 (the first stop point) by the extension movement of the moving cylinder 31, the new recovery retort 21 is attached to the cylinder shaft 24 of the insertion cylinder 23. With the contraction movement of the moving cylinder 31, the recovery retort 21 is moved forward in the cooling and vacuum purge chamber 3, and stops when the open face of the front end of the recovery retort 21 reaches the end of the forward movement of the moving carriage 36, in other words, a position just in front of the vacuum double door 2 (the second stop point). At that time, the vacuum double door 2 is closed.

After the interior of the cooling and vacuum purge chamber 3 is hermetically maintained by the operation of the vacuum door 32 at a point in time when the recovery retort 21 reaches the second stop point, the vacuum valve 6 is opened, the vacuum pump 7 starts operating, and the interior of the cooling and vacuum purge chamber 3 comes to have the same degree of vacuum as the interior of the vacuum furnace 1. Thereafter, the opening and closing cylinder 15 starts operating, the vacuum double door 2 is opened, and the insertion cylinder 23 starts operating to let the opening of the recovery retort 21 face the interior of the vacuum furnace 1. In the vacuum furnace 1, the object to be treated is heat-treated under a proper degree of vacuum to produce metallic vaporized substances, and the vaporized substances flow into the recovery retort 21 without going to the vacuum double door 2. Accordingly, the occurrence of the situation in which the vaporized substances adhere to the vacuum double door 2 to lower and deteriorate the vacuum sealing capability thereof can be avoided.

After the completion of the recovery of the vaporized substances, the recovery retort 21 is pulled out to the second stop point by the operation of the insertion cylinder 23, and thereafter the vacuum double door 2 is closed by the operation of the opening and closing cylinder 15. An inert cooling gas such as nitrogen gas is then supplied into the cooling and vacuum purge chamber 3, and the cooling and vacuum purge chamber 3 is cooled to a temperature at which there is no possibility that the recovered metal is oxidized and combusted. As described above, in the apparatus according to the present invention, after the vacuum furnace 1 and the cooling and vacuum purge chamber 3 are blocked off by the vacuum double door 2, only the interior of the cooling and vacuum purge chamber 3 is cooled while the interior of the vacuum furnace 1 is maintained at a high temperature, which can omit wasteful time to cool the vacuum furnace 1 unlike the conventional case.

After the recovered metal is cooled fully, nitrogen gas or the like is further supplied into the cooling and vacuum purge chamber 3, and the pressure in the chamber is regulated so as to be equalized to the outside pressure. After the completion of this pressure regulation, the vacuum door 32 is opened with the operation of the moving cylinder 31, and the recovery retort 21 is puled out to the first stop point. The recovery retort 21 is removed from the insertion cylinder 23 there, and the vaporized metal is recovered specially. After this, the aforesaid process is repeated.

Next, the structure of a route from the cooling and vacuum purge chamber 3 to the vacuum pump 7 will be explained. In the apparatus according to the present invention, a method to prevent fine particles vaporized in vacuum in the vacuum furnace 1 from flowing into the vaporized substance outlet 17 through the recovery retort 21 and further into the seal portion of the vacuum valve 6 and the vacuum pump 7 to lower the sealing capability of vacuum seal, or to cause a failure of the vacuum pump 7 is devised. Namely, the metallic net 22 is put up at the outlet for vaporized substances of the recovery retort 21, and a solid-type and liquid-type filters are placed doubly between the vaporized substance outlet 17 and the vacuum valve 6.

The solid-type filter 4 is composed of a wire gauze filter, a ceramic ball, or the like. When the suction force of the vacuum pump 7 is not so strong, even only the solid-type filter 4 is sufficient, but if the suction force exceeds a certain level, the fine particles pass through the solid-type filter 4 and reach the vacuum valve 6 and the vacuum pump 7. Thus, in the present invention, the liquid-type filter 5 is placed after the solid-type filter 4. This liquid-type filter 5 recovers fine particles by introducing them into a liquid or a liquid filter.

When the amount of file particles is small, the liquid-type filter 5 only is sometimes used without using the solid-type filter 4, but when the amount of fine particles is large or when the size of a particle is large, it is necessary to use both the solid-type filter 4 and the liquid-type filter 5.

The present invention is as described above, and can omit operations requiring a long period of time in which the vacuum furnace is cooled and heated again, since the recovery retort from which vacuum-vaporized substances are recovered is pulled out of the vacuum furnace into the cooling and vacuum purge chamber, the vacuum furnace and the cooling and vacuum purge chamber are blocked off by the vacuum door, and thereafter only the interior of the cooling and vacuum purge chamber is cooled. As a result, the operation can be performed very efficiently and at a low cost, which is effective in saving energy.

Since the recovery retort comes into contact with the body surface of the vacuum furnace via the vacuum door, most of the vaporized substances produced in the vacuum furnace get into the recovery retort, which is effective in eliminating the possibility that the vaporized substances adhere to the vacuum door to thereby lower its vacuum hermetic sealing capability.

The present invention is effective in preventing vaporized fine particles from reaching the vacuum valve and the vacuum pump to thereby avoid the occurrence of the situation in which the vacuum sealing capability of the vacuum valve is lowered or a failure of the vacuum pump is caused.

The present invention is effective in continuing operating even if something is wrong with one vacuum door, since a vacuum door is structured doubly and even only the other vacuum door can perform its duty.

Example 23

The diffusion of organic halides such as dioxins, PCB, and coplanar PCB to the environment and their influences are serious social problems. For example, noxious organic halides such as dioxins remain in heated residues (ashes, chars, carbon) resulting from combustion treatment and thermal decomposition treatment of wastes. Moreover, a high concentration of dioxins are detected from soil and the like around a refuse incineration plant and an industrial waste disposal plant, for example, and thus a harmful influence on residents' health causes serious anxiety. Furthermore, soil, sludge, and the like also contain organic halides.

As described above, organic halides such as dioxins, or heavy metals remain in many cases in solids and liquids such as the heated residues of wastes, soil and sludge under special conditions, or the like.

As a method for removing noxious substances containing organic halides or heavy metals, a method of reducing the concentration of organic halides by heating an object to be treated containing organic halides at a high temperature or by subjecting it to melting treatment at a high temperature of about 1500° C. is proposed. Such a method, however, has disadvantages that expensive and large-scale equipment is needed, running costs are high, and the like. Moreover, this method has a disadvantage of being unable to cope with dioxins produced while the temperature of the object to be treated reaches the decomposition temperature of dioxins from normal temperature. Effective treatment technology for soil around incineration facilities and the like to which organic halides such as dioxins, As, Hg, Cd, Pb, $Cr^{+6}$ and the like fall, has not been established.

When town refuse and the like are treated by combustion (incineration), the production of organic halides can be reduced if they can be combusted completely. It is extremely difficult, however, to completely combust abundant and heterogeneous objects to be treated. Even if complete combustion is possible, noxious organic halides such as dioxins are produced until the object to be treated reaches a predetermined temperature.

Organic halides such as dioxins remain in a heated residue being a residue resulting from heat treatment of the object to be treated such as combustion or thermal decomposition, and the establishment of heat treatment technology for reducing the concentration of organic halides remaining in the heated residue and removing them is demanded.

Incidentally, to produce dioxins, it is necessary that reactive chlorine atoms bonding with carbon of benzene nuclei and oxygen for bonding benzene nuclei exist. It is thought that it is effective to control the quantities of these reactive chlorine atoms and oxygen in a thermal decomposition furnace in order to suppress the production of dioxins at the time of thermal decomposition. However, hitherto a thermal decomposition furnace suitable for preventing the production of dioxins from such a viewpoint has not been proposed. Especially, technology for realizing the suppression of production of organic halides such as dioxins and coplanar PCB at relatively low temperatures (from normal temperature to 500° C.) in the process of temperature rise to a predetermined heating temperature and the decomposition of organic halides remaining in a heated residue such as residual ashes or the like at a low temperature has not been established yet.

An object of the present invention is to provide a soil producing method and a soil treatment apparatus for producing clean soil from soil contaminated by organic halides such as dioxins.

A problem to be solved of the present invention is to provide a treatment method and a treatment apparatus capable of safely and certainly removing dioxins contained in a heated residue such as residual ashes, residual liquid, and soot and dust let out from refuse incineration facilities of local governments, factories, and the like, and soil, sludge, and the like contaminated by dioxins.

In order to solve these problems, the present invention adopts the following structure. A soil producing method of the present invention is characterized in that a soil producing method for producing a second soil containing organic halides with a second concentration lower than a first concentration from a first soil containing the organic halides with the first concentration comprises the steps of introducing the first soil to a hermetic zone, and thermally decomposing at least a part of the organic halides by heating the first soil under reduced pressure. An object to be treated is heated to a temperature not less than the decomposition temperature of the organic halides, or a temperature not less than the boiling point thereof. As examples of organic halides, dioxins, PCB, coplanar PCB, and the like are given.

The method may further comprise the step of reducing the concentration of halogen contained in a gaseous emission produced by the thermal decomposition of the soil. Thereby, a possibility of production or reproduction of organic halides in the gaseous emission can be reduced.

A thermally decomposed residue of the first soil may be cooled after the hermetic zone is purged by a purge gas which is substantially organic halide-free and not capable of producing organic halides. As a result, organic halides such as dioxins can be prevented from being fixed in the residue by cooling.

As configurations of the purge gas which is substantially organic halide-free and not capable of producing organic halides, gas of at least one element selected from a group consisting of helium, neon, argon, krypton, xenon, nitrogen, and hydrogen, a mixed gas of these elements, a gas with the above gas and the mixed gas as a main constituent, for example, can be given.

The thermally decomposing step may be performed in the hermetic zone where an oxygen concentration is controlled. Consequently, a change in the amount of gaseous emission can be controlled, irrespective of heterogeneity of the object to be treated, partial combustion, and the like, and thus the gaseous emission can be treated more surely and efficiently. Moreover, the production of dioxins can be prevented by holding down oxygen concentration and halogen concentration.

A soil producing method of the present invention is characterized in that a soil producing method for producing a second soil containing organic halides with a second concentration lower than a first concentration from a first soil containing the organic halides with the first concentration comprises the steps of heating the first soil so that at least a part of the organic halides are vaporized or decomposed, introducing a heated residue of the soil to a hermetic zone, and cooling the heated residue of the soil after the hermetic zone is purge by a purge gas which is substantially organic halide-free and not capable of producing organic halides.

Furthermore, a soil producing method of the present invention is characterized in that soil containing organic halides is thermally decomposed under reduced pressure. Under reduced pressure, a mean free path of a molecule is long, and a non-oxidizing atmosphere is maintained in the furnace, thereby preventing the production and reproduction of organic halides such as dioxins. Moreover, under reduced pressure, the partial pressure of organic halides themselves is low, thereby making it possible to reduce the concentration of dioxins remaining in the heated residue.

Dioxins can be treated effectively by heat-treating soil, a heated residue, roasted articles, residual ashes, residual liquid, soot and dust, and the like containing residual dioxins, for example, from refuse disposal facilities, factories, and the like while pressure is reduced from normal pressure with an increase in temperature. Besides, the concentration of halogen contained in a gaseous emission produced by the thermal decomposition of soil may be reduced.

A soil treatment apparatus of the present invention is characterized in that a soil treatment apparatus for treating a soil containing organic halides or being capable of producing organic halides by heating, comprises a means for heating the soil, a hermetic zone, a means for introducing a heated residue of the soil to the hermetic zone, a means for purging the hermetic zone by a purge gas which is substantially organic halide-free (which is short of organic halides), and a means for cooling the heated residue. In the present invention, regardless of combustion, thermal decomposition, or thermal decomposition under reduced pressure, after being heated, the soil which is the object to be treated is purged and cooled in the hermetic zone. The purge means may introduce the purge gas after pressure in the hermetic zone is reduced.

Moreover, the apparatus may further comprise a halogen trapping means having a metal for forming compounds with halogen contained in gaseous emission produced by the heating of the soil or an adsorbent for adsorbing the halogen in the gaseous emission.

Besides, the apparatus may further comprises a reforming means for reforming the gaseous emission produced by the heating of the soil at a first temperature such that dioxins are decomposed, and a cooling means for cooling the gaseous emission to a second temperature so that a rise in the concentration of dioxins in the reformed gaseous emission is suppressed. As concerns the cooling means, rapid cooling by jetting oil to the gaseous emission is also recommended.

Namely, a treatment method of the present invention is characterized in that an object to be treated containing organic halides is thermally decomposed under reduced pressure. Incidentally, if the object to be treated such as soil, burned ashes, or the like contains not only organic halides but also heavy metals and the like, after the organic halides are treated, the temperature and pressure in the system are regulated to thereby vaporize the heavy metals. The vaporized metal may be condensed and recovered by such a recovery chamber as described above. The gaseous emission produced by the pressure reduction or heating of the object to be treated such as soil and burned ashes also may be introduced into a treatment system in the same manner.

Further, a treatment apparatus of the present invention is characterized in that a treatment apparatus for treating an object to be treated containing organic halides or being capable of producing organic halides by heating comprises a means for heating the object to be treated, a hermetic zone, a means for introducing the heated residue to the hermetic zone, a means for purging the hermetic zone by a purge gas which is substantially organic halide-free (which is short of organic halides), and a means for cooling the heated residue.

As the heating means, a combustion furnace for combusting the object to be treated, a thermal decomposition furnace for thermally decomposing the object to be treated, a reduced pressure thermal decomposition furnace for thermally decomposing the object to be treated under reduced pressure can be named.

A treatment apparatus of the present invention is characterized in that an object to be treated is passed through a furnace capable of controlling thermal decomposition temperature or through a plurality of reduced pressure furnaces different in thermal decomposition temperature when being subjected to thermal decomposition (roasting) treatment while the pressure is being reduced from normal pressure.

For example, the object to be treated may be thermally decomposed in the furnace where the pressure is maintained almost constant but the temperature is being changed.

Further, it is characterized in that a furnace capable of controlling thermal decomposition temperature at which an object to be treated is subjected to thermal decomposition treatment is provided, the pressure in the furnace is changed from normal pressure to a predetermined degree of vacuum, and thus the degree of vacuum can be maintained. For example, the object to be treated may be thermally decomposed in the furnace where the temperature is maintained almost constant but the pressure is being changed.

Furthermore, a normal pressure furnace and a plurality of reduced pressure furnaces each for subjecting an object to be treated to thermal decomposition treatment may be continuously provided, and the thermal decomposition temperature in each of the furnaces may be set so as to increase with progress to a later stage.

It is characterized by further comprising a halogen trapping means placed to connect with the reduced pressure furnaces and holding a metal for forming compounds with halogen contained in a gaseous emission produced by the thermal decomposition of the object to be treated or an adsorbent for adsorbing the halogen in the gaseous emission therein. A portion of the halogen trapping means loaded, for example, with metals for trapping halogen, a catalyst for decomposing the halogen, or the like may be maintained at an almost constant temperature in the range of normal temperature to about 1000° C., and more preferably in the range of about 400° C. to about 1000° C. It is desirable to maintain a portion, at which halogen is adsorbed, at a low temperature.

In the present invention, a heated residue containing residual dioxins let out from waste disposal facilities, factories, and the like may be treated while being heated with a reduction in pressure. Roasted articles, residual ashes, residual liquid, soot and dust, and the like which contain residual dioxins let out from refuse disposal facilities, factories, and the like may be treated while the pressure is reduced from normal pressure with an increase in temperature.

In the present invention, it is suitable that by introducing a gaseous emission into a reducing means in a heating state placed at a gas outlet of a hermetically sealable thermal decomposition furnace, the gaseous emission is decomposed and reduced, then the concentration of at least one gas of oxygen, oxide gas, chlorine, chloride gas downstream of the reducing means is measured, and that the temperature, pressure, oxygen concentration, and the like in the thermal decomposition furnace is controlled according to the measured value.

In the present invention, organic halides are defined as what contains dioxins, PCB, coplanar PCB, DDT, trichloroethylene, trihalomethane, and the like (See FIG. 6).

In the present invention, unless not explained specially, polychlorinated dibenzo-p-dioxins (PCDDs), polychlorinated dibenzofurans (PCDFs), and homologues different from these in number of chlorine and substitution position are generically called dioxins. In addition, compounds in which another halogen such as fluorine or bromine is substituted for chlorine in dioxins are included in organic halides defined in the present invention.

To reduce the concentration of organic halides such as dioxins, PCB, and coplanar PCB in the heated reside of the object to be treated, it is important to heat the object to be treated at such a temperature that at least a part of such organic halides are decomposed and to cool the object to be treated in an atmosphere with the lowest possible concentration of substances having organic halides and organic halide producing capability.

Meanwhile, also as concerns a gaseous emission produced by heating of the object to be treated, it is desirable to reduce the concentration of dioxins, for example, the concentration of substances such as halogen capable of producing dioxins to a minimum.

If organic halides coexist in a cooling atmosphere when the object to be treated is cooled, the organic halides are fixed in the object to be treated. If materials capable of producing organic halides coexist when the object to be treated is cooled, organic halides are composed or recomposed in the process of cooling, and consequently organic halides remain in a residue as well.

Accordingly, in the present invention, in treating the object to be treated containing organic halides or producing organic halides by heating, after heating such as combustion or thermal decomposition, the heated residue is cooled in a state in which the concentration of substances having organic halides and organic halide producing capability is lowered. For this purpose, the heated residue may be cooled, for example, in an atmosphere purged with a cooling gas containing no material for organic halides. Therefore, it is desirable to use gas containing no halogen, oxygen nor organic compounds as a cooling gas, and, for example, rare gases such as argon, nitrogen, and the like can be used.

As examples of the object to be treated, town refuse, burned ashes of town refuse, soil, sludge, agricultural products, aquatic products, shredder dust, scrapped household appliances, various kinds of wastes, and the like, which are contaminated by organic halides such as dioxins or PCB, can be given.

A treatment method of the present invention is characterized in that a treatment method for treating an object to be treated capable of producing organic halides by heating comprises the steps of heating the object to be treated, introducing a heated residue to a hermetic zone, purging the hermetic zone by a purge gas which is substantially organic halide-free and not capable of producing organic halides, and cooling the heated residue.

Moreover, a treatment method of the present invention is characterized in that a treatment method for treating an object to be treated capable of producing organic halides by heating comprises the steps of heating the object to be treated, introducing a heated residue to a hermetic zone, purging the hermetic zone by a purge gas which is substantially organic halide-free (which is short of organic halides), and cooling the heated residue, where "organic halide-free" means a shortage of organic halides. As types of purge gas, a rare gas, nitrogen, hydrogen, or a mixed gas of these gases can be shown. Air also can be used as a purge gas as far as oxygen concentration does not matter.

As types of heating of the object to be treated, for example, combustion, thermal decomposition, and the like can be given. Such heating may be performed while oxygen concentration is being controlled. Thermal decomposition may be performed while the pressure in the hermetic zone is being controlled, for example, the pressure is reduced or raised. The purge gas may be introduced into the hermetic zone after the pressure in the hermetic zone is reduced.

Also for a gaseous emission produced by the heating of the object to be treated, treatment of lowering the concentration of organic halides such as dioxins is performed.

As an example of such treatment, the gaseous emission may be reformed at a first temperature such that dioxins are decomposed, and the gaseous emission may be cooled to a second temperature so that a rise in the concentration of dioxins in the reformed gaseous emission is suppressed.

Concerning cooling of the gaseous emission produced by the heating of the object to be treated, rapid cooling by jetting oil to the gaseous emission is also suitable, thereby making it possible to suppress the recomposition of organic halides, and to trap hydrocarbon and the like in the reformed gaseous emission.

Moreover, it is also suitable that the gaseous emission cooled by jetting oil is reheated to a high temperature such that organic halides such as dioxins are decomposed again, and thereafter rapidly cooled by jetting cooling water. The cooling water may be alkaline.

Further, the concentration of halogen such as chlorine contained in the gaseous emission produced by the heating of the object to be treated may be lowered. For example, a halogen trapping device for trapping halogen in the gaseous emission may be placed at a stage subsequent to a thermal decomposition furnace. As an example of the configuration of the halogen trapping device, a configuration in which metals such as iron, cutting scrap, and/or chemical compounds such as calcium hydroxides or the like which react with chlorine contained in the gaseous emission to compose chlorides are put in a chamber is given. A catalyst and the like for promoting fixing reaction of halogen contained in the gaseous emission and decomposition of organic halides in the gaseous emission may be put in the chamber. In addition, an adsorbent for adsorbing halogen contained in the gaseous emission may be put therein. A plurality of structures of halogen trapping devices described above may be combined.

When an adsorbent such as zeolite is used for trapping halogen, it is desirable to maintain the adsorbent at the lowest possible temperature in order to raise adsorptive efficiency. In this case, the gaseous emission is cooled in the chamber in which the adsorbent is put, and it is desirable to perform this cooling rapidly so that the retention time of the gaseous emission in the range of temperatures at which organic halides such as dioxins are reproduced is shortened as much as possible.

Various kinds of treatments for lowering the concentration of organic halides such as dioxins contained in the gaseous emission described above may be used in plural combination.

It is recommended that a treatment apparatus of the present invention for carrying out such treatments be provided with, for example, a hermetic zone capable of holding the object to be treated hermetically therein, a means for regulating the temperature of the hermetic zone, a purge means for purging gas in the hermetic zone, and a cooling means for cooling the heated residue of the object to be treated. In addition, the pressure in the hermetic zone may be reduced.

The purge means may not only purge gas in the hermetic zone, but also introduce a purge gas after reducing the pressure in the hermetic zone and exhausting the gas therein. This exhaust system can be used also for pressure reduction in the hermetic zone other than gas purge.

Further, a moving means for moving the object to be treated in the hermetic zone may be provided. As the moving means, a rotary kiln, a screw conveyor, a tray pusher, a drawer, a roller house, or the like may be provided.

A gas circulating device for circulating gas in the hermetic zone while regulating the temperature of the gas may be provided. As an example of the gas circulating device, it is recommended that a bypass connected to the hermetic zone (a chamber) is provided, and that a circulating pump, a temperature regulating device or a heat exchanger, a filter means for trapping dust, mist, and the like contained in a gas stream, and the like be provided in the bypass. They may be positioned in the order of the filter, the temperature regulating device, and the circulating pump. It is specially desirable to position the filter in a stage prior to the circulating pump and the temperature regulating device. An oil film, for example, may be used as a filter. The aforesaid treatment methods and treatment apparatus of the present invention are not limited to a reduced pressure thermal decomposition furnace, and can be also applied to treatment in heating furnaces such as an incinerator and a normal pressure thermal decomposition furnace.

For example, the treatment apparatus of the present invention can be added in a stage subsequent to a conventional incinerator and normal pressure decomposition furnace. Thus, organic halides such as dioxins can be safely and effectively removed from a burned residue produced in the incinerator in large quantities.

The diffusion of organic halides having toxicity to the environment is a serious problem, and the reconstruction of incineration facilities into new treatment facilities requires tremendous costs and time, and moreover the treatment of wastes produced day by day is also needed. The present invention can be applied also to existing incineration facilities as an incidental equipment. Consequently, it is possible to treat an object to be treated having an organic halide producing capability while utilizing the existing facilities.

A soil producing method of the present invention is characterized in that a soil producing method for producing a second soil containing organic halides with a second concentration lower than a first concentration from a first soil containing the organic halides with the first concentration comprises the steps of introducing the first soil to a hermetic zone, and thermally decomposing at least a part of the organic halides by heating the first soil under reduced pressure.

It is desirable that a thermally decomposed residue of the first soil be cooled after the hermetic zone is purged by a purge gas which is substantially organic halide-free and not capable of producing organic halides.

This is because if organic halides coexist in a cooling atmosphere when the object to be treated is cooled, the organic halides are fixed in the heated residue of the object to be treated as described above. In order to vaporize organic halides by heating or remove organic halides from the heated residue of the object to be treated which produces organic halides, it is important to purge heating atmosphere gas containing organic halides or to cool the heated residue in the state in which the concentration of substances having organic halides and organic halide producing capability is lowered by pressure reduction or the like. As a result, the concentration of organic halides remaining in the second soil which is the heated residue of the first soil can be lowered and the organic halides can be removed by cooling the thermally decomposed residue of the first soil in the state in which the concentration of organic halides or the substances having organic halide producing capability is lowered.

Incidentally, it is preferable to perform the thermal decomposition of the first soil in the hermetic zone where the oxygen concentration is controlled. For example, it is recommended that the oxygen concentration in the hermetic zone be measured and the oxygen concentration in the hermetic zone be regulated according to the measured oxygen concentration. Besides, the aforesaid control of oxygen concentration may be performed by introducing a reducing carrier gas or a reducing agent into the hermetic zone.

The aforesaid active control of oxygen concentration in the hermetic zone enables thermal decomposition in a stable state even when the object to be treated is heterogeneous. Further, by performing thermal decomposition in the hermetic zone where a reducing atmosphere is maintained, the production of organic halides such as dioxins can be suppressed. Furthermore, a reduction in the pressure in the hermetic zone enables mean free paths of molecules to become longer and the probability of production of organic halides such as dioxins to be lowered.

When the aforesaid first soil contains metals such as heavy metals, the metals may be vaporized by heating the soil and reducing the pressure to thereby be recovered. Thus, even when the soil is contaminated by mercury, cadmium, zinc, lead, arsenic, or the like, such metals can be separated and recovered from the soil. Hexavalent chromium, for example, can be reduced into trivalent chromium. Such recovery of metals can be performed by the aforesaid recovery chamber. Not limited to treatment of contaminated soil, the present invention can be applied to treatment of burned ashes, sludge, waste water, agricultural products, aquatic products, and the like. Soil treated by the present invention contains a large amount of inorganic components such as porous carbon, and hence can be used not only as soil, but also as an effective soil conditioner. Furthermore, it may be used being mixed with organic substances such as leaf mold and compost.

Example 24

Figure 56:
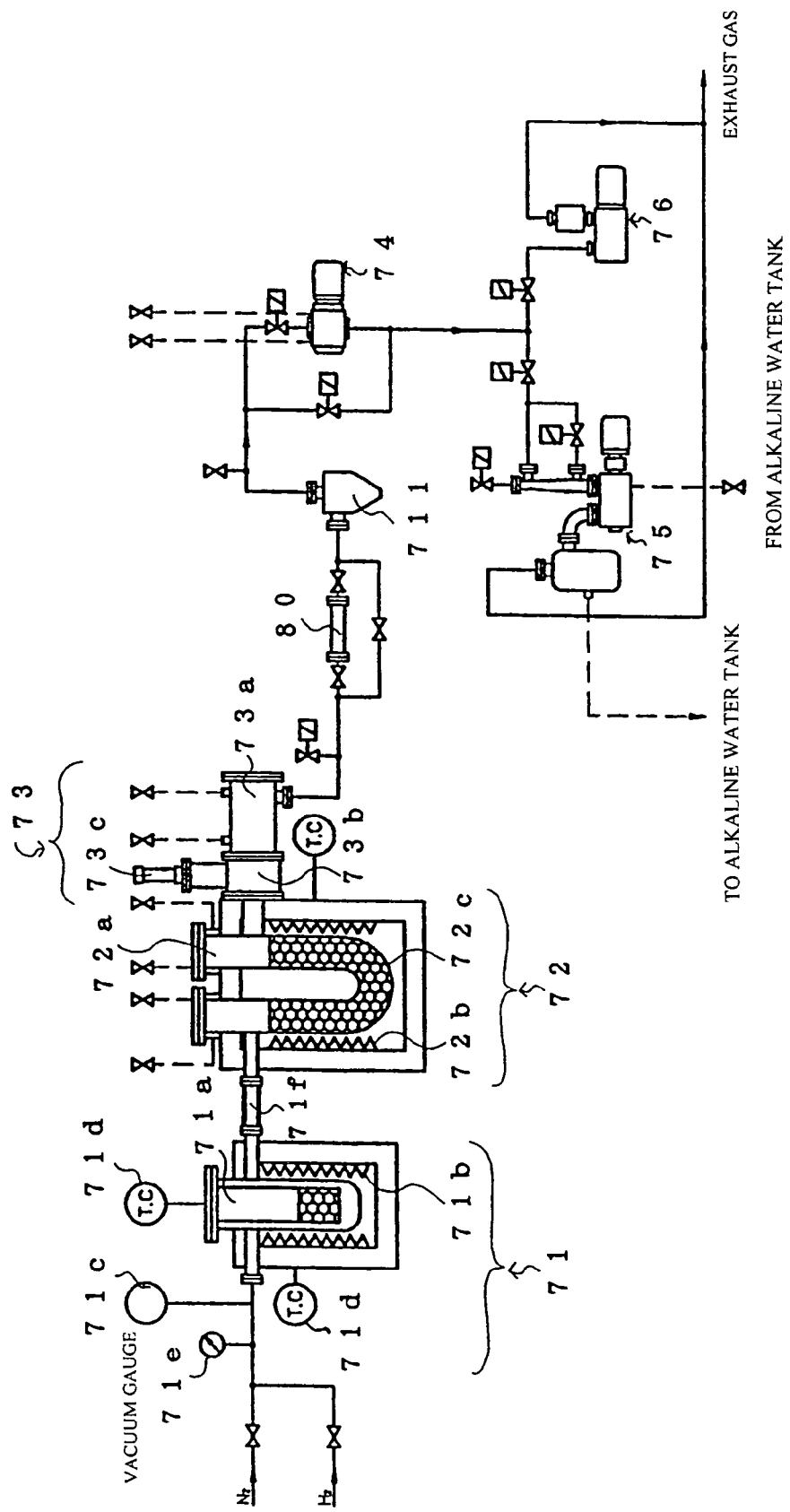
FIG. 56 and FIG. 57 are diagrams roughly showing the structure of the treatment apparatus of the present invention.
Figure 57:
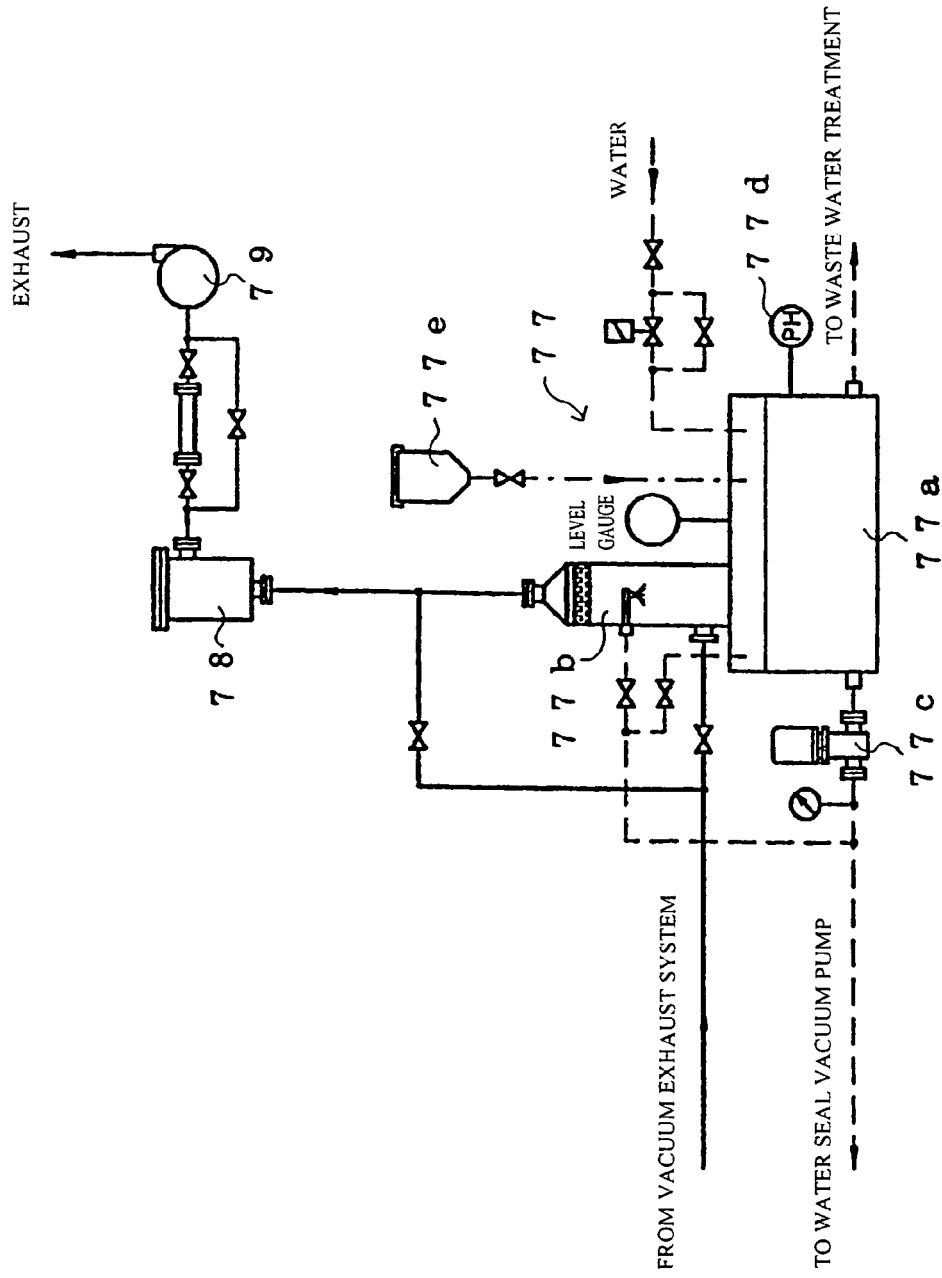

FIG. 56 and FIG. 57 are diagrams showing an example of the treatment apparatus of the present invention. This treatment apparatus can treat soil, burned ashes, and the like containing organic halides such as dioxins.

This treatment apparatus includes a reforming unit 72 and a recovery unit 73 between a reduced pressure heating furnace 71 and an exhaust system. The exhaust system is composed of a booster pump 74, a water sealing pump 75 including a sealing liquid circulating system capable of controlling pH, and a rotary pump 76. An exhaust gas treatment system for treating exhaust gas from the exhaust system is placed at a stage subsequent to the exhaust system (FIG. 57).

The reduced pressure heating furnace 71 can heat the object to be treated while the pressure in the system is reduced by the exhaust system. The reduced pressure heating furnace 71 includes a chamber 71a for housing the object to be treated, a heater 71b for heating the chamber 71a, a vacuum gauge 71c for measuring the pressure in the chamber, a thermocouple 71d for measuring the temperature in the chamber, and a flow meter 71e for controlling the flow rate of a carrier gas. It is recommended that nitrogen, a rare gas, hydrogen or the like be used as the carrier gas as required. The oxygen concentration in the system may be regulated according to the flow rate of the carrier gas. The carrier gas is used also as a cooling gas which is organic halide-free for the heated residue of the object to be treated. A chamber 72a in the reforming unit 72 is heated by a heater 72b, and can crack the gaseous emission from the object to be treated circulating in the chamber 72a. Noxious substances such as dioxins, PCB, and coplanar PCB contained in the gaseous emission are decomposed by the reforming at a high temperature. In the treatment apparatus of the present invention, the gaseous emission can be reformed under reduced pressure by providing the reforming unit between the reduced pressure heating furnace and the exhaust system. Moreover, in this example, a catalyst 72c such as decomposes organic halide, promotes decomposition, and suppresses composition is put into the chamber 72a. A catalyst in which a substrate made of alumina or ceramics is impregnated with nickel is used here, but the type of catalyst can be selected as required. The reduced pressure heating furnace 71 and the reforming unit 72 are connected by a pipe 71f which is kept warm so that the gaseous emission is not condensed. Moreover, in the present invention, it is desirable to heat the object to be treated after the reforming unit 72 fulfills predetermined operating conditions. When reforming is performed by heating, for example, it is recommended that the object to be treated be heated in the reduced pressure heating furnace 71 after the temperature in the reforming unit reaches a set temperature at which the gaseous emission is reformed. Therefore, a means for detecting the temperature in the reforming unit and a means for heating the interior of the reduced pressure heating furnace according to the detected temperature may be provided. Moreover, a means for maintaining a set value such as a reforming temperature in the reforming unit (for example, a memory), a means for detecting the temperature in the reforming unit, and a means for comparing the detected temperature and the set value and heating the interior of the reduced pressure heating furnace according to the result of the comparison may be provided. The gaseous emission reformed in the reforming unit 72 is introduced to the recovery unit 73. The recovery unit 73 includes a recovery chamber 73a in which a tubular retort is put and a hermetic door 73b which can be opened and closed and partitions off the chamber 72a of the reforming unit 73 and the recovery chamber 73a. The hermetic door 73b performs opening and closing operations by a cylinder 73c. The structure of the recovery unit is the same as that in FIG. 8, FIG. 9, FIG. 42, and FIG. 43, for example. Specifically, a retort is inserted from the recovery chamber 73c to the chamber 72a side when the hermetic door 73b is open. The hermetic door 73b is shielded and protected by the inserted retort. When the retort is exchanged, the retort is pulled out to the recovery chamber 73a side, the hermetic door 73b is closed, and a valve between the recovery chamber and the exhaust system is closed, which makes it possible to take the retort out and recover condensates while maintaining the states of the reduced pressure heating furnace 71 and the reforming unit 72. In the present invention, also metals contained in the object to be treated can be separated from the object to be treated and recovered by this recovery unit. For example, even when a heavy metal such as lead, zinc, or cadmium is contained in contaminated soil or burned fly ashes, it is heated to its boiling point or higher and vaporized under reduced pressure, and can be recovered in a metallic state in the recovery unit 73. It is desirable to take the metal condensed in the retort out after a non-oxidizing gas such as nitrogen is introduced into the recovery chamber and cools the metal.

Furthermore, this recovery chamber 73a is cooled by a refrigerant such as cooling water. This cooling has not only the function of condensing the metal but also the function as means for rapidly cooling the gaseous emission reformed in the reforming unit. Thus, the recomposition of organic halides such as dioxins in the gaseous emission can be suppressed.

The oil film filter 711 is placed between the recovery unit 73 and the booster pump 74. Owing to this oil film filter 711, the gaseous emission which has not been condensed in the recovery unit, dust, and fine particles of the condensed metal are prevented from reaching the exhaust system.

The water sealing pump 75 and the rotary pump 76 are connected in parallel at a stage subsequent to the booster pump 74. Such an exhaust system can be used by switching according to the sequence of treatment. When soil is treated, for example, water, oil, and the like are contained in the gaseous emission at the early stages of heating, in which case it is desirable to bypass the booster pump 74 and perform exhaust operation by the liquid sealing pump 75. The water and oil in the gaseous emission are trapped by sealing liquid in the liquid sealing pump. Incidentally, in this apparatus, alkaline aqueous solution is used as the sealing liquid in the liquid sealing pump. Nitrogen oxides, sulfur oxides, and the like in the gaseous emission can be neutralized by this sealing liquid. If the treatment progresses and the water and oil in the gaseous emission decrease in quantity, the exhaust system is switched to the rotary pump 76 and the booster pump 74, whereby the pressure in the treatment system can be reduced. In this state, a metal such as zinc, lead, or the like is vaporized from the object to be treated and condensed in the retort in the recovery chamber. The switching of the exhaust system is not limited to the aforesaid example, and can be suitably performed as required.

An exhaust gas neutralizing unit 77, an activated carbon filter 78, and an exhaust blower 79 are placed at a stage subsequent to the exhaust system to treat exhaust gas from the exhaust system.

The exhaust gas from the exhaust system is showered by an alkaline aqueous solution in a spray tower 77. The aqueous solution for cleaning the exhaust gas is sent again to the spray tower 77 via a neutralizing tank 77a and a circulating pump 77c. Moreover, the pH of the aqueous solution is monitored by a pH meter, and the alkaline aqueous solution is supplied from an alkali reservoir 77e, whereby the pH of circulating water is kept alkaline. This aqueous solution is supplied also to a sealing liquid circulating system of the liquid sealing pump 75. The exhaust gas cleaned by the alkaline aqueous solution is filtered by the activated carbon filter 78, and then exhausted to the outside by the exhaust blower 79. It should be noted that an analytical sample recovery unit 80 is provided in order to monitor the concentrations of substances in the gaseous emission and the exhaust gas in this example. The on-line quantitative analysis of components contained in the gaseous emission also can be performed. The above makes it possible to regulate the temperature, pressure, oxygen concentration of treatment of the object to be treated, the reforming temperature of the gaseous emission, and the like according to detected results.

INDUSTRIAL AVAILABILITY

As explained above, according to the present invention, when a tube is inserted into a first opening, a hermetic door is shielded from a first hermetic chamber by a zone between a second opening and a third opening in a side face of the tube, a gaseous emission can be prevented from condensing at the hermetic door or adhering thereto. Also when packing made of resin or the like is provided at a seal portion of the hermetic door, for example, the seal portion of the hermetic door can be prevented from being damaged by heat of the gaseous emission. Accordingly, the hermetic sealing capability of the hermetic door can be maintained. As described above, in a treatment apparatus of the present invention, an interface from the first hermetic chamber to the outside is realized by the hermetic door and the tube.

In the treatment apparatus of the present invention, even when a second hermetic chamber is opened and the tube is taken out, the hermetic sealing capability of the hermetic door is maintained, and hence the leakage of outside air into the first hermetic chamber can be prevented. Accordingly, the tube can be taken out while temperature conditions or pressure conditions in the first hermetic chamber are maintained. Hitherto, the treatment apparatus has needed to be stopped in order to take condensates out, which has lowered the productivity of treatment. The present invention enables continuous operation of the treatment apparatus and a rise in the productivity of treatment.

The invention claimed is:

1. A treatment apparatus, comprising:
   a first hermetic chamber having a first opening;
   a first hermetic door, placed outside the first hermetic chamber, capable of opening and closing the first opening;
   a tube having a second opening on an end of the tube, a third opening, and an end facing the first hermetic chamber, capable of being inserted into the first opening, which shields the first hermetic door from the first hermetic chamber such that the first hermetic door is positioned between the second opening and the third opening when the tube is inserted into the first opening;
   an exhaust system having an exhaust opening, the third opening of the tube being positioned opposed to the exhaust opening when the tube is inserted into the first opening, the exhaust system being configured to exhaust the first hermetic chamber via the second opening, the third opening, and the exhaust opening when the tube is inserted into the first opening; and
   a cooling section configured to cool the tube when the exhaust system exhausts the first hermetic chamber to perform condensation in the tube,
   wherein the first hermetic door is disposed between the first opening and the cooling section.

2. The treatment apparatus as set forth in claim 1,
   wherein the first hermetic chamber maintains a vacuum state when the first hermetic door is at a closing position, while the tube is allowed to be replaced.

3. The treatment apparatus as set forth in claim 1,
   the exhaust system exhausts the first hermetic chamber when the first hermetic door is at an opening position, and the exhausting system is isolated from the first hermetic chamber when the first hermetic door is at a closing position so that the tube is allowed to be replaced.

4. The treatment apparatus as set forth in claim 1, further comprising:
   a means for regulating a temperature in the first hermetic chamber when the first hermetic door is at an opening position and a closing position.

5. The treatment apparatus as set forth in claim 1, further comprising:
   a means, placed along the inserting direction of the tube, for guiding an inserting operation of the tube.

6. The treatment apparatus as set forth in claim 1,
   wherein the first hermetic chamber has a plurality of the first openings, the plurality of the first openings are linearly arranged, and the tube and the first hermetic door are provided at each of the first openings.

7. The treatment apparatus as set forth in claim 1,
wherein a plurality of the first hermetic chambers are linearly arranged, said plurality of the first hermetic chambers being portioned off by openable and closeable partitions.

8. The treatment apparatus as set forth in claim 1, further comprising:
a second hermetic chamber adjoining the first hermetic chamber with the first hermetic door therebetween, wherein the tube is inserted into the first opening of the first hermetic chamber from the second hermetic chamber.

9. The treatment apparatus as set forth in claim 8, wherein the exhaust system is connected to the first hermetic chamber via the second hermetic chamber.

10. The treatment apparatus as set forth in claim 9, wherein the third opening of the tube and the exhaust system are hermetically connected when the tube is inserted into the first opening of the first hermetic chamber.

11. The treatment apparatus as set forth in claim 8, further comprising:
a means for performing pressure regulation in a space between the tube and the second hermetic chamber so that a pressure in the space is higher than a pressure in the first hermetic chamber when the tube is inserted into the first opening of the first hermetic chamber.

12. The treatment apparatus as set forth in claim 8, further comprising:
a means for performing pressure regulation in the first hermetic chamber so that a pressure in the first hermetic chamber is lower than a pressure in a space between the tube and the second hermetic chamber and higher than a pressure in the tube when the tube is inserted into the first opening of the first hermetic chamber.

13. The treatment apparatus as set forth in claim 11,
wherein the means for performing pressure regulation has a means for supplying a carrier gas to a space between the tube and the second hermetic chamber.

14. The treatment apparatus as set forth in claim 9, further comprising:
a filter means placed between the second hermetic chamber and the exhaust system.

15. The treatment apparatus as set forth in claim 14,
wherein the filter means includes at least a wet filter.

16. The treatment apparatus as set forth in claim 8,
wherein the tube is removable, and the second hermetic chamber has a second hermetic door that is hermetically openable and closeable for replacing the tube with a second tube.

17. The treatment apparatus as set forth in claim 8, further comprising:
a means for regulating a temperature in the second hermetic chamber.

18. The treatment apparatus as set forth in claim 8, further comprising:
a means for supplying a non-oxidizing gas to the second hermetic chamber.

19. A treatment apparatus, comprising:
a first chamber having a first opening;
a second chamber adjoining the first chamber and having an exhaust opening configured to connect to an exhaust system;
a door provided between the first chamber and the second chamber, the door being configured to open and close the first opening;
a tube having an end with a second opening and a side with a third opening, movable between a first position in which the tube is outside of the first chamber and within the second chamber and a second position in which the end of the tube is within the first opening of the first chamber, which shields the door from the first chamber such that the door is positioned between the second opening and the third opening when the tube is in the second position, the third opening of the tube being positioned opposed to the exhaust opening when the tube is in the second position; and
a cooling section configured to cool the tube when the exhaust system exhausts the first chamber to perform condensation in the tube,
wherein the door is disposed between the first opening and the cooling section.

* * * * *